(12) United States Patent
Kenigsberg et al.

(10) Patent No.: US 11,861,712 B1
(45) Date of Patent: Jan. 2, 2024

(54) MULTIPLE MODULAR ASSET CLASS CONSTRUCTOR APPARATUSES, METHODS AND SYSTEMS

(71) Applicant: FMR LLC, Boston, MA (US)

(72) Inventors: Matthew Kenigsberg, Hingham, MA (US); Prasenjit Mazumdar, Bangalore (IN); Keith Quinton, Hanover, NH (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/958,794

(22) Filed: Dec. 3, 2015

Related U.S. Application Data

(63) Continuation-in-part of application No. 14/601,061, filed on Jan. 20, 2015, now Pat. No. 9,818,156.

(60) Provisional application No. 62/156,115, filed on May 1, 2015.

(51) Int. Cl.
  *G06Q 40/06* (2012.01)
  *G06Q 40/04* (2012.01)

(52) U.S. Cl.
  CPC ............ *G06Q 40/06* (2013.01); *G06Q 40/04* (2013.01)

(58) Field of Classification Search
  CPC .................................................. G06Q 40/06
  USPC ....................................................... 705/36 R
  See application file for complete search history.

(56) References Cited

U.S. PATENT DOCUMENTS

| | | |
|---|---|---|
| 5,802,501 A | 9/1998 | Graff |
| 6,078,904 A | 6/2000 | Rebane |
| 6,167,384 A | 12/2000 | Graff |
| 6,192,347 B1 | 2/2001 | Graff |
| 6,778,968 B1 | 8/2004 | Gulati |
| 7,062,458 B2 | 6/2006 | Maggioncalda |
| 7,203,661 B1 | 4/2007 | Graff |

(Continued)

OTHER PUBLICATIONS

M. Cooper, "The economics of collaborative production in the spectrum commons," First IEEE International Symposium on New Frontiers in Dynamic Spectrum Access Networks, 2005. DySPAN 2005., 2005, pp. 379-400, doi: 10.1109/DYSPAN.2005.1542656 ( Collaborative). (Year: 2005).

(Continued)

*Primary Examiner* — Robert R Niquette
(74) *Attorney, Agent, or Firm* — Hanchuk Kheit LLP.; Walter G. Hanchuk

(57) ABSTRACT

The Multiple Modular Asset Class Constructor Apparatuses, Methods and Systems ("MMACC") transforms collateralized equity obligation structure parameters, asset search, tranche selections inputs via MMACC components into asset income distribution message, principal distribution message outputs. A capital structure input may be obtained from a system user via a first data structure that specifies dividend allocation and capital allocation for a first equity tranche, and dividend allocation and capital allocation for a second equity tranche. Dividend allocation and capital allocation for the first equity tranche, and dividend allocation and capital allocation for the second equity tranche may be determined. A second data structure may be generated that maps dividend allocation and capital allocation of an index to the first equity tranche and to the second equity tranche. Shares of the first equity tranche and shares of the second equity tranche may be generated using the second data structure.

19 Claims, 94 Drawing Sheets

(56) References Cited

U.S. PATENT DOCUMENTS

| | | | |
|---|---|---|---|
| 7,475,032 B1 | 1/2009 | Patnode | |
| 7,774,257 B2 | 8/2010 | Maggioncalda | |
| 7,788,155 B2* | 8/2010 | Jones | G06Q 40/08 705/36 R |
| 7,813,989 B2 | 10/2010 | Jones | |
| 7,983,975 B2 | 7/2011 | Jones | |
| 8,200,561 B1 | 6/2012 | Scott | |
| 8,224,732 B1 | 7/2012 | Mahoney | |
| 8,306,885 B2 | 11/2012 | Brose | |
| 8,335,736 B2 | 12/2012 | Caputo | |
| 8,341,063 B1 | 12/2012 | Cernyar | |
| 8,396,775 B1 | 3/2013 | Mindlin | |
| 8,515,848 B2 | 8/2013 | Torre | |
| 8,595,116 B1 | 11/2013 | Bettinger | |
| 9,874,859 B1 | 1/2018 | Perzichilli | |
| 10,453,142 B2 | 10/2019 | Mun | |
| 2002/0138386 A1 | 9/2002 | Maggioncalda | |
| 2005/0038734 A1 | 2/2005 | Graff | |
| 2005/0108146 A1 | 5/2005 | Bond | |
| 2005/0114151 A1 | 5/2005 | Graff | |
| 2005/0154662 A1 | 7/2005 | Langenwalter | |
| 2006/0010060 A1 | 1/2006 | Jones | |
| 2006/0074788 A1 | 4/2006 | Grizack | |
| 2006/0200400 A1 | 9/2006 | Hunter | |
| 2007/0179964 A1 | 8/2007 | Fink | |
| 2007/0239572 A1 | 10/2007 | Harris | |
| 2007/0244777 A1 | 10/2007 | Torre | |
| 2007/0244785 A1 | 10/2007 | Williams | |
| 2008/0154792 A1 | 6/2008 | Maggioncalda | |
| 2008/0235154 A1 | 9/2008 | Jones | |
| 2008/0288889 A1 | 11/2008 | Hunt | |
| 2008/0294996 A1 | 11/2008 | Hunt | |
| 2008/0319829 A1 | 12/2008 | Hunt | |
| 2009/0006156 A1 | 1/2009 | Hunt | |
| 2009/0048958 A1 | 2/2009 | Gardner | |
| 2009/0055327 A1 | 2/2009 | Jones | |
| 2009/0076873 A1 | 3/2009 | Johnson | |
| 2009/0076980 A1 | 3/2009 | Ameriks | |
| 2009/0138406 A1 | 5/2009 | Reinkemeyer | |
| 2009/0150301 A1 | 6/2009 | Abbott | |
| 2009/0281959 A1 | 11/2009 | Abidi | |
| 2010/0008250 A1 | 1/2010 | Nomura | |
| 2010/0057636 A1 | 3/2010 | Brennan | |
| 2010/0145873 A1 | 6/2010 | Bakaya | |
| 2011/0087622 A1 | 4/2011 | Padgette | |
| 2011/0153520 A1 | 6/2011 | Jeng | |
| 2011/0270782 A1 | 11/2011 | Trenner | |
| 2012/0259797 A1 | 10/2012 | Sarkany | |
| 2013/0211990 A1 | 8/2013 | Zhong | |
| 2014/0089229 A1* | 3/2014 | Ameriks | G06Q 40/12 705/36 R |
| 2014/0258175 A1* | 9/2014 | Twombly | G06Q 40/06 705/36 R |
| 2015/0161733 A1 | 6/2015 | Emsbo-Mattingly | |
| 2015/0206245 A1 | 7/2015 | Basu | |
| 2016/0063631 A1 | 3/2016 | Wootton | |
| 2016/0086277 A1 | 3/2016 | Irlam | |
| 2016/0155200 A1 | 6/2016 | Basu | |
| 2017/0132706 A1 | 5/2017 | Kariv | |

OTHER PUBLICATIONS

L.F.Pau, "Artificial Intelligence and Financial Services", IEEE Transaction on Knowledge and Data Engineering, vol. 3, No. 2, Jun. 1991.

* cited by examiner

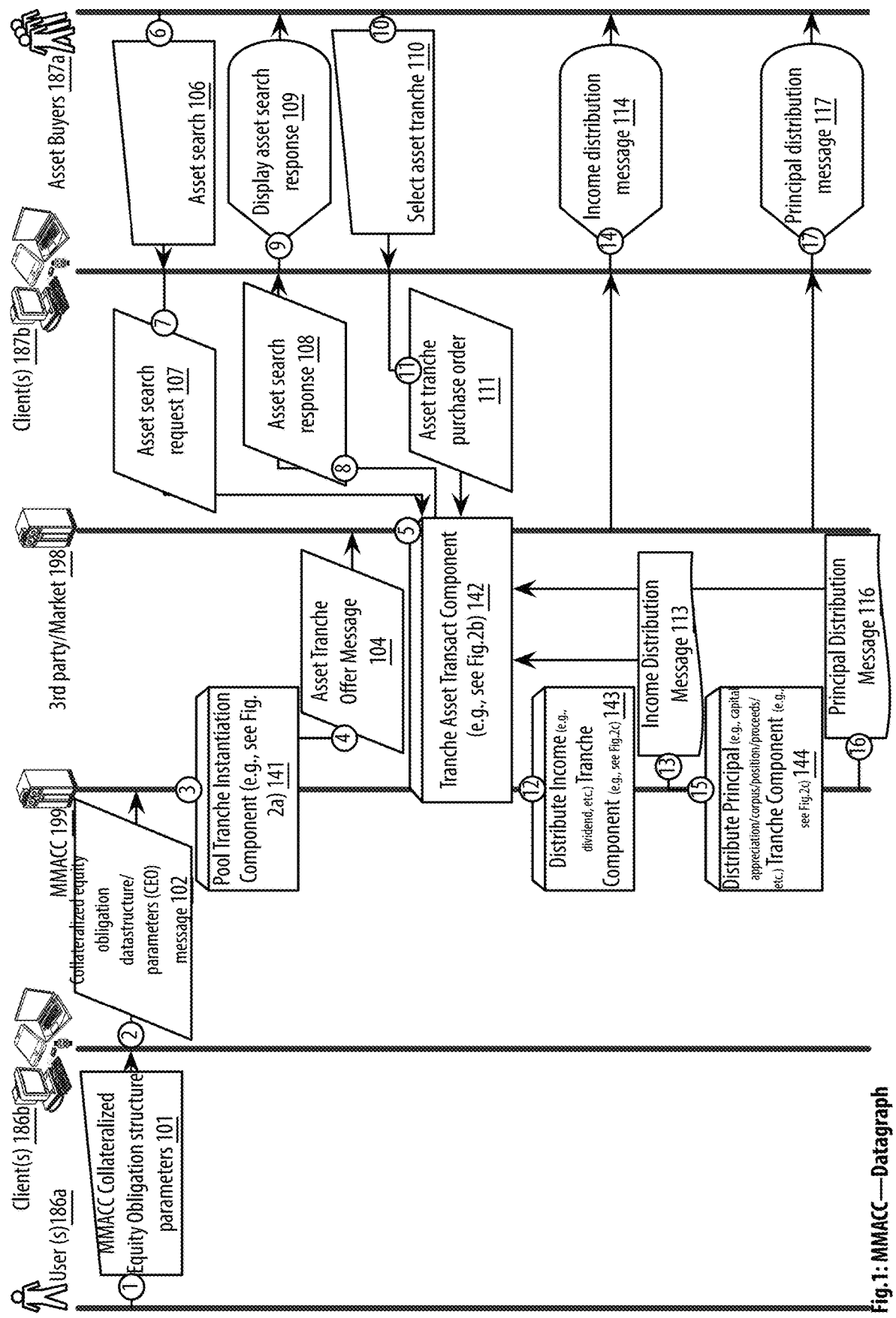
Fig. 1: MMACC—Datagraph

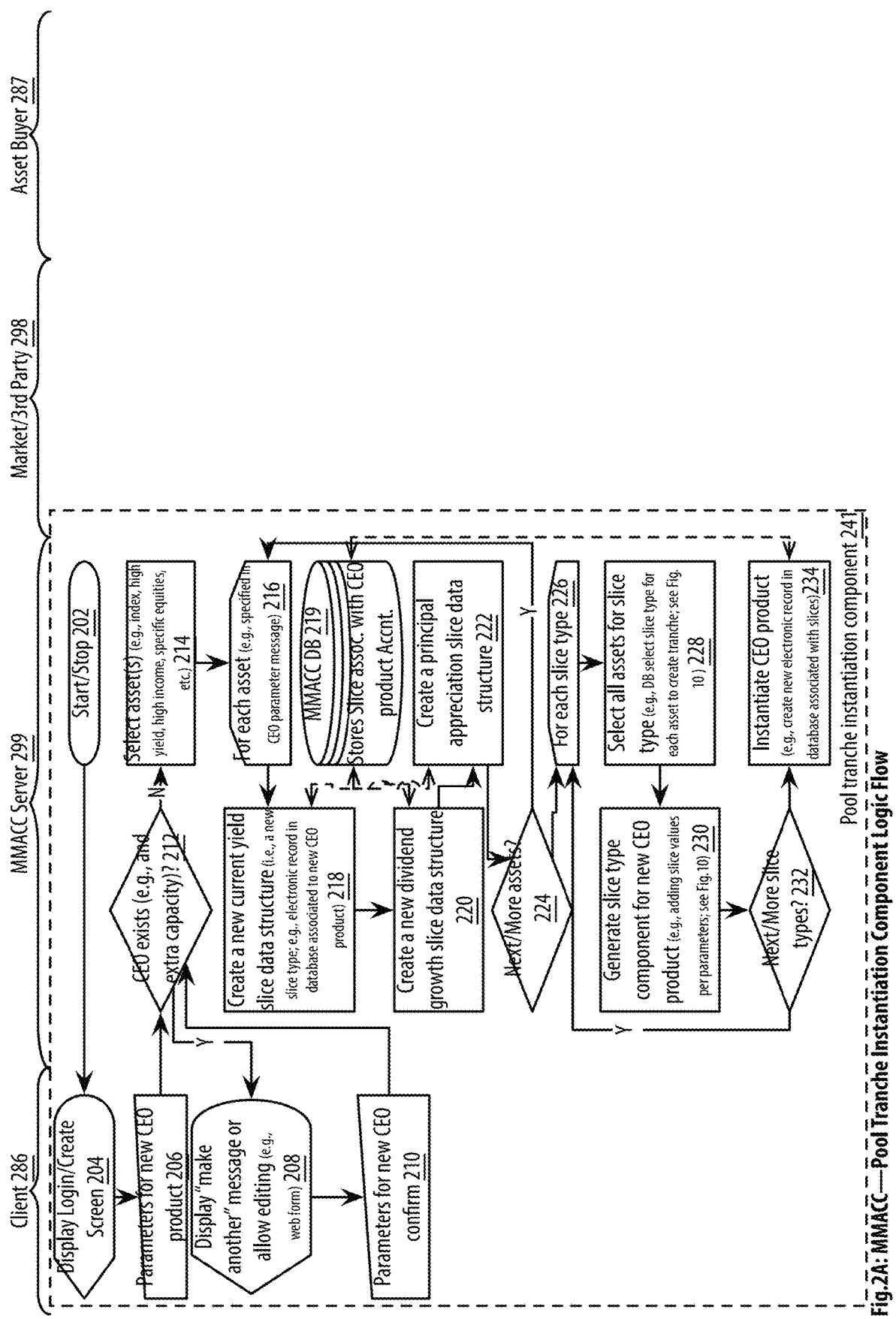
Fig.2A: MMACC—Pool Tranche Instantiation Component Logic Flow

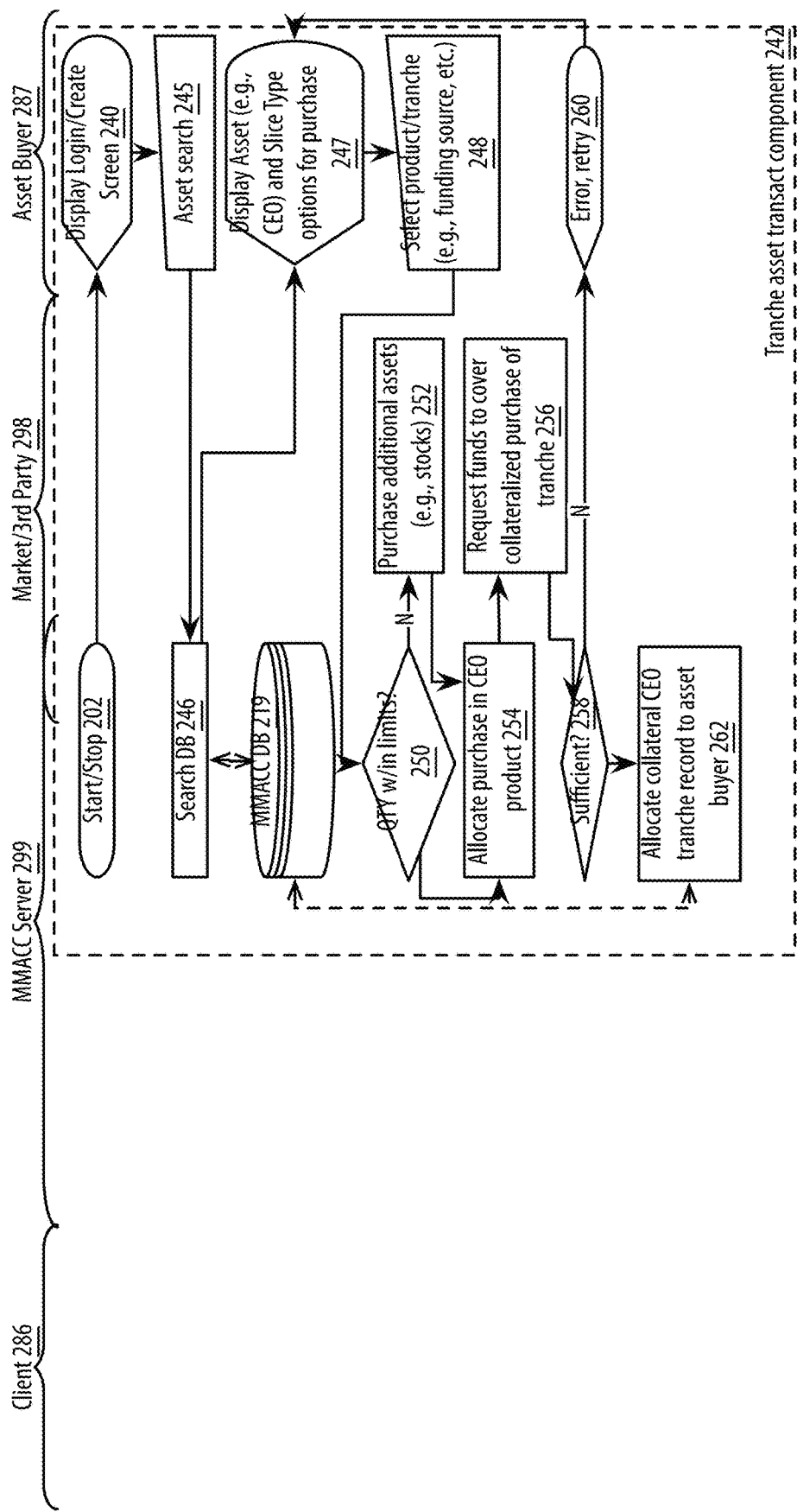
Fig.2B: MMACC—Transact Component Logic Flow

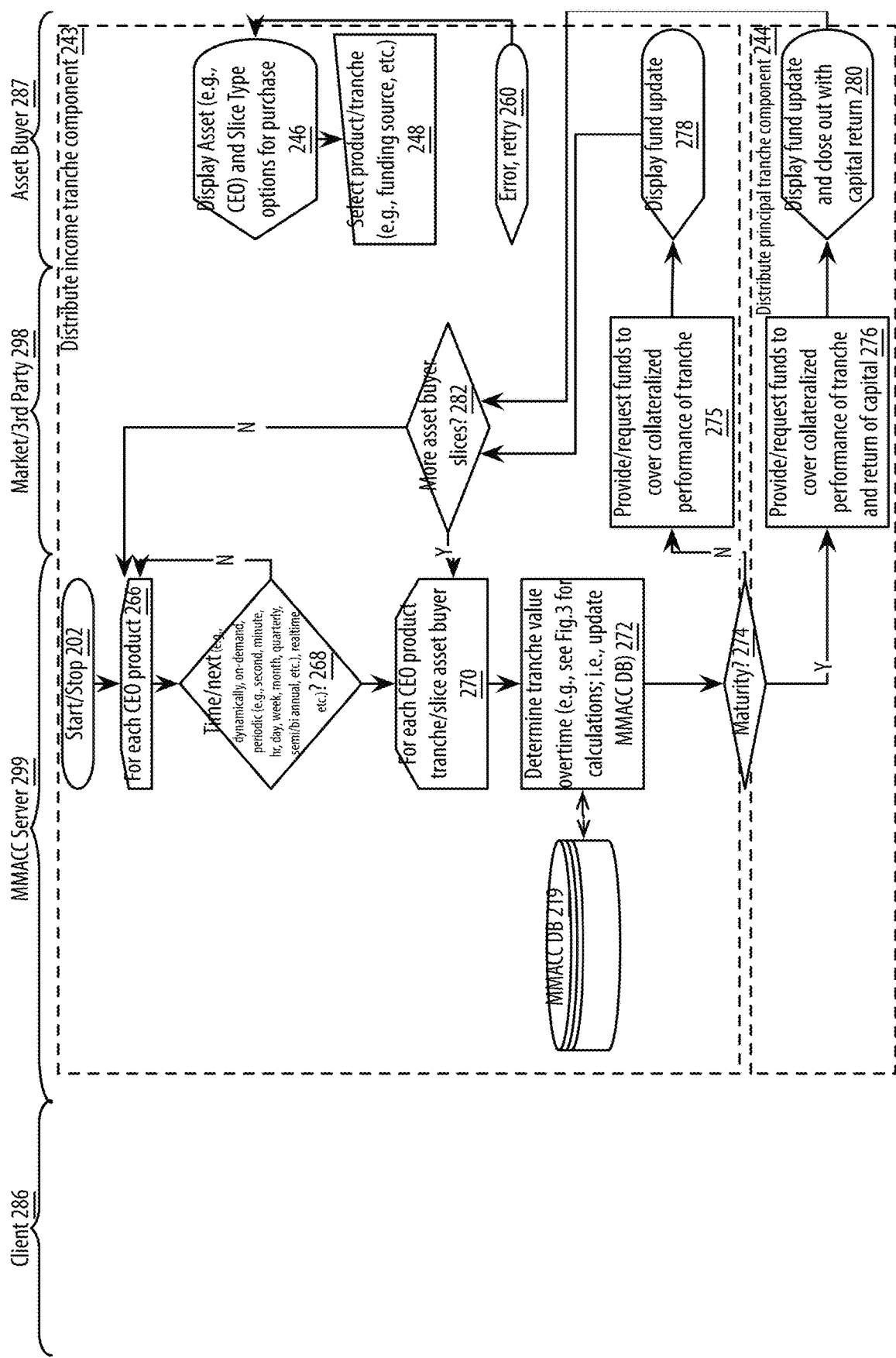
Fig.2C: MMACC—Distribute Components Logic Flow

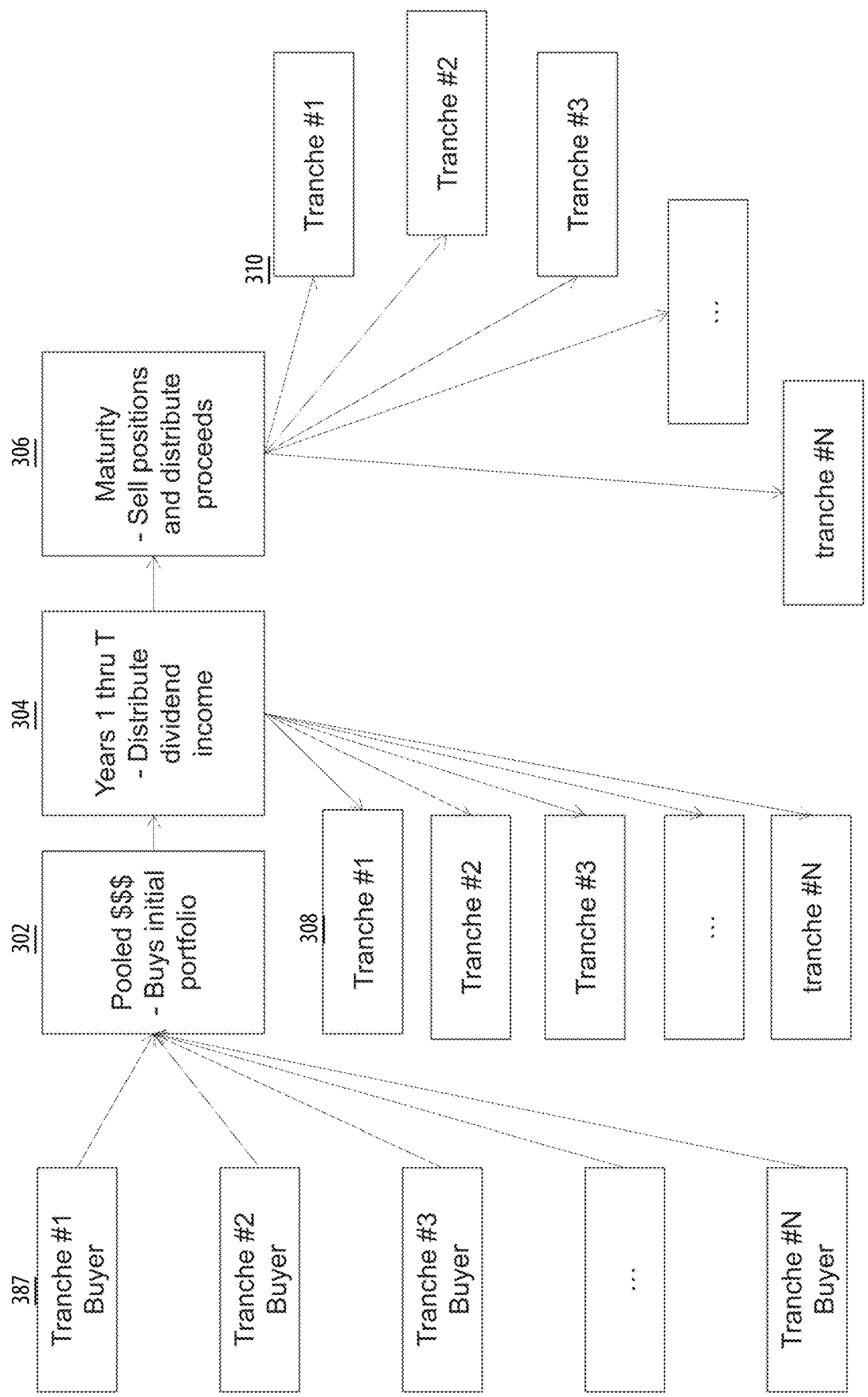
Fig.3: MMACC—Datagraph/Structure

| | Portfolio Dividend Income | Dividend Allocation | | |
|---|---|---|---|---|
| | | Tranche 1 | Tranche 2 | Tranche 3 |
| 2009 | 8,044,745 | $3,100,000 | $3,100,000 | $1,844,745 |
| 2010 | 8,287,523 | $3,100,000 | $3,100,000 | $2,087,523 |
| 2011 | 10,444,385 | $3,100,000 | $4,244,385 | $3,100,000 |
| 2012 | 13,651,874 | $3,100,000 | $7,451,874 | $3,100,000 |
| 2013 | 14,405,821 | $3,100,000 | $8,205,821 | $3,100,000 |
| Total: | | $15,500,000 | $26,102,079 | $13,232,268 |

| | Portfolio Market Value | Market Value Allocation | | |
|---|---|---|---|---|
| | | Tranche 1 | Tranche 2 | Tranche 3 |
| 2013 | $595,740,879 | $100,000,000 | $100,000,000 | $395,740,879 |
| 5 Year Simple Return: | | 15.5% | 26.1% | 309.0% |
| Annual IRR: | | 3.1% | 5.1% | 33.2% |

Fig.4: MMACC—Example CE0 Parameters 2008 Vintage

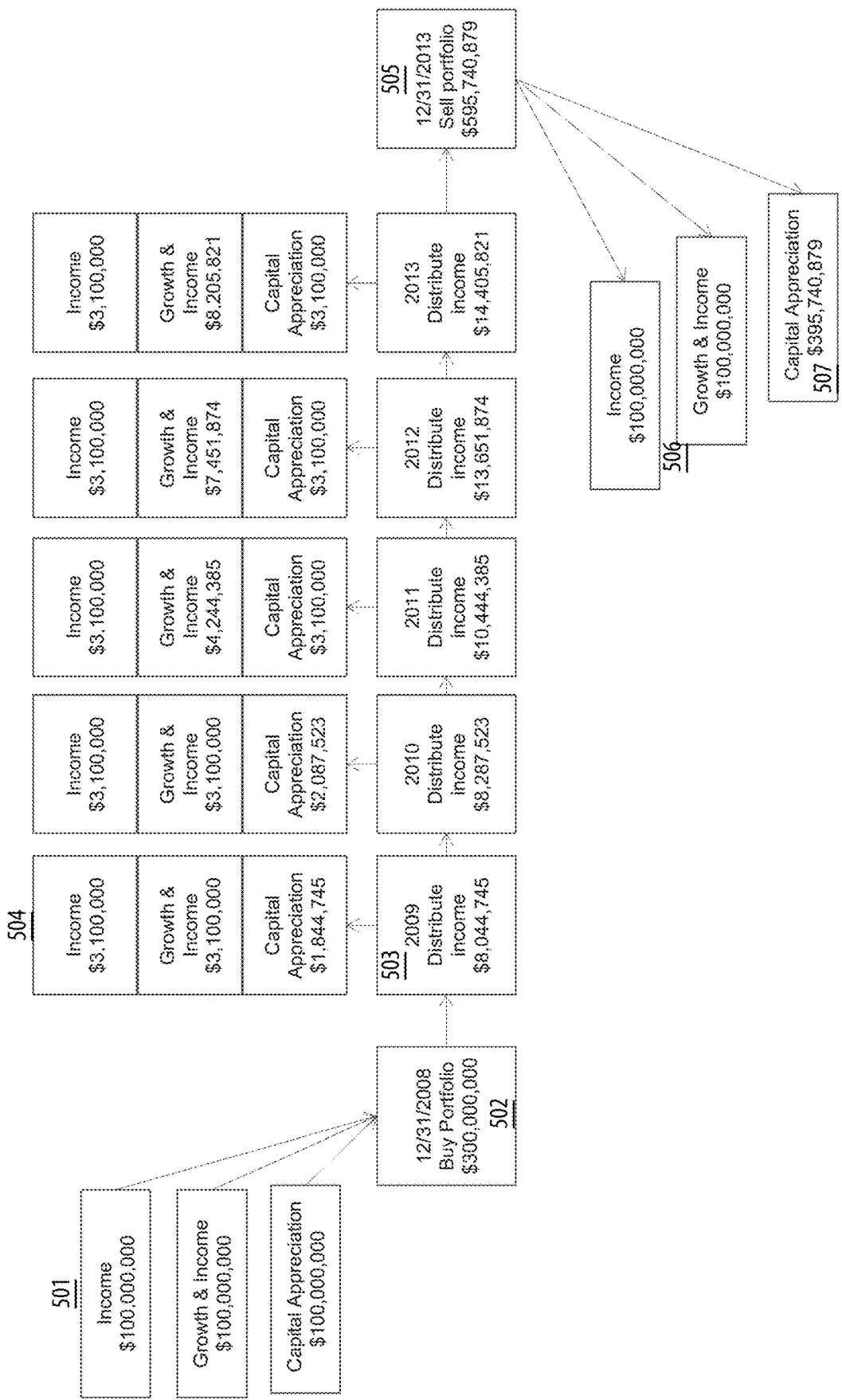
Fig.5: MMACC—2008 Vintage Flowchart

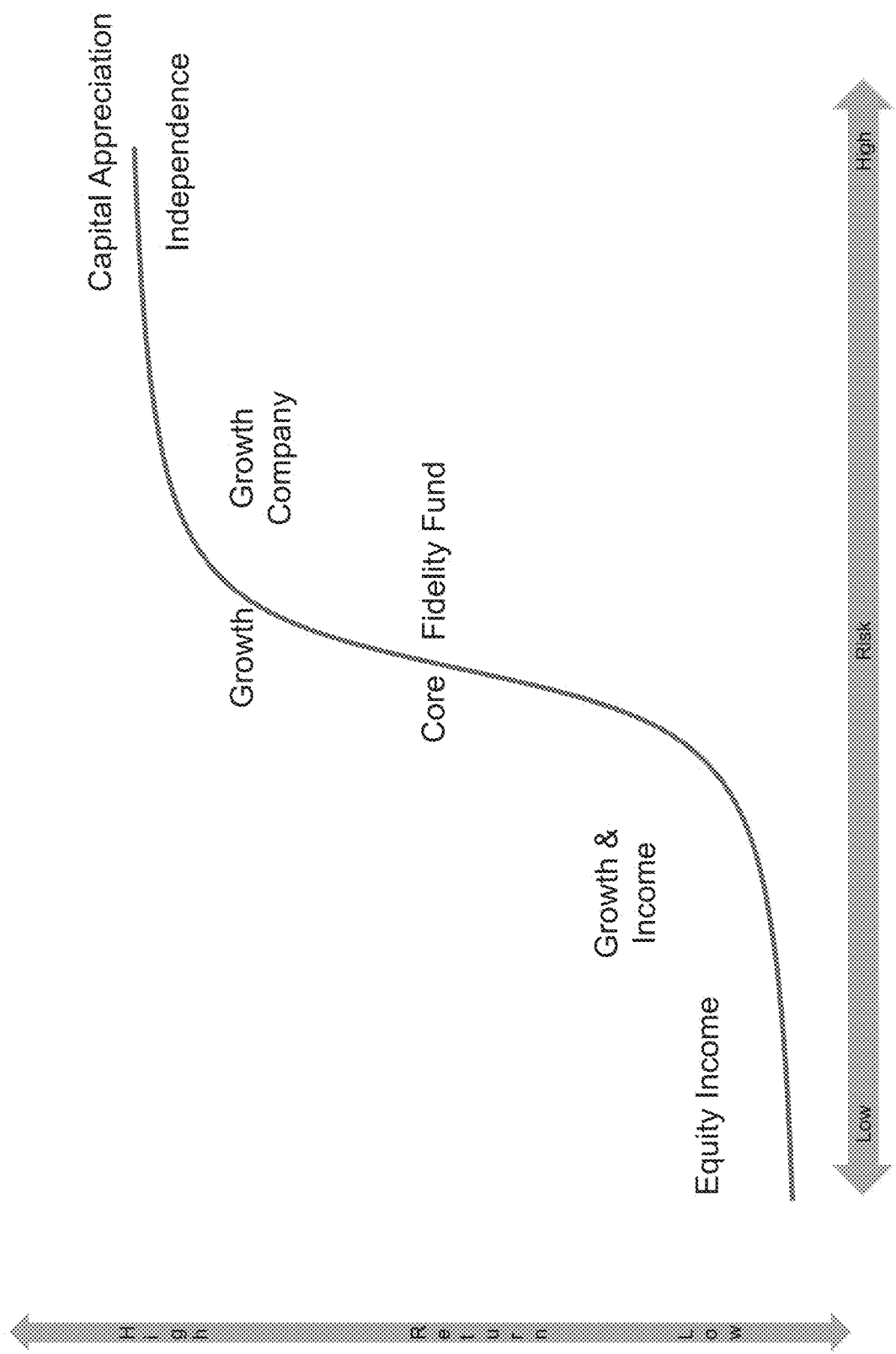
Fig.6: MMACC—Equity Product Line

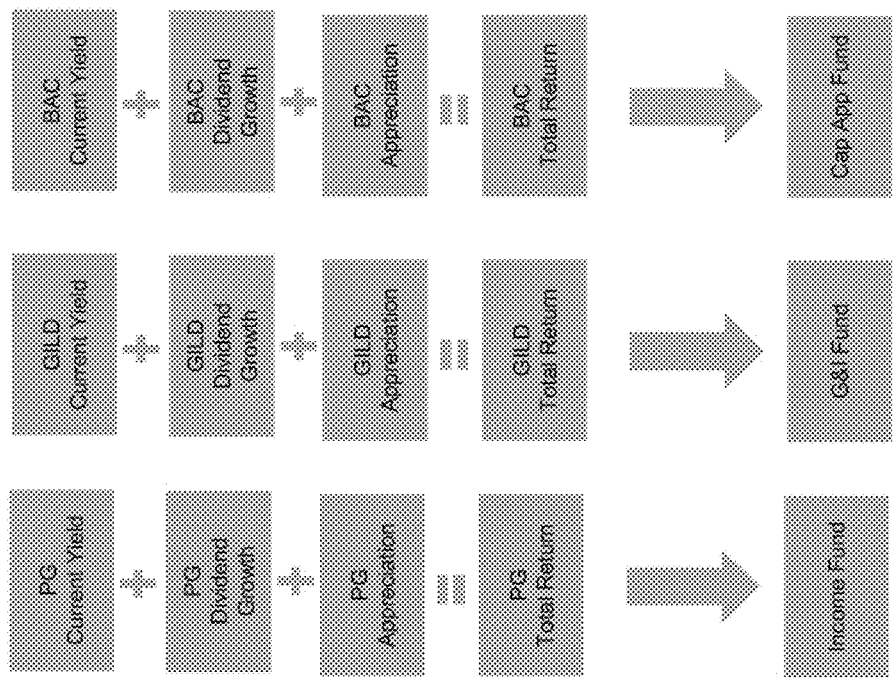
Fig.7: MMACC—Equity Process

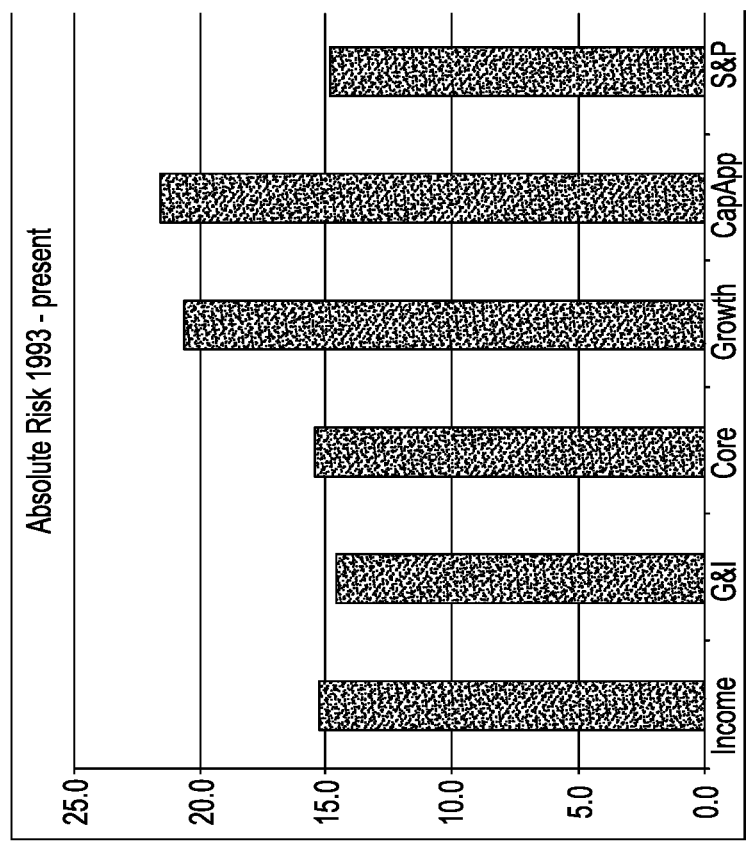
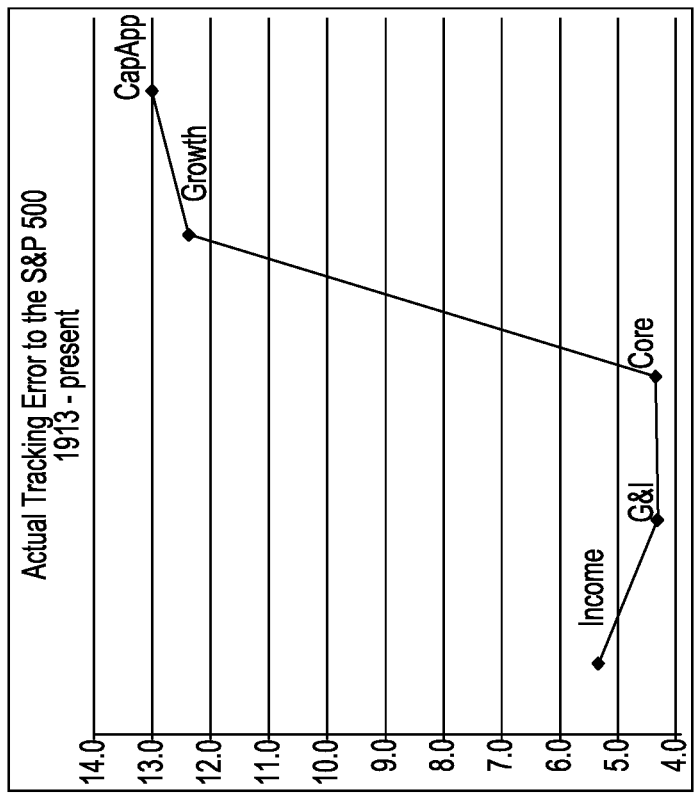
Fig. 8  MMACC - Fund Perfomance (Risk)

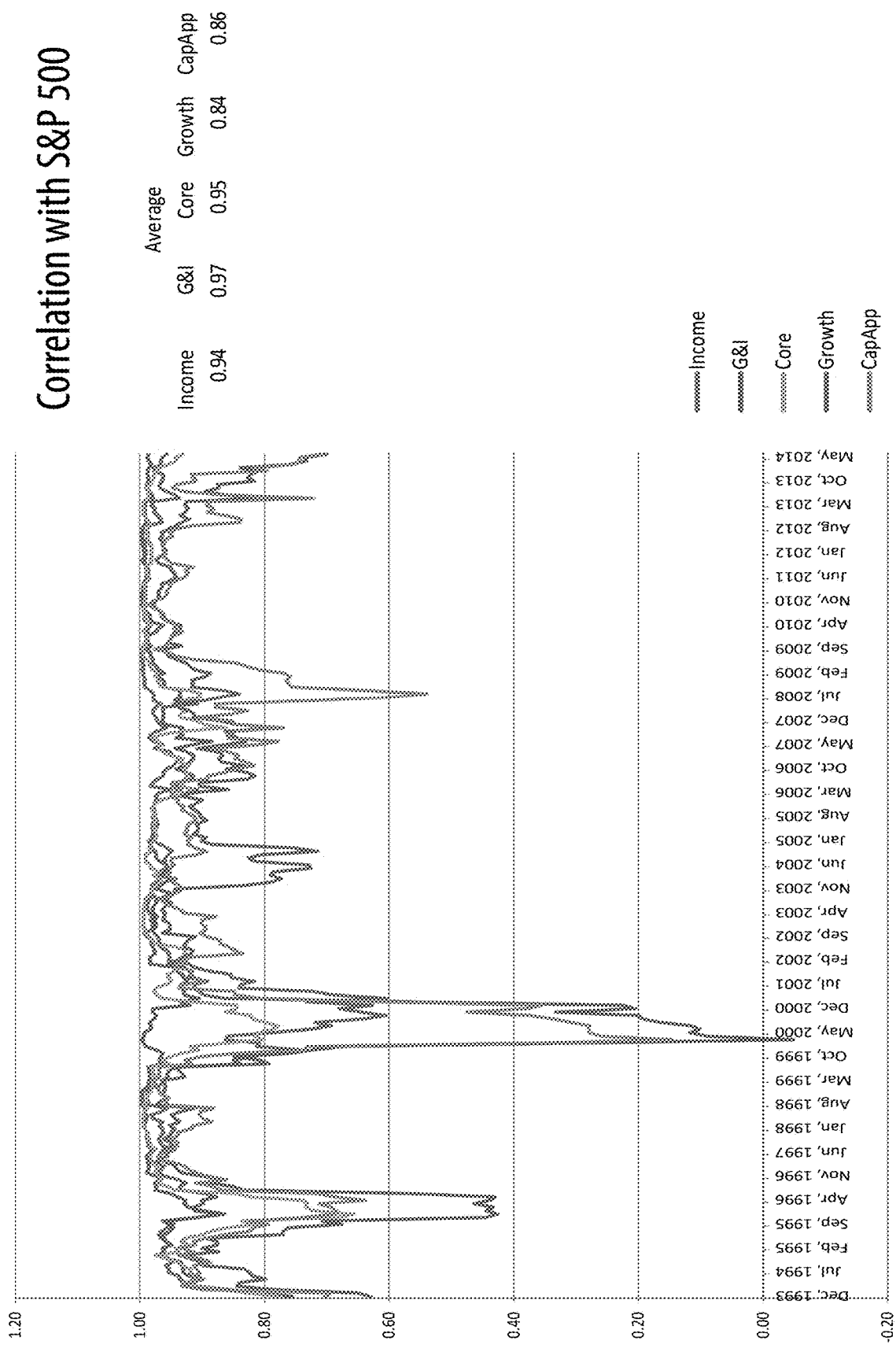
Fig.9A: MMACC—Correlation/Performance

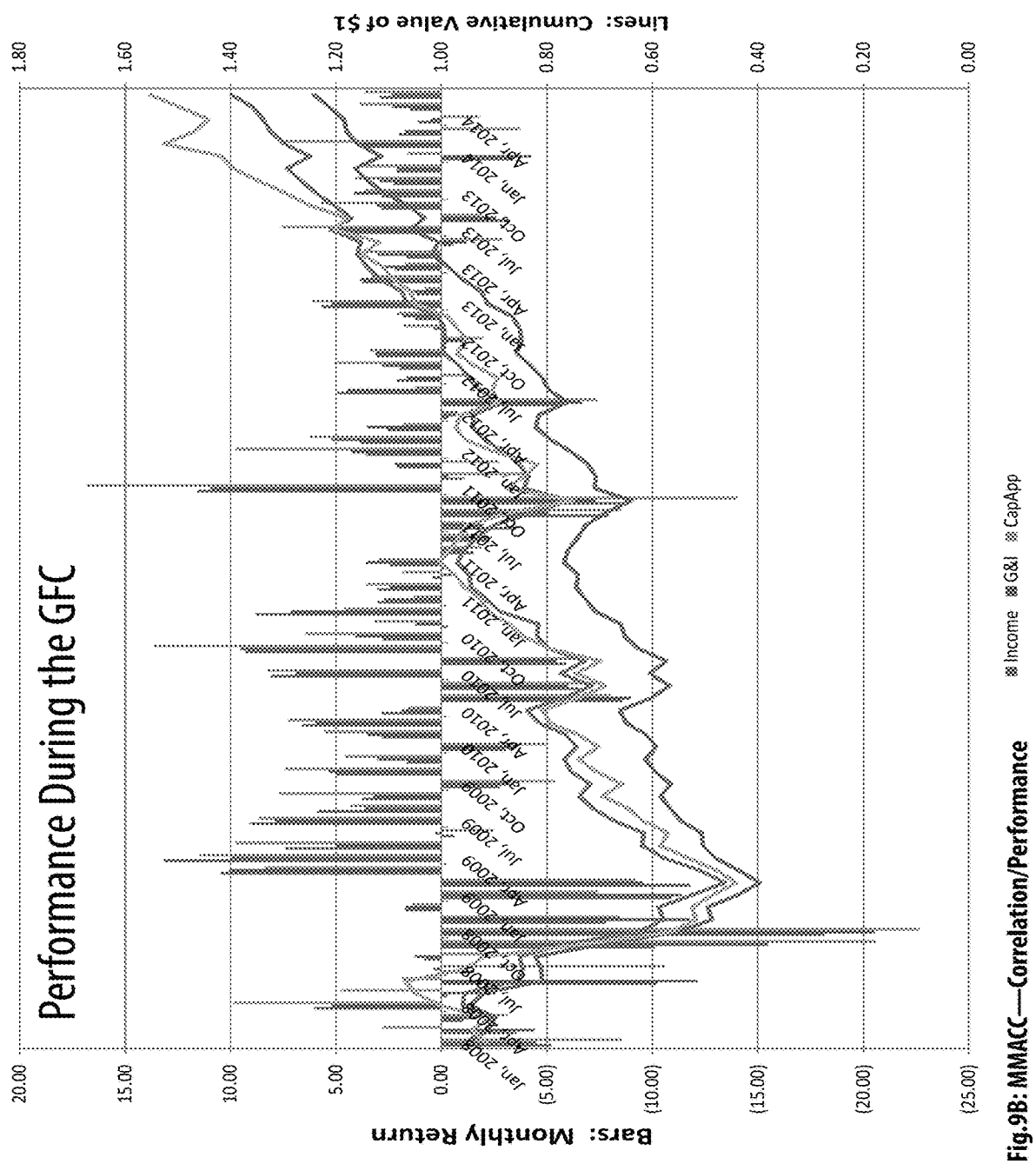
Fig. 9B: MMACC—Correlation/Performance

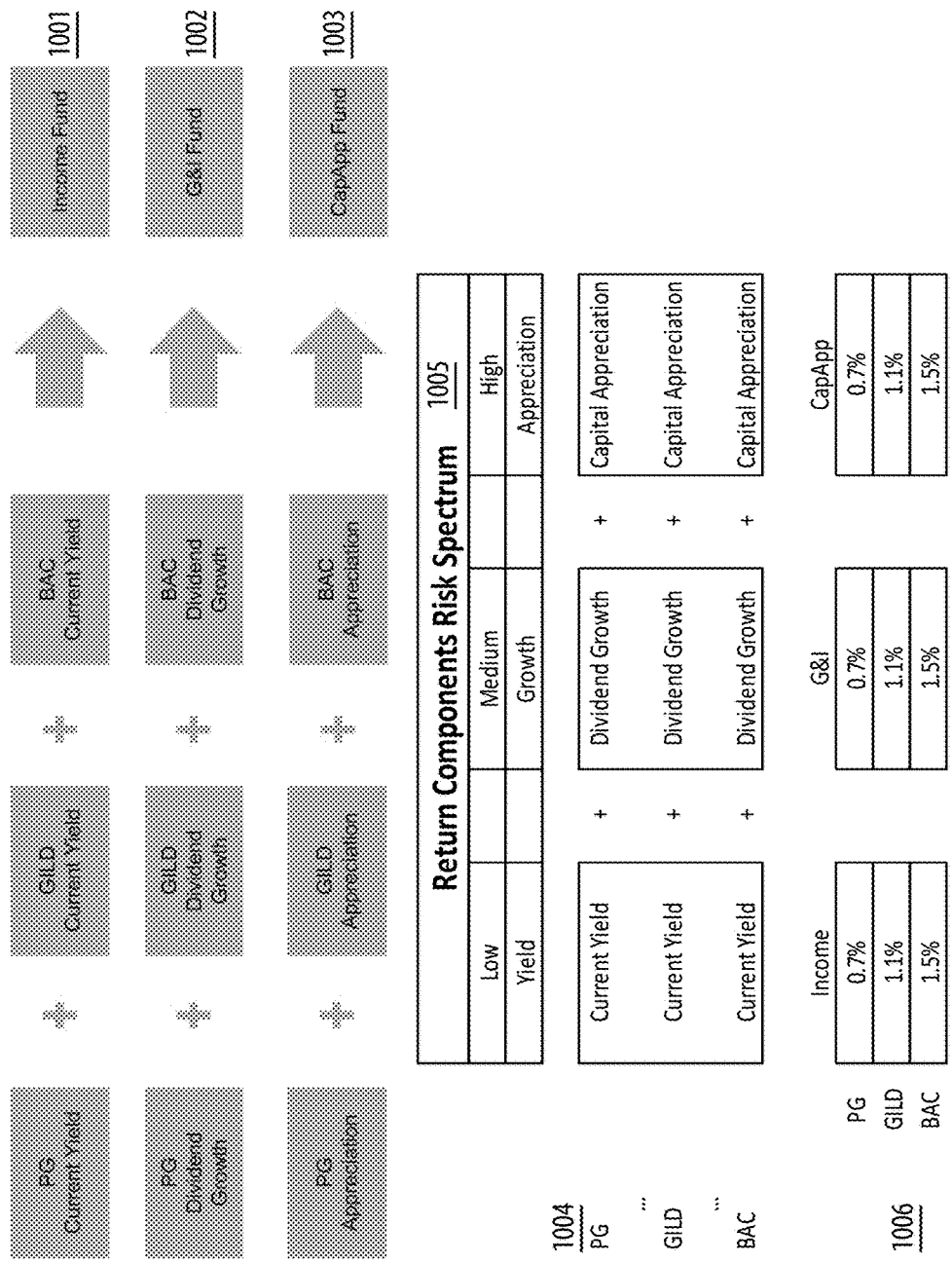
Fig.10: MMACC—MMACC Structure

$300 MM Sold at 4% Yield

| | 0 | 1 | 2 | 3 | 4 | 5 | | Total Return | | | | | Overall | Average | STD | Sharpe |
|---|---|---|---|---|---|---|---|---|---|---|---|---|---|---|---|---|
| | | | | | | | | 1 | 2 | 3 | 4 | 5 | | | | |
| Index Price | 100 | 105 | 100 | 95 | 102 | 110 | | | | | | | | | | |
| Index Yield | | 4.0% | 4.4% | 4.8% | 3.9% | 4.4% | | | | | | | | | | |
| Portfolio | | | | | | | | | | | | | | | | |
| Dividend income | | 12,000,000 | 13,860,000 | 14,400,000 | 11,115,000 | 13,464,000 | | | | | | | | | | |
| Value | 300,000,000 | 315,000,000 | 300,000,000 | 285,000,000 | 306,000,000 | 330,000,000 | | 9.0% | -0.4% | -0.2% | 11.3% | 12.2% | 31.6% | 6.4% | 6.2% | 1.03 |
| Income tranche | | | | | | | | | | | | | | | | |
| Dividend income | | 4,000,000 | 4,000,000 | 4,000,000 | 4,000,000 | 4,000,000 | | | | | | | | | | |
| Value | 100,000,000 | 100,000,000 | 100,000,000 | 100,000,000 | 100,000,000 | 100,000,000 | | 4.0% | 4.0% | 4.0% | 4.0% | 4.0% | 20.0% | 4.0% | 0.0% | n.m. |
| Portfolio ex-Income | | | | | | | | | | | | | | | | |
| Dividend income | | 8,000,000 | 9,860,000 | 10,400,000 | 7,115,000 | 9,464,000 | | | | | | | | | | |
| Value | 200,000,000 | 215,000,000 | 200,000,000 | 185,000,000 | 206,000,000 | 230,000,000 | | 11.5% | -2.4% | -2.3% | 15.2% | 16.2% | 37.4% | 7.7% | 9.3% | 0.82 |
| G&I Tranche | | | | | | | | | | | | | | | | |
| Dividend income | | 4,000,000 | 5,860,000 | 6,400,000 | 4,000,000 | 5,464,000 | | | | | | | | | | |
| Value | 100,000,000 | 100,000,000 | 100,000,000 | 100,000,000 | 100,000,000 | 100,000,000 | | 4.0% | 5.9% | 6.4% | 4.0% | 5.5% | 25.7% | 5.1% | 1.1% | 4.69 |
| Portfolio ex-Income, ex-G&I (= Capp App) | | | | | | | | | | | | | | | | |
| Dividend income | | 4,000,000 | 4,000,000 | 4,000,000 | 3,115,000 | 4,000,000 | | | | | | | | | | |
| Value | 100,000,000 | 115,000,000 | 100,000,000 | 85,000,000 | 106,000,000 | 130,000,000 | | 19.0% | -9.6% | -11.0% | 28.4% | 26.4% | 49.1% | 10.6% | 19.4% | 0.55 |

Fig. 11: MMACC—MMACC Hypothetical

1970 Tranche

| Sold at: | 3.5% | Start | 1971 | 1972 | 1973 | 1974 | 1975 | | Total Return | | | | | Overall | Average | STD | Sharpe |
|---|---|---|---|---|---|---|---|---|---|---|---|---|---|---|---|---|---|
| | | | | | | | | 1 | 2 | 3 | 4 | 5 | | | | |
| Index Price | | 92.15 | 102.09 | 118.05 | 97.55 | 68.56 | 90.19 | | | | | | | | | |
| Index Dividend | | $3.19 | $3.16 | $3.19 | $3.61 | $3.72 | $3.73 | | | | | | | | | |
| Index Yield | | 3.5% | 3.1% | 2.7% | 3.7% | 5.4% | 4.1% | | | | | | | | | |
| Portfolio | | | | | | | | | | | | | | | | |
| Income | | | 10,303,169 | 10,376,614 | 11,750,461 | 12,119,831 | 12,155,831 | 3.4% | 3.1% | 3.1% | 3.8% | 5.4% | 16.8% | 6.0% | 25.6% | 0.23 |
| 3,255,562 | Value | 300,000,000 | 332,360,282 | 384,319,045 | 317,580,033 | 223,201,302 | 293,619,099 | 14.2% | 18.8% | -14.3% | -25.9% | 37.0% | | | | |
| 30.0% Income tranche | | | | | | | | | | | | | | | | |
| Income | | | 3,114,000 | 3,114,000 | 3,114,000 | 3,114,000 | 3,114,000 | 3.5% | 3.5% | 3.5% | 3.5% | 3.5% | 17.3% | 3.5% | 0.0% | n.m. |
| 976,668 | Value | 90,000,000 | 90,000,000 | 90,000,000 | 90,000,000 | 90,000,000 | 90,000,000 | 3.5% | 3.5% | 3.5% | 3.5% | 3.5% | | | | |
| Portfolio ex-Income | | | | | | | | | | | | | | | | |
| Income | | | 7,189,169 | 7,262,614 | 8,636,461 | 9,005,831 | 9,041,831 | 3.4% | 3.0% | 2.9% | 4.0% | 6.8% | 16.6% | 9.1% | 38.4% | 0.24 |
| Value | 210,000,000 | 242,360,282 | 294,319,045 | 227,580,033 | 133,201,302 | 203,619,099 | 18.8% | 24.4% | -19.7% | -37.5% | 59.7% | | | | |
| 30.0% G&I Tranche | | | | | | | | | | | | | | | | |
| Income | | | 3,114,000 | 3,114,000 | 4,484,461 | 4,853,831 | 4,889,831 | 3.5% | 3.5% | 5.0% | 5.4% | 5.4% | 22.7% | 4.5% | 1.0% | 4.52 |
| 976,668 | Value | 90,000,000 | 90,000,000 | 90,000,000 | 90,000,000 | 90,000,000 | 90,000,000 | 3.5% | 3.5% | 5.0% | 5.4% | 5.4% | | | | |
| 40.0% CapApp Tranche | | | | | | | | | | | | | | | | |
| Income | | | 4,075,169 | 4,148,614 | 4,152,000 | 4,152,000 | 4,152,000 | 3.4% | 2.7% | 2.0% | 3.0% | 9.6% | 11.9% | 28.7% | 81.5% | 0.35 |
| 1,302,225 | Value | 120,000,000 | 152,360,282 | 204,319,045 | 137,580,033 | 43,201,302 | 113,619,099 | 30.4% | 36.8% | -30.6% | -65.6% | 172.6% | | | | |

Fig. 12: MMACC—MMACC Actual

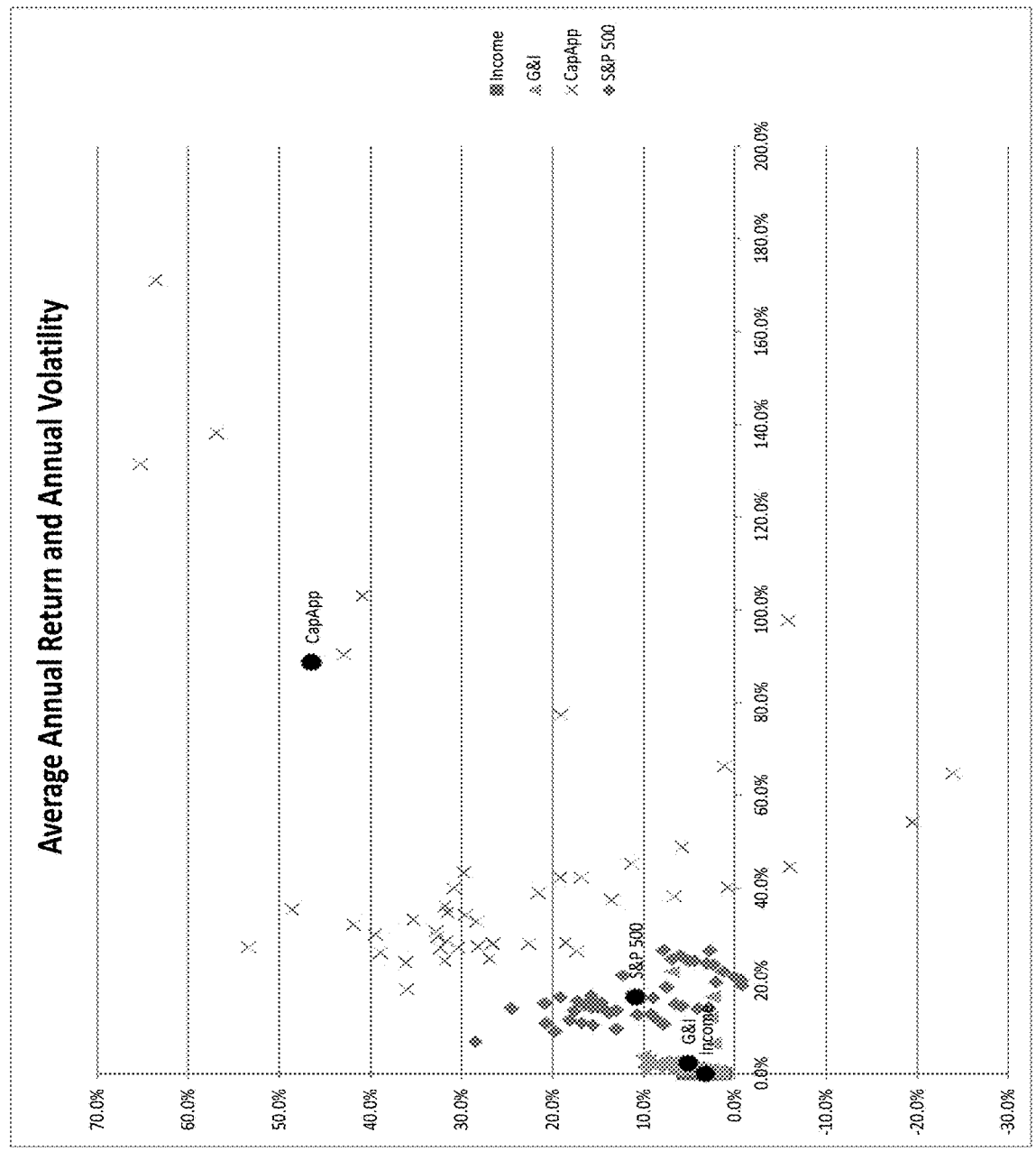
Fig. 13: MMACC—Outcome Range 1961-2008

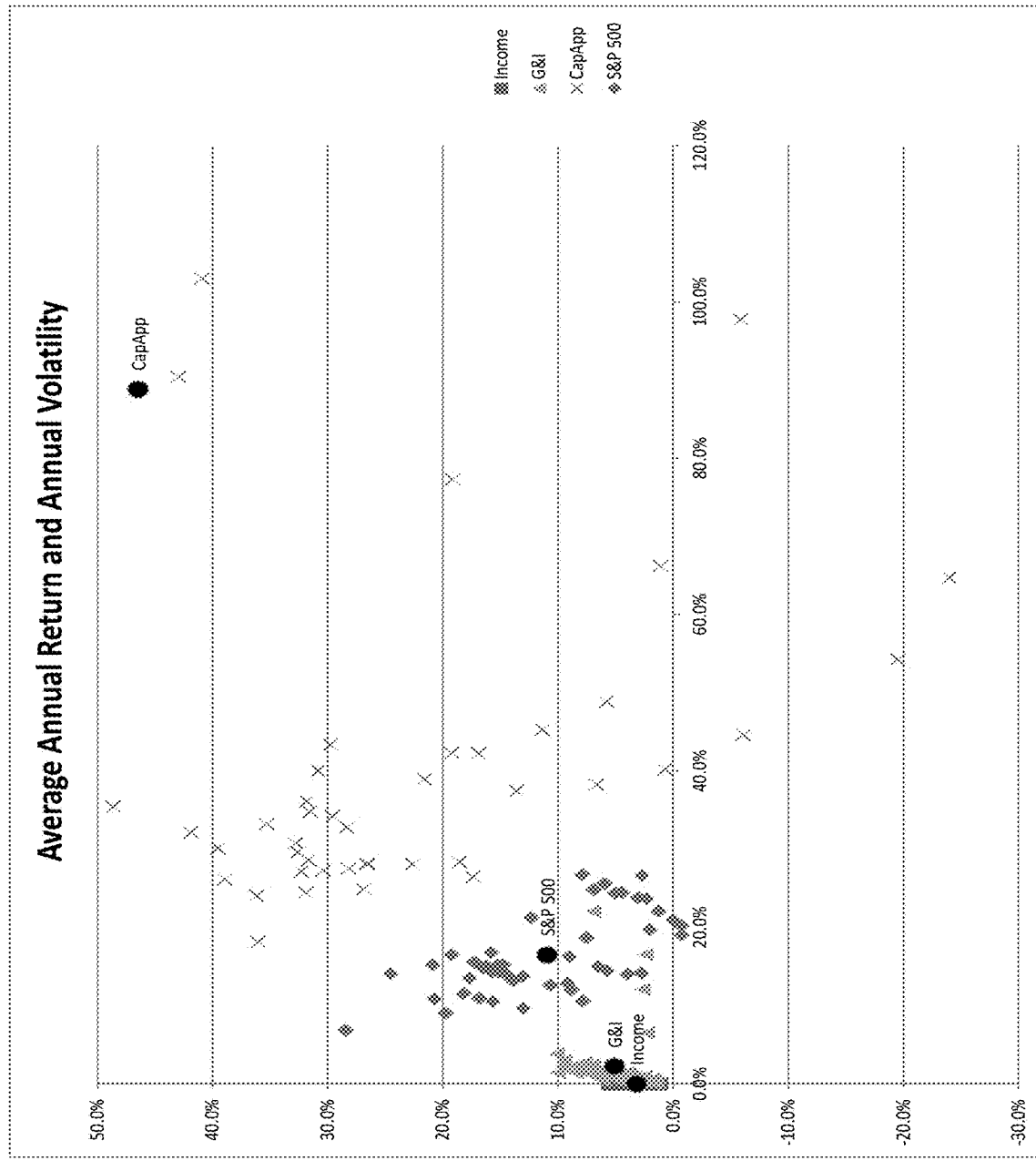
Fig. 14: MMACC—Outcome Range 1961-2008

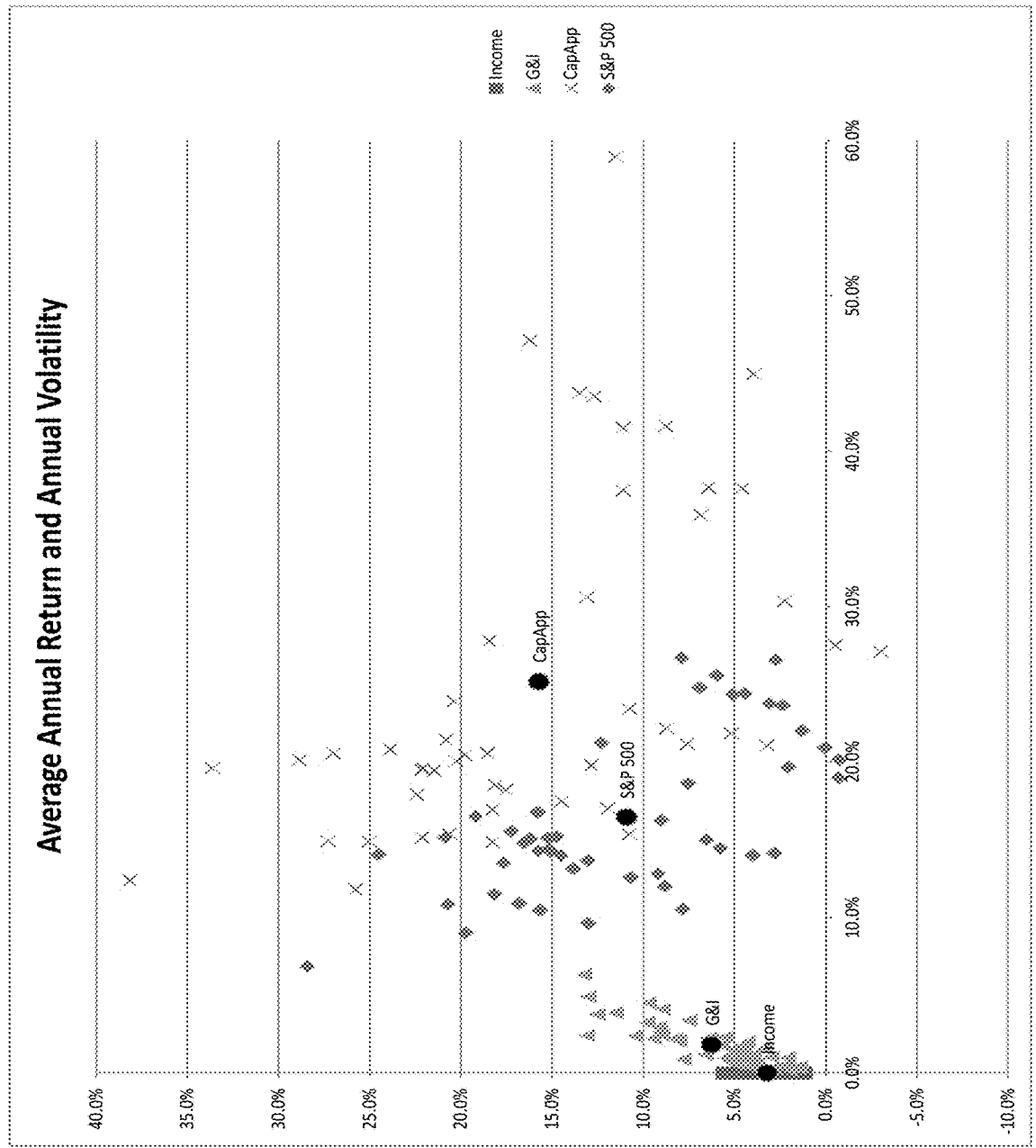
Fig.15: MMACC—Shift Risk Change Allocation 33:33:33 to 20:20:60

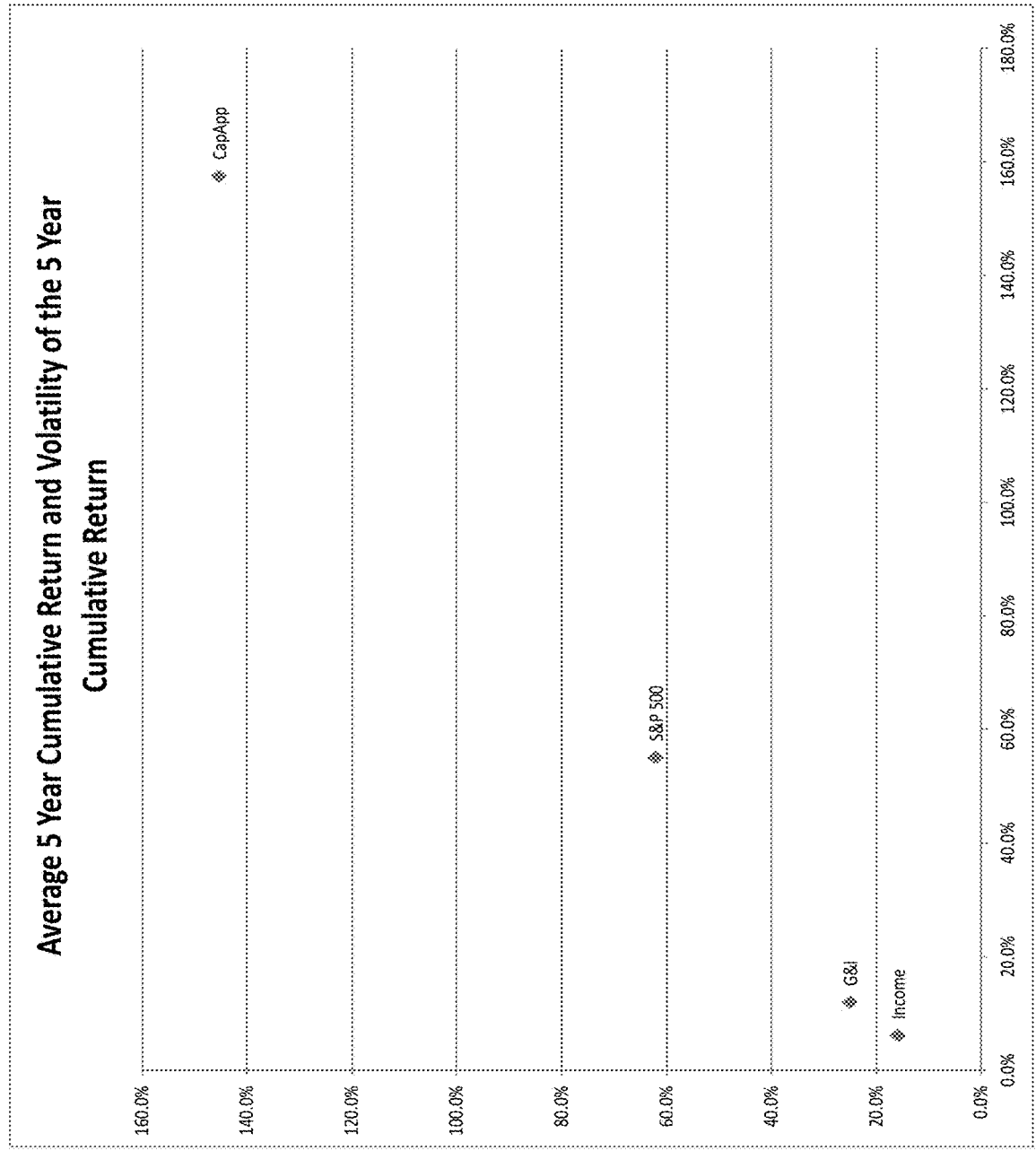
Fig.16: MMACC—5 Yr Outcomes 1961-2008

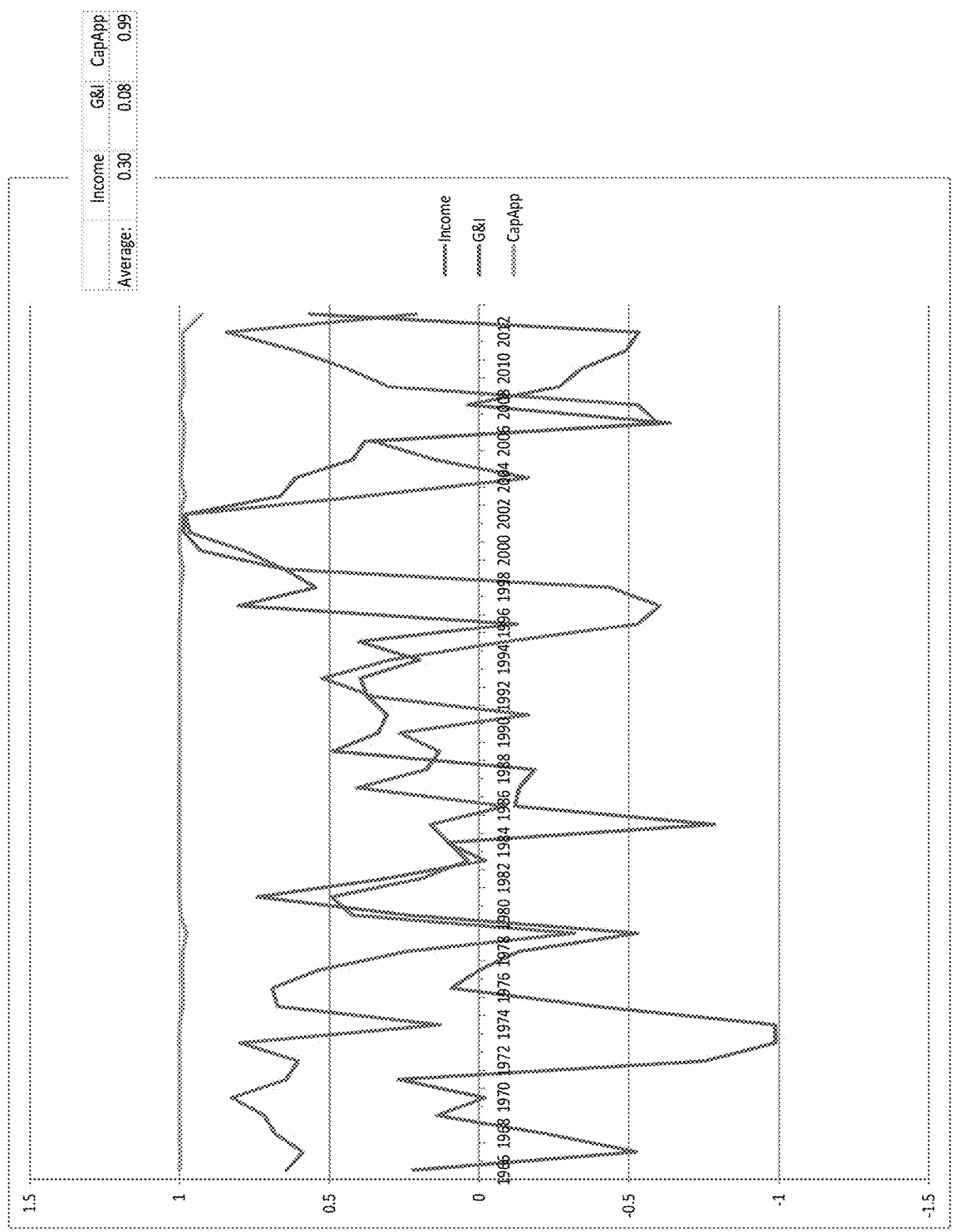
Fig.17: MMACC—Trailing 5 Yr MMACC Tranche Correlations with S&P 500

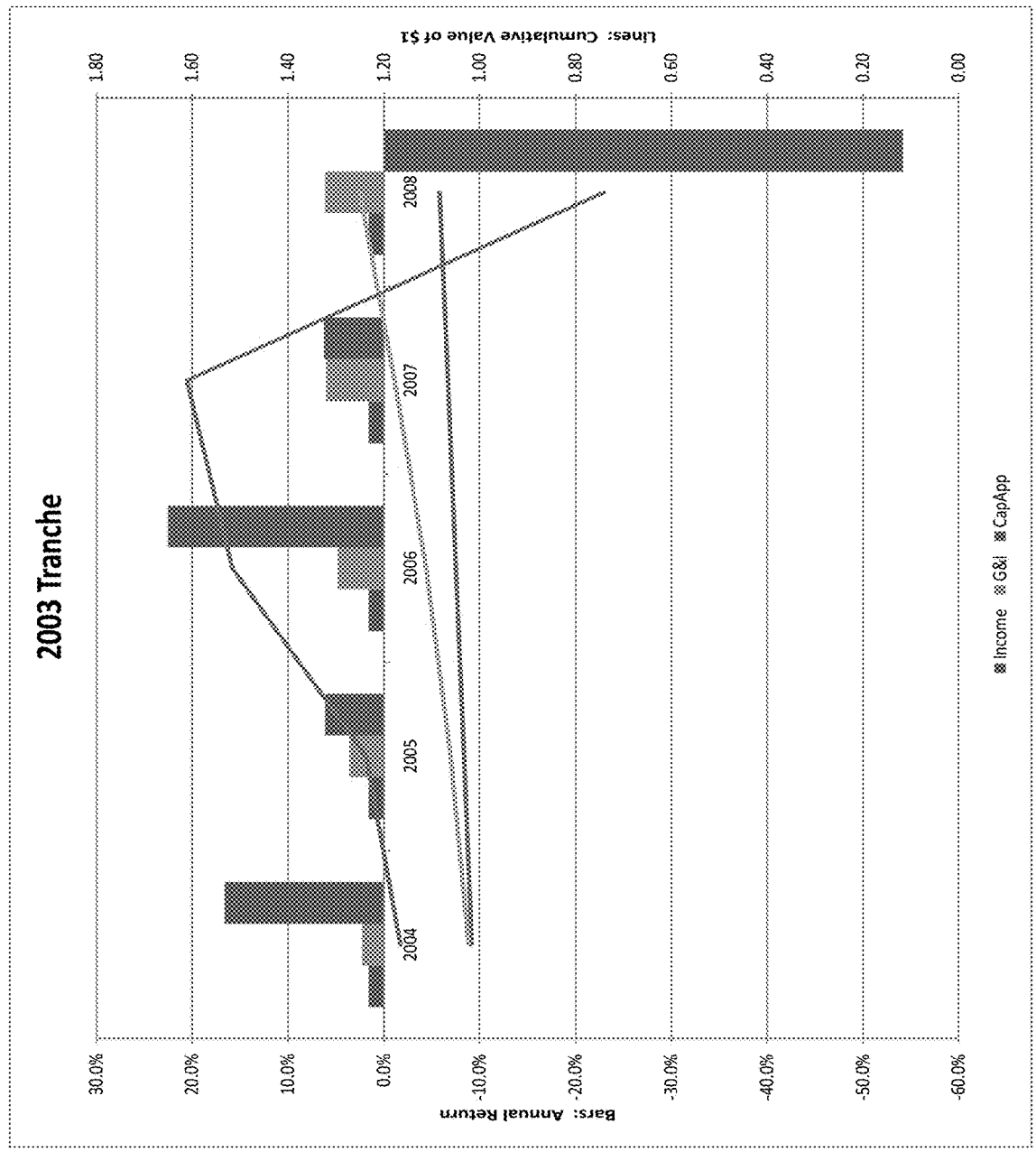
Fig. 18: MMACC—MMACC and GFC

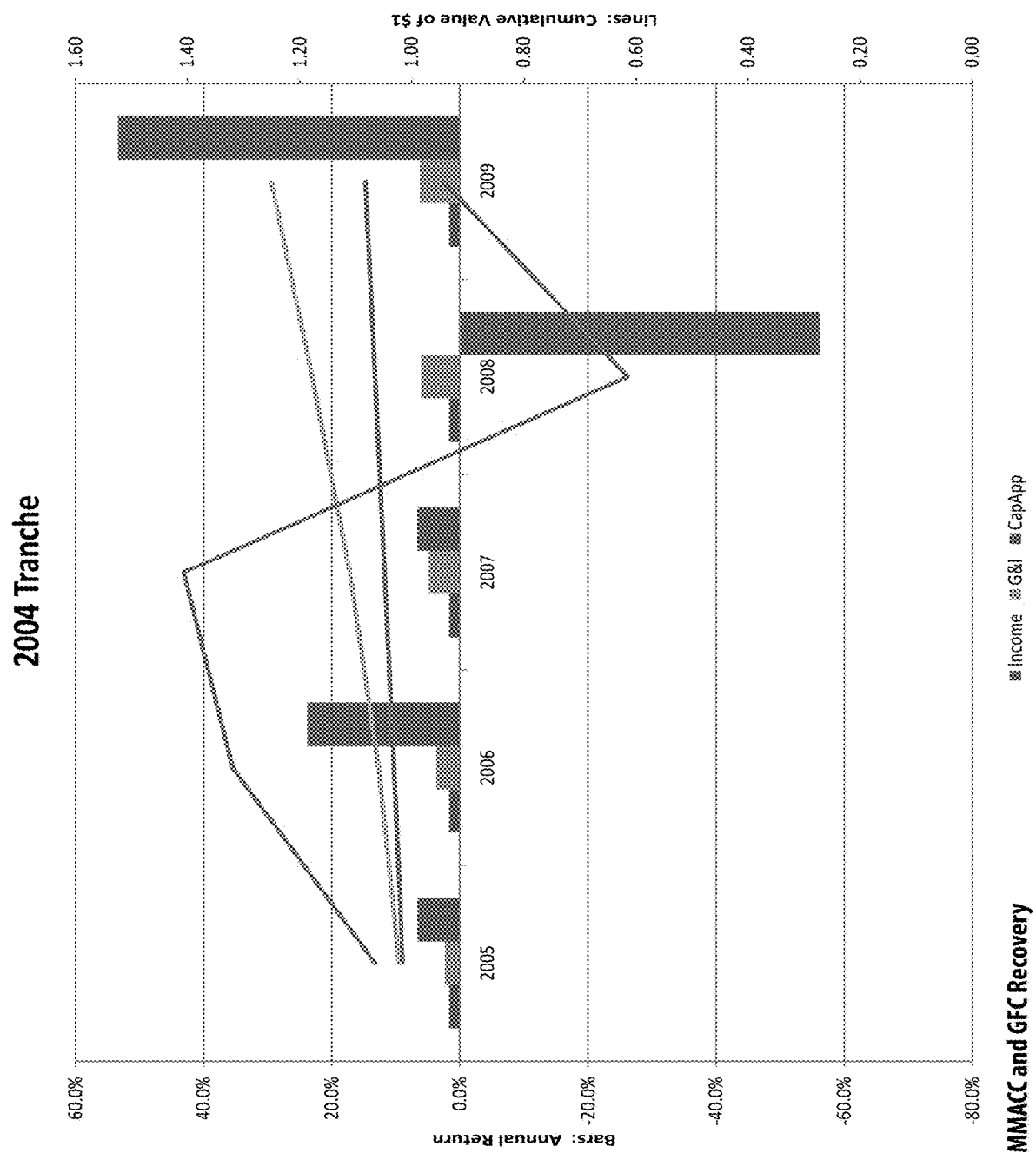
Fig. 19A: MMACC—MMACC and GFC Recovery

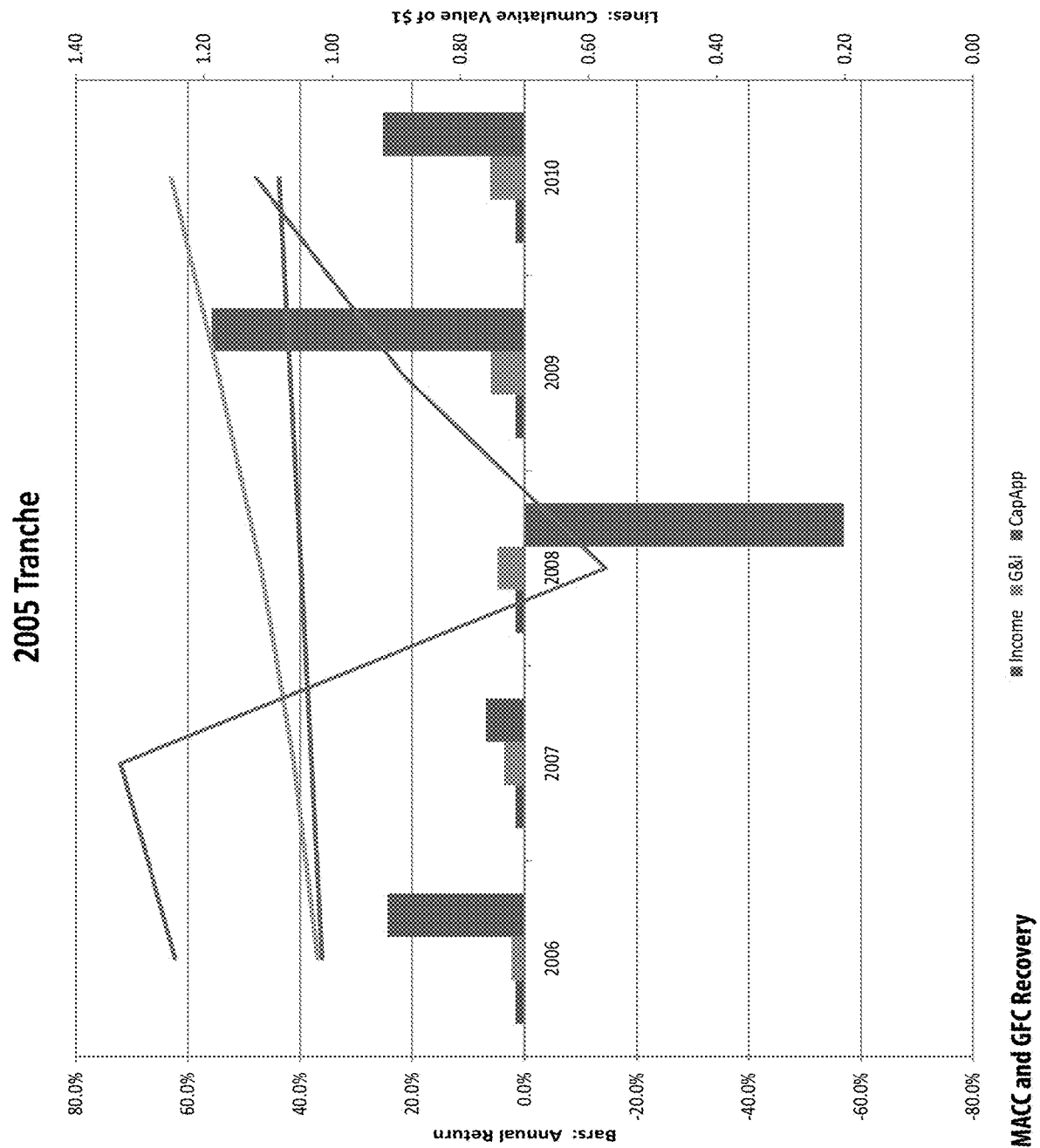
Fig.19B: MMACC—MMACC and GFC Recovery

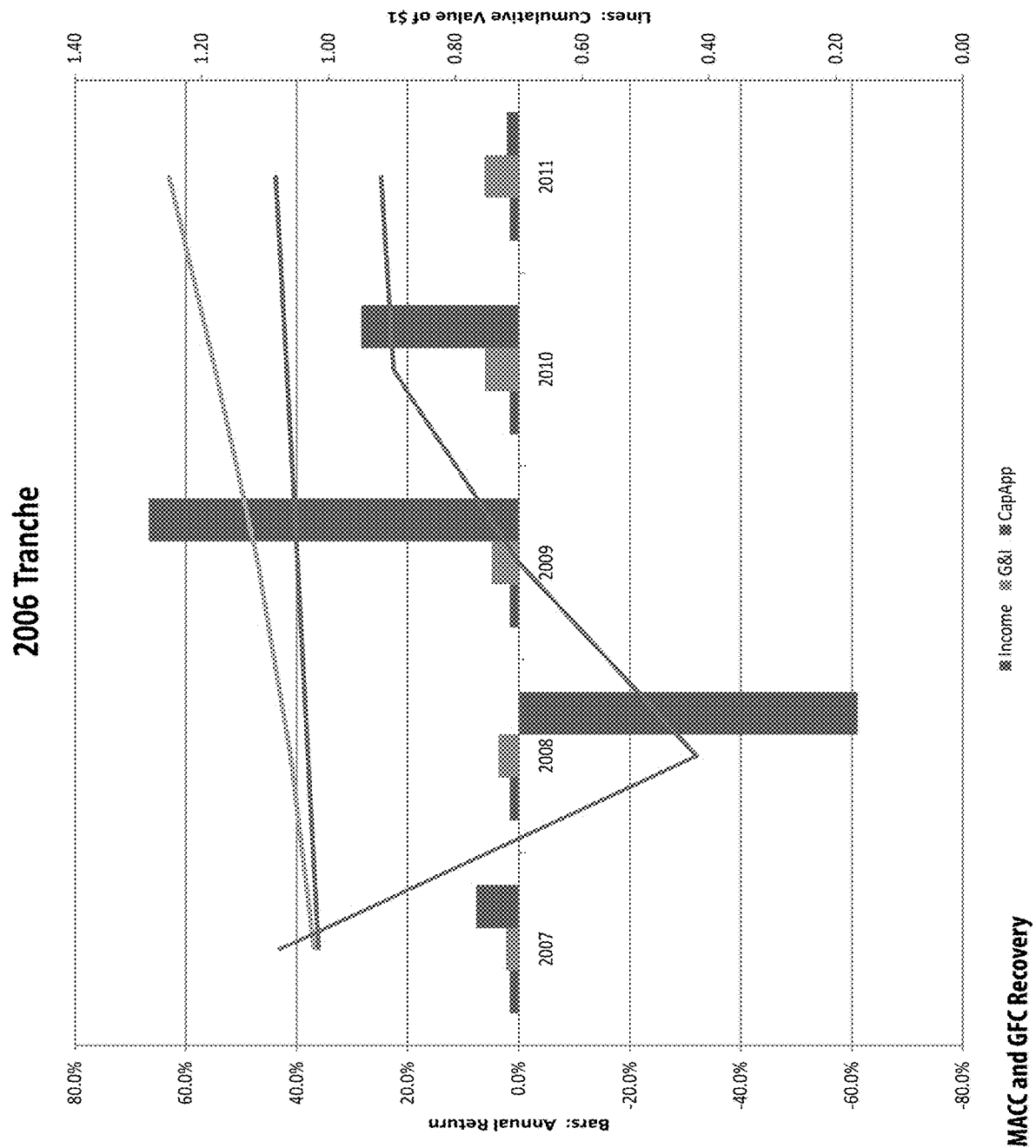
Fig.19C: MMACC—MMACC and GFC Recovery

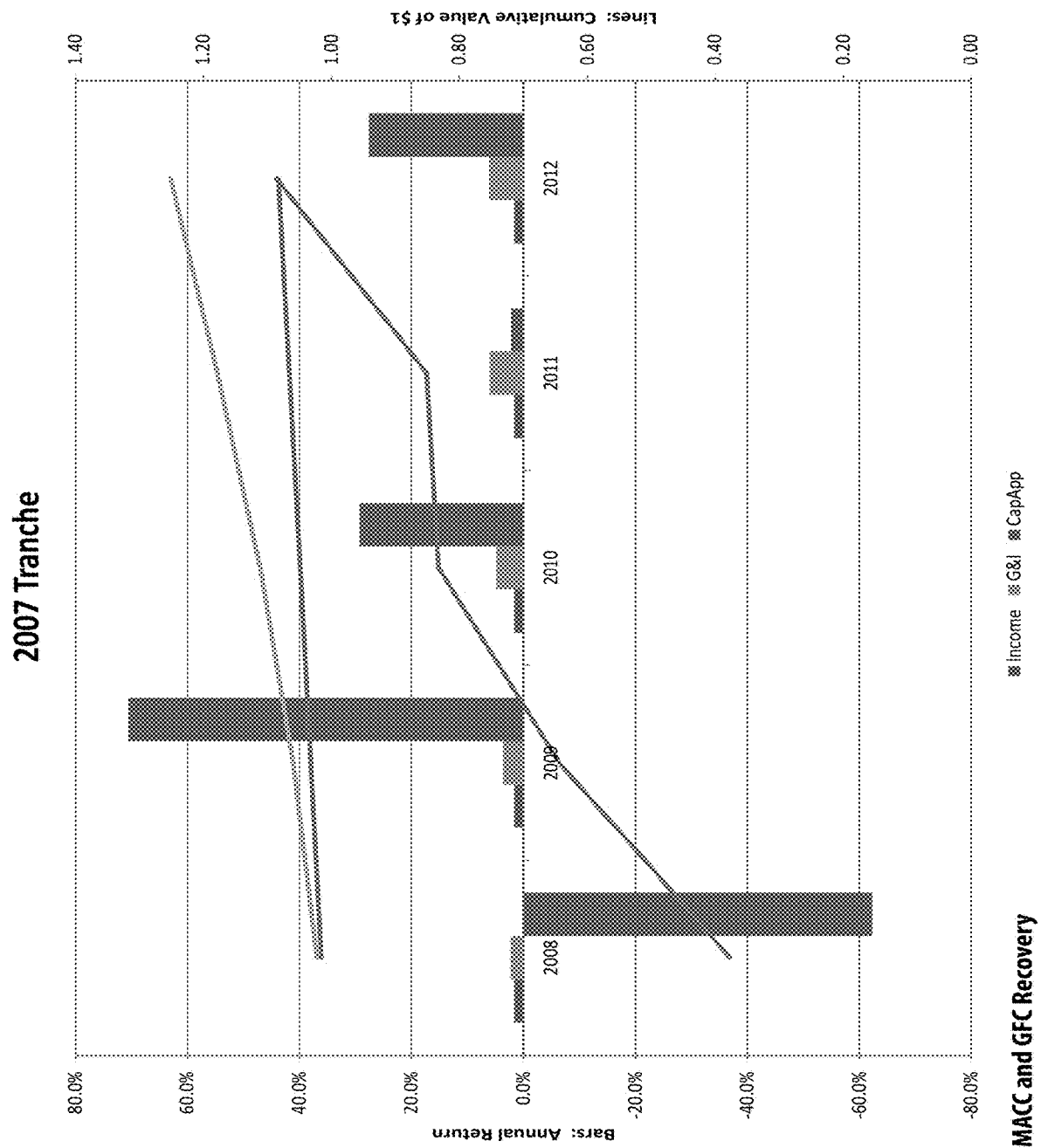
Fig.19D: MMACC—MMACC and GFC Recovery

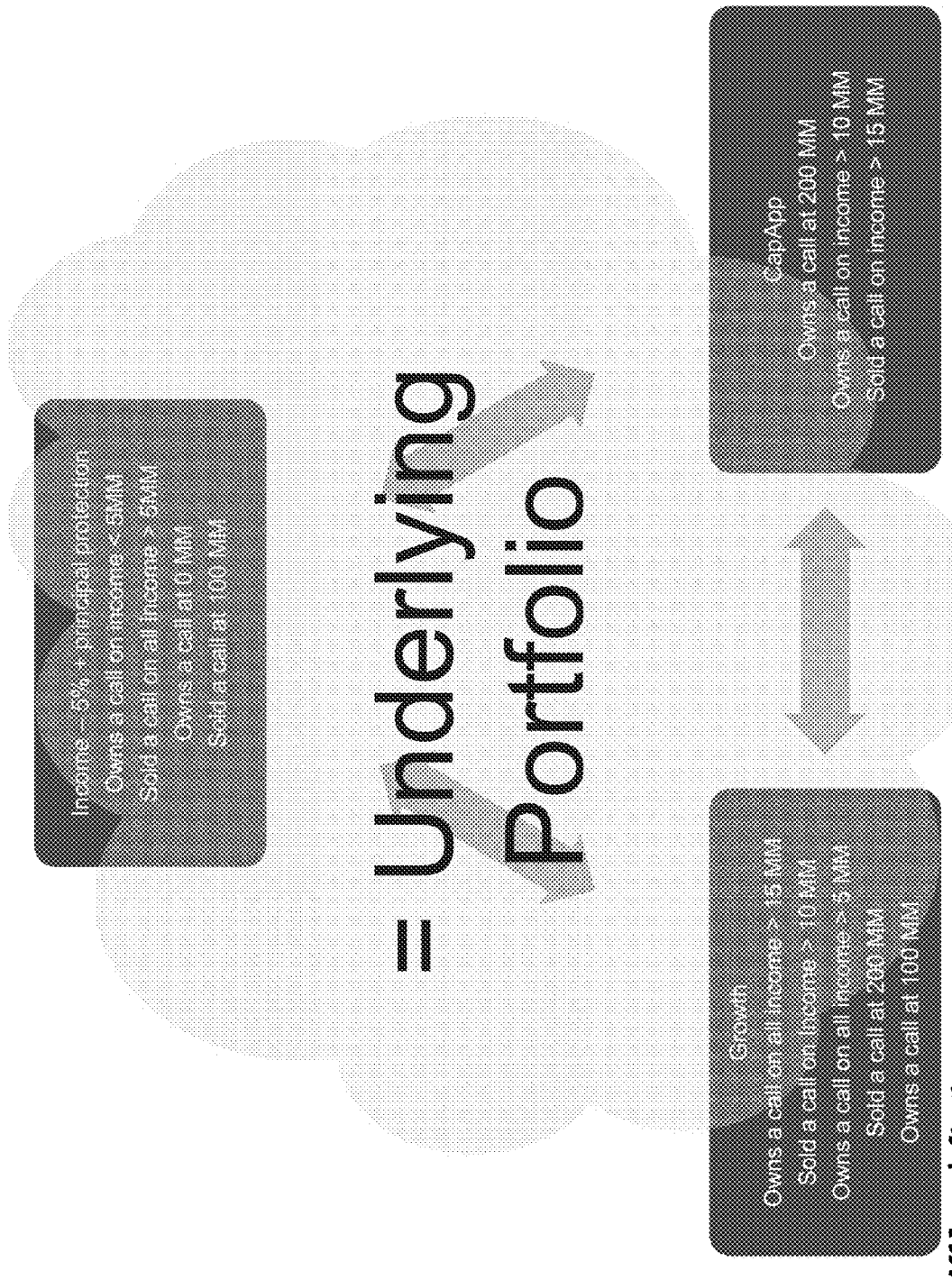
Fig.20: MMACC—MMACC Example Structure

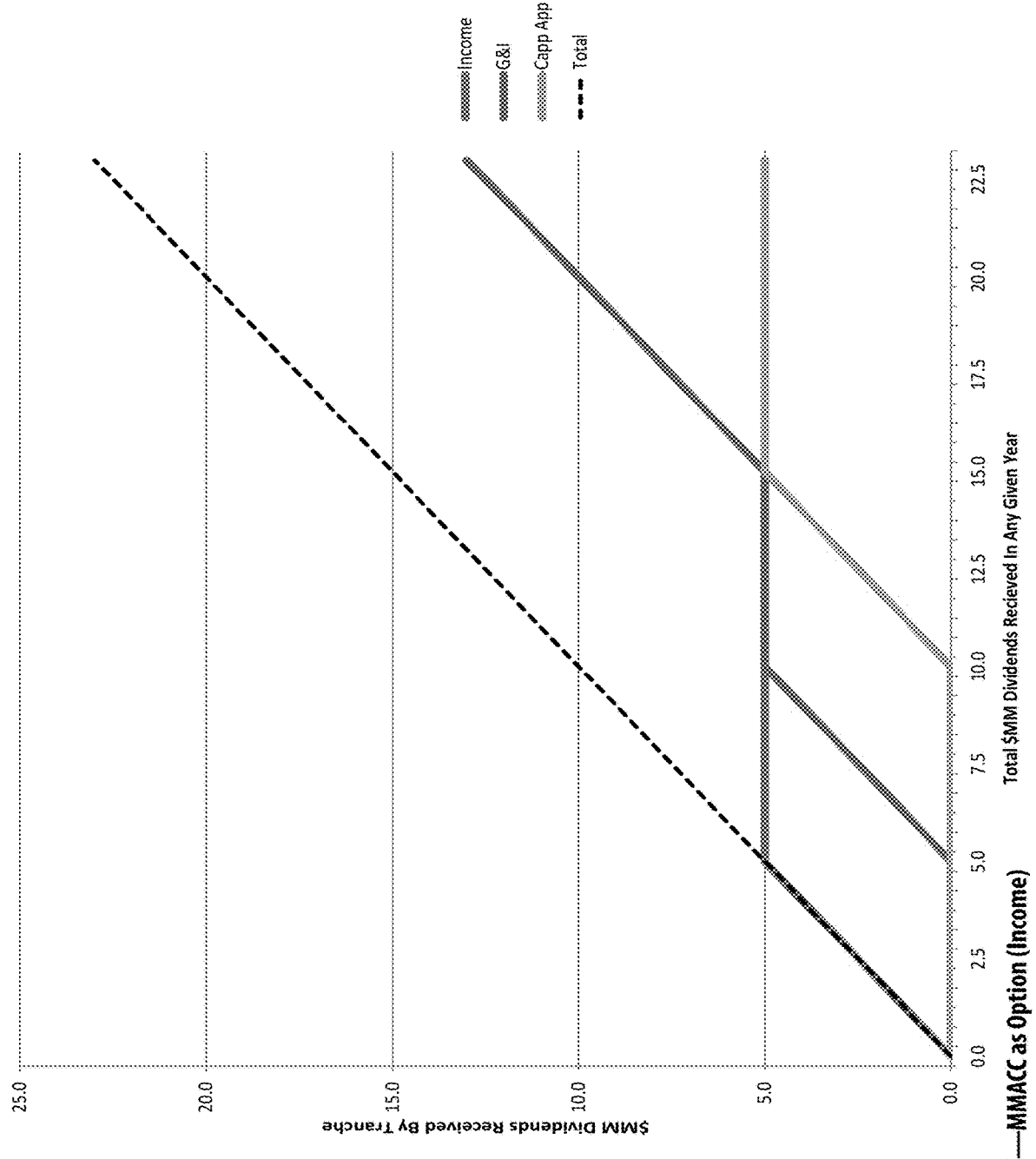

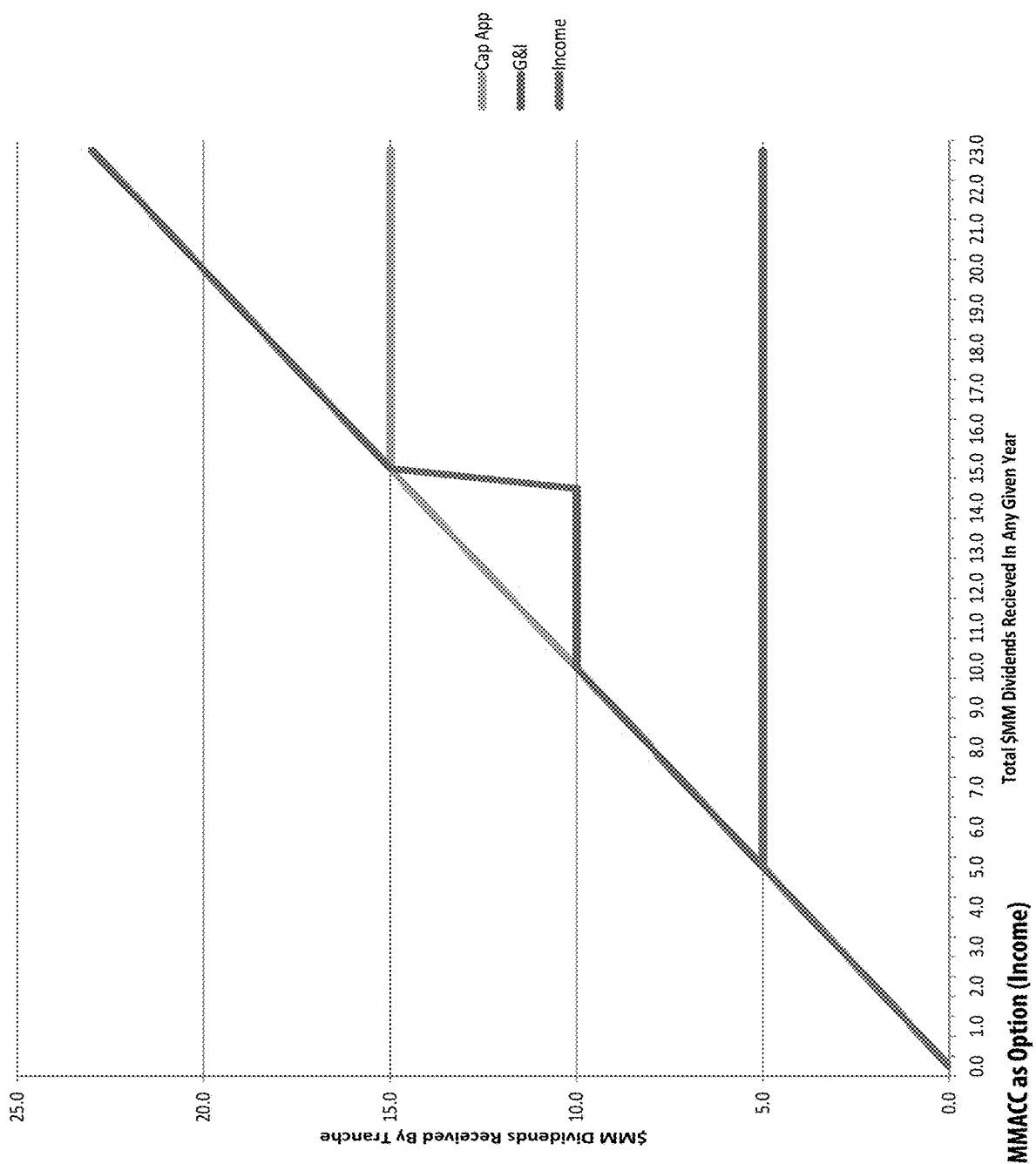
Fig.21B: MMACC—MMACC as Option (Income)

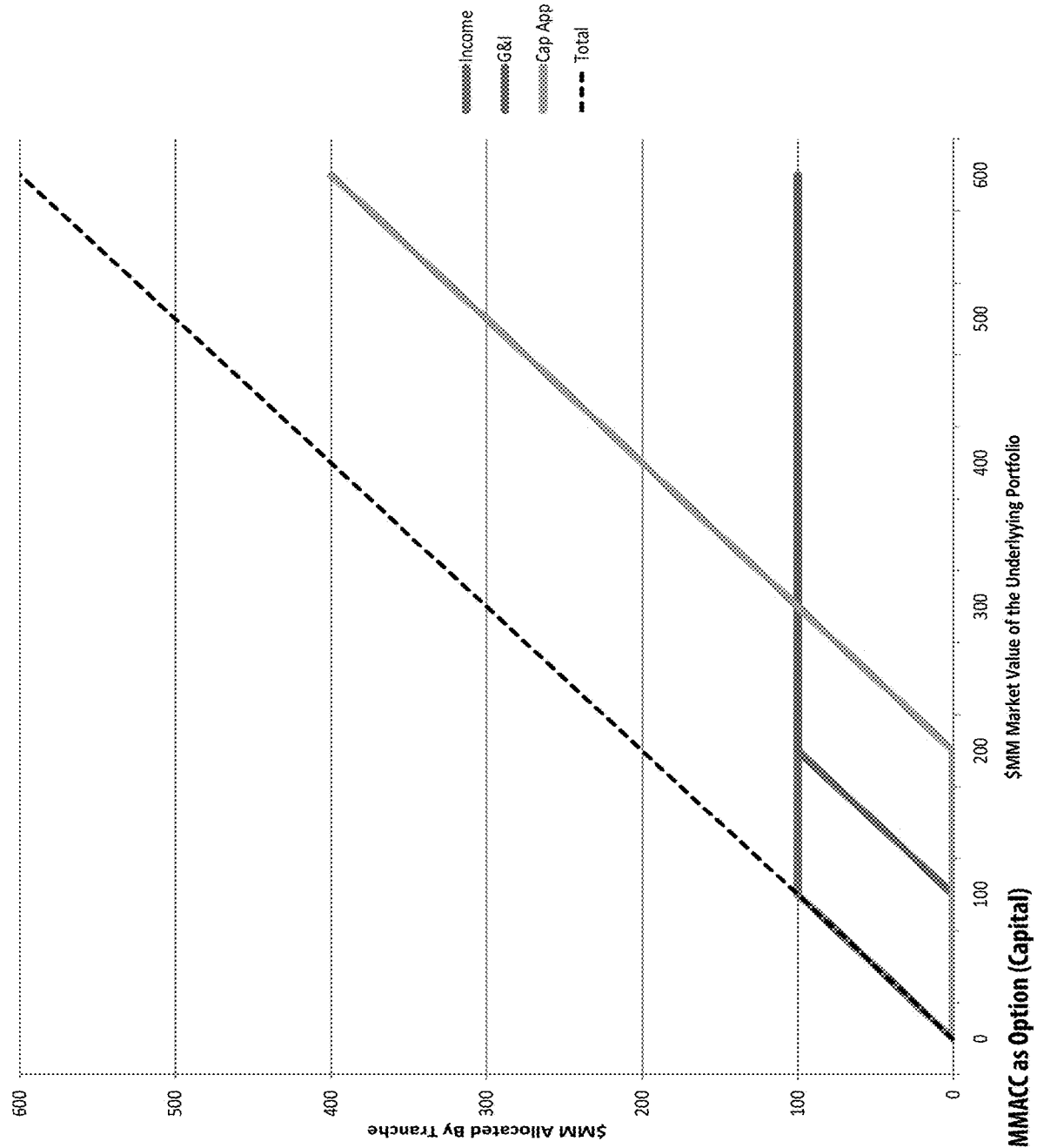
Fig.22A: MMACC—MMACC as Option (Capital)

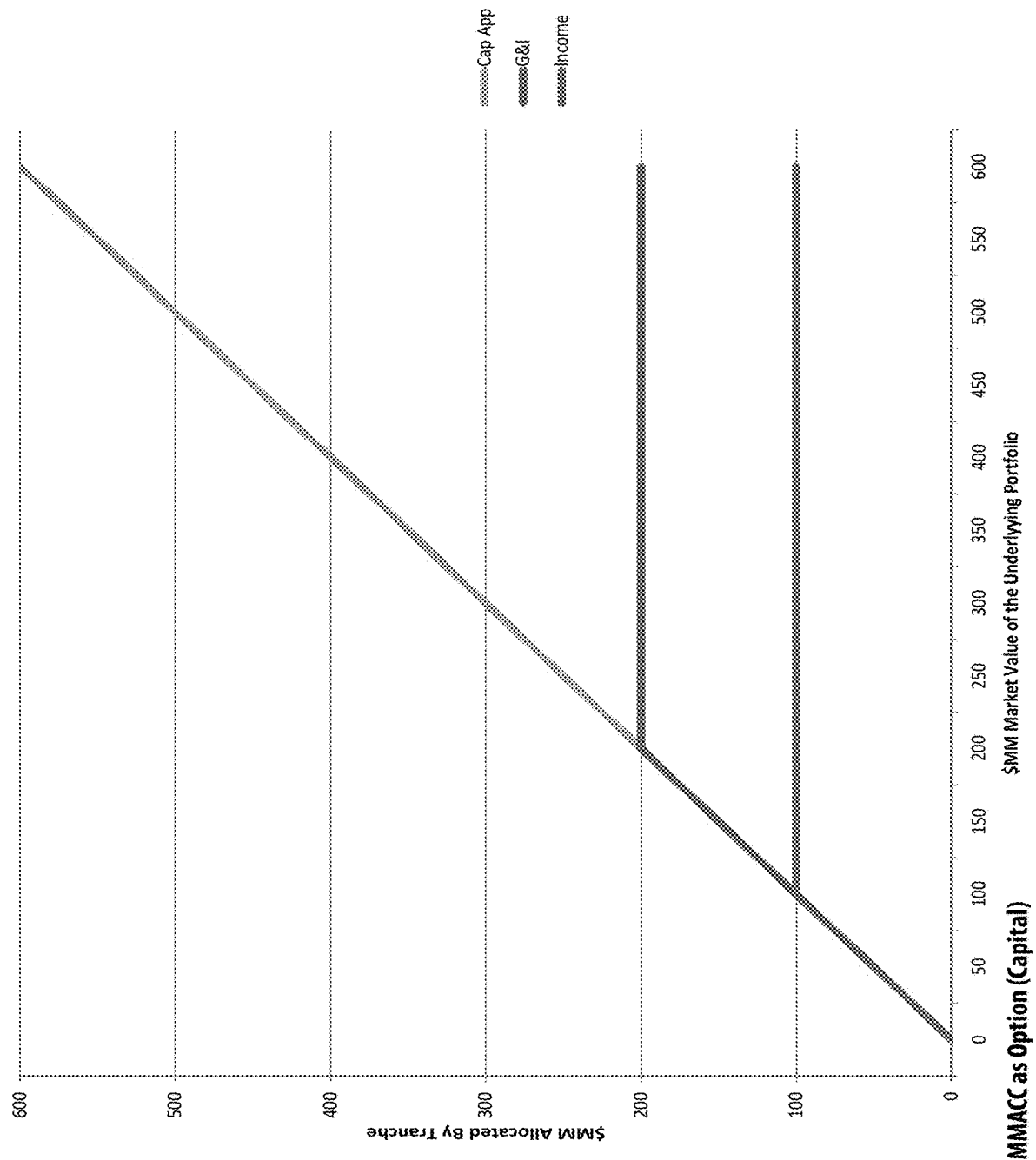
Fig.22B: MMACC—MMACC as Option (Capital)

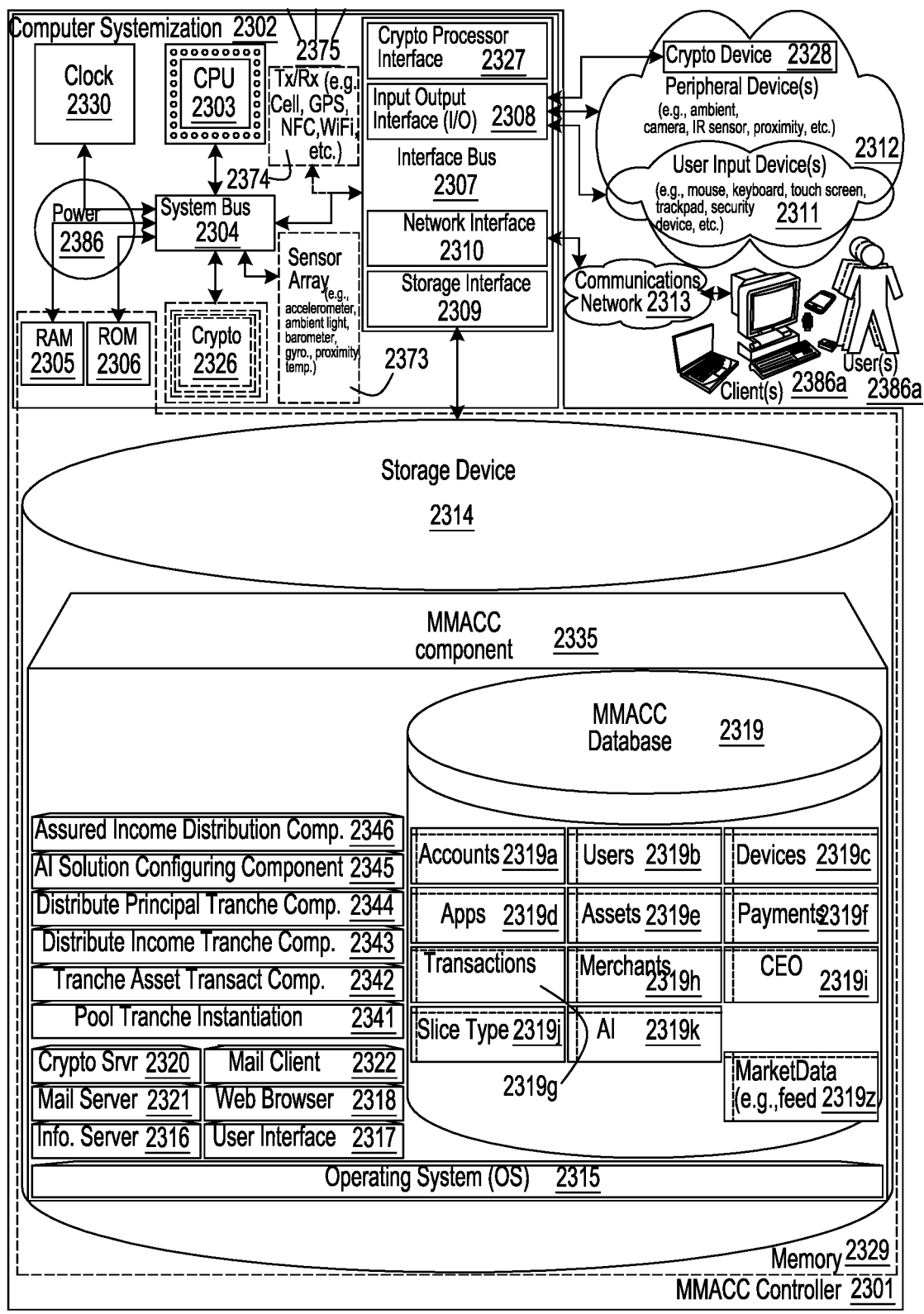
Fig. 23  MMACC - Controller

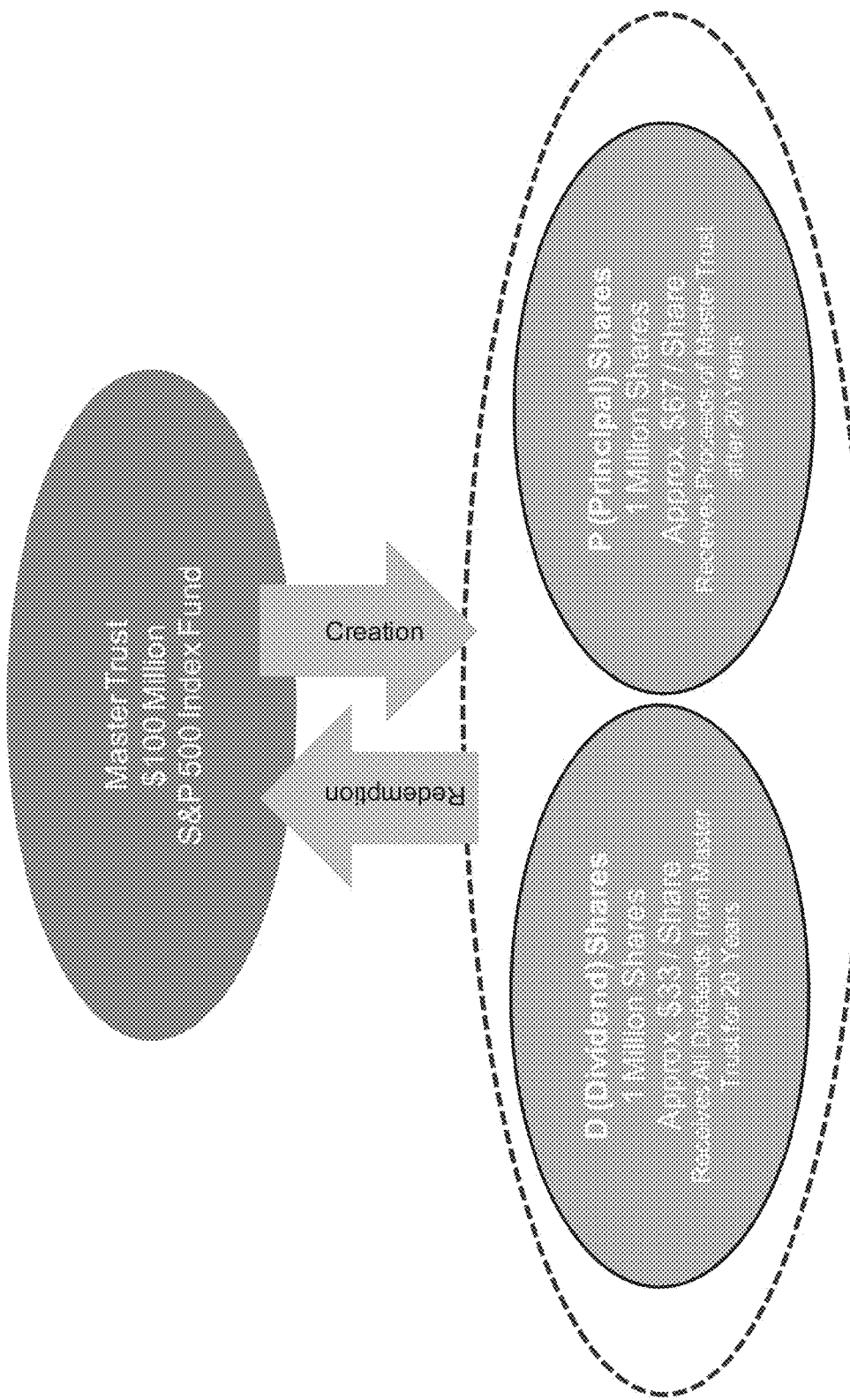
Fig. 24: MMACC-Equity Strips High-Level Schematic

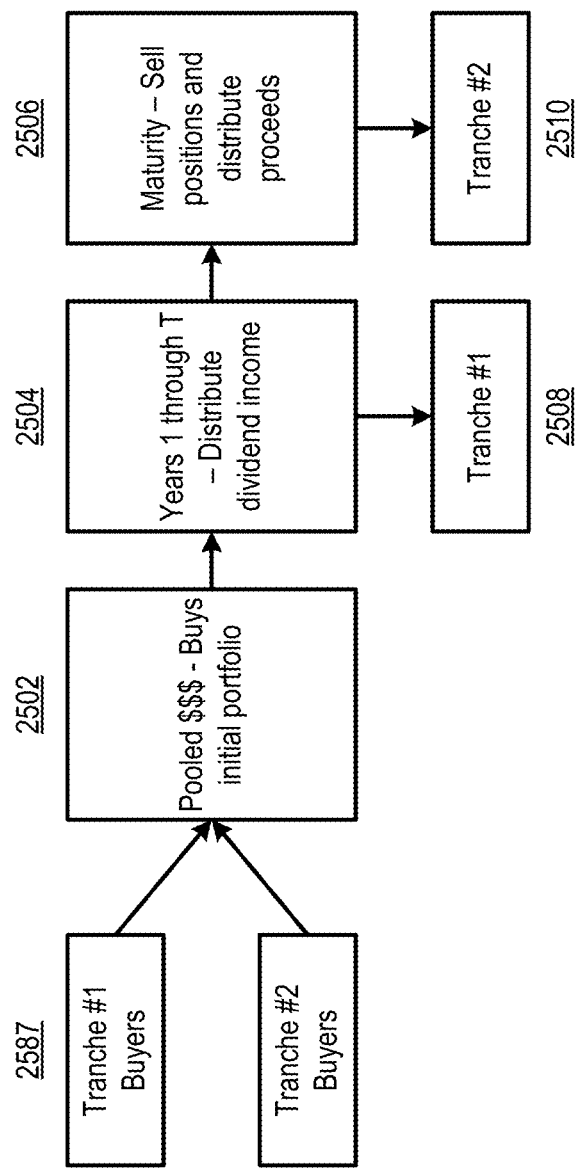
Fig.25: MMACC-Equity Strips Datagraph/Structure

|  | Portfolio Dividend Income | Dividend Allocation | |
|---|---|---|---|
|  |  | Tranche 1 | Tranche 2 |
| 2009 | 8,044,745 | 8,044,745 | $0 |
| 2010 | 8,287,523 | 8,287,523 | $0 |
| 2011 | 10,444,385 | 10,444,385 | $0 |
| 2012 | 13,651,874 | 13,651,874 | $0 |
| 2013 | 14,405,821 | 14,405,821 | $0 |
| Total: | $54,834,348 | $54,834,348 | $0 |

|  | Portfolio Market Value | Market Value Allocation | |
|---|---|---|---|
|  |  | Tranche 1 | Tranche 2 |
| 2013 | $595,740,879 | $0 | $595,740,879 |

Fig.26: MMACC-Equity Strips Example Parameters 2008 Vintage

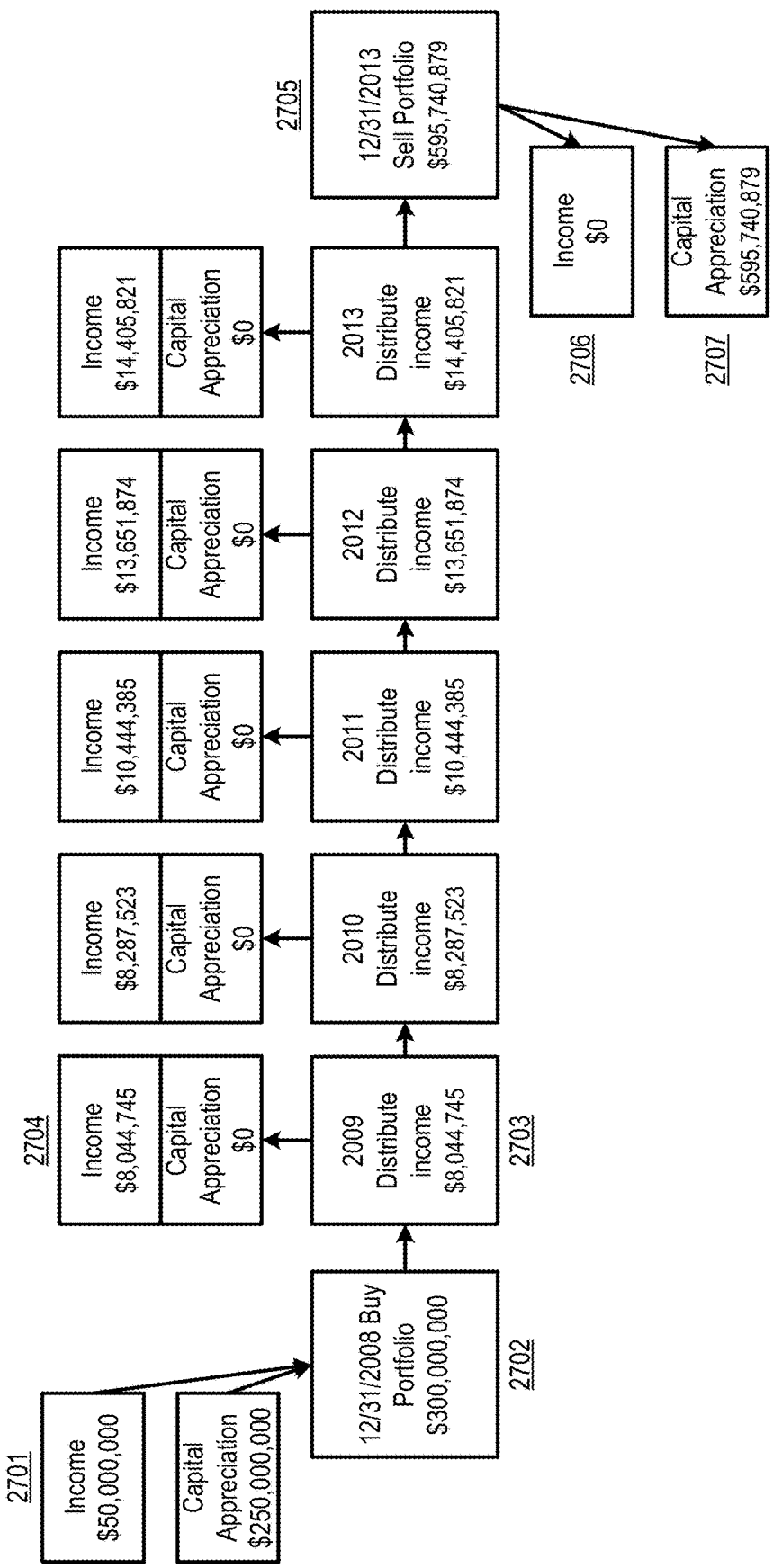
Fig.27: MMACC-Equity Strips 2008 Vintage Flowchart

What are the advantages of D Shares and P Shares?

D share:

- Provides a natural and fully automatic source of adaptive withdrawals.
- Ensures that an investor cannot exhaust his assets over a given term.
- Provides excellent inflation protection.
- Has historically provided an income stream that is competitive with those provided by traditional portfolios.

P share:

- Provides a beta over 1.0 without borrowing or portfolio tilts.
- Asymmetric exposure: greater upside and lower downside than the TR index.
- Never generates margin calls and bears no risk of being wiped out, unlike leveraged investments.
- Potentially advantageous tax treatment.

Fig.28: MMACC-D Shares and P Shares

What are the potential applications of D Shares and P Shares?

D Shares:

- Assured Income & other comprehensive retirement solutions, particularly when paired with DIAs.
- Inflation protection for conventional portfolios.
- Bond substitute/complement for conventional income portfolios.
- Diversifier for conventional stock/bond/cash portfolios.

P Shares:

- Endowments, SWFs, public DB plans, and other perpetual investment pools.
- Long-dated TDF and 529 products.
- HNW legacy planning (e.g., GRATs).
- Replacement for leveraged ETFs.
- Aggressive TAMs.
- Smart beta applications

D Shares & P Shares Together:

- Enhanced equity products with (A) extra yield or (B) extra beta exposure.
- Managed products with tactical tilts to D and P, non-US indices, etc.

Fig.29: MMACC-Applications of D Shares and P Shares

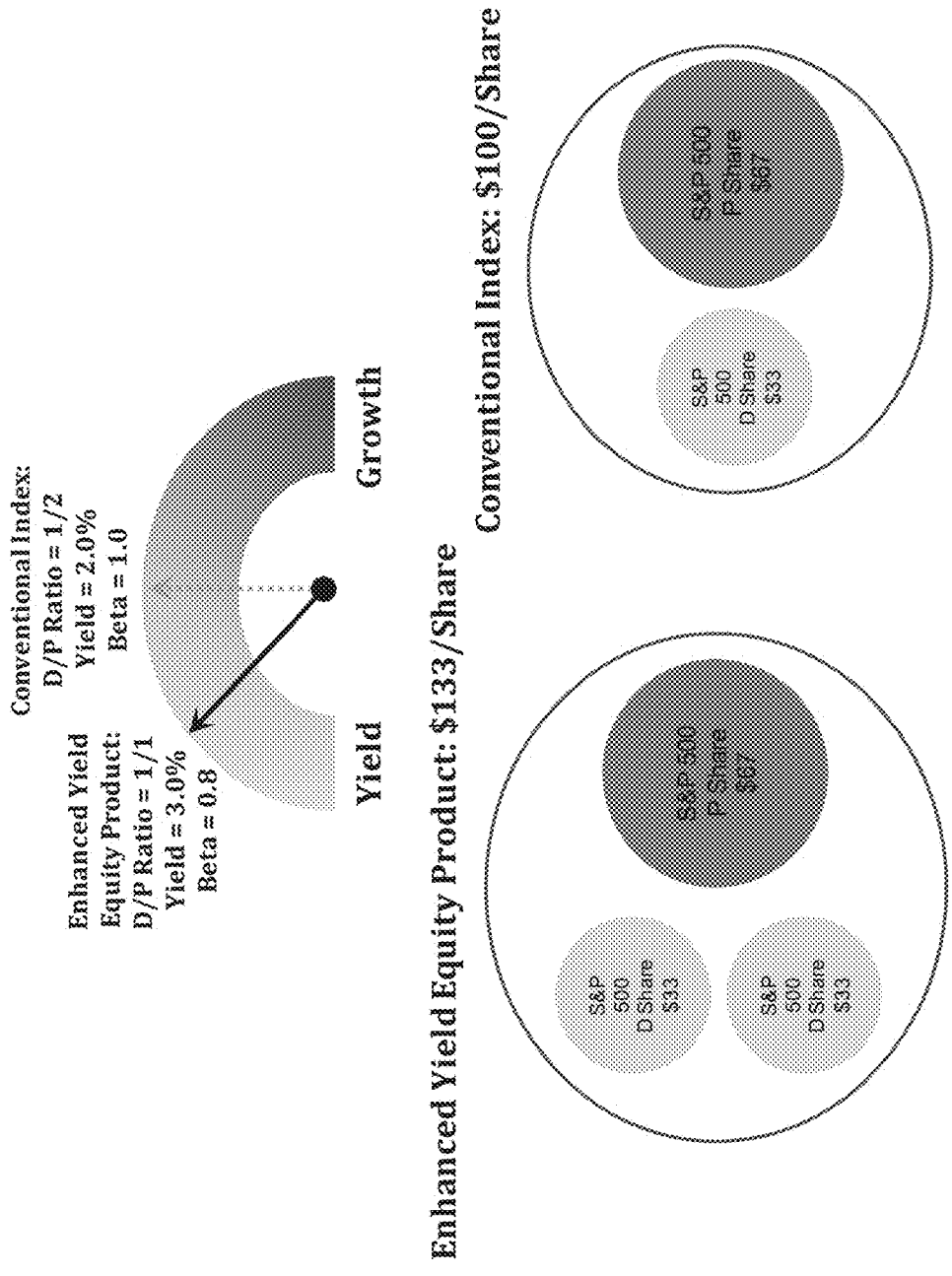
Fig.30: MMACC-Applications of D Shares and P Shares Example

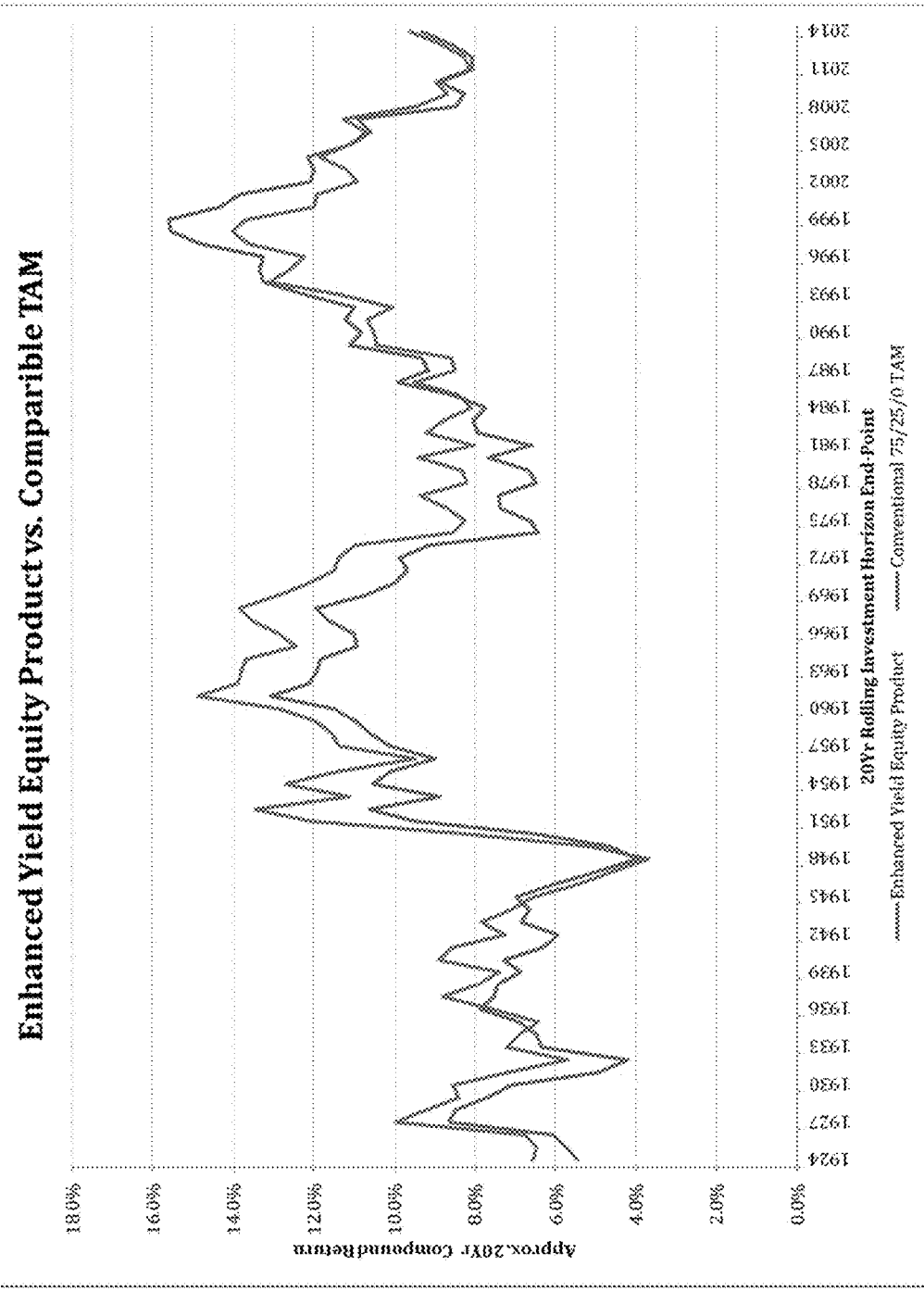
Fig.31: MMACC-Applications of D Shares and P Shares Example

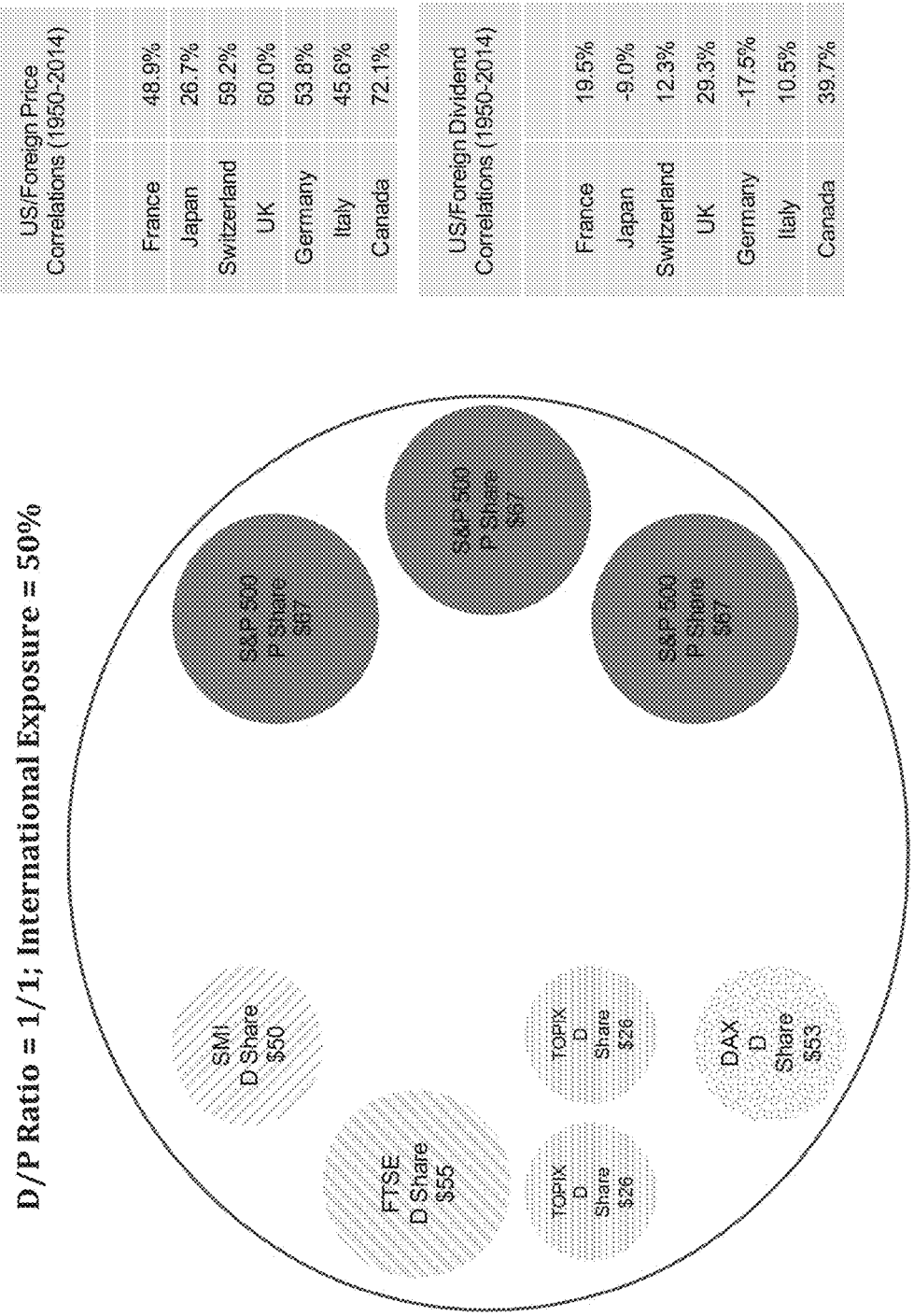
Fig.32: MMACC-Applications of D Shares and P Shares Example

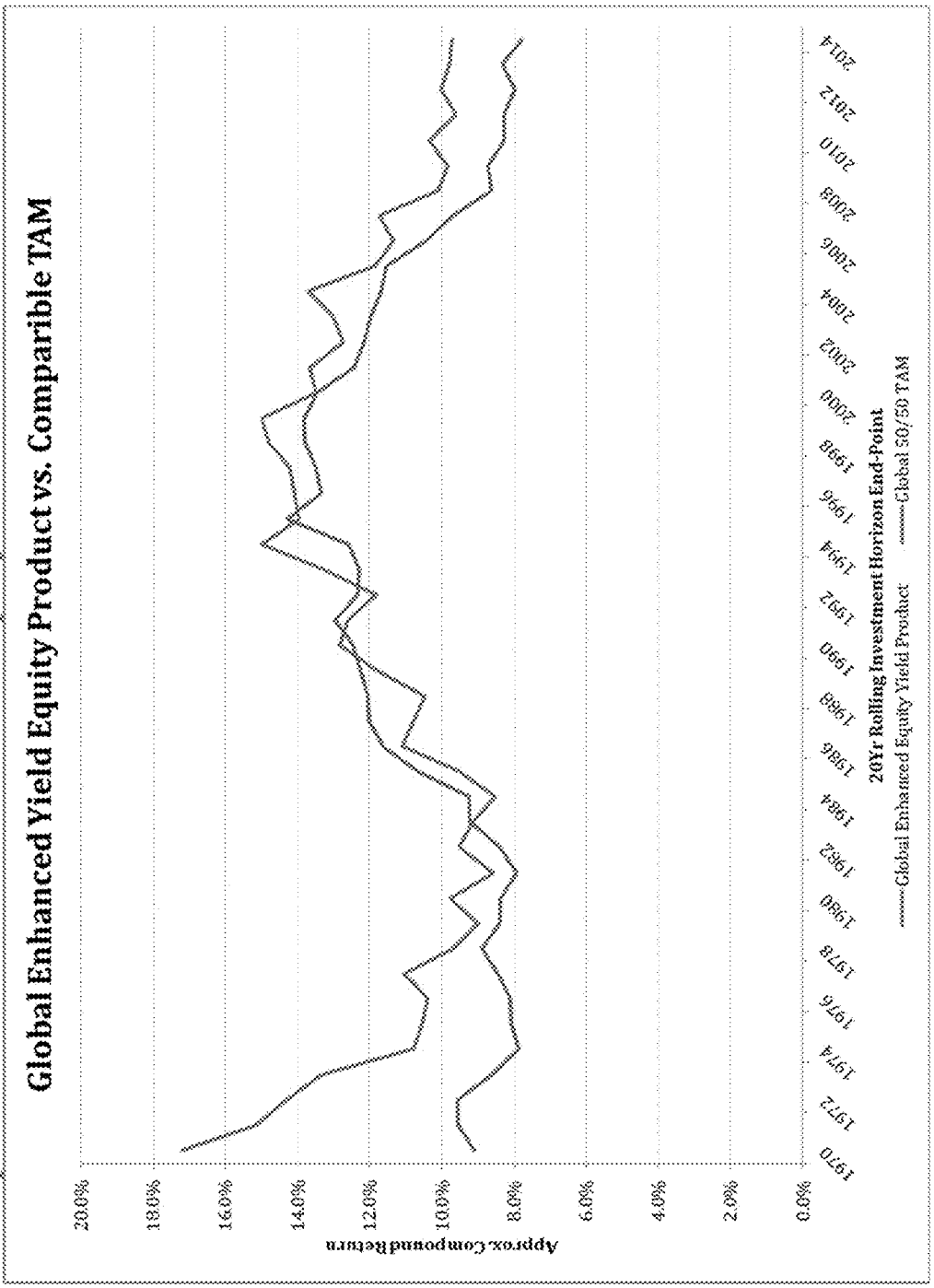
Fig.33: MMACC-Applications of D Shares and P Shares Example

What is the relationship between D-Shares, P-Shares, and the Index?

- D + P = Index
  The price of an A-Share plus the price of a B-Share will be close to the price of the Index, or else the mispricing can be arbitraged through creation/redemption.

- $P = Index \cdot e^{-(DivYld \cdot T)}$ ; D = Index − P
  The prices of A-Shares and B-Shares will both depend only on: (1) the index price, and (2) market expectations for dividend yield over a period of T years.

- Generally: D-Share Returns < Index Returns < P-Share Returns
  In terms of conventional total returns, D-Shares tend to underperform the index, but can outperform it when dividends constitute a larger share of total return than expected. P-Shares tend to outperform the index, but can underperform it when dividends constitute a larger share of total return than expected.

Fig.34: MMACC-Relationship between D Shares and P Shares

No arbitrage prices of D & P shares depends on the expected DY

| No-arbitrage price of P Shares | No-arbitrage price of D Shares |
|---|---|
| $P = S_0 e^{-qT}$ | $D = S_0 - P$ |

- The value q is the implied dividend yield. For short horizons, it can be calculated from available instruments in the market, such as a T-year forward / future on the index.

- If T is large (> 3 or 4 years), publically traded derivatives may not be available to provide an estimate of q. However, OTC dividend swaps and other derivatives may be used in such cases.

- If price of P-shares deviates from this theoretical price, it can be shown that an arbitrage opportunity would exist. Arbitrage can be created using ZCBs and forwards/futures, or options.

- Prices may vary from the theoretical of because factors including margin requirements, transactions costs, and (possibly) tax arbitrage.

Fig.35: MMACC-Prices of D Shares and P Shares

Theoretically, if Realized = Assumed Dividend Yield, then D = Index = P

| Div Yield for Pricing | 2.00% | D Wgt | 32.70% |
| Div Growth | 4.52% | P Wgt | 67.30% |
| Index Price Return | 4.52% | | |

| Yr | D Share Price | Dividend | P Share Price | Index Price | | D Share TR | Index TR | P Share TR | Dividend Yield | D + P TR |
|----|---------------|----------|---------------|-------------|---|------------|----------|------------|----------------|----------|
| 0  | $32.70 |       | $67.30  | $100.00 | | | | | 2.00% | |
| 1  | $32.77 | $2.09 | $71.75  | $104.52 | | 6.61% | 6.61% | 6.61% | 2.00% | 6.61% |
| 2  | $32.76 | $2.18 | $76.49  | $109.24 | | 6.61% | 6.61% | 6.61% | 2.00% | 6.61% |
| 3  | $32.64 | $2.28 | $81.54  | $114.18 | | 6.61% | 6.61% | 6.61% | 2.00% | 6.61% |
| 4  | $32.41 | $2.39 | $86.94  | $119.34 | | 6.61% | 6.61% | 6.61% | 2.00% | 6.61% |
| 5  | $32.06 | $2.49 | $92.68  | $124.74 | | 6.61% | 6.61% | 6.61% | 2.00% | 6.61% |
| 6  | $31.57 | $2.61 | $98.81  | $130.38 | | 6.61% | 6.61% | 6.61% | 2.00% | 6.61% |
| 7  | $30.93 | $2.73 | $105.34 | $136.27 | | 6.61% | 6.61% | 6.61% | 2.00% | 6.61% |
| 8  | $30.12 | $2.85 | $112.30 | $142.43 | | 6.61% | 6.61% | 6.61% | 2.00% | 6.61% |
| 9  | $29.14 | $2.98 | $119.73 | $148.87 | | 6.61% | 6.61% | 6.61% | 2.00% | 6.61% |
| 10 | $27.95 | $3.11 | $127.64 | $155.59 | | 6.61% | 6.61% | 6.61% | 2.00% | 6.61% |
| 11 | $26.55 | $3.25 | $136.08 | $162.63 | | 6.61% | 6.61% | 6.61% | 2.00% | 6.61% |
| 12 | $24.90 | $3.40 | $145.07 | $169.98 | | 6.61% | 6.61% | 6.61% | 2.00% | 6.61% |
| 13 | $23.00 | $3.55 | $154.66 | $177.66 | | 6.61% | 6.61% | 6.61% | 2.00% | 6.61% |
| 14 | $20.80 | $3.71 | $164.89 | $185.69 | | 6.61% | 6.61% | 6.61% | 2.00% | 6.61% |
| 15 | $18.30 | $3.88 | $175.79 | $194.08 | | 6.61% | 6.61% | 6.61% | 2.00% | 6.61% |
| 16 | $15.45 | $4.06 | $187.41 | $202.86 | | 6.61% | 6.61% | 6.61% | 2.00% | 6.61% |
| 17 | $12.23 | $4.24 | $199.80 | $212.03 | | 6.61% | 6.61% | 6.61% | 2.00% | 6.61% |
| 18 | $8.61  | $4.43 | $213.00 | $221.61 | | 6.61% | 6.61% | 6.61% | 2.00% | 6.61% |
| 19 | $4.54  | $4.63 | $227.09 | $231.63 | | 6.61% | 6.61% | 6.61% | 2.00% | 6.61% |
| 20 | $0.00  | $4.84 | $242.10 | $242.10 | | 6.61% | 6.61% | 6.61% | 2.00% | 6.61% |

| | | | | | Arith Mean | 6.61% | 6.61% | 6.61% | 2.00% | 6.61% |
| | | | | | IRR | 6.61% | | | | |

Fig.36: MMACC-MMACC and Dividend Yield

If Dividend Yield is Lower than Expected, then D < Index < P

| | | |
|---|---|---|
| Div Yield for Pricing | 2.00% | |
| Div Growth | 4.52% | D Wgt 32.70% |
| Index Price Return | 7.60% | P Wgt 67.30% |

| Yr | D Share Price | Dividend | P Share Price | Index Price | D Share TR | Index TR | P Share TR | Dividend Yield | D + P TR |
|---|---|---|---|---|---|---|---|---|---|
| 0 | $32.70 | | $67.30 | $100.00 | | | | 2.00% | |
| 1 | $32.95 | $2.09 | $74.65 | $107.60 | 7.14% | 9.69% | 10.93% | 1.94% | 9.69% |
| 2 | $33.08 | $2.18 | $82.69 | $115.78 | 7.04% | 9.63% | 10.77% | 1.89% | 9.63% |
| 3 | $33.10 | $2.28 | $91.48 | $124.58 | 6.95% | 9.57% | 10.62% | 1.83% | 9.57% |
| 4 | $32.98 | $2.39 | $101.07 | $134.04 | 6.85% | 9.52% | 10.48% | 1.78% | 9.52% |
| 5 | $32.71 | $2.49 | $111.52 | $144.23 | 6.76% | 9.46% | 10.34% | 1.73% | 9.46% |
| 6 | $32.29 | $2.61 | $122.90 | $155.19 | 6.67% | 9.41% | 10.21% | 1.68% | 9.41% |
| 7 | $31.69 | $2.73 | $135.30 | $166.99 | 6.59% | 9.36% | 10.08% | 1.63% | 9.36% |
| 8 | $30.91 | $2.85 | $148.77 | $179.68 | 6.51% | 9.31% | 9.96% | 1.59% | 9.31% |
| 9 | $29.92 | $2.98 | $163.42 | $193.33 | 6.43% | 9.26% | 9.84% | 1.54% | 9.26% |
| 10 | $28.70 | $3.11 | $179.32 | $208.03 | 6.35% | 9.21% | 9.73% | 1.50% | 9.21% |
| 11 | $27.25 | $3.25 | $196.58 | $223.84 | 6.28% | 9.16% | 9.63% | 1.45% | 9.16% |
| 12 | $25.55 | $3.40 | $215.30 | $240.85 | 6.21% | 9.12% | 9.52% | 1.41% | 9.12% |
| 13 | $23.56 | $3.55 | $235.59 | $259.15 | 6.14% | 9.08% | 9.42% | 1.37% | 9.08% |
| 14 | $21.28 | $3.71 | $257.57 | $278.85 | 6.07% | 9.03% | 9.33% | 1.33% | 9.03% |
| 15 | $18.68 | $3.88 | $281.37 | $300.04 | 6.01% | 8.99% | 9.24% | 1.29% | 8.99% |
| 16 | $15.73 | $4.06 | $307.12 | $322.85 | 5.95% | 8.95% | 9.15% | 1.26% | 8.95% |
| 17 | $12.42 | $4.24 | $334.97 | $347.38 | 5.89% | 8.91% | 9.07% | 1.22% | 8.91% |
| 18 | $8.71 | $4.43 | $365.07 | $373.78 | 5.83% | 8.88% | 8.99% | 1.19% | 8.88% |
| 19 | $4.58 | $4.63 | $397.61 | $402.19 | 5.78% | 8.84% | 8.91% | 1.15% | 8.84% |
| 20 | $0.00 | $4.84 | $432.76 | $432.76 | 5.72% | 8.80% | 8.84% | 1.12% | 8.80% |
| | | | | Arith Mean | 6.36% | 9.21% | 9.75% | 1.50% | 9.21% |
| | | | | IRR | 6.61% | | | | |

Fig.37: MMACC-MMACC and Dividend Yield

If Dividend Yield is Higher than Expected, then D > Index > P

| Div Yield for Pricing | 2.00% | D Wgt | 32.70% |
|---|---|---|---|
| Div Growth | 4.52% | P Wgt | 67.30% |
| Index Price Return | 2.40% | | |

| Yr | D Share Price | Dividend | P Share Price | Index Price | D Share TR | Index TR | P Share TR | Dividend Yield | D + P TR |
|---|---|---|---|---|---|---|---|---|---|
| 0 | $32.70 | | $67.30 | $100.00 | | | | 2.00% | |
| 1 | $32.65 | $2.09 | $69.75 | $102.40 | 6.23% | 4.49% | 3.65% | 2.04% | 4.49% |
| 2 | $32.52 | $2.18 | $72.34 | $104.86 | 6.28% | 4.53% | 3.71% | 2.08% | 4.53% |
| 3 | $32.29 | $2.28 | $75.08 | $107.37 | 6.34% | 4.58% | 3.79% | 2.13% | 4.58% |
| 4 | $31.97 | $2.39 | $77.98 | $109.95 | 6.40% | 4.62% | 3.86% | 2.17% | 4.62% |
| 5 | $31.54 | $2.49 | $81.05 | $112.59 | 6.46% | 4.67% | 3.94% | 2.22% | 4.67% |
| 6 | $30.99 | $2.61 | $84.30 | $115.29 | 6.52% | 4.72% | 4.01% | 2.26% | 4.72% |
| 7 | $30.31 | $2.73 | $87.75 | $118.06 | 6.58% | 4.76% | 4.09% | 2.31% | 4.76% |
| 8 | $29.48 | $2.85 | $91.42 | $120.89 | 6.65% | 4.81% | 4.18% | 2.36% | 4.81% |
| 9 | $28.48 | $2.98 | $95.32 | $123.79 | 6.72% | 4.86% | 4.26% | 2.41% | 4.86% |
| 10 | $27.30 | $3.11 | $99.47 | $126.77 | 6.79% | 4.91% | 4.35% | 2.45% | 4.91% |
| 11 | $25.92 | $3.25 | $103.89 | $129.81 | 6.86% | 4.97% | 4.45% | 2.51% | 4.97% |
| 12 | $24.32 | $3.40 | $108.61 | $132.92 | 6.93% | 5.02% | 4.54% | 2.56% | 5.02% |
| 13 | $22.47 | $3.55 | $113.65 | $136.11 | 7.01% | 5.07% | 4.64% | 2.61% | 5.07% |
| 14 | $20.34 | $3.71 | $119.04 | $139.38 | 7.09% | 5.13% | 4.74% | 2.66% | 5.13% |
| 15 | $17.92 | $3.88 | $124.80 | $142.72 | 7.17% | 5.18% | 4.85% | 2.72% | 5.18% |
| 16 | $15.16 | $4.06 | $130.99 | $146.15 | 7.25% | 5.24% | 4.95% | 2.78% | 5.24% |
| 17 | $12.03 | $4.24 | $137.62 | $149.66 | 7.33% | 5.30% | 5.07% | 2.83% | 5.30% |
| 18 | $8.49 | $4.43 | $144.76 | $153.25 | 7.42% | 5.36% | 5.18% | 2.89% | 5.36% |
| 19 | $4.50 | $4.63 | $152.43 | $156.93 | 7.51% | 5.42% | 5.30% | 2.95% | 5.42% |
| 20 | $0.00 | $4.84 | $160.69 | $160.69 | 7.61% | 5.49% | 5.42% | 3.01% | 5.49% |
| | | | | Arith Mean | 6.86% | 4.96% | 4.45% | 2.50% | 4.96% |
| | | | | IRR | 6.61% | | | | |

Fig.38: MMACC-MMACC and Dividend Yield

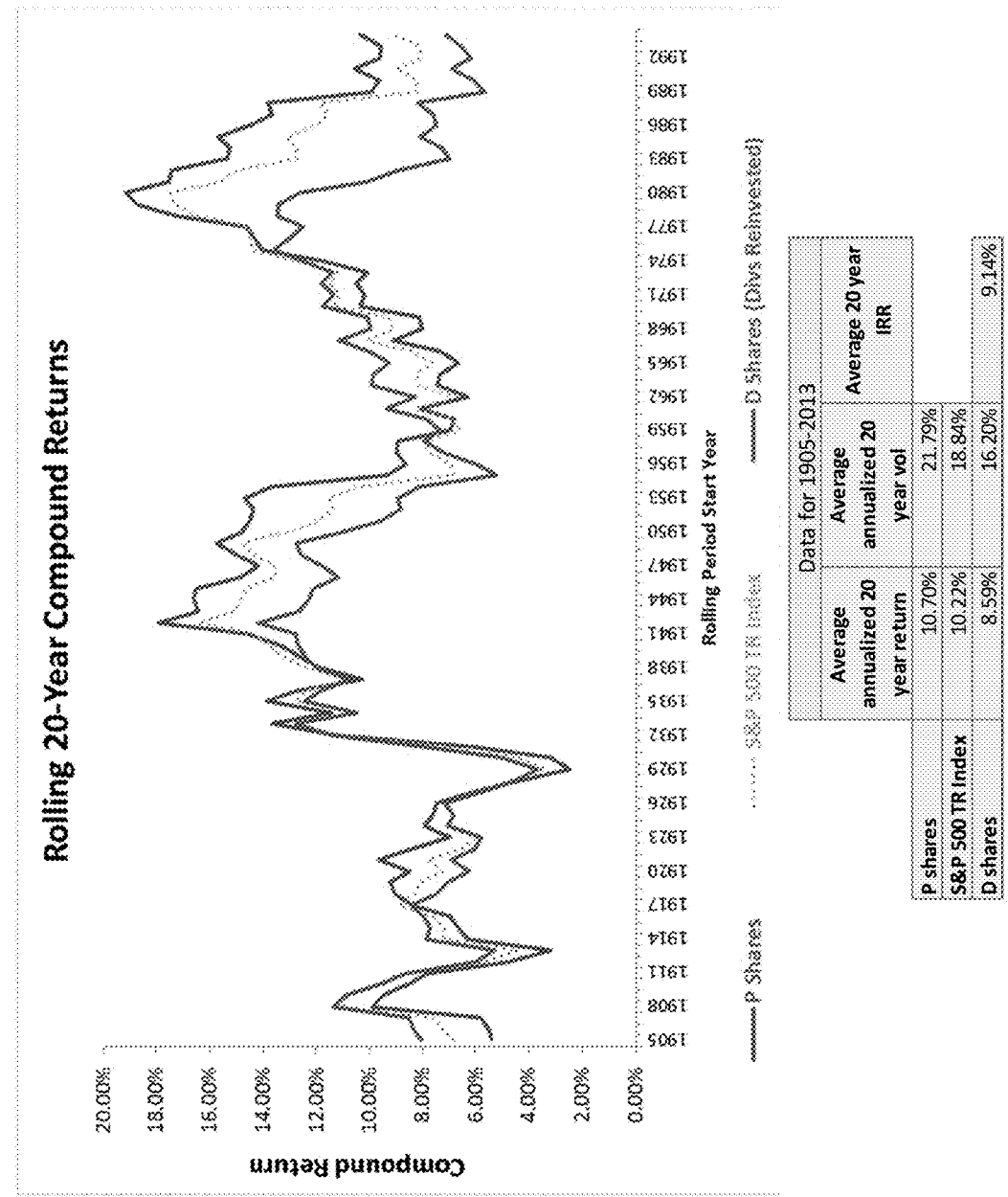
Fig.39: MMACC-Historical Performance of D Shares, P Shares, and S&P 500 TR Index

D Share Price Path Can Vary Widely Depending on Div Yld Assumptions

Historical Performance Assuming *Current Year* Dividend Yield Pricing

| Calendar Year | Horizon Year | D Share Price | Dividend | P Share Price | Index Price | D Share TR | Index TR | P Share TR | Curr Yr Dividend Yield | YOY Chg | D + P |
|---|---|---|---|---|---|---|---|---|---|---|---|
| 1994 | 0 | $197.99 | | $257.20 | $455.19 | | | | 2.90% | | |
| 1995 | 1 | $211.42 | $13.79 | $403.15 | $614.57 | 13.75% | 35.04% | 56.75% | 2.24% | -22.74% | 38.04% |
| 1996 | 2 | $223.29 | $14.90 | $519.96 | $743.25 | 12.66% | 23.36% | 28.99% | 2.00% | -10.66% | 23.36% |
| 1997 | 3 | $228.91 | $15.50 | $733.46 | $962.37 | 9.46% | 31.57% | 41.06% | 1.61% | -19.46% | 31.57% |
| 1998 | 4 | $231.51 | $16.20 | $958.54 | $1,190.05 | 8.21% | 25.34% | 30.69% | 1.36% | -15.46% | 25.34% |
| 1999 | 5 | $225.81 | $16.48 | $1,202.87 | $1,428.68 | 4.66% | 21.44% | 25.49% | 1.15% | -15.55% | 21.44% |
| 2000 | 6 | $208.19 | $16.27 | $1,122.74 | $1,330.93 | -0.60% | -5.70% | -6.66% | 1.22% | 5.86% | -5.70% |
| 2001 | 7 | $186.21 | $15.74 | $958.72 | $1,144.93 | -3.00% | -12.79% | -14.61% | 1.37% | 12.46% | -12.79% |
| 2002 | 8 | $172.19 | $16.07 | $726.99 | $899.18 | -7.10% | -20.06% | -24.16% | 1.79% | 30.00% | -20.06% |
| 2003 | 9 | $178.13 | $17.39 | $906.60 | $1,080.64 | 13.57% | 22.11% | 24.70% | 1.61% | -9.96% | 22.11% |
| 2004 | 10 | $174.04 | $19.44 | $1,021.08 | $1,199.21 | 8.62% | 12.77% | 13.65% | 1.62% | 0.48% | 12.77% |
| 2005 | 11 | $183.45 | $22.22 | $1,078.62 | $1,262.07 | 15.46% | 7.09% | 5.64% | 1.76% | 8.61% | 7.09% |
| 2006 | 12 | $184.19 | $24.88 | $1,232.23 | $1,416.42 | 13.96% | 14.20% | 14.24% | 1.76% | -0.23% | 14.20% |
| 2007 | 13 | $180.34 | $27.73 | $1,298.88 | $1,479.22 | 12.97% | 6.39% | 5.41% | 1.87% | 6.72% | 6.39% |
| 2008 | 14 | $152.60 | $28.39 | $724.96 | $877.56 | 0.36% | -38.75% | -44.19% | 3.24% | 72.57% | -38.75% |
| 2009 | 15 | $105.57 | $22.41 | $1,004.81 | $1,110.38 | -16.13% | 29.08% | 38.60% | 2.02% | -37.61% | 29.08% |
| 2010 | 16 | $86.91 | $22.73 | $1,154.62 | $1,241.53 | 3.85% | 13.86% | 14.91% | 1.83% | -9.29% | 13.86% |
| 2011 | 17 | $76.03 | $26.43 | $1,167.29 | $1,243.32 | 17.90% | 2.27% | 1.10% | 2.13% | 16.11% | 2.27% |
| 2012 | 18 | $60.50 | $31.25 | $1,361.79 | $1,422.29 | 20.67% | 16.91% | 16.66% | 2.20% | 3.36% | 16.91% |
| 2013 | 19 | $34.33 | $34.99 | $1,773.45 | $1,807.78 | 14.57% | 29.56% | 30.23% | 1.94% | -11.91% | 29.56% |
| 2014 | 20 | $0.00 | $39.44 | $2,060.31 | $2,060.31 | 14.90% | 16.15% | 16.17% | 1.91% | -1.10% | 16.15% |

| | | |
|---|---|---|
| ArithMe | 8.47% | 11.64% | 13.68% |
| Comp | 8.11% | 9.82% | 10.96% |
| Vol | 8.80% | 19.04% | 23.61% |
| IRR | 7.62% | | |

Fig.40: MMACC-D Share Price and Dividend Yield Assumptions (Current Year)

D Share Price Path Can Vary Widely Depending on Div Yld Assumptions

Historical Performance Assuming *Rolling 5Yr* Dividend Yield Pricing

| Calendar Year | Horizon Year | D Share Price | Dividend | P Share Price | Index Price | D Share TR | Index TR | P Share TR | Curr Yr Dividend Yield | YOY Chg | D + P |
|---|---|---|---|---|---|---|---|---|---|---|---|
| 1994 | 0 | $205.67 | | $249.52 | $455.19 | | | | 3.05% | | |
| 1995 | 1 | $248.49 | $13.79 | $366.08 | $614.57 | 27.52% | 35.04% | 46.72% | 2.76% | -9.40% | 38.04% |
| 1996 | 2 | $269.80 | $14.90 | $473.45 | $743.25 | 14.57% | 23.36% | 29.33% | 2.44% | -4.22% | 23.36% |
| 1997 | 3 | $307.56 | $15.50 | $654.81 | $962.37 | 19.74% | 31.57% | 38.31% | 2.29% | -6.71% | 31.57% |
| 1998 | 4 | $326.31 | $16.20 | $863.74 | $1,190.05 | 11.36% | 25.34% | 34.80% | 2.03% | -11.66% | 25.34% |
| 1999 | 5 | $315.06 | $16.48 | $1,113.62 | $1,428.68 | 1.60% | 21.44% | 31.05% | 1.67% | -17.56% | 21.44% |
| 2000 | 6 | $246.01 | $16.27 | $1,084.92 | $1,330.93 | -16.75% | -5.70% | 2.40% | 1.75% | 12.00% | -5.70% |
| 2001 | 7 | $182.49 | $15.74 | $962.44 | $1,144.93 | -19.42% | -12.79% | -8.57% | 1.86% | 8.57% | -12.79% |
| 2002 | 8 | $136.35 | $16.07 | $762.83 | $899.18 | -16.45% | -20.06% | -20.74% | 1.86% | 2.65% | -20.06% |
| 2003 | 9 | $156.20 | $17.39 | $924.44 | $1,080.64 | 27.31% | 22.11% | 21.19% | 1.85% | -3.58% | 22.11% |
| 2004 | 10 | $168.22 | $19.44 | $1,030.99 | $1,199.21 | 20.14% | 12.77% | 11.15% | 1.95% | 5.84% | 12.77% |
| 2005 | 11 | $170.97 | $22.22 | $1,091.10 | $1,262.07 | 14.84% | 7.09% | 5.83% | 1.63% | 7.07% | 7.09% |
| 2006 | 12 | $179.37 | $24.88 | $1,237.05 | $1,416.42 | 19.46% | 14.20% | 13.38% | 1.71% | 4.68% | 14.20% |
| 2007 | 13 | $166.85 | $27.73 | $1,312.37 | $1,479.22 | 8.48% | 6.39% | 6.09% | 1.72% | 1.02% | 6.39% |
| 2008 | 14 | $100.58 | $28.39 | $776.98 | $877.56 | -22.70% | -38.75% | -40.80% | 2.05% | 18.86% | -38.75% |
| 2009 | 15 | $111.01 | $22.41 | $999.37 | $1,110.38 | 32.65% | 29.08% | 28.62% | 2.13% | 3.88% | 29.08% |
| 2010 | 16 | $100.96 | $22.73 | $1,140.57 | $1,241.53 | 11.42% | 13.86% | 14.13% | 2.14% | 0.66% | 13.86% |
| 2011 | 17 | $79.15 | $26.43 | $1,164.17 | $1,243.32 | 4.58% | 2.27% | 2.07% | 2.22% | 3.45% | 2.27% |
| 2012 | 18 | $62.74 | $31.25 | $1,359.55 | $1,422.29 | 18.74% | 16.91% | 16.78% | 2.28% | 2.91% | 16.91% |
| 2013 | 19 | $35.82 | $34.99 | $1,771.96 | $1,807.78 | 12.86% | 29.56% | 30.33% | 2.02% | -11.39% | 29.56% |
| 2014 | 20 | $0.00 | $39.44 | $2,060.31 | $2,060.31 | 10.11% | 16.15% | 16.27% | 2.00% | -1.03% | 16.15% |

|  |  |  |  |
|---|---|---|---|
| ArithMe | 9.00% | 11.64% | 13.30% |
| Comp | 7.75% | 9.82% | 11.13% |
| Vol | 16.18% | 19.04% | 21.00% |
| IRR | 7.20% | | |

Fig.41: MMACC-D Share Price and Dividend Yield Assumptions (Rolling 5 Year)

1904 (Rolling 5 Year Dividend Yield)

| Calendar Year | Horizon | D-Share Price | Dividend | P-Share Price | Index Price | D-Share TR | Index TR | P-Share TR | 5 Yr Rolling Average DY (used for pricing) | YoY Change | D+P |
|---|---|---|---|---|---|---|---|---|---|---|---|
| 1904 | 0 | $4.7 | | $3.5 | $8.3 | | | | 4.32% | | |
| 1905 | 1 | $5.1 | $0.3 | $4.4 | $9.5 | 15.8% | 19.6% | 24.7% | 4.13% | -4.2% | 19.6% |
| 1906 | 2 | $5.1 | $0.4 | $4.7 | $9.8 | 7.4% | 7.3% | 7.3% | 4.14% | 0.2% | 7.3% |
| 1907 | 3 | $3.5 | $0.4 | $3.0 | $6.6 | -21.9% | -28.8% | -36.1% | 4.66% | 12.5% | -28.8% |
| 1908 | 4 | $4.6 | $0.4 | $4.5 | $9.0 | 39.8% | 43.5% | 47.9% | 4.48% | -3.9% | 43.5% |
| 1909 | 5 | $5.0 | $0.4 | $5.3 | $10.3 | 20.4% | 18.9% | 17.4% | 4.58% | 2.3% | 18.9% |
| 1910 | 6 | $4.4 | $0.5 | $4.6 | $9.1 | -2.7% | -7.6% | -12.3% | 4.93% | 7.6% | -7.6% |
| 1911 | 7 | $4.4 | $0.5 | $4.7 | $9.1 | 9.0% | 5.9% | 2.8% | 5.15% | 4.4% | 5.9% |
| 1912 | 8 | $4.1 | $0.5 | $5.3 | $9.4 | 3.9% | 8.2% | 12.2% | 4.83% | -6.1% | 8.2% |
| 1913 | 9 | $3.4 | $0.5 | $4.6 | $8.0 | -4.1% | -9.2% | -13.0% | 5.14% | 6.4% | -9.2% |
| 1914 | 10 | $3.0 | $0.4 | $4.3 | $7.4 | 0.9% | -3.4% | -6.5% | 5.43% | 5.6% | -3.4% |
| 1915 | 11 | $3.5 | $0.4 | $6.0 | $9.5 | 31.0% | 34.8% | 37.5% | 5.30% | -2.4% | 34.8% |
| 1916 | 12 | $3.4 | $0.6 | $6.4 | $9.8 | 11.6% | 9.3% | 7.9% | 5.41% | 2.1% | 9.3% |
| 1917 | 13 | $2.4 | $0.7 | $4.4 | $6.8 | -8.3% | -23.6% | -31.6% | 6.42% | 18.6% | -23.6% |
| 1918 | 14 | $2.5 | $0.6 | $5.4 | $7.9 | 29.4% | 24.6% | 21.9% | 6.67% | 3.9% | 24.6% |
| 1919 | 15 | $2.5 | $0.5 | $6.4 | $8.9 | 18.4% | 19.6% | 20.2% | 6.71% | 0.7% | 19.6% |
| 1920 | 16 | $1.7 | $0.5 | $5.1 | $6.8 | -11.8% | -17.9% | -20.3% | 7.30% | 8.8% | -17.9% |
| 1921 | 17 | $1.4 | $0.5 | $5.9 | $7.3 | 11.9% | 14.1% | 14.8% | 7.42% | 1.6% | 14.1% |
| 1922 | 18 | $1.0 | $0.5 | $7.7 | $8.8 | 10.2% | 27.1% | 31.1% | 6.55% | -11.7% | 27.1% |
| 1923 | 19 | $0.5 | $0.5 | $8.0 | $8.6 | -0.6% | 3.4% | 4.0% | 6.35% | -3.1% | 3.4% |
| 1924 | 20 | $0.0 | $0.6 | $10.2 | $10.2 | 7.8% | 25.3% | 26.4% | 6.24% | -1.7% | 25.3% |

| | |
|---|---|
| Arithmetic Mean | 8.4% 8.6% 7.8% |
| Geometric Mean | 7.4% 6.8% 5.4% |
| Volatility | 15.1% 19.3% 22.4% |
| IRR | 7.5% |

Fig.42: MMACC-MMACC and 1904 (Rolling 5 Year Dividend Yield) Data

1925 (Rolling 5 Year Dividend Yield)

| Calendar Year | Horizon | D-Share Price | Dividend | P-Share Price | Index Price | D-Share TR | Index TR | P-Share TR | 5 Yr Rolling Average DY (used for pricing) | YoY Change | D+P |
|---|---|---|---|---|---|---|---|---|---|---|---|
| 1925 | 0 | $8.4 | | $4.1 | $12.5 | | | | 5.71% | | |
| 1926 | 1 | $8.6 | $0.7 | $4.9 | $13.5 | 11.1% | 13.8% | 19.4% | 5.47% | -4.1% | 13.8% |
| 1927 | 2 | $10.4 | $0.8 | $7.0 | $17.5 | 30.5% | 35.1% | 43.2% | 5.19% | -5.1% | 35.1% |
| 1928 | 3 | $12.5 | $0.9 | $10.6 | $23.2 | 28.1% | 37.5% | 51.4% | 4.69% | -9.7% | 37.5% |
| 1929 | 4 | $10.8 | $1.0 | $10.6 | $21.4 | -5.7% | -3.4% | -0.6% | 4.51% | -3.8% | -3.4% |
| 1930 | 5 | $7.8 | $1.0 | $7.7 | $15.5 | -18.5% | -22.9% | -27.4% | 4.81% | 6.7% | -22.9% |
| 1931 | 6 | $4.6 | $0.8 | $3.9 | $8.4 | -31.3% | -40.3% | -49.5% | 5.73% | 19.1% | -40.3% |
| 1932 | 7 | $3.7 | $0.5 | $3.1 | $6.8 | -7.2% | -13.3% | -20.5% | 6.31% | 10.2% | -13.3% |
| 1933 | 8 | $5.3 | $0.4 | $4.7 | $10.0 | 52.5% | 52.6% | 52.8% | 6.46% | 2.3% | 52.6% |
| 1934 | 9 | $4.6 | $0.5 | $4.6 | $9.3 | -3.3% | -2.6% | -1.8% | 6.53% | 1.0% | -2.6% |
| 1935 | 10 | $5.7 | $0.5 | $7.3 | $13.0 | 34.0% | 45.9% | 57.9% | 5.98% | -8.3% | 45.9% |
| 1936 | 11 | $6.0 | $0.7 | $11.1 | $17.1 | 16.1% | 36.3% | 52.3% | 4.89% | -18.4% | 36.3% |
| 1937 | 12 | $3.5 | $0.8 | $7.5 | $11.0 | -28.0% | -30.7% | -32.2% | 4.87% | -0.3% | -30.7% |
| 1938 | 13 | $3.5 | $0.5 | $9.1 | $12.7 | 16.3% | 19.8% | 21.4% | 4.79% | -1.6% | 19.8% |
| 1939 | 14 | $3.0 | $0.6 | $9.3 | $12.4 | 3.4% | 2.4% | 2.0% | 4.82% | 0.6% | 2.4% |
| 1940 | 15 | $2.4 | $0.7 | $8.1 | $10.5 | 1.6% | -9.5% | -13.1% | 5.37% | 11.4% | -9.5% |
| 1941 | 16 | $1.9 | $0.7 | $6.9 | $8.8 | 6.0% | -10.1% | -14.9% | 6.15% | 14.5% | -10.1% |
| 1942 | 17 | $1.5 | $0.6 | $8.0 | $9.5 | 13.0% | 15.4% | 16.1% | 5.94% | -3.5% | 15.4% |
| 1943 | 18 | $1.3 | $0.6 | $10.2 | $11.5 | 26.3% | 27.0% | 27.1% | 6.20% | 4.4% | 27.0% |
| 1944 | 19 | $0.8 | $0.6 | $12.3 | $13.1 | 7.7% | 19.7% | 21.2% | 6.17% | -0.4% | 19.7% |
| 1945 | 20 | $0.0 | $0.7 | $17.3 | $17.3 | -13.3% | 37.3% | 40.5% | 5.66% | -8.3% | 37.3% |

| | | | |
|---|---|---|---|
| Arithmatic Mean | 7.0% | 10.5% | 12.3% |
| Geometric Mean | 4.9% | 7.2% | 7.5% |
| Volatility | 21.3% | 26.6% | 31.9% |
| IRR | 5.4% | | |

Fig.43: MMACC-MMACC and 1925 (Rolling 5 Year Dividend Yield) Data

1946 (Rolling 5 Year Dividend Yield)

| Calendar Year | Horizon | D-Share Price | Dividend | P-Share Price | Index Price | D-Share TR | Index TR | P-Share TR | 5 Yr Rolling Average DY (used for pricing) | YoY Change | D+P |
|---|---|---|---|---|---|---|---|---|---|---|---|
| 1946 | 0 | $9.4 | | $5.7 | $15.1 | | | | 4.98% | | |
| 1947 | 1 | $8.9 | $0.8 | $6.1 | $15.0 | 3.8% | 4.9% | 6.6% | 4.86% | -2.4% | 4.9% |
| 1948 | 2 | $8.9 | $0.9 | $6.3 | $15.2 | 10.1% | 7.3% | 3.1% | 5.02% | 3.3% | 7.3% |
| 1949 | 3 | $9.8 | $1.1 | $6.7 | $16.5 | 22.9% | 16.4% | 7.2% | 5.42% | 8.0% | 16.4% |
| 1950 | 4 | $12.1 | $1.5 | $7.6 | $19.8 | 39.0% | 28.3% | 12.8% | 6.15% | 13.4% | 28.3% |
| 1951 | 5 | $14.2 | $1.4 | $9.2 | $23.4 | 28.5% | 25.7% | 21.2% | 6.41% | 4.3% | 25.7% |
| 1952 | 6 | $15.1 | $1.4 | $11.0 | $26.0 | 16.2% | 17.3% | 18.9% | 6.38% | -0.5% | 17.3% |
| 1953 | 7 | $13.6 | $1.5 | $11.2 | $24.8 | 0.0% | 0.9% | 2.1% | 6.32% | -0.9% | 0.9% |
| 1954 | 8 | $17.2 | $1.5 | $17.7 | $35.0 | 37.7% | 47.0% | 58.4% | 5.82% | -7.9% | 47.0% |
| 1955 | 9 | $19.0 | $1.6 | $26.4 | $45.4 | 19.7% | 34.4% | 48.7% | 5.06% | -13.1% | 34.4% |
| 1956 | 10 | $16.8 | $1.7 | $29.6 | $46.4 | -2.3% | 6.2% | 12.3% | 4.60% | -9.0% | 6.2% |
| 1957 | 11 | $13.0 | $1.8 | $27.4 | $40.3 | -12.3% | -9.3% | -7.6% | 4.41% | -4.2% | -9.3% |
| 1958 | 12 | $14.1 | $1.8 | $39.4 | $53.5 | 22.0% | 37.0% | 44.1% | 3.90% | -11.7% | 37.0% |
| 1959 | 13 | $13.1 | $1.8 | $46.0 | $59.1 | 5.7% | 13.8% | 16.8% | 3.63% | -6.7% | 13.8% |
| 1960 | 14 | $10.9 | $2.0 | $45.9 | $56.8 | -1.9% | -0.5% | -0.1% | 3.60% | -1.0% | -0.5% |
| 1961 | 15 | $11.1 | $2.0 | $60.7 | $71.7 | 20.7% | 29.9% | 32.0% | 3.41% | -5.2% | 29.9% |
| 1962 | 16 | $7.4 | $2.1 | $55.2 | $62.6 | -13.8% | -9.7% | -9.0% | 3.20% | -6.1% | -9.7% |
| 1963 | 17 | $6.6 | $2.3 | $67.6 | $74.2 | 19.9% | 22.0% | 22.3% | 3.16% | -1.2% | 22.0% |
| 1964 | 18 | $5.0 | $2.5 | $78.9 | $84.0 | 13.9% | 16.6% | 16.8% | 3.14% | -0.8% | 16.6% |
| 1965 | 19 | $2.7 | $2.7 | $89.0 | $91.7 | 7.9% | 12.5% | 12.8% | 3.05% | -3.0% | 12.5% |
| 1966 | 20 | $0.0 | $2.9 | $81.3 | $81.3 | 5.8% | -8.2% | -8.6% | 3.19% | 4.7% | -8.2% |
| | | | | | Arithmetic Mean | 12.2% | 14.6% | 15.5% | | | |
| | | | | | Geometric Mean | 11.3% | 13.6% | 14.2% | | | |
| | | | | | Volatility | 14.6% | 16.0% | 18.6% | | | |
| | | | | | IRR | 14.1% | | | | | |

Fig. 44: MMACC-MMACC and 1946 (Rolling 5 Year Dividend Yield) Data

1967 (Rolling 5 Year Dividend Yield)

| Calendar Year | Horizon | D-Share Price | Dividend | P-Share Price | Index Price | D-Share TR | Index TR | P-Share TR | 5 Yr Rolling Average DY *(Used for pricing)* | YoY Change | D+P |
|---|---|---|---|---|---|---|---|---|---|---|---|
| 1967 | 0 | $43.8 | | $51.5 | $95.3 | | | | 3.12% | | |
| 1968 | 1 | $46.7 | $3.1 | $59.8 | $106.5 | 13.7% | 15.0% | 16.1% | 3.08% | -1.2% | 15.0% |
| 1969 | 2 | $39.3 | $3.2 | $51.8 | $91.1 | -9.1% | -11.5% | -13.3% | 3.18% | 3.2% | -11.5% |
| 1970 | 3 | $38.1 | $3.1 | $52.0 | $90.1 | 5.0% | 2.3% | 0.2% | 3.29% | 3.3% | 2.3% |
| 1971 | 4 | $39.3 | $3.1 | $59.9 | $99.2 | 11.2% | 13.5% | 15.3% | 3.20% | -2.6% | 13.5% |
| 1972 | 5 | $43.4 | $3.2 | $74.1 | $117.5 | 18.6% | 21.7% | 23.6% | 3.12% | -2.4% | 21.7% |
| 1973 | 6 | $34.3 | $3.4 | $60.5 | $94.8 | -13.2% | -16.5% | -18.3% | 3.26% | 4.4% | -16.5% |
| 1974 | 7 | $24.9 | $3.6 | $42.1 | $67.1 | -16.8% | -25.4% | -30.3% | 3.64% | 11.7% | -25.4% |
| 1975 | 8 | $31.8 | $3.7 | $56.9 | $88.7 | 42.4% | 37.7% | 35.0% | 3.77% | 3.6% | 37.7% |
| 1976 | 9 | $36.2 | $4.1 | $68.5 | $104.7 | 26.4% | 22.6% | 20.5% | 3.93% | 4.1% | 22.6% |
| 1977 | 10 | $32.7 | $4.7 | $61.1 | $93.8 | 3.5% | -5.9% | -10.9% | 4.39% | 11.7% | -5.9% |
| 1978 | 11 | $32.7 | $5.1 | $63.4 | $96.1 | 15.3% | 7.8% | 3.8% | 4.73% | 7.8% | 7.8% |
| 1979 | 12 | $33.2 | $5.7 | $74.6 | $107.8 | 18.7% | 18.0% | 17.7% | 4.70% | -0.5% | 18.0% |
| 1980 | 13 | $37.3 | $6.2 | $96.2 | $133.5 | 31.1% | 29.6% | 28.9% | 4.80% | 2.0% | 29.6% |
| 1981 | 14 | $31.9 | $6.6 | $91.9 | $123.8 | 3.3% | -2.3% | -4.5% | 5.09% | 6.2% | -2.3% |
| 1982 | 15 | $30.6 | $6.9 | $108.8 | $139.4 | 17.5% | 18.2% | 18.4% | 5.08% | -0.2% | 18.2% |
| 1983 | 16 | $28.6 | $7.1 | $135.8 | $164.4 | 16.5% | 23.0% | 24.8% | 4.89% | -3.8% | 23.0% |
| 1984 | 17 | $21.4 | $7.5 | $143.1 | $164.5 | 1.3% | 4.6% | 5.4% | 4.76% | -2.7% | 4.6% |
| 1985 | 18 | $17.8 | $7.9 | $189.5 | $207.3 | 20.1% | 30.8% | 32.4% | 4.60% | -3.4% | 30.8% |
| 1986 | 19 | $10.0 | $8.3 | $238.6 | $248.6 | 2.6% | 23.9% | 25.9% | 4.19% | -8.8% | 23.9% |
| 1987 | 20 | $0.0 | $8.8 | $241.0 | $241.0 | -11.9% | 0.5% | 1.0% | 3.94% | -6.1% | 0.5% |

| | | | |
|---|---|---|---|
| Arithmetic Mean | 9.8% | 10.4% | 9.6% |
| Geometric Mean | 8.8% | 9.1% | 8.0% |
| Volatility | 15.4% | 16.9% | 18.2% |
| IRR | 8.0% | | |

Fig.45: MMACC-MMACC and 1967 (Rolling 5 Year Dividend Yield) Data

1988 (Rolling 5 Year Dividend Yield)

| Calendar Year | Horizon | D-Share Price | Dividend | P-Share Price | Index Price | D-Share TR | Index TR | P-Share TR | 5 Yr Rolling Average DY (used for pricing) | YoY Change | D+P |
|---|---|---|---|---|---|---|---|---|---|---|---|
| 1988 | 0 | $144.8 | | $131.7 | $276.5 | | | | 3.78% | | |
| 1989 | 1 | $167.2 | $11.1 | $181.4 | $348.6 | 23.1% | 30.1% | 37.8% | 3.50% | -7.5% | 30.1% |
| 1990 | 2 | $150.9 | $12.1 | $177.9 | $328.8 | -2.5% | -2.2% | -2.0% | 3.47% | -0.7% | -2.2% |
| 1991 | 3 | $169.6 | $12.2 | $218.9 | $388.5 | 20.5% | 21.9% | 23.0% | 3.43% | -1.1% | 21.9% |
| 1992 | 4 | $175.3 | $12.4 | $260.3 | $435.6 | 10.6% | 15.3% | 18.9% | 3.27% | -4.7% | 15.3% |
| 1993 | 5 | $171.5 | $12.6 | $294.5 | $466.0 | 5.0% | 9.8% | 13.1% | 3.11% | -5.0% | 9.8% |
| 1994 | 6 | $156.4 | $13.2 | $298.8 | $455.2 | -1.1% | 0.5% | 1.5% | 3.05% | -1.8% | 0.5% |
| 1995 | 7 | $183.4 | $13.8 | $431.1 | $614.6 | 26.1% | 38.0% | 44.3% | 2.76% | -9.4% | 38.0% |
| 1996 | 8 | $193.0 | $14.9 | $550.3 | $743.3 | 13.3% | 23.4% | 27.6% | 2.54% | -8.2% | 23.4% |
| 1997 | 9 | $212.2 | $15.5 | $750.1 | $962.4 | 18.0% | 31.6% | 36.3% | 2.29% | -9.7% | 31.6% |
| 1998 | 10 | $216.0 | $16.2 | $974.0 | $1,190.1 | 9.4% | 25.3% | 29.8% | 2.02% | -11.7% | 25.3% |
| 1999 | 11 | $198.4 | $16.5 | $1,230.3 | $1,428.7 | -0.5% | 21.4% | 26.3% | 1.67% | -17.2% | 21.4% |
| 2000 | 12 | $146.7 | $16.3 | $1,184.2 | $1,330.9 | -17.8% | -5.7% | -3.7% | 1.47% | -12.2% | -5.7% |
| 2001 | 13 | $102.2 | $15.7 | $1,042.7 | $1,144.9 | -19.6% | -12.8% | -11.9% | 1.34% | -8.6% | -12.8% |
| 2002 | 14 | $71.0 | $16.1 | $828.2 | $899.2 | -14.8% | -20.1% | -20.6% | 1.38% | 2.6% | -20.1% |
| 2003 | 15 | $74.0 | $17.4 | $1,006.6 | $1,080.6 | 28.8% | 22.1% | 21.5% | 1.43% | 3.6% | 22.1% |
| 2004 | 16 | $70.4 | $19.4 | $1,128.9 | $1,199.2 | 21.3% | 12.8% | 12.1% | 1.52% | 6.5% | 12.8% |
| 2005 | 17 | $59.8 | $22.2 | $1,202.3 | $1,262.1 | 16.5% | 7.1% | 6.5% | 1.63% | 7.1% | 7.1% |
| 2006 | 18 | $47.1 | $24.9 | $1,369.3 | $1,416.4 | 20.5% | 14.2% | 13.9% | 1.71% | 4.7% | 14.2% |
| 2007 | 19 | $25.1 | $27.7 | $1,454.1 | $1,479.2 | 12.0% | 6.4% | 6.2% | 1.72% | 1.0% | 6.4% |
| 2008 | 20 | $0.0 | $28.4 | $877.6 | $877.6 | 13.2% | -38.8% | -39.7% | 2.05% | 18.9% | -38.8% |

| | |
|---|---|
| Arithmetic Mean | 9.1% 10.0% 12.1% |
| Geometric Mean | 8.1% 8.2% 9.9% |
| Volatility | 14.4% 19.0% 20.8% |
| IRR | 8.3% |

Fig.46: MMACC-MMACC and 1988 (Rolling 5 Year Dividend Yield) Data

1904 (Current Year Dividend Yield)

| Calendar Year | Horizon | D-Share Price | Dividend | P-Share Price | Index Price | D-Share TR | Index TR | P-Share TR | Current Year DY | YoY Change | D+P |
|---|---|---|---|---|---|---|---|---|---|---|---|
| 1904 | 0 | $4.3 | | $3.9 | $8.3 | | | | 3.76% | | |
| 1905 | 1 | $4.5 | $0.3 | $5.0 | $9.5 | 13.1% | 19.6% | 26.7% | 3.46% | -7.9% | 19.6% |
| 1906 | 2 | $5.0 | $0.4 | $4.8 | $9.8 | 19.8% | 7.3% | -3.9% | 4.07% | 17.5% | 7.3% |
| 1907 | 3 | $4.4 | $0.4 | $2.2 | $6.6 | -4.2% | -28.8% | -54.6% | 6.70% | 64.7% | -28.8% |
| 1908 | 4 | $4.5 | $0.4 | $4.5 | $9.0 | 12.1% | 43.5% | 106.8% | 4.43% | -33.9% | 43.5% |
| 1909 | 5 | $4.8 | $0.4 | $5.5 | $10.3 | 16.0% | 18.9% | 21.9% | 4.27% | -3.6% | 18.9% |
| 1910 | 6 | $4.6 | $0.5 | $4.5 | $9.1 | 5.5% | -7.6% | -19.0% | 5.19% | 21.6% | -7.6% |
| 1911 | 7 | $4.4 | $0.5 | $4.7 | $9.1 | 5.4% | 5.9% | 6.3% | 5.16% | -0.7% | 5.9% |
| 1912 | 8 | $4.2 | $0.5 | $5.2 | $9.4 | 7.6% | 8.2% | 8.8% | 5.12% | -0.8% | 8.2% |
| 1913 | 9 | $3.8 | $0.5 | $4.2 | $8.0 | 1.1% | -9.2% | -17.6% | 5.97% | 16.7% | -9.2% |
| 1914 | 10 | $3.1 | $0.4 | $4.2 | $7.4 | -6.3% | -3.4% | -0.8% | 5.71% | -4.3% | -3.4% |
| 1915 | 11 | $3.1 | $0.4 | $6.4 | $9.5 | 13.3% | 34.8% | 50.8% | 4.54% | -20.6% | 34.8% |
| 1916 | 12 | $3.5 | $0.6 | $6.3 | $9.8 | 30.7% | 9.3% | -1.2% | 5.71% | 26.0% | 9.3% |
| 1917 | 13 | $3.3 | $0.7 | $3.5 | $6.8 | 14.7% | -23.6% | -45.0% | 10.15% | 77.6% | -23.6% |
| 1918 | 14 | $2.7 | $0.6 | $5.2 | $7.9 | -2.2% | 24.6% | 50.4% | 7.22% | -28.9% | 24.6% |
| 1919 | 15 | $2.2 | $0.5 | $6.7 | $8.9 | 2.5% | 19.6% | 28.5% | 5.94% | -17.7% | 19.6% |
| 1920 | 16 | $1.7 | $0.5 | $5.1 | $6.8 | -0.8% | -17.9% | -23.7% | 7.49% | 26.0% | -17.9% |
| 1921 | 17 | $1.2 | $0.5 | $6.1 | $7.3 | -1.5% | 14.1% | 19.3% | 6.29% | -16.0% | 14.1% |
| 1922 | 18 | $0.9 | $0.5 | $7.8 | $8.8 | 18.4% | 27.1% | 28.8% | 5.81% | -7.7% | 27.1% |
| 1923 | 19 | $0.5 | $0.5 | $8.1 | $8.6 | 9.8% | 3.4% | 2.7% | 6.20% | 6.7% | 3.4% |
| 1924 | 20 | $0.0 | $0.6 | $10.2 | $10.2 | 10.2% | 25.3% | 26.2% | 5.41% | -12.7% | 25.3% |

| | | | |
|---|---|---|---|
| Arithmatic Mean | 8.3% | 8.6% | 10.6% |
| Geometric Mean | 7.9% | 6.8% | 4.8% |
| Volatility | 9.3% | 19.3% | 36.0% |
| IRR | 8.6% | | |

Fig.47: MMACC-MMACC and 1904 (Current Year Dividend Yield) Data

1925 (Current Year Dividend Yield)

| Calendar Year | Horizon | D-Share Price | Dividend | P-Share Price | Index Price | D-Share TR | Index TR | P-Share TR | Current Year DY (Used for pricing) | YoY Change | D+P |
|---|---|---|---|---|---|---|---|---|---|---|---|
| 1925 | 0 | $7.6 | | $4.9 | $12.5 | | | | 4.82% | | |
| 1926 | 1 | $8.3 | $0.7 | $5.2 | $13.5 | 17.8% | 13.8% | 7.5% | 5.11% | 6.2% | 13.8% |
| 1927 | 2 | $9.4 | $0.8 | $8.0 | $17.5 | 23.5% | 35.1% | 53.6% | 4.41% | -13.8% | 35.1% |
| 1928 | 3 | $10.6 | $0.9 | $12.5 | $23.2 | 21.5% | 37.5% | 56.2% | 3.67% | -16.7% | 37.5% |
| 1929 | 4 | $10.9 | $1.0 | $10.5 | $21.4 | 11.6% | -3.4% | -16.0% | 4.53% | 23.4% | -3.4% |
| 1930 | 5 | $9.3 | $1.0 | $6.2 | $15.5 | -5.2% | -22.9% | -41.2% | 6.32% | 39.4% | -22.9% |
| 1931 | 6 | $6.1 | $0.8 | $2.3 | $8.4 | -25.4% | -40.3% | -62.8% | 9.72% | 53.8% | -40.3% |
| 1932 | 7 | $4.1 | $0.5 | $2.7 | $6.8 | -25.0% | -13.3% | 18.0% | 7.33% | -24.5% | -13.3% |
| 1933 | 8 | $4.0 | $0.4 | $5.9 | $10.0 | 9.0% | 52.6% | 118.4% | 4.41% | -39.8% | 52.6% |
| 1934 | 9 | $3.8 | $0.5 | $5.5 | $9.3 | 4.5% | -2.6% | -7.5% | 4.86% | 10.1% | -2.6% |
| 1935 | 10 | $3.9 | $0.5 | $9.2 | $13.0 | 15.7% | 45.9% | 66.6% | 3.60% | -25.8% | 45.9% |
| 1936 | 11 | $5.3 | $0.7 | $11.8 | $17.1 | 54.8% | 36.3% | 28.5% | 4.22% | 17.1% | 36.3% |
| 1937 | 12 | $4.7 | $0.8 | $6.3 | $11.0 | 4.3% | -30.7% | -46.5% | 7.26% | 72.0% | -30.7% |
| 1938 | 13 | $3.1 | $0.5 | $9.6 | $12.7 | -24.5% | 19.8% | 53.1% | 4.02% | -44.6% | 19.8% |
| 1939 | 14 | $3.1 | $0.6 | $9.2 | $12.4 | 23.1% | 2.4% | -4.2% | 5.01% | 24.7% | 2.4% |
| 1940 | 15 | $2.8 | $0.7 | $7.7 | $10.5 | 10.1% | -9.5% | -16.1% | 6.36% | 26.9% | -9.5% |
| 1941 | 16 | $2.3 | $0.7 | $6.4 | $8.8 | 9.4% | -10.1% | -17.1% | 8.11% | 27.4% | -10.1% |
| 1942 | 17 | $1.6 | $0.6 | $7.9 | $9.5 | -7.9% | 15.4% | 23.9% | 6.20% | -23.5% | 15.4% |
| 1943 | 18 | $1.1 | $0.6 | $10.4 | $11.5 | 10.7% | 27.0% | 30.2% | 5.31% | -14.3% | 27.0% |
| 1944 | 19 | $0.6 | $0.6 | $12.5 | $13.1 | 10.7% | 19.7% | 20.7% | 4.89% | -8.1% | 19.7% |
| 1945 | 20 | $0.0 | $0.7 | $17.3 | $17.3 | 8.2% | 37.3% | 38.8% | 3.81% | -22.0% | 37.3% |

| | | | |
|---|---|---|---|
| Arithmetic Mean | 7.4% | 10.5% | 15.2% |
| Geometric Mean | 5.7% | 7.2% | 6.6% |
| Volatility | 18.8% | 26.6% | 43.5% |
| IRR | 6.6% | | |

Fig.48: MMACC-MMACC and 1925 (Current Year Dividend Yield) Data

1946 *(Current Year Dividend Yield)*

| Calendar Year | Horizon | D-Share Price | Dividend | P-Share Price | Index Price | D-Share TR | Index TR | P-Share TR | Current Year DY (used for pricing) | YoY Change | D+P |
|---|---|---|---|---|---|---|---|---|---|---|---|
| 1946 | 0 | $9.1 | | $6.0 | $15.1 | | | | 4.69% | | |
| 1947 | 1 | $9.7 | $0.8 | $5.3 | $15.0 | 15.8% | 4.9% | -11.5% | 5.59% | 19.1% | 4.9% |
| 1948 | 2 | $10.0 | $0.9 | $5.2 | $15.2 | 12.7% | 7.3% | -2.5% | 6.12% | 9.5% | 7.3% |
| 1949 | 3 | $11.2 | $1.1 | $5.3 | $16.5 | 23.8% | 16.4% | 2.2% | 6.89% | 12.6% | 16.4% |
| 1950 | 4 | $13.5 | $1.5 | $6.3 | $19.8 | 33.4% | 28.3% | 17.6% | 7.44% | 8.0% | 28.3% |
| 1951 | 5 | $13.7 | $1.4 | $9.7 | $23.4 | 11.8% | 25.7% | 55.5% | 6.02% | -19.1% | 25.7% |
| 1952 | 6 | $13.6 | $1.4 | $12.4 | $26.0 | 9.7% | 17.3% | 27.8% | 5.41% | -10.1% | 17.3% |
| 1953 | 7 | $13.0 | $1.5 | $11.9 | $24.8 | 6.0% | 0.9% | -4.6% | 5.84% | 7.8% | 0.9% |
| 1954 | 8 | $14.1 | $1.5 | $20.8 | $35.0 | 20.9% | 47.0% | 75.6% | 4.40% | -24.6% | 47.0% |
| 1955 | 9 | $14.7 | $1.6 | $30.7 | $45.4 | 15.5% | 34.4% | 47.2% | 3.61% | -17.9% | 34.4% |
| 1956 | 10 | $14.3 | $1.7 | $32.1 | $46.4 | 9.3% | 6.2% | 4.7% | 3.75% | 3.7% | 6.2% |
| 1957 | 11 | $13.0 | $1.8 | $27.3 | $40.3 | 3.8% | -9.3% | -15.1% | 4.44% | 18.5% | -9.3% |
| 1958 | 12 | $12.1 | $1.8 | $41.3 | $53.5 | 6.5% | 37.0% | 51.5% | 3.27% | -26.3% | 37.0% |
| 1959 | 13 | $11.4 | $1.8 | $47.7 | $59.1 | 8.6% | 13.8% | 15.4% | 3.10% | -5.3% | 13.8% |
| 1960 | 14 | $10.4 | $2.0 | $46.4 | $56.8 | 8.8% | -0.5% | -2.8% | 3.43% | 10.8% | -0.5% |
| 1961 | 15 | $9.3 | $2.0 | $62.4 | $71.7 | 8.7% | 29.9% | 34.6% | 2.82% | -18.0% | 29.9% |
| 1962 | 16 | $7.8 | $2.1 | $54.8 | $62.6 | 7.2% | -9.7% | -12.2% | 3.40% | 20.8% | -9.7% |
| 1963 | 17 | $6.4 | $2.3 | $67.7 | $74.2 | 11.2% | 22.0% | 23.6% | 3.07% | -9.6% | 22.0% |
| 1964 | 18 | $4.8 | $2.5 | $79.2 | $84.0 | 13.1% | 16.6% | 16.9% | 2.98% | -3.1% | 16.6% |
| 1965 | 19 | $2.6 | $2.7 | $89.1 | $91.7 | 12.0% | 12.5% | 12.5% | 2.97% | -0.4% | 12.5% |
| 1966 | 20 | $0.0 | $2.9 | $81.3 | $81.3 | 8.6% | -8.2% | -8.7% | 3.53% | 19.0% | -8.2% |

| | | | |
|---|---|---|---|
| Arithmetic Mean | 12.4% | 14.6% | 16.4% |
| Geometric Mean | 12.2% | 13.6% | 13.9% |
| Volatility | 6.9% | 16.0% | 25.6% |
| IRR | 14.6% | | |

Fig. 49: MMACC-MMACC and 1946 (Current Year Dividend Yield) Data

1967 (Current Year Dividend Yield)

| Calendar Year | Horizon | D-Share Price | Dividend | P-Share Price | Index Price | D-Share TR | Index TR | P-Share TR | Current Year DY (used for pricing) | YoY Change | D+P |
|---|---|---|---|---|---|---|---|---|---|---|---|
| 1967 | 0 | $43.2 | | $52.1 | $95.3 | | | | 3.06% | | |
| 1968 | 1 | $44.4 | $3.1 | $62.1 | $106.5 | 10.0% | 15.0% | 19.1% | 2.88% | -5.9% | 15.0% |
| 1969 | 2 | $41.8 | $3.2 | $49.3 | $91.1 | 1.2% | -11.5% | -20.5% | 3.47% | 20.3% | -11.5% |
| 1970 | 3 | $39.8 | $3.1 | $50.3 | $90.1 | 2.7% | 2.3% | 2.0% | 3.49% | 0.5% | 2.3% |
| 1971 | 4 | $38.3 | $3.1 | $60.9 | $99.2 | 4.0% | 13.5% | 21.1% | 3.10% | -11.2% | 13.5% |
| 1972 | 5 | $38.5 | $3.2 | $79.0 | $117.5 | 8.8% | 21.7% | 29.8% | 2.68% | -13.4% | 21.7% |
| 1973 | 6 | $36.7 | $3.4 | $58.0 | $94.8 | 4.3% | -16.5% | -26.6% | 3.57% | 33.0% | -16.5% |
| 1974 | 7 | $33.1 | $3.6 | $34.0 | $67.1 | -0.2% | -25.4% | -41.4% | 5.37% | 50.5% | -25.4% |
| 1975 | 8 | $34.2 | $3.7 | $54.5 | $88.7 | 14.6% | 37.7% | 60.2% | 4.15% | -22.7% | 37.7% |
| 1976 | 9 | $35.7 | $4.1 | $69.0 | $104.7 | 16.2% | 22.6% | 26.6% | 3.87% | -6.8% | 22.6% |
| 1977 | 10 | $36.1 | $4.7 | $57.7 | $93.8 | 14.1% | -5.9% | -16.3% | 4.98% | 28.7% | -5.9% |
| 1978 | 11 | $35.6 | $5.1 | $60.5 | $96.1 | 12.7% | 7.8% | 4.8% | 5.28% | 6.0% | 7.8% |
| 1979 | 12 | $36.2 | $5.7 | $71.6 | $107.8 | 17.5% | 18.0% | 18.4% | 5.24% | -0.6% | 18.0% |
| 1980 | 13 | $36.1 | $6.2 | $97.4 | $133.5 | 17.0% | 29.6% | 35.9% | 4.61% | -12.0% | 29.6% |
| 1981 | 14 | $33.3 | $6.6 | $90.5 | $123.8 | 10.4% | -2.3% | -7.0% | 5.36% | 16.1% | -2.3% |
| 1982 | 15 | $29.8 | $6.9 | $109.6 | $139.4 | 10.2% | 18.2% | 21.1% | 4.93% | -8.0% | 18.2% |
| 1983 | 16 | $25.5 | $7.1 | $138.9 | $164.4 | 9.5% | 23.0% | 26.7% | 4.31% | -12.5% | 23.0% |
| 1984 | 17 | $20.7 | $7.5 | $143.8 | $164.5 | 10.4% | 4.6% | 3.6% | 4.58% | 6.1% | 4.6% |
| 1985 | 18 | $14.9 | $7.9 | $192.4 | $207.3 | 10.5% | 30.8% | 33.7% | 3.81% | -16.7% | 30.8% |
| 1986 | 19 | $8.0 | $8.3 | $240.6 | $248.6 | 9.1% | 23.9% | 25.1% | 3.33% | -12.6% | 23.9% |
| 1987 | 20 | $0.0 | $8.8 | $241.0 | $241.0 | 9.9% | 0.5% | 0.2% | 3.66% | 9.8% | 0.5% |

| | | |
|---|---|---|
| Arithmatic Mean | 9.6% | 10.4% | 10.8% |
| Geometric Mean | 9.5% | 9.1% | 8.0% |
| Volatility | 5.1% | 16.9% | 24.5% |
| IRR | 8.2% | | |

Fig.50: MMACC-MMACC and 1967 (Current Year Dividend Yield) Data

1988 (Current Year Dividend Yield)

| Calendar Year | Horizon | D-Share Price | Dividend | P-Share Price | Index Price | D-Share TR | Index TR | P-Share TR | Current Year DY (used for pricing) | YoY Change | D+P |
|---|---|---|---|---|---|---|---|---|---|---|---|
| 1988 | 0 | $138.0 | | $138.5 | $276.5 | | | | 3.52% | | |
| 1989 | 1 | $155.9 | $11.1 | $192.7 | $348.6 | 21.0% | 30.1% | 39.2% | 3.17% | -9.9% | 30.1% |
| 1990 | 2 | $157.2 | $12.1 | $171.5 | $328.8 | 8.6% | -2.2% | -11.0% | 3.68% | 16.1% | -2.2% |
| 1991 | 3 | $158.8 | $12.2 | $229.7 | $388.5 | 8.8% | 21.9% | 33.9% | 3.14% | -14.7% | 21.9% |
| 1992 | 4 | $157.4 | $12.4 | $278.2 | $435.6 | 6.9% | 15.3% | 21.1% | 2.84% | -9.5% | 15.3% |
| 1993 | 5 | $153.5 | $12.6 | $312.5 | $466.0 | 5.5% | 9.8% | 12.3% | 2.70% | -5.0% | 9.8% |
| 1994 | 6 | $149.9 | $13.2 | $305.2 | $455.2 | 6.3% | 0.5% | -2.3% | 2.90% | 7.2% | 0.5% |
| 1995 | 7 | $154.0 | $13.8 | $460.6 | $614.6 | 11.9% | 38.0% | 50.9% | 2.24% | -22.5% | 38.0% |
| 1996 | 8 | $157.5 | $14.9 | $585.7 | $743.3 | 12.0% | 23.4% | 27.2% | 2.00% | -10.7% | 23.4% |
| 1997 | 9 | $155.1 | $15.5 | $807.3 | $962.4 | 8.3% | 31.6% | 37.8% | 1.61% | -19.7% | 31.6% |
| 1998 | 10 | $150.5 | $16.2 | $1,039.5 | $1,190.1 | 7.5% | 25.3% | 28.8% | 1.36% | -15.5% | 25.3% |
| 1999 | 11 | $140.1 | $16.5 | $1,288.6 | $1,428.7 | 4.0% | 21.4% | 24.0% | 1.15% | -15.3% | 21.4% |
| 2000 | 12 | $123.3 | $16.3 | $1,207.6 | $1,330.9 | -0.4% | -5.7% | -6.3% | 1.22% | 6.0% | -5.7% |
| 2001 | 13 | $104.4 | $15.7 | $1,040.6 | $1,144.9 | -2.6% | -12.8% | -13.8% | 1.37% | 12.5% | -12.8% |
| 2002 | 14 | $90.7 | $16.1 | $808.5 | $899.2 | 2.3% | -20.1% | -22.3% | 1.79% | 30.0% | -20.1% |
| 2003 | 15 | $82.9 | $17.4 | $997.7 | $1,080.6 | 10.6% | 22.1% | 23.4% | 1.61% | -10.0% | 22.1% |
| 2004 | 16 | $74.7 | $19.4 | $1,124.5 | $1,199.2 | 13.6% | 12.8% | 12.7% | 1.62% | 0.7% | 12.8% |
| 2005 | 17 | $64.4 | $22.2 | $1,197.7 | $1,262.1 | 15.9% | 7.1% | 6.5% | 1.76% | 8.6% | 7.1% |
| 2006 | 18 | $48.5 | $24.9 | $1,367.9 | $1,416.4 | 13.9% | 14.2% | 14.2% | 1.76% | -0.2% | 14.2% |
| 2007 | 19 | $27.2 | $27.7 | $1,452.0 | $1,479.2 | 13.3% | 6.4% | 6.1% | 1.87% | 6.7% | 6.4% |
| 2008 | 20 | $0.0 | $28.4 | $877.6 | $877.6 | 4.3% | -38.8% | -39.6% | 3.24% | 72.6% | -38.8% |

| | | | |
|---|---|---|---|
| Arithmatic Mean | 8.6% | 10.0% | 12.1% |
| Geometric Mean | 8.4% | 8.2% | 9.7% |
| Volatility | 5.7% | 19.0% | 22.8% |
| IRR | 8.8% | | |

Fig.51: MMACC-MMACC and 1988 (Current Year Dividend Yield) Data

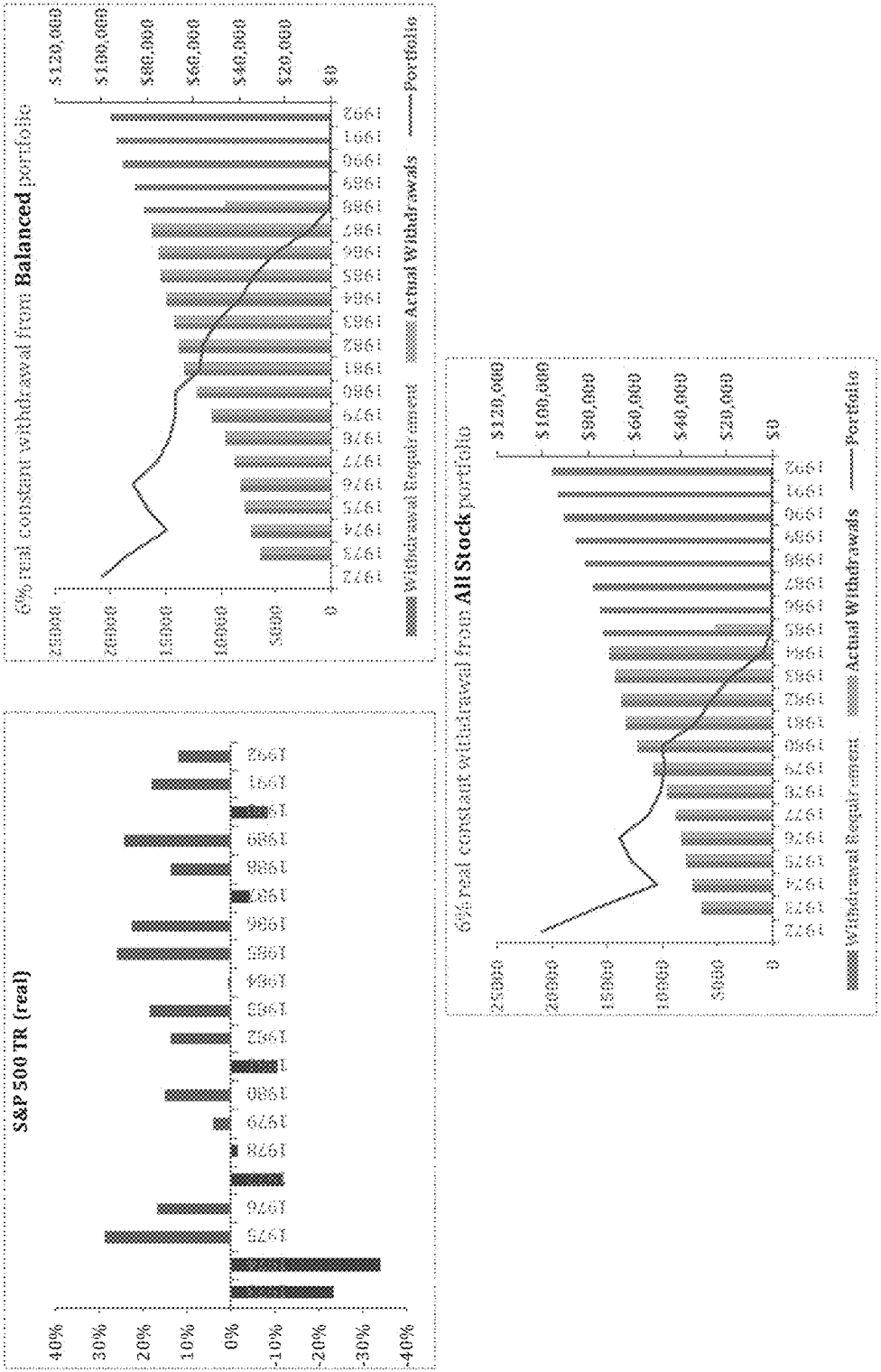
Fig.52: MMACC-D Shares and Sequence of Return Risk

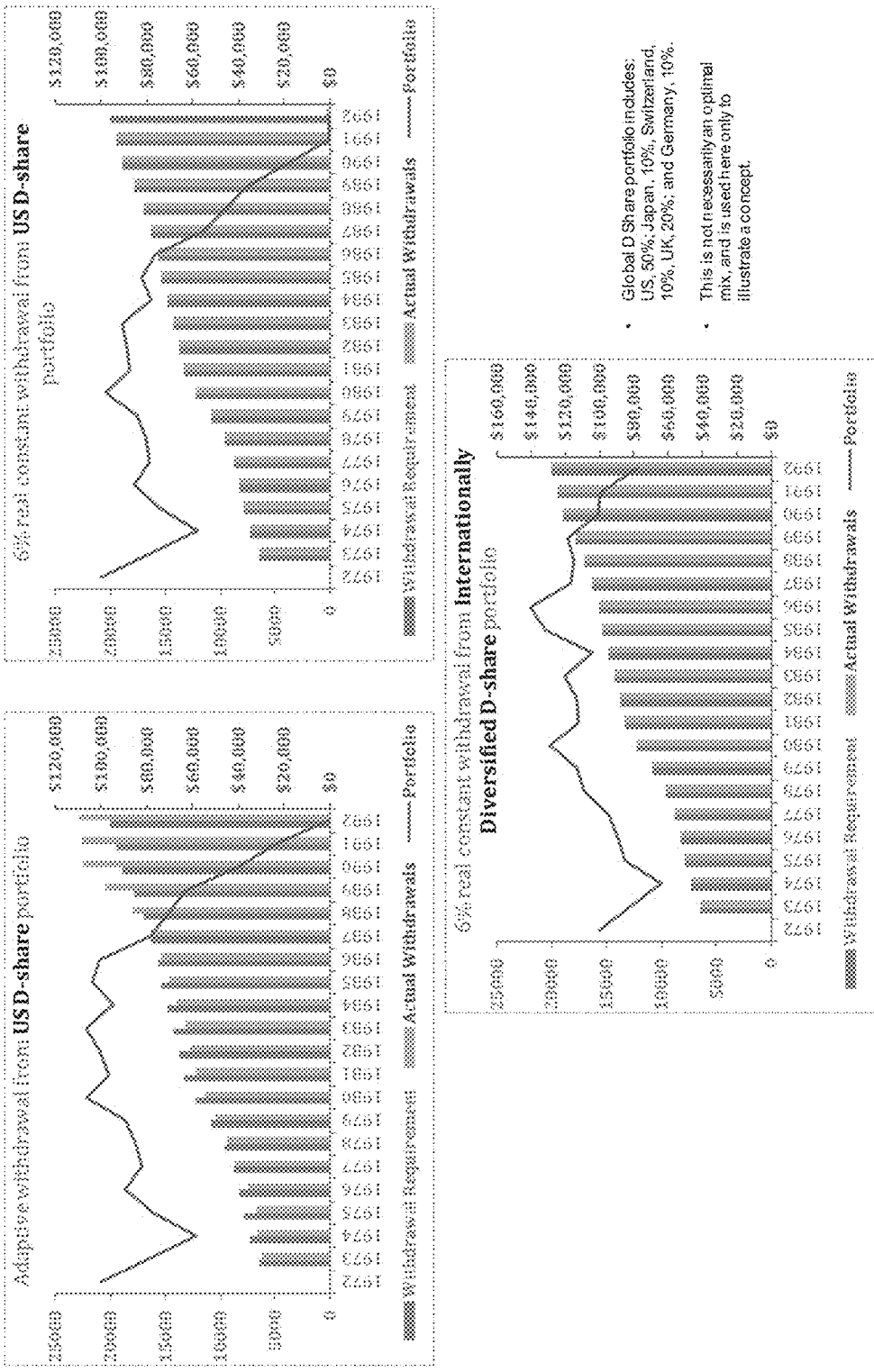
Fig.53: MMACC-D Shares and Sequence of Return Risk

Historical performance without adaptive withdrawals

The following table shows historical performance for D Shares and traditional portfolios given a 6% real withdrawal (i.e., constant real rather than adaptive withdrawals) over a 20-year horizon. A total of 69 rolling 20-year periods (starting between 1926 and 1994) are considered for the study, which is based on Ibbotson data. Since the periods are overlapping, the statistical significance of these results is limited.

| | Success in maintaining 6% real constant withdrawals for 20 years | Median Remainder per $1,000 Investment (Successful Trials only) |
|---|---|---|
| D Shares | 62 out of 69 (90%) | $1,358 |
| Conservative | 41 out of 69 (59%) | $579 |
| Income | 46 out of 69 (67%) | $821 |
| Moderate Income | 52 out of 69 (75%) | $1,100 |
| Balanced | 54 out of 69 (78%) | $1,390 |
| Moderate Growth | 57 out of 69 (83%) | $1,814 |
| Growth | 57 out of 69 (83%) | $2,192 |
| Aggressive Growth | 55 out of 69 (80%) | $3,044 |
| All Stock | 55 out of 69 (80%) | $4,057 |

*Note: The A-shares are priced on the basis of average of previous 5 years' realized dividend yield of S&P 500.*

Fig.54: MMACC-D Shares and Historical Performance

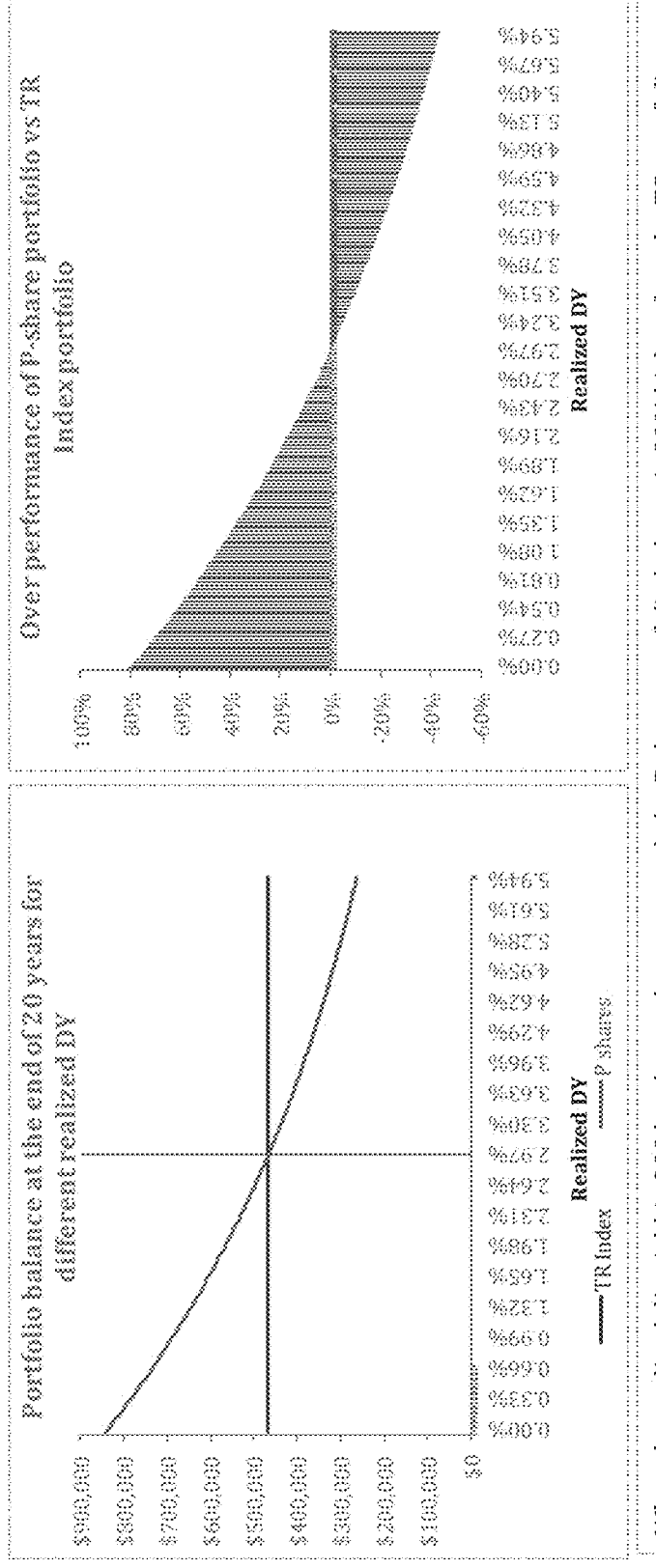
Fig.55: MMACC-P Shares and Convexity

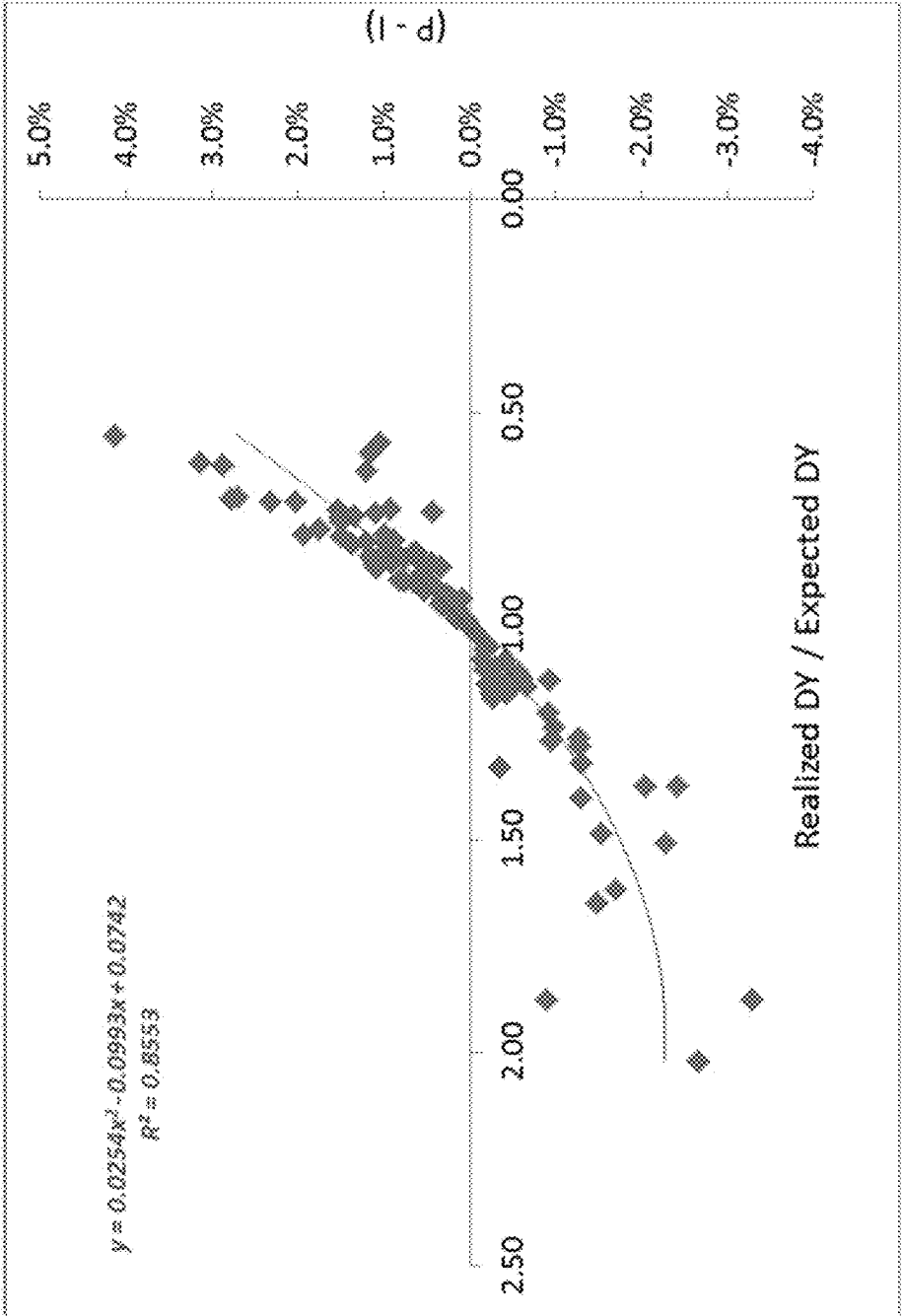
Fig.56: MMACC-P Shares and Convexity

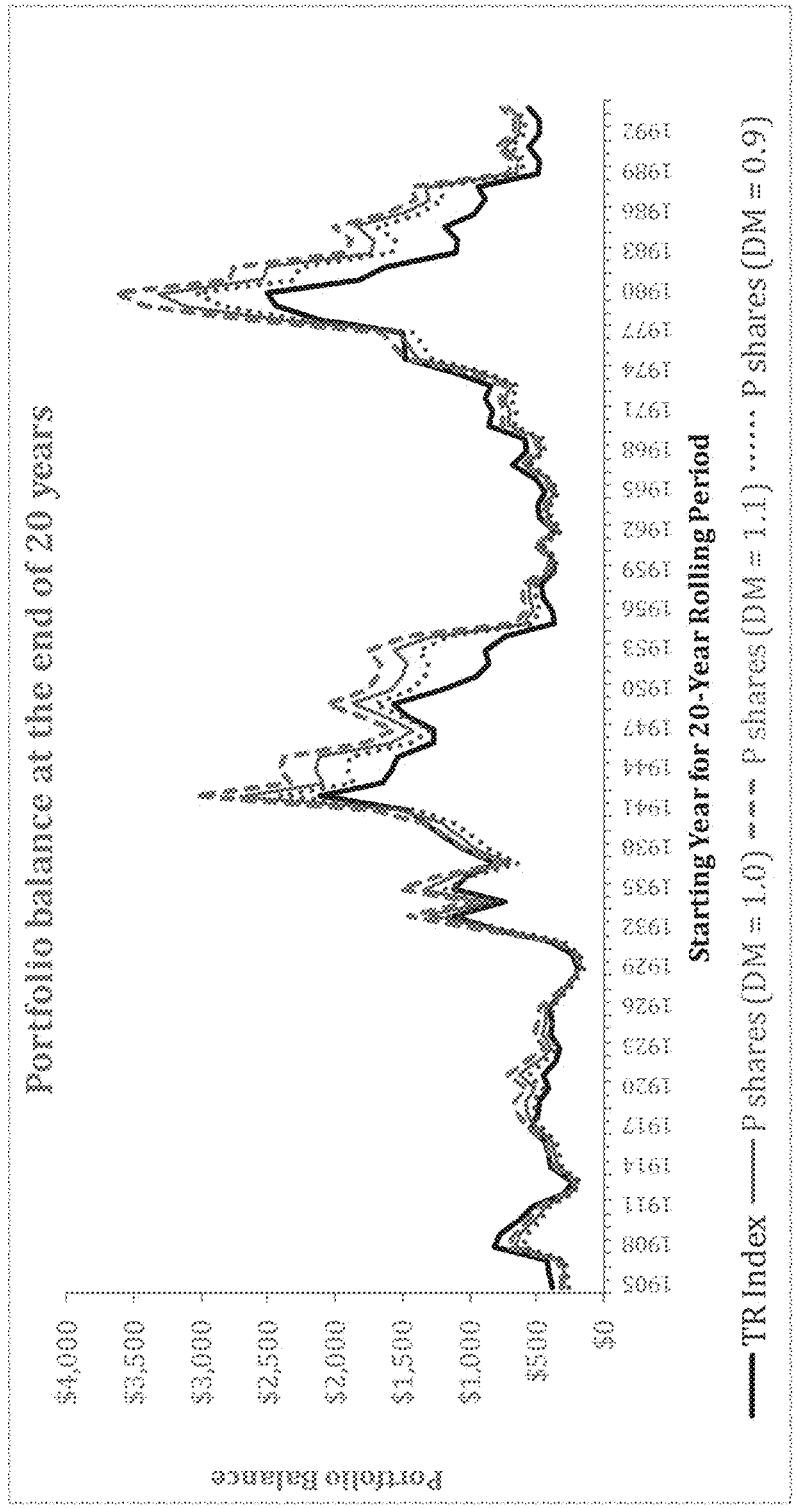
Fig.57: MMACC-P Shares and Convexity

Convexity allows P shares to provide higher returns than the index

| Dividend Multiplier | No of times P-shares outperformed S&P 500 TR index | Average of (P-share return – TR index return) over 90 rolling periods | Min Return (P shares – TR Index) | Max Return (P shares – TR index) |
|---|---|---|---|---|
| 0.9 | 45/90 | 0.0% | -2.2% | 2.5% |
| 1.0 | 52/90 | 0.5% | -1.7% | 3.2% |
| 1.1 | 59/90 | 1.0% | -1.3% | 3.9% |

If the market prices in div yields equal to the average of the preceding five years:
The Dividend Multiplier would be 1.0
P Shares would have outperformed the S&P 500 TR index in 52 out of 90 rolling historical periods
P Shares would have outperformed the S&P 500 TR index by an average of about 50 bps

If the market prices in div yields 10% higher than the average of the preceding five years:
The Dividend Multiplier would be 1.1
P Shares would have outperformed the S&P 500 TR index in 59 out of 90 rolling historical periods
P Shares would have outperformed the S&P 500 TR index by an average of about 100 bps

If the market prices in div yields 10% lower than the average of the preceding five years:
The Dividend Multiplier would be 0.9
P Shares would have outperformed the S&P 500 TR index in 45 out of 90 rolling historical periods
P Shares would have performed roughly in line with the S&P 500 TR index 1. 20 year P shares are considered.
2. Historical rolling periods starting between 1965 and 1994.
3. Expected dividend yield used for pricing in previous 5 years average realized dividend yield. This is multiplied with the dividend multiplier.

Fig.58: MMACC-P Shares and Convexity

Fig. 59: MMACC-Exemplary Calculation Engine - Inputs

| Div Yield for Pricing | 2.00% |
| Div Growth | 6.00% |
| Index Price Return | 2.50% |

| Q Wgt | 32.70% |
| P Wgt | 67.30% |

| Yr | Q Share Price | Dividend | P Share Price | Index Price | | Q Share TR | Index TR | P Share TR | | Dividend Yield | | Q + P TR | | A Share TR | B Share TR | Index TR | | A Share IRR |
|---|---|---|---|---|---|---|---|---|---|---|---|---|---|---|---|---|---|---|
| 0 | $32.70 | $2.00 | $67.30 | $100.00 | | | | | | 2.00% | | | | 1 | 1 | 1 | | -$32.70 |
| 1 | $33.03 | $2.12 | $69.47 | $102.50 | | 7.48% | 4.62% | 3.33% | | 2.07% | | 4.62% | | 1.074827 | 1.052393 | 1.104662 | | $2.12 |
| 2 | $33.28 | $2.25 | $71.78 | $105.06 | | 7.57% | 4.69% | 3.33% | | 2.14% | | 4.69% | | 1.156153 | 1.086617 | 1.095292 | | $2.25 |
| 3 | $33.45 | $2.38 | $74.24 | $107.69 | | 7.66% | 4.77% | 3.43% | | 2.21% | | 4.77% | | 1.244677 | 1.130118 | 1.147907 | | $2.38 |
| 4 | $33.52 | $2.52 | $76.87 | $110.38 | | 7.75% | 4.84% | 3.54% | | 2.29% | | 4.84% | | 1.341123 | 1.182692 | 1.2031 | | $2.52 |
| 5 | $33.47 | $2.68 | $79.67 | $113.14 | | 7.85% | 4.92% | 3.65% | | 2.37% | | 4.92% | | 1.446347 | 1.183884 | 1.26233 | | $2.68 |
| 6 | $33.29 | $2.84 | $82.68 | $115.97 | | 7.95% | 5.01% | 3.77% | | 2.45% | | 5.01% | | 1.561299 | 1.228555 | 1.325562 | | $2.84 |
| 7 | $32.97 | $3.01 | $85.90 | $118.87 | | 8.05% | 5.09% | 3.90% | | 2.53% | | 5.09% | | 1.687053 | 1.276478 | 1.393875 | | $3.01 |
| 8 | $32.47 | $3.19 | $89.37 | $121.84 | | 8.17% | 5.18% | 4.04% | | 2.62% | | 5.18% | | 1.824321 | 1.328902 | 1.466236 | | $3.19 |
| 9 | $31.78 | $3.38 | $93.11 | $124.89 | | 8.28% | 5.27% | 4.18% | | 2.71% | | 5.27% | | 1.973976 | 1.385608 | 1.542527 | | $3.38 |
| 10 | $30.87 | $3.58 | $97.14 | $128.01 | | 8.41% | 5.37% | 4.33% | | 2.80% | | 5.37% | | 2.142079 | 1.443427 | 1.623329 | | $3.58 |
| 11 | $29.71 | $3.80 | $101.50 | $131.21 | | 8.53% | 5.47% | 4.49% | | 2.89% | | 5.47% | | 2.324898 | 1.508247 | 1.714168 | | $3.80 |
| 12 | $28.26 | $4.02 | $106.23 | $134.49 | | 8.67% | 5.57% | 4.66% | | 2.99% | | 5.57% | | 2.526452 | 1.578519 | 1.805899 | | $4.02 |
| 13 | $26.48 | $4.27 | $111.37 | $137.85 | | 8.81% | 5.67% | 4.84% | | 3.09% | | 5.67% | | 2.749048 | 1.654871 | 1.912237 | | $4.27 |
| 14 | $24.33 | $4.52 | $116.96 | $141.30 | | 8.96% | 5.78% | 5.02% | | 3.20% | | 5.78% | | 2.995337 | 1.738018 | 2.022769 | | $4.52 |
| 15 | $21.76 | $4.79 | $123.07 | $144.83 | | 9.11% | 5.89% | 5.22% | | 3.31% | | 5.89% | | 3.26832 | 1.828776 | 2.143953 | | $4.79 |
| 16 | $18.70 | $5.08 | $129.75 | $148.45 | | 9.28% | 6.01% | 5.42% | | 3.42% | | 6.01% | | 3.571515 | 1.928381 | 2.276444 | | $5.08 |
| 17 | $15.08 | $5.39 | $137.08 | $152.16 | | 9.45% | 6.13% | 5.65% | | 3.54% | | 6.13% | | 3.908936 | 2.037808 | 2.409786 | | $5.39 |
| 18 | $10.82 | $5.71 | $145.13 | $155.97 | | 9.63% | 6.25% | 5.88% | | 3.66% | | 6.25% | | 4.285341 | 2.156795 | 2.560439 | | $5.71 |
| 19 | $5.83 | $6.05 | $154.03 | $159.87 | | 9.81% | 6.38% | 6.12% | | 3.79% | | 6.38% | | 4.705831 | 2.286872 | 2.72979 | | $6.05 |
| 20 | $0.00 | $6.41 | $163.86 | $163.86 | | 10.01% | 6.51% | 6.38% | | 3.91% | | 6.51% | | 5.176993 | 2.434898 | 2.903172 | | $6.41 |

| Arith Mean | 8.57% | 5.47% | 4.55% | | 3.90% | | 5.47% |
| IRR | 8.11% | | | | | | |

Index Relative Return  3.10%

Alternative Calc Alternative Return Calc  5.47%  -0.92%

Alternative Calc Index Relative Return Calc  -0.92%

Fig. 60: MMACC-Exemplary Calculation Engine - Outputs

INPUTS

| Horizon | 20 |
|---|---|
| Year | Dec-1993 |
| Dividend Yld Mult | 1.0 |

| Initial balance | $1,000 |
|---|---|
| Spending rate | 0.0% |
| COLA | CPI |

| | Adaptive w/d |
|---|---|
| Upside | 100.0% |
| Downside | -100.0% |

| | Allocation |
|---|---|
| Stock | 100.0% |
| Bond | 0.0% |
| Cash | 0.0% |

Asset Allocations:

| | Short-Term/Money Mkts | Bonds | Equity |
|---|---|---|---|
| Conservative Income | 30% | 50% | 20% |
| Income | 20% | 50% | 30% |
| Moderate Income | 15% | 45% | 40% |
| Balanced | 10% | 40% | 50% |
| Moderate Growth | 5% | 35% | 60% |
| Growth | 5% | 25% | 70% |
| Aggressive Growth | 0% | 15% | 85% |

Fig.61: MMACC-Exemplary Calculation Engine - Inputs

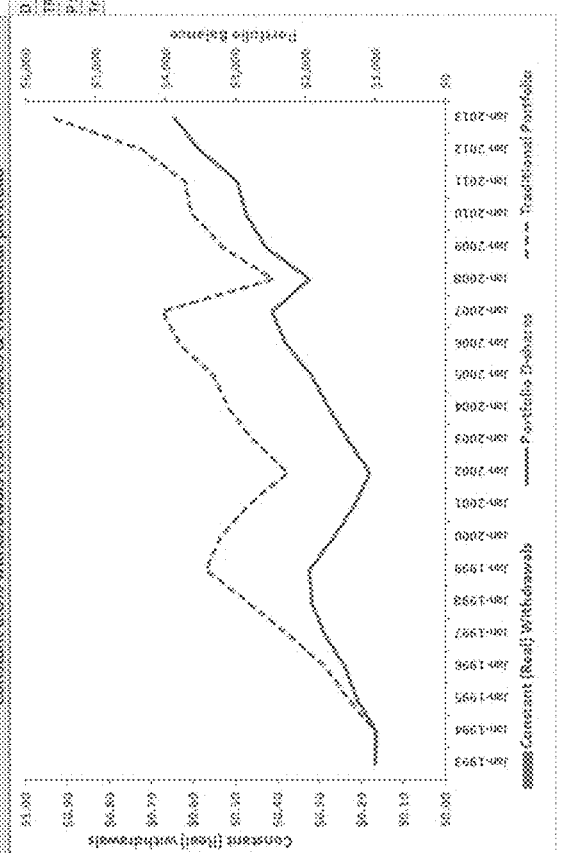
Fig.62A: MMACC-Exemplary Calculation Engine – Outputs (Individual)

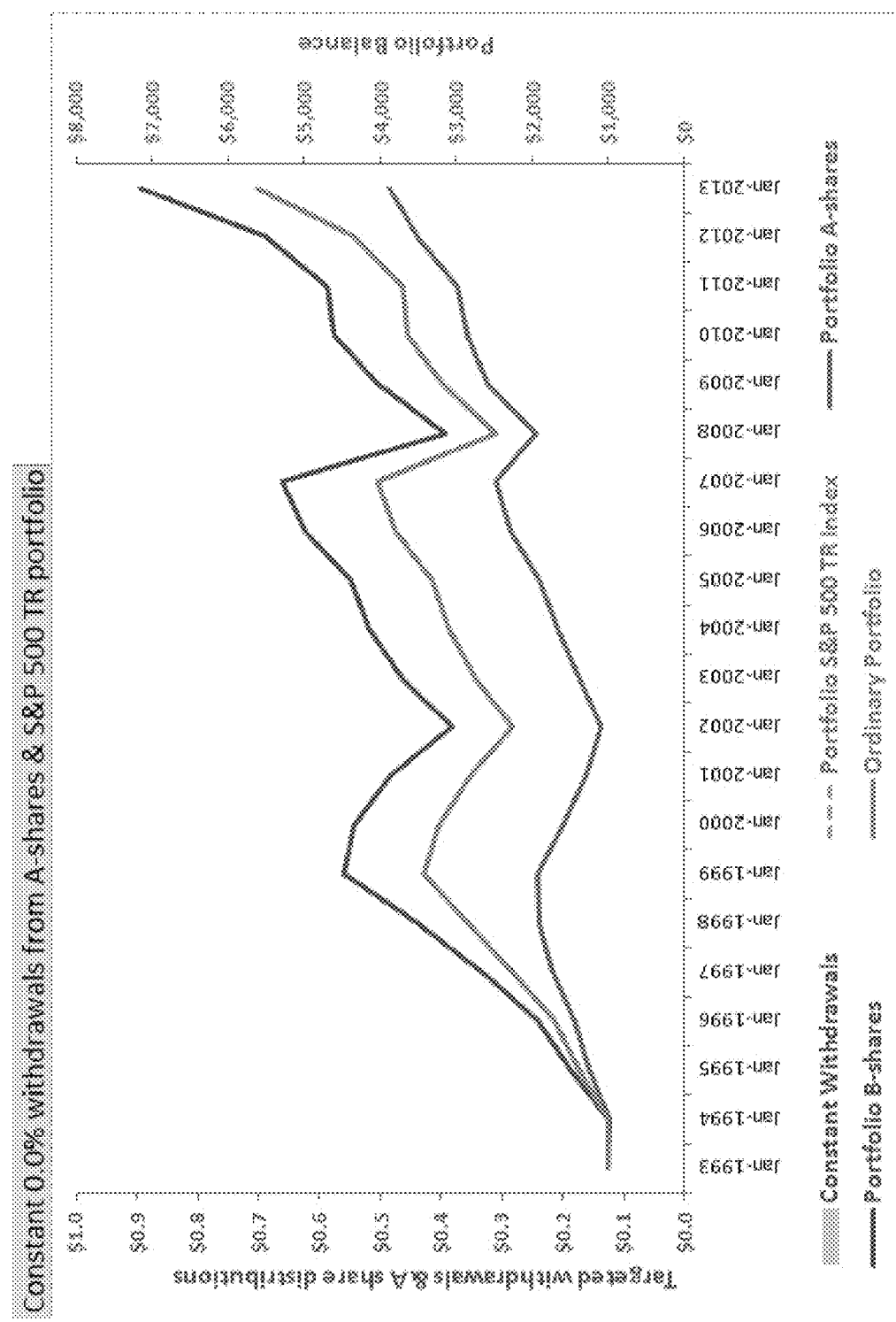
Fig.62B: MMACC-Exemplary Calculation Engine – Outputs (Individual)

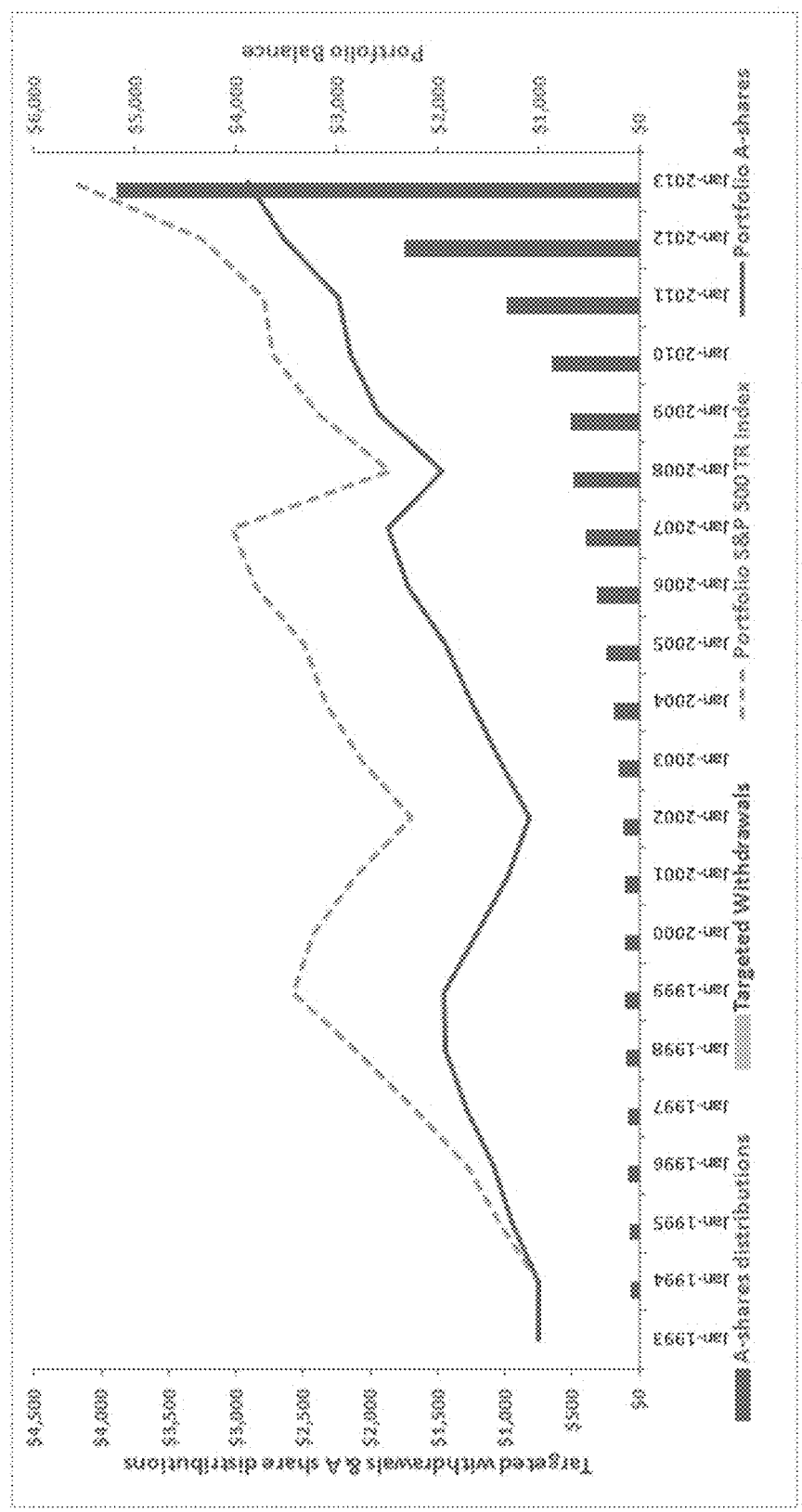
Fig.62C: MMACC-Exemplary Calculation Engine – Outputs (Individual)

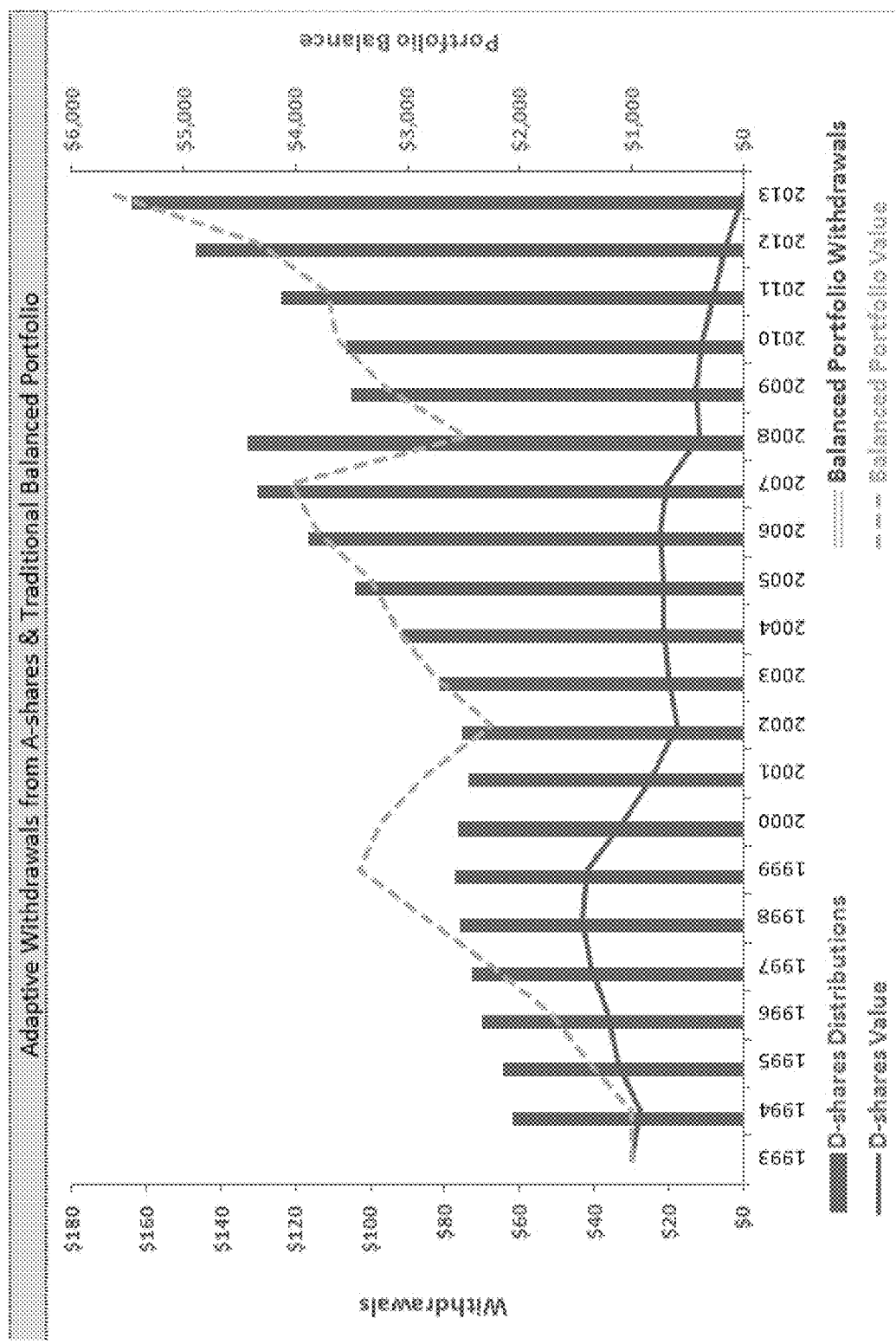
Fig.62D: MMACC-Exemplary Calculation Engine – Outputs (Individual)

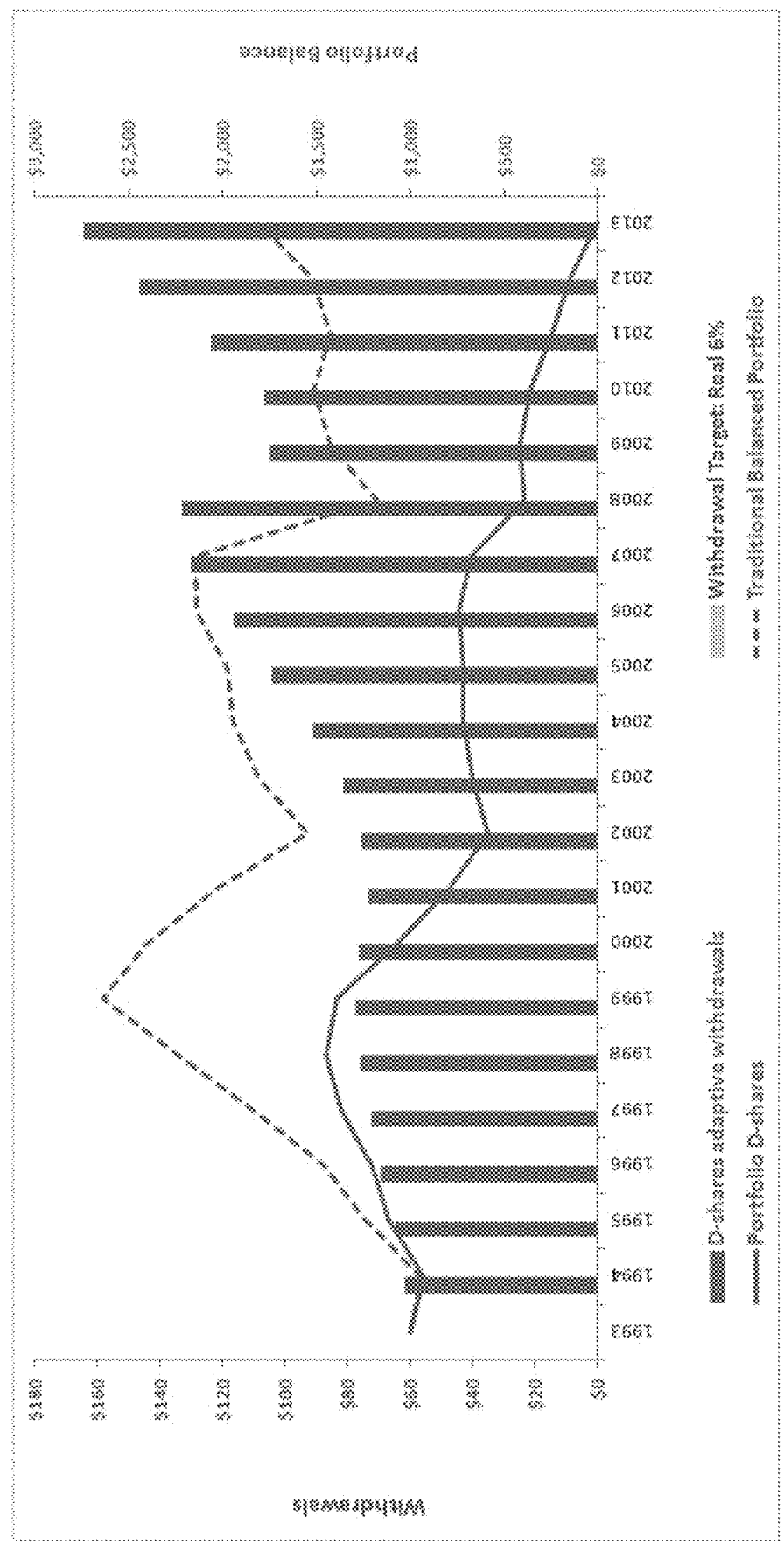
Fig.62E: MMACC-Exemplary Calculation Engine – Outputs (Individual)

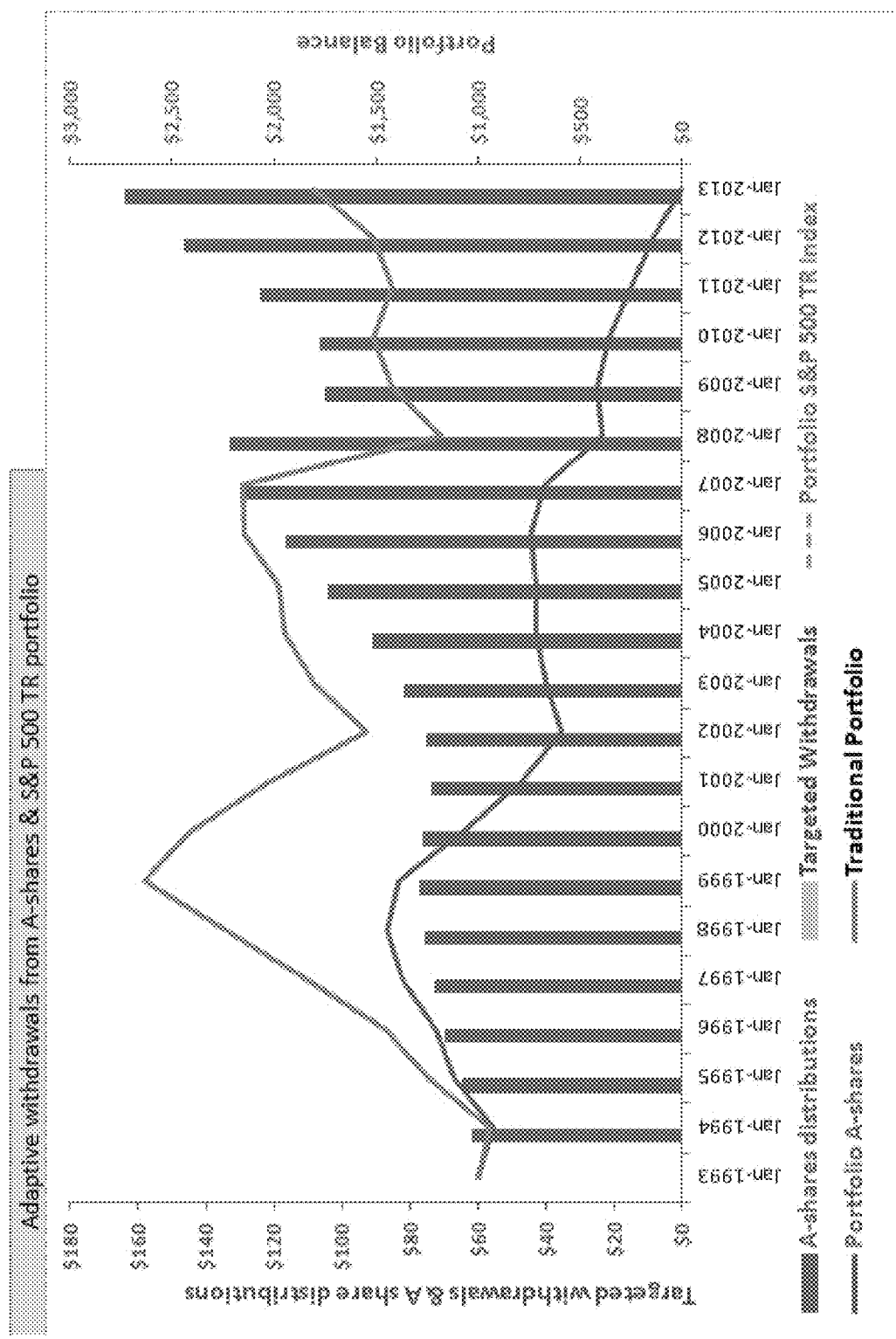
Fig.62F: MMACC-Exemplary Calculation Engine – Outputs (Individual)

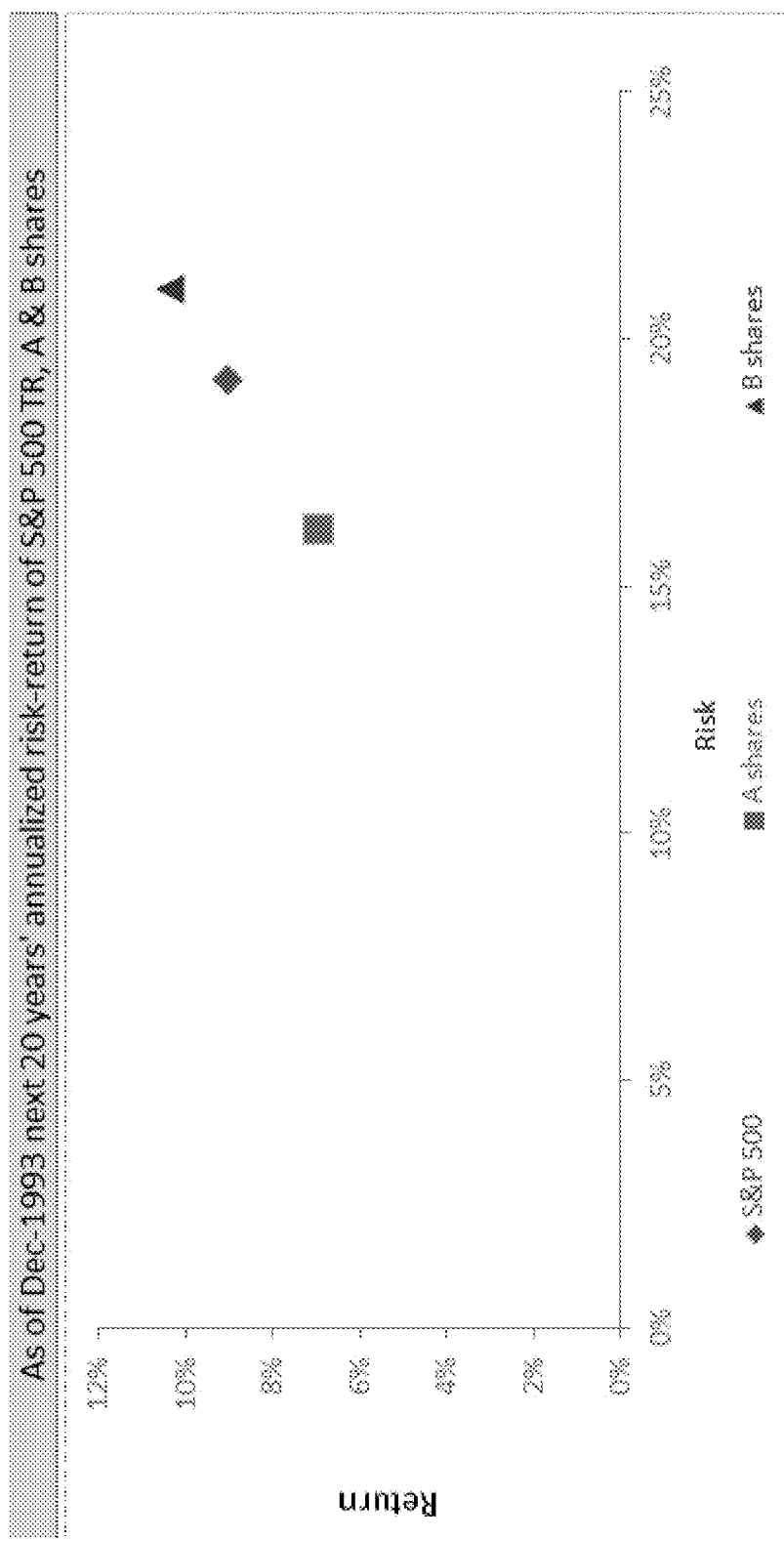
Fig.62G: MMACC-Exemplary Calculation Engine – Outputs (Individual)

OUTPUTS BATCH

Batch Run

| | Data for 1905-2013 | | |
|---|---|---|---|
| | Average annualized 20 year return | Average annualized 20 year vol | Average 20 year IRR |
| P shares | 10.70% | 21.79% | |
| S&P 500 TR Index | 10.22% | 18.84% | |
| D shares | 8.59% | 16.20% | 9.14% |

Fig.63A: MMACC-Exemplary Calculation Engine – Outputs (Batch)

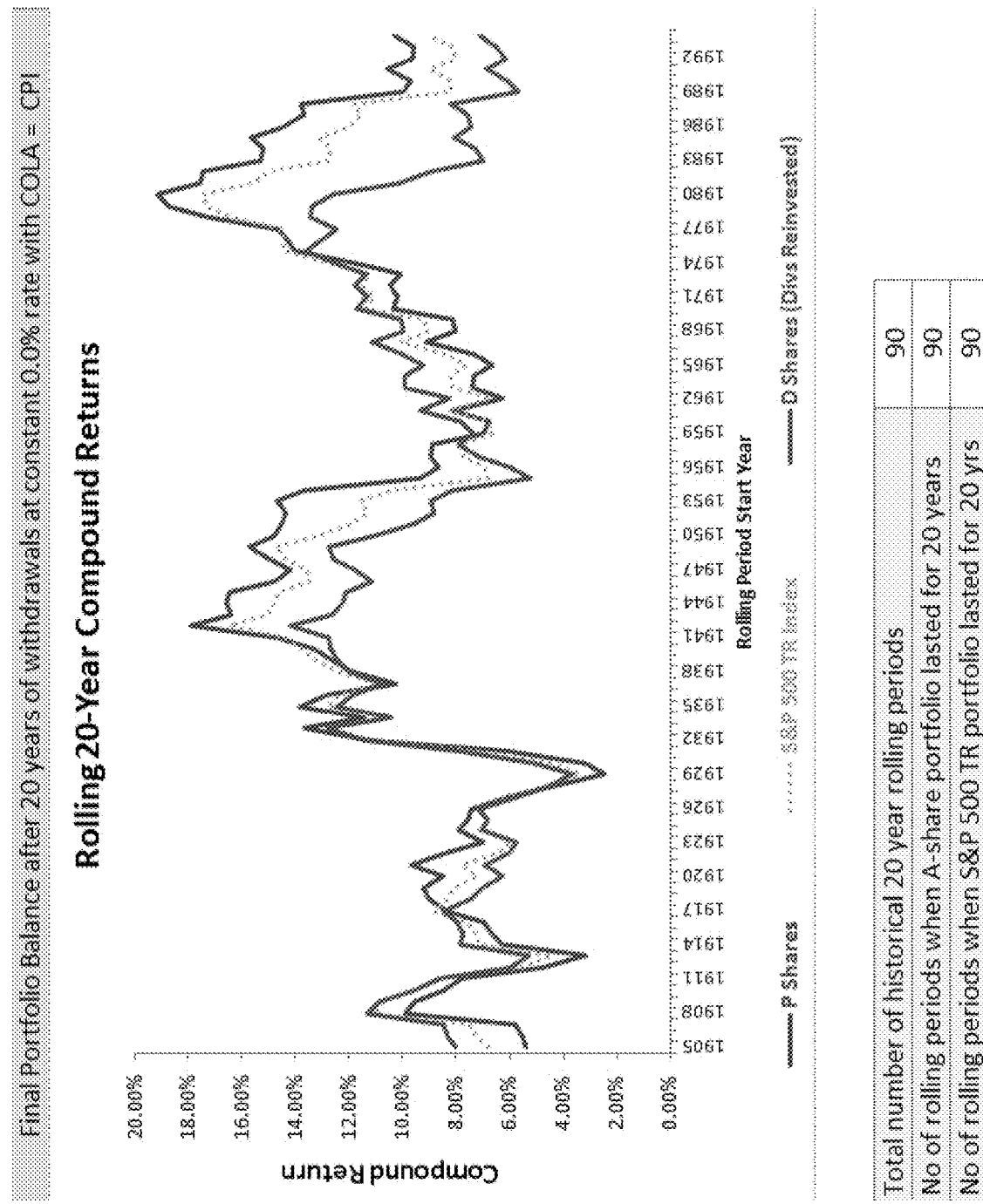
Fig.63B: MMACC-Exemplary Calculation Engine – Outputs (Batch)

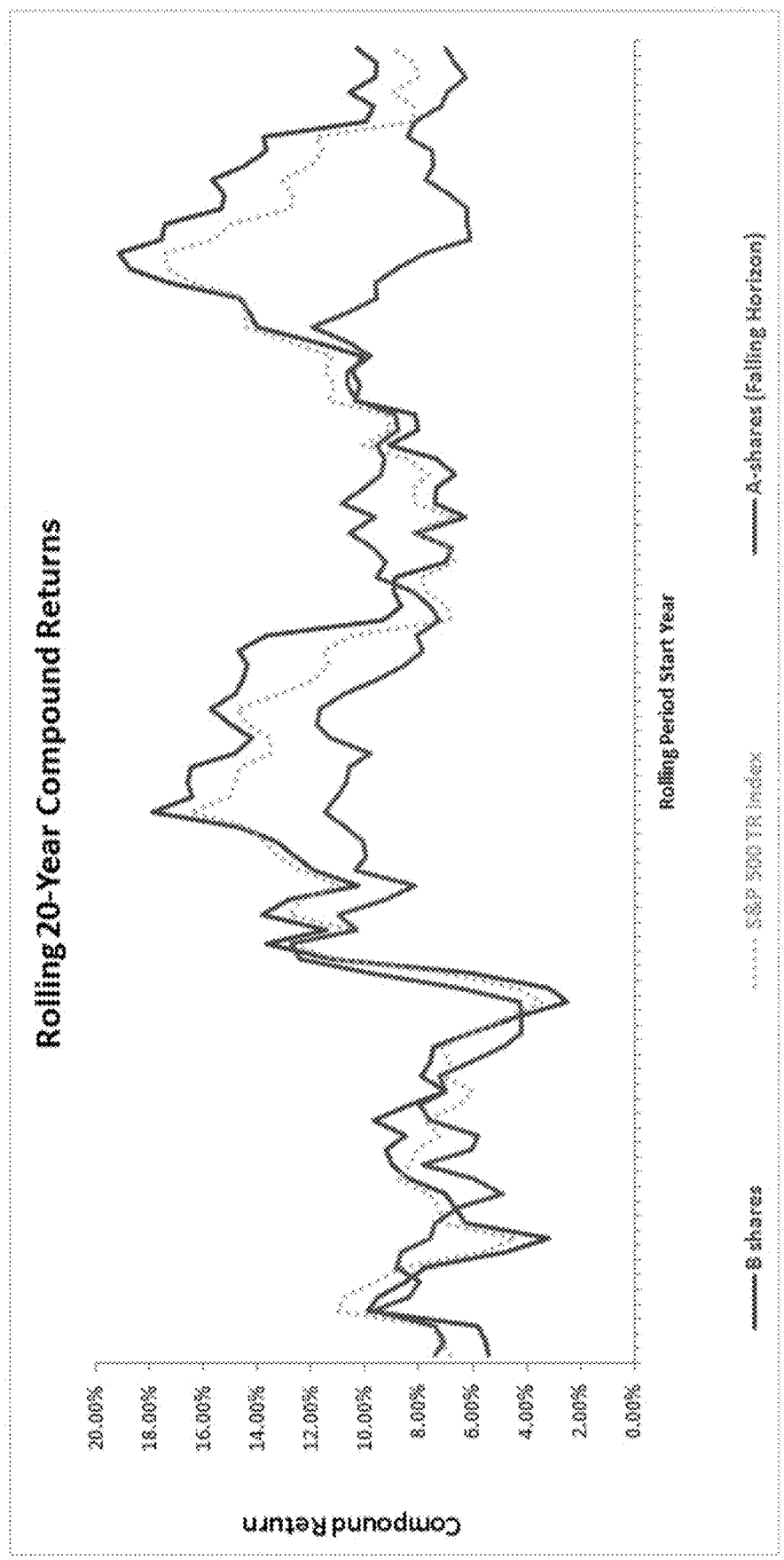
Fig.63C: MMACC-Exemplary Calculation Engine – Outputs (Batch)

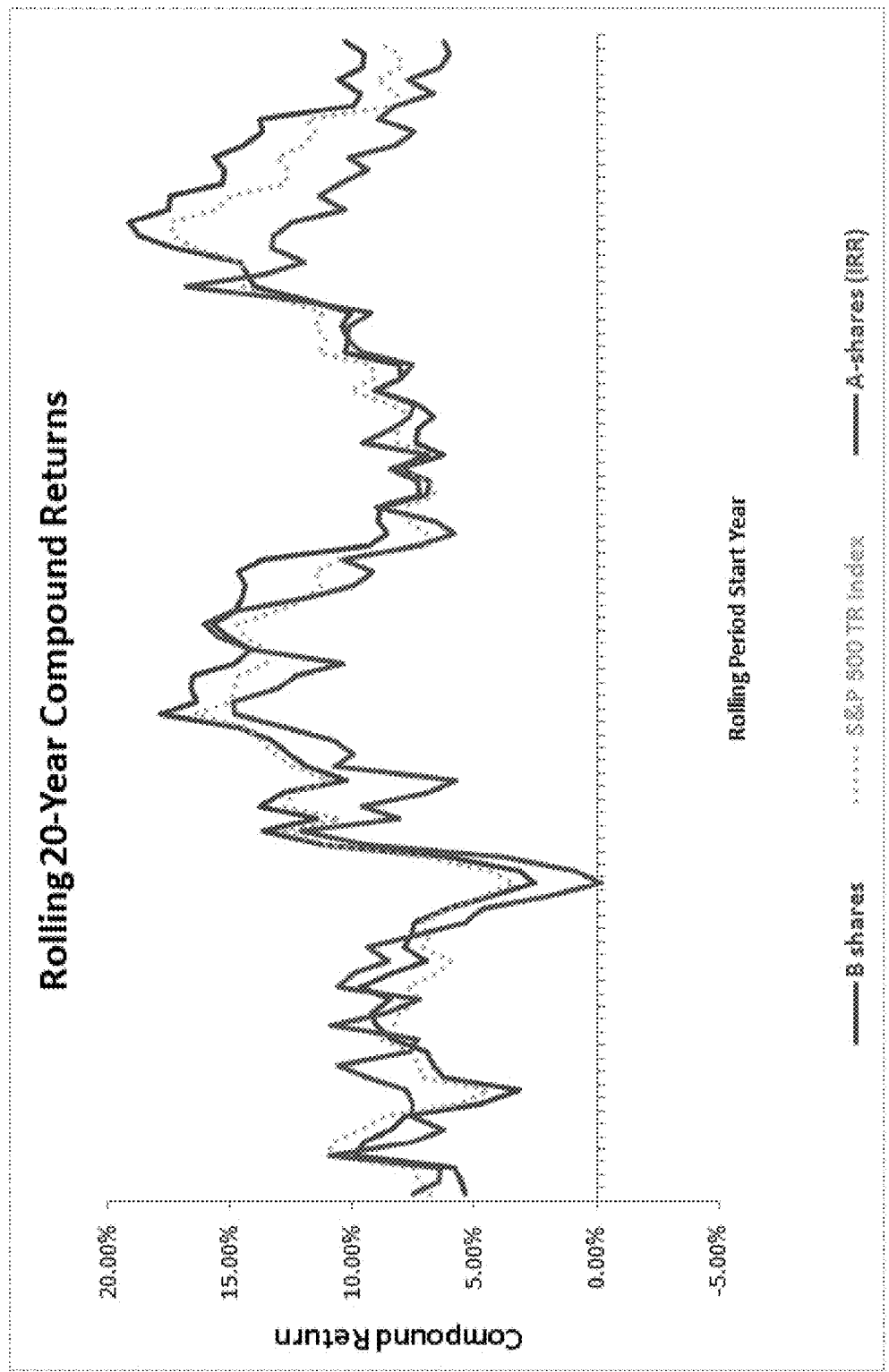
Fig.63D: MMACC-Exemplary Calculation Engine – Outputs (Batch)

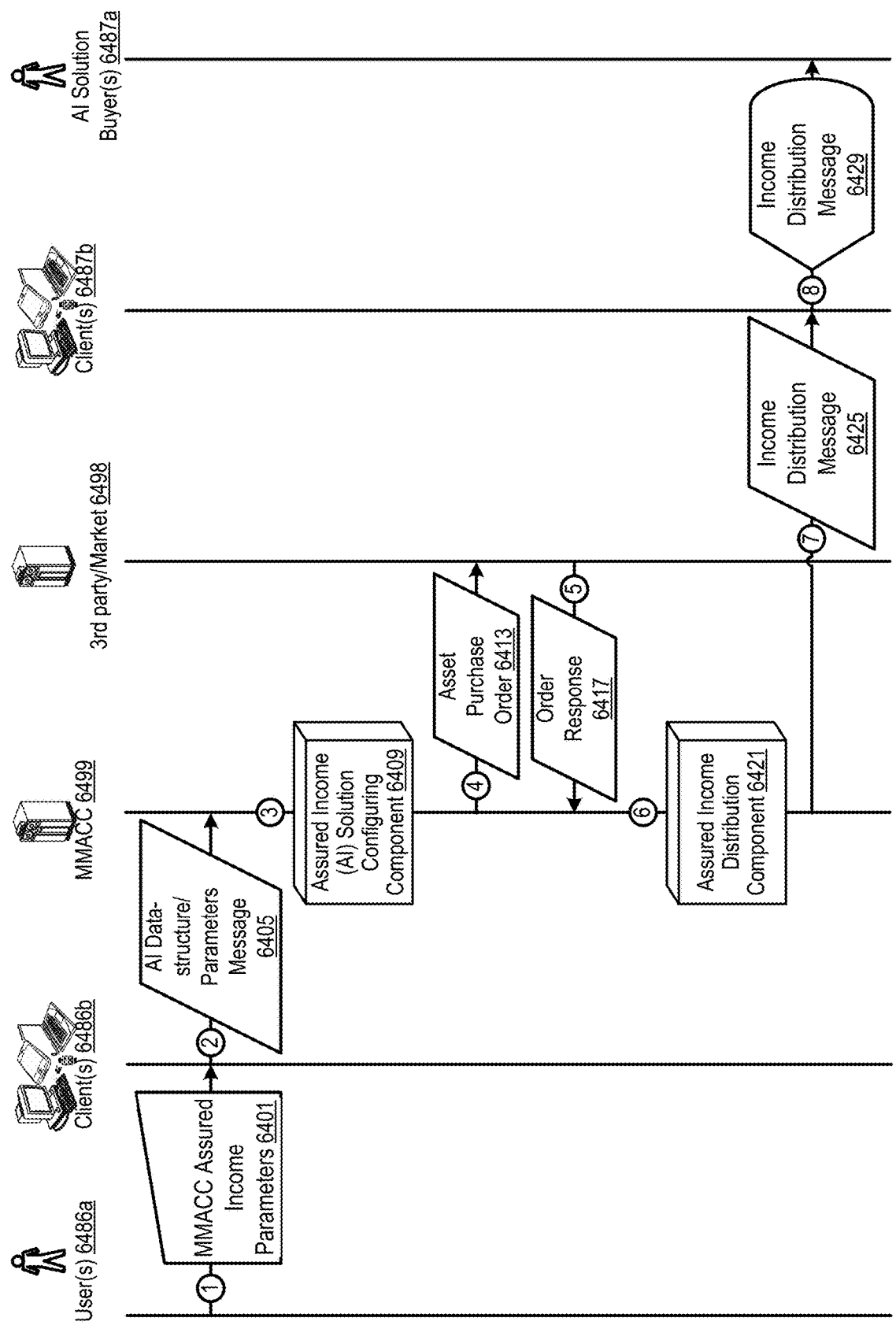
Fig.64: EXEMPLARY MMACC ASSURED INCOME DATA FLOW

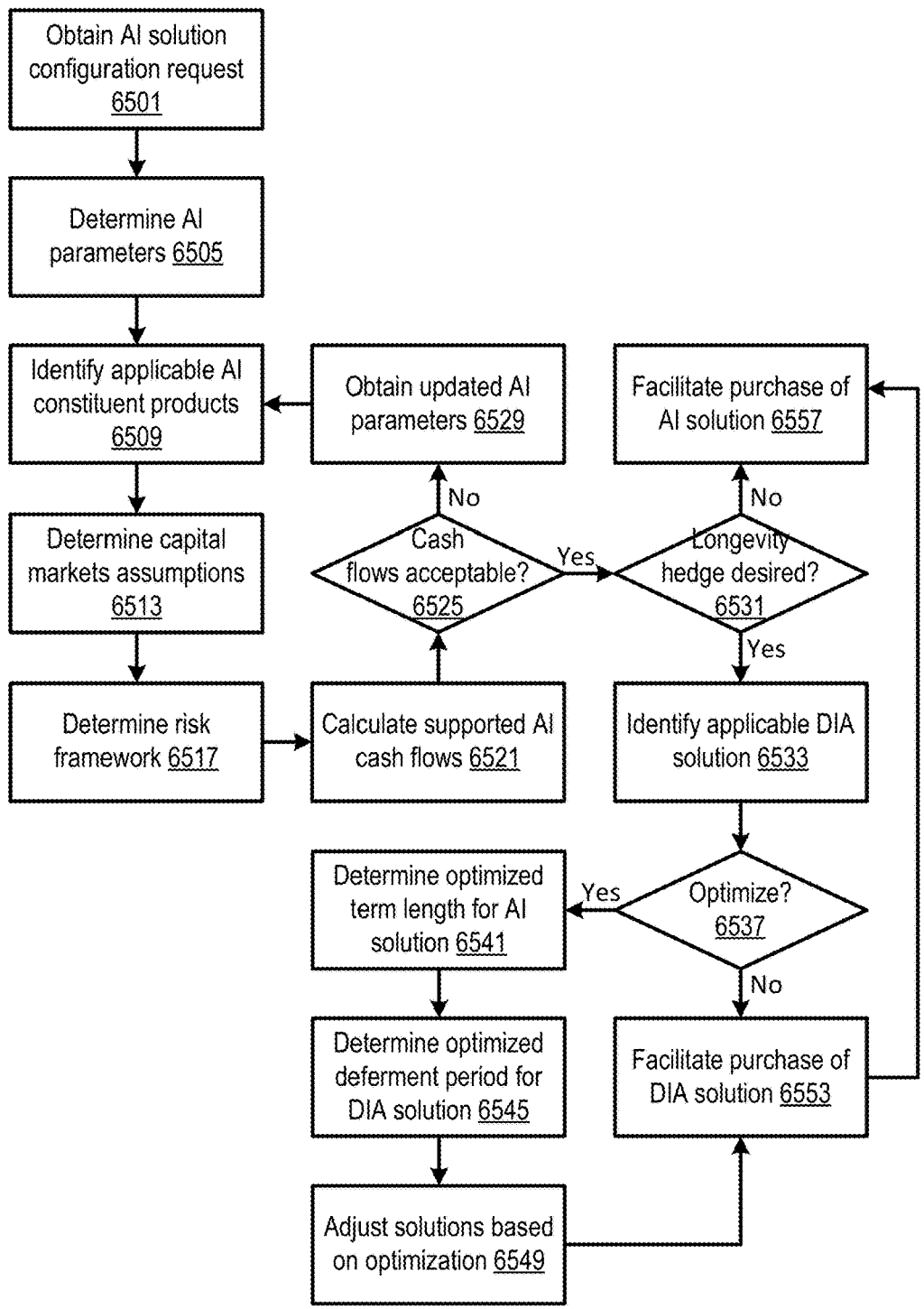
Fig.65: EXEMPLARY MMACC ASSURED INCOME SOLUTION CONFIGURING (AISC) COMPONENT

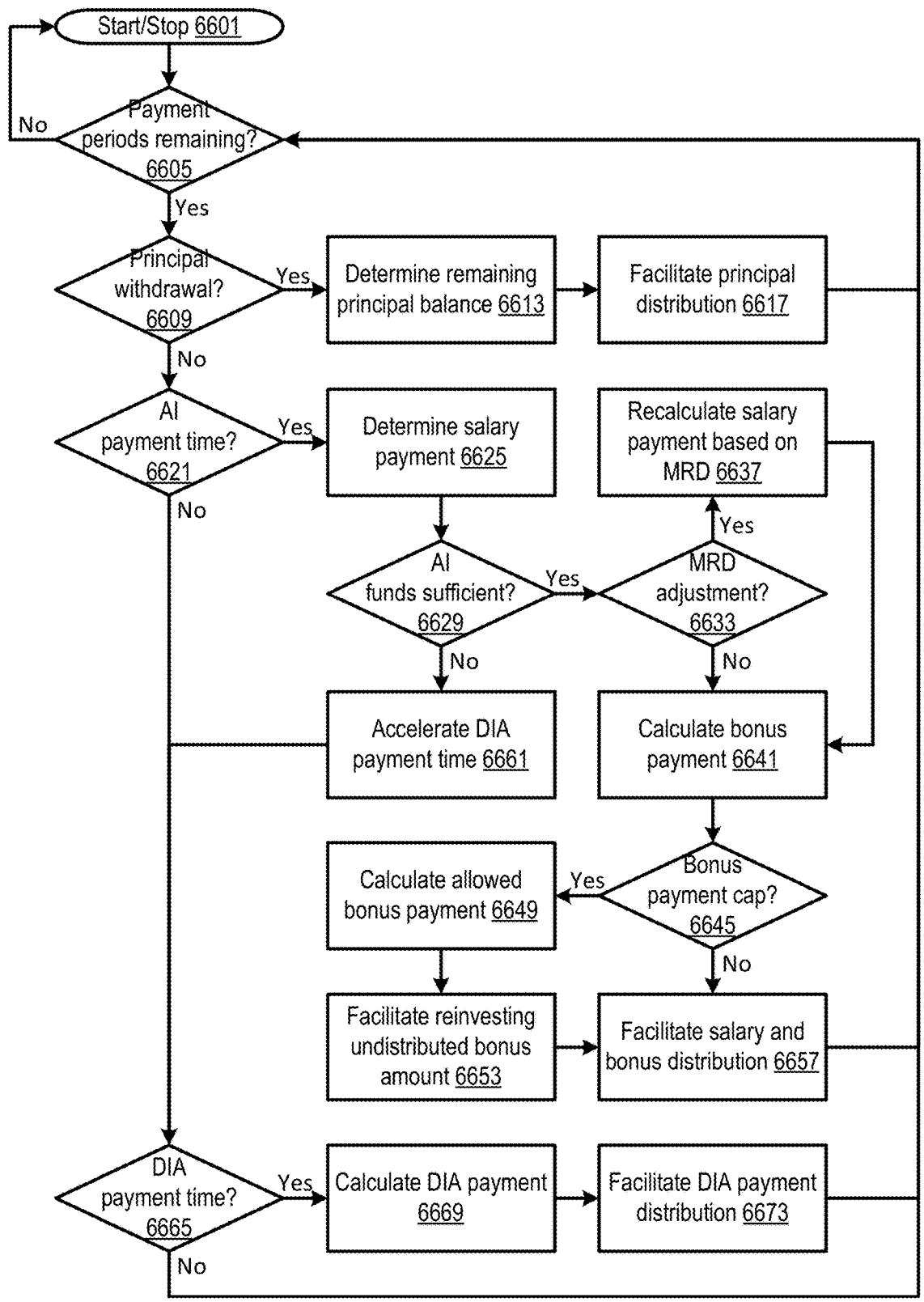
Fig.66: EXEMPLARY MMACC ASSURED INCOME DISTRIBUTION (AID) COMPONENT

Assured Income: Value Proposition

Client Request

- "Here is my life savings: $1M. I need to live off this for the next 20 years and possibly longer"
- "Social Security and pension income will get me part of the way there, but I need additional income"
- "I still want some growth potential in my portfolio"
- "Help!"

Assured Income Value Proposition

- We will help you determine how much you can safely spend in retirement
- We will manage your investment to deliver reliable cash flows for the time period you select (or for life)
- If the markets perform well, you will receive an annual "bonus"
- You will maintain access to your assets, providing flexibility should you need it in the future

Assured Income offers a unique combination of benefits:

- Higher cash flow during retirement than many common solutions
- Flexibility and control of your assets
- An optional guarantee that protects you from outliving your income Fig.67: MMACC-Assured Income Value Proposition

Assured Income: Structure

Delivers a fixed cash flow (base) each month for the next 20/25/30 years with a high degree of confidence

- Clients will have access to their assets in the future should they need them.
- Invests in a mix of liquid instruments harnessing the glide path methodology used by target date, 529 and other products

Over time, if markets perform well the client will receive a bonus

- The fixed monthly cash flow (base) would be established at account setup and would not change.
- The variable (quarterly/annually) cash flow (bonus) would depend on account balance. If market returns are good, there will be a bonus.

Clients would be encouraged to hedge their shortfall and longevity risk

- Clients with no outside assets would be encouraged to purchase a deferred income annuity (DIA) as a relatively cheap longevity hedge.
- Other assets may take the place of the DIA IF the client has them

Assured provides clients with a monthly paycheck in retirement, essentially replicating their experience of receiving a salary during their working years

Fig.68: MMACC-Exemplary Assured Income Structure

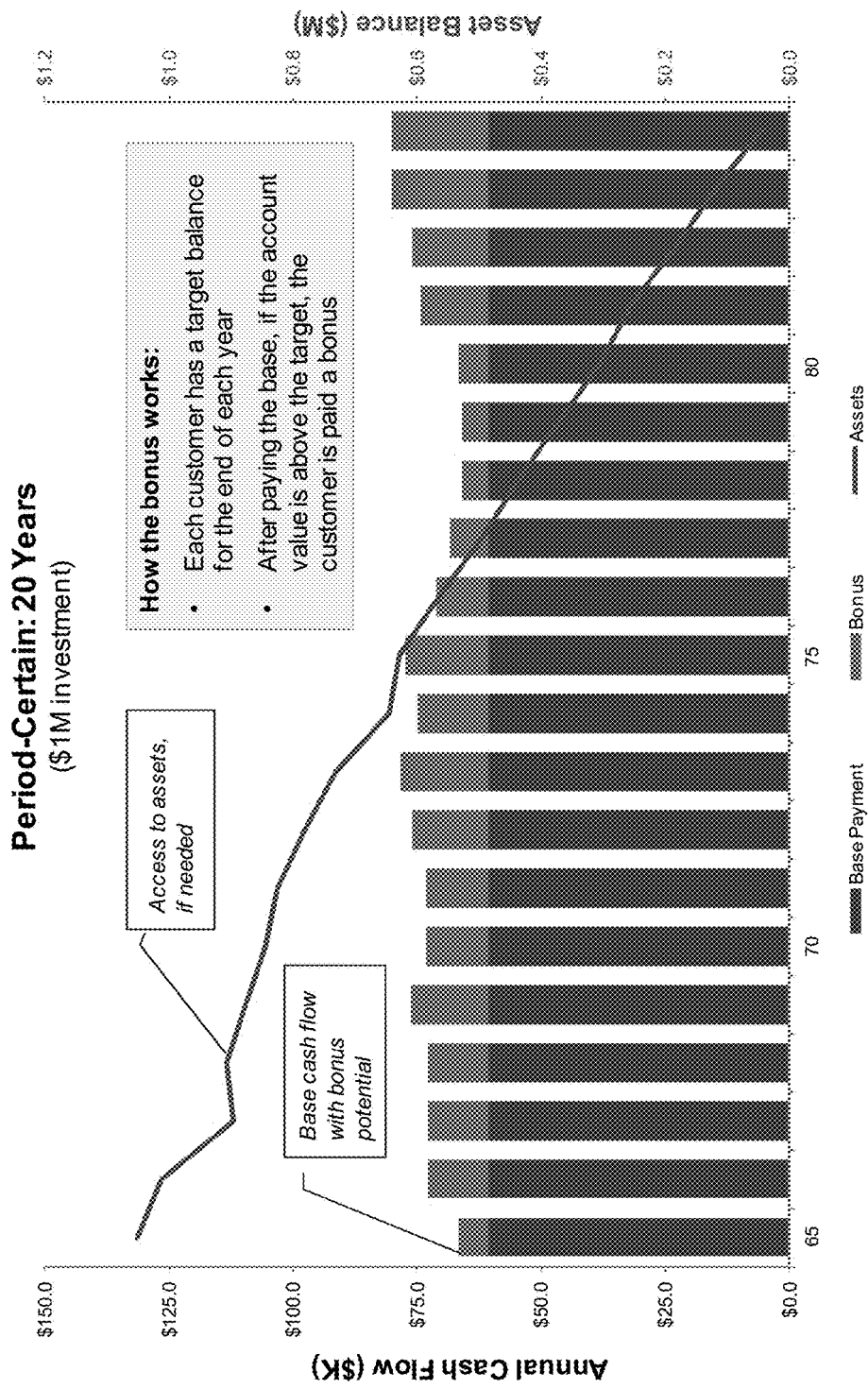
Fig. 69: MMACC-Exemplary Assured Income Period-Certain Solution

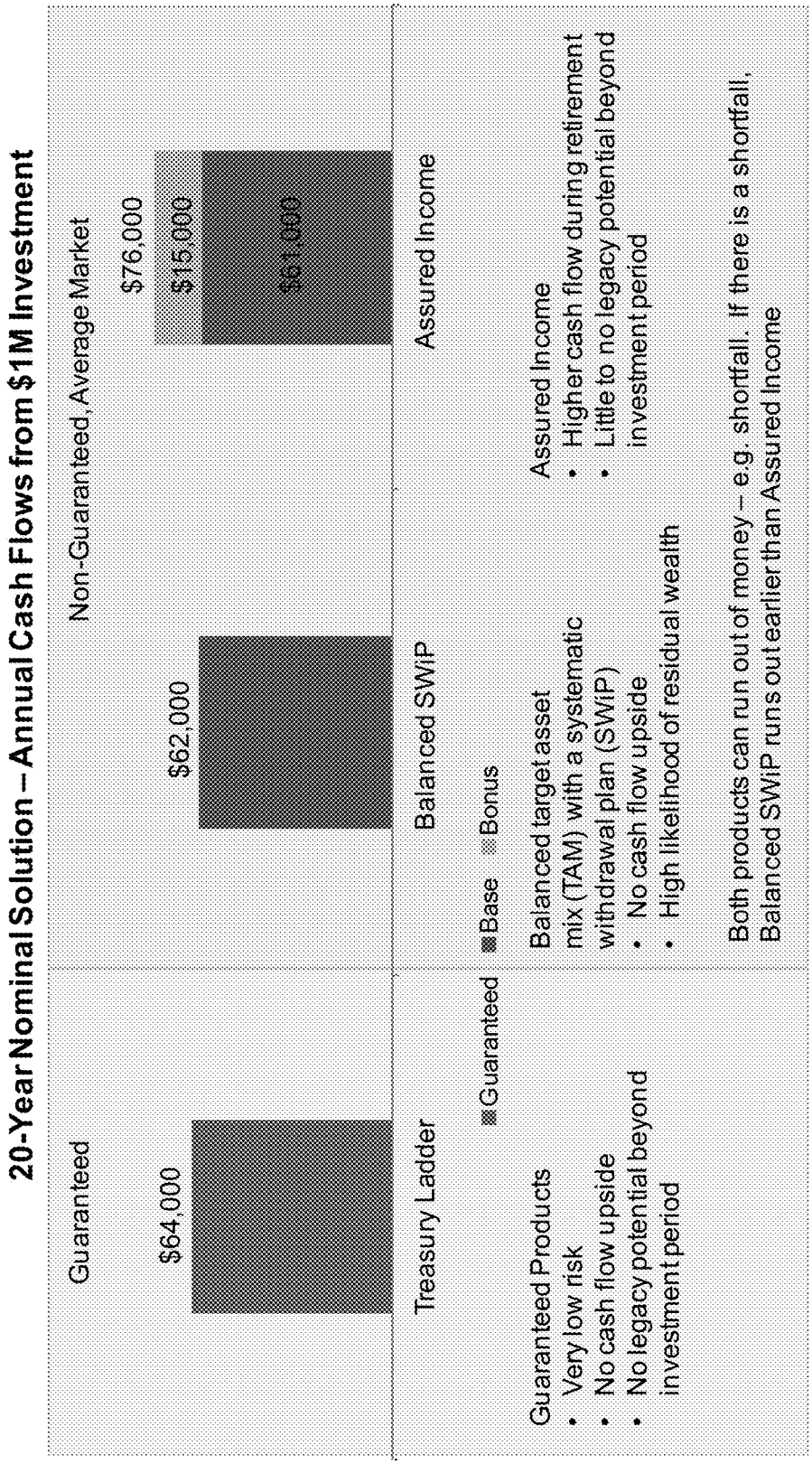
Fig. 70: MMACC-Exemplary Assured Income 20-Year Payout Estimates

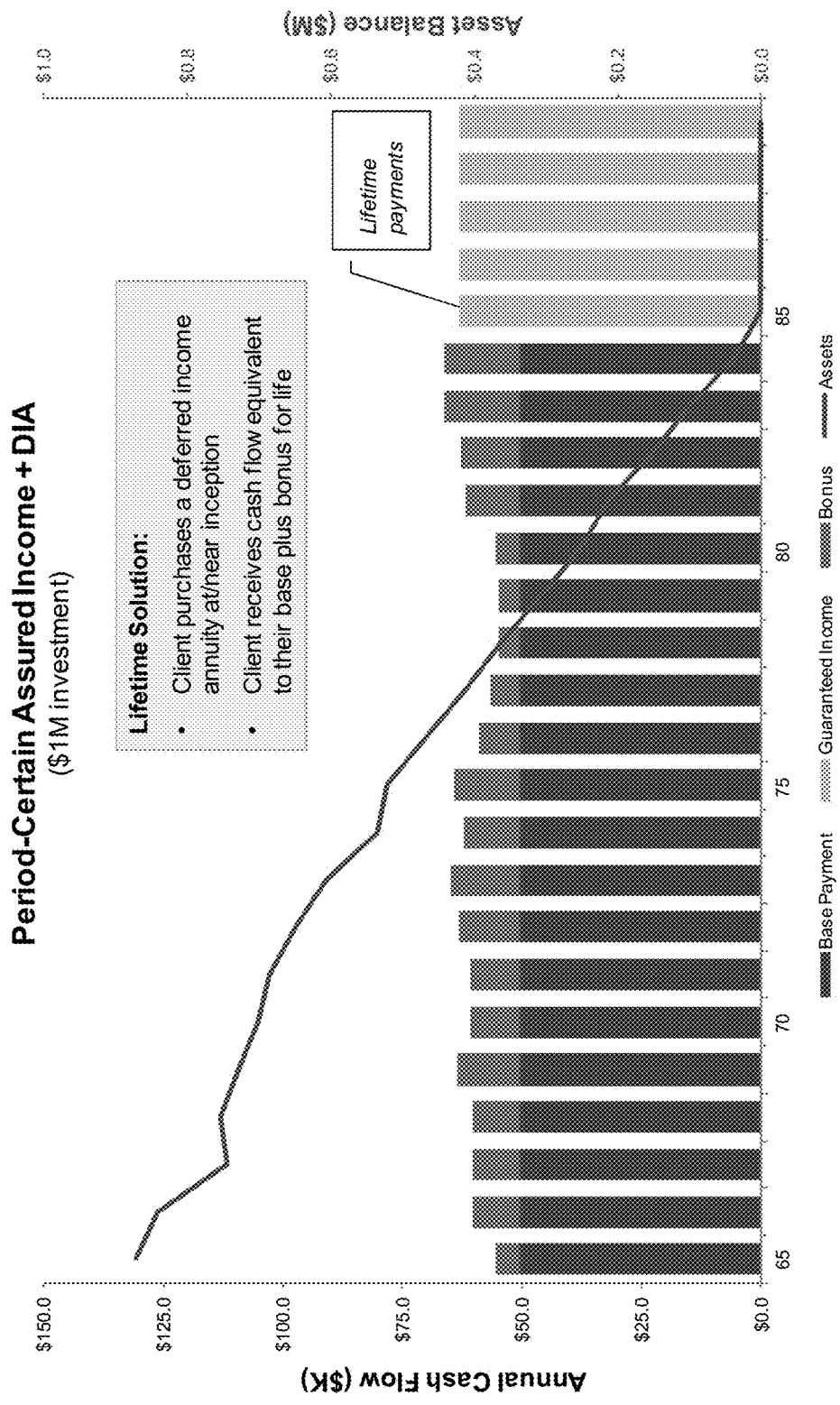
Fig.71: MMACC-Exemplary Assured Income Lifetime Solution

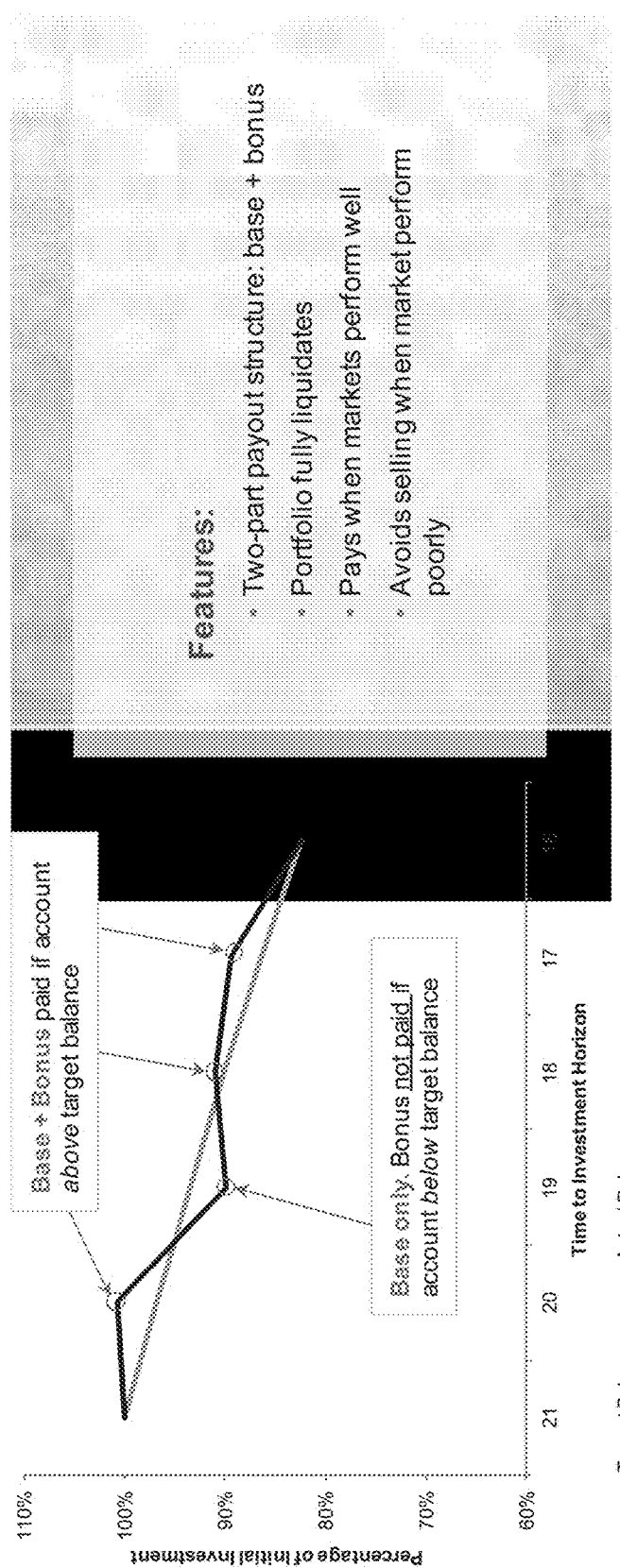
Fig.72: MMACC-Exemplary Assured Income Adaptive Payout Structure

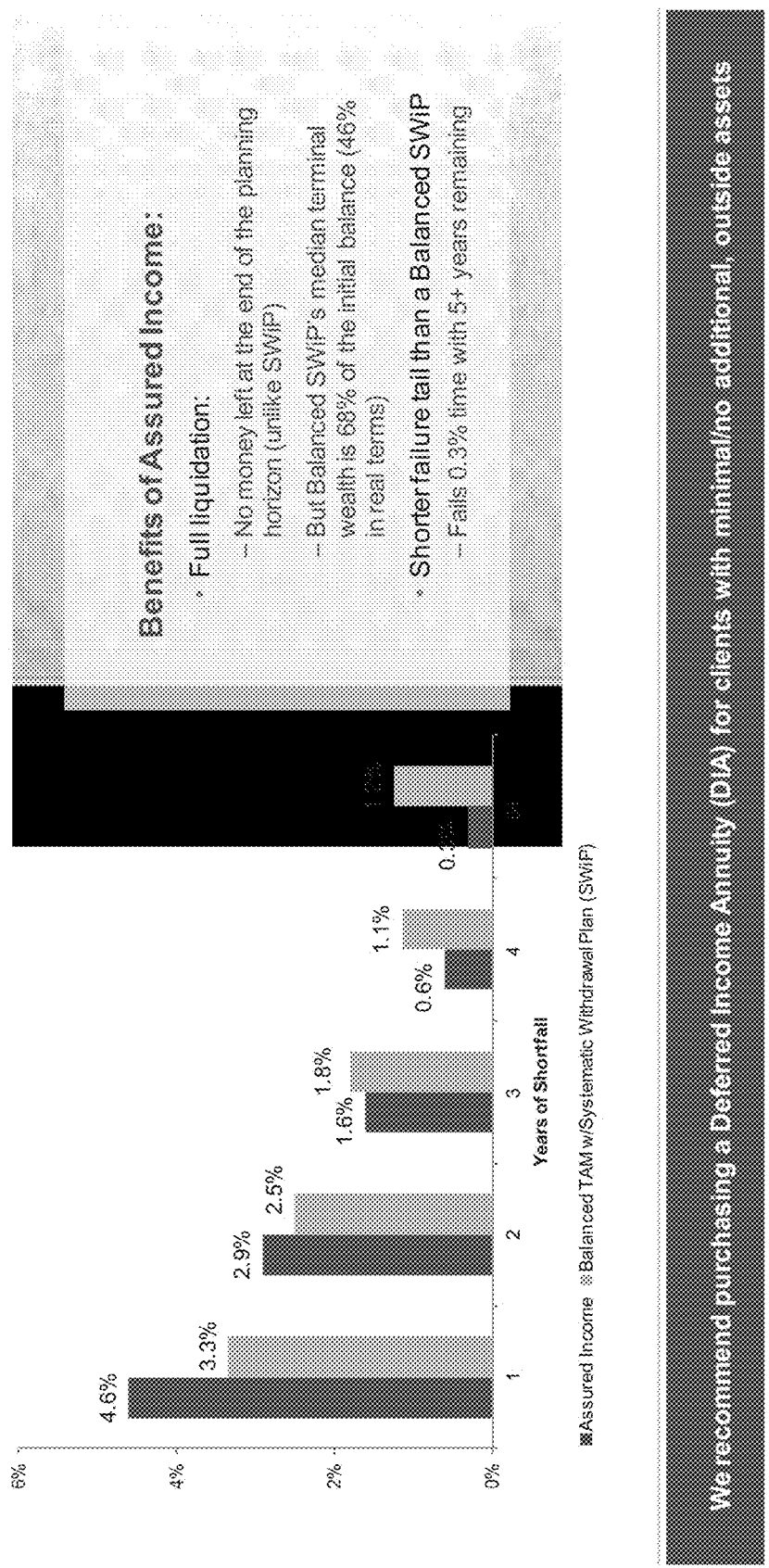
Fig.73: MMACC-Exemplary Assured Income Shortfall Risk

DIA "Safety Net" to Hedge Longevity and Shortfall Risk

Available in two forms

- Life only—upon death, the payments stop (even if none have been paid)
- Cash refund—upon death, payments equal to the initial premium less accumulated payments are paid (and more expensive than the life only)

Cash refund DIA revenues can be accelerated (if received early)

- It is a relatively cheap longevity hedge
- There is a cost to the client if received earlier
- Other assets may take the place of the DIA if the client has them

Complete failure only occurs 0.3% of all cases, although partial failure can be expected roughly 10% of the time.

Fig.74: MMACC-Exemplary Assured Income and Deferred Income Annuity

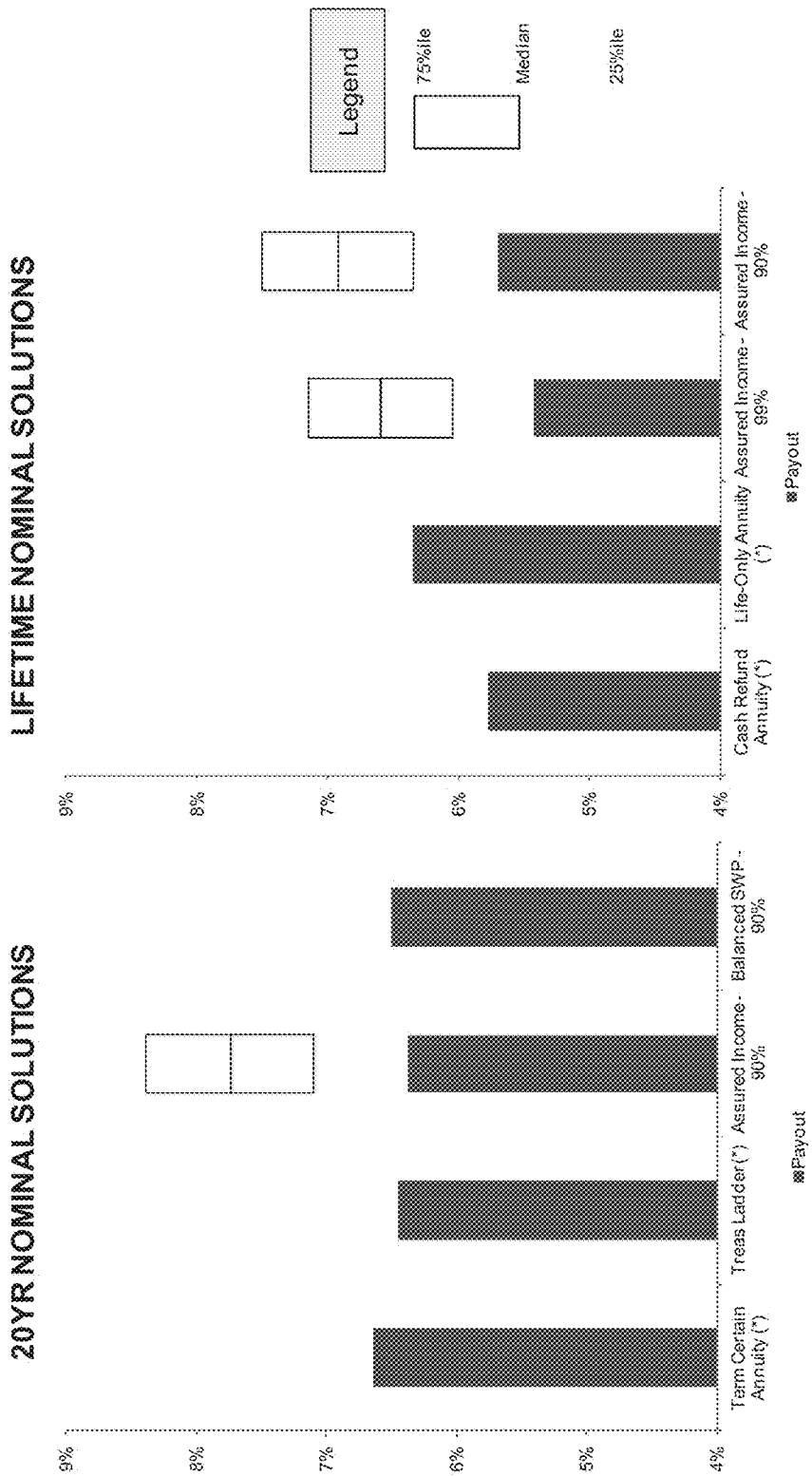
Fig.75: MMACC-Exemplary Assured Income Payout Estimates - Nominal

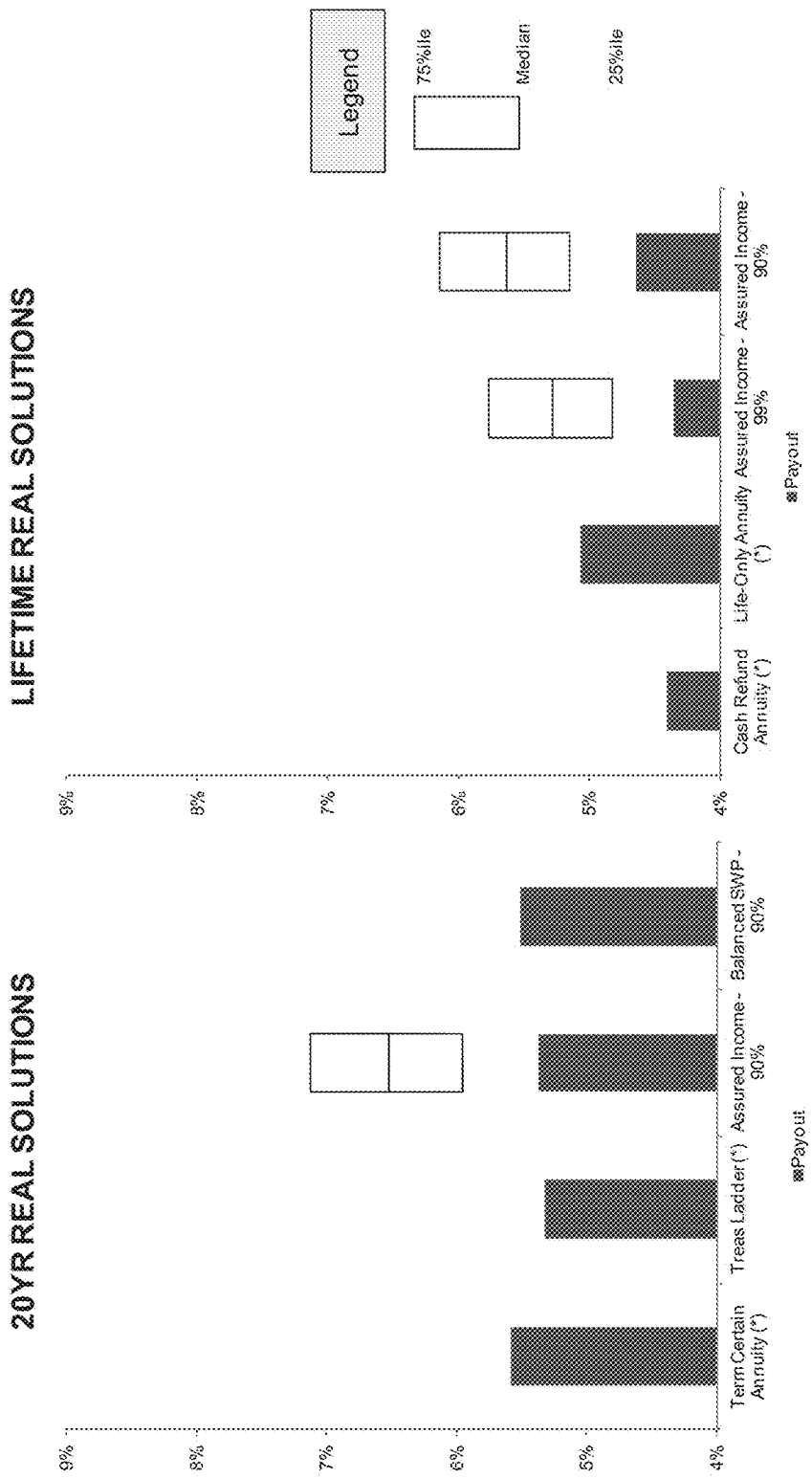
Fig. 76: MMACC-Exemplary Assured Income Payout Estimates – Real

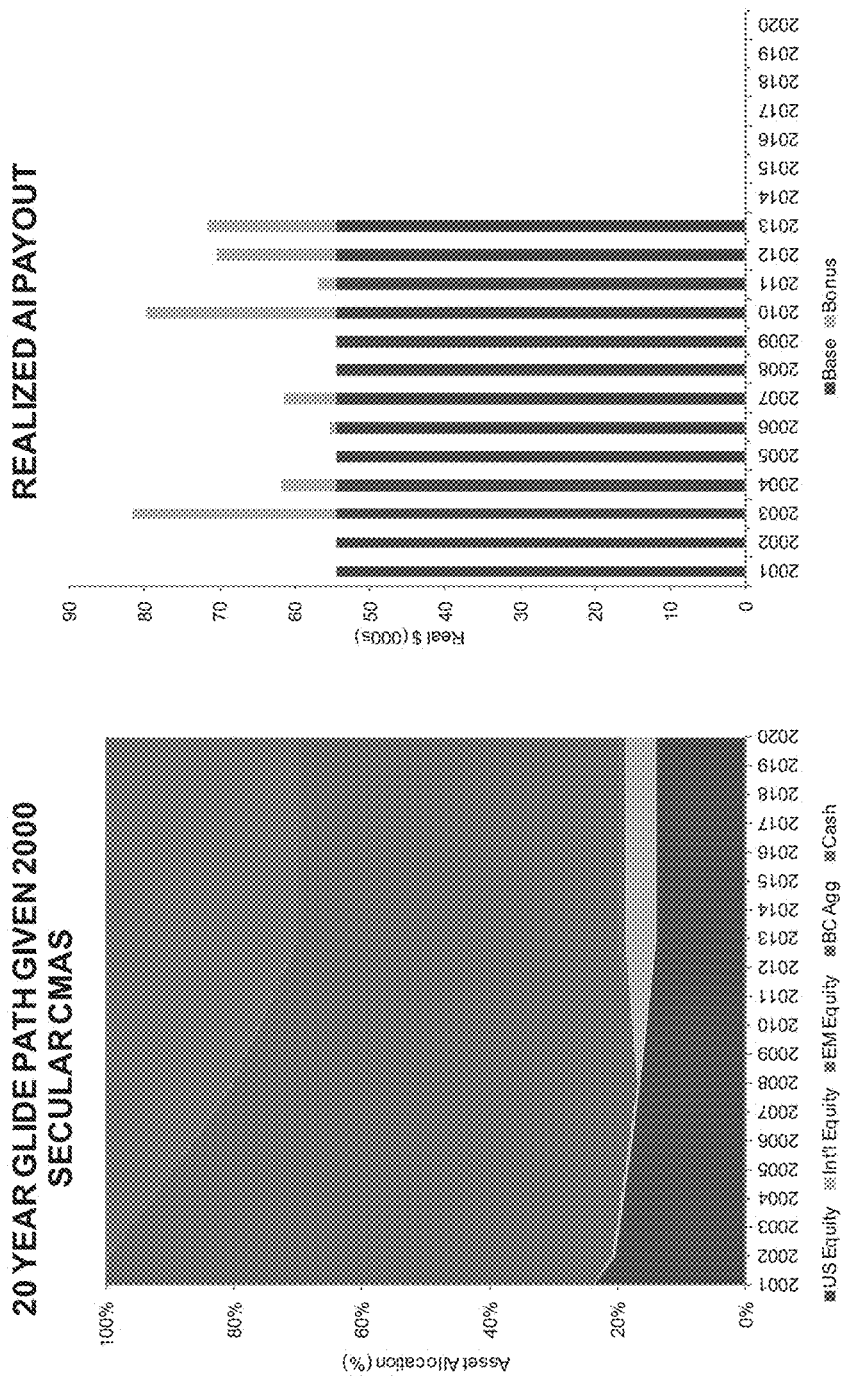
Fig.77: MMACC-Exemplary Assured Income Historical Performance

MULTIPLE MODULAR ASSET CLASS CONSTRUCTOR APPARATUSES, METHODS AND SYSTEMS

PRIORITY CLAIM

Applicant hereby claims benefit to priority under 35 USC § 119 as a non-provisional conversion of: U.S. provisional patent application Ser. No. 62/156,115, filed May 1, 2015, entitled "Multiple Modular Asset Class Constructor Apparatuses, Methods and Systems,".

Applicant hereby claims benefit to priority under 35 USC § 120 as a continuation-in-part of: U.S. patent application Ser. No. 14/601,061, filed Jan. 20, 2015, entitled "Multiple Modular Asset Class Constructor Apparatuses, Methods and Systems,".

The entire contents of the aforementioned applications are herein expressly incorporated by reference.

FIELD

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

The present innovations generally address information technology, and more particularly, include Multiple Modular Asset Class Constructor Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Information technology allows users to access streams of information through various user interfaces. Databases can track assets such as physical inventory, equity shares, accounts receivable/payable, debts/loans and derivatives thereof. Some assets have stable values while others vary greatly, the various assets sometimes generating income streams, while other times appreciate/depreciate. These different assets have different risk exposures and may be attractive to different types of owners.

BRIEF DESCRIPTION OF THE DRAWINGS

Appendices and/or drawings illustrating various, non-limiting, example, innovative aspects of the Multiple Modular Asset Class Constructor Apparatuses, Methods and Systems (hereinafter "MMACC") disclosure, include:

FIG. 1 shows a datagraph illustrating example embodiments of the MMACC;

FIG. 2A shows a logic flow diagram illustrating embodiments of a pool tranche instantiation component for the MMACC;

FIG. 2B shows a logic flow diagram illustrating embodiments of a tranche asset transact component for the MMACC;

FIG. 2C shows a logic flow diagram illustrating embodiments of a distribute income tranche and distribute principal tranche components for the MMACC;

FIG. 3 shows a datagraph illustrating example embodiments of the MMACC;

FIG. 4 shows a calculation worksheet illustrating embodiments of a 2008 vintage CEO datastructure parameters for the MMACC;

FIG. 5 shows a datagraph companion to the worksheet illustrating embodiments of a 2008 vintage CEO datastructure parameters for the MMACC;

FIG. 6 shows a graph illustrating embodiments an equity product line relationship between returns and risk for the MMACC;

FIG. 7 shows a datagraph illustrating funds' relationship between returns and risk for the MMACC;

FIG. 8 shows graphs illustrating funds' performances for the MMACC;

FIG. 9A-B shows graphs illustrating funds' correlated performances for the MMACC;

FIG. 10 show a datagraph illustrating a CEO structure for the MMACC;

FIG. 11 show a calculation worksheet illustrating a hypothetical CEO structure values for the MMACC;

FIG. 12 show a calculation worksheet actual 1970 CEO structure values for the MMACC;

FIGS. 13-14 show graphs of a range of outcomes from 1961-2008 of average annual returns and volatility for the example CEO structure for the MMACC;

FIG. 15 shows a graph of a range of outcomes from 1961-2008 of average annual returns and volatility with risk shifted by changing tranche allocations for the example CEO structure for the MMACC;

FIG. 16 shows a graph of a range of outcomes from 1961-2008 of average 5 year cumulative returns and volatility for the example CEO structure for the MMACC;

FIG. 17 shows a graph of a trailing 5 year MMACC tranche correlations with the S&P 500 for the example CEO structure for the MMACC;

FIGS. 18, 19A-19D show graphs of a annual return and cumulative value of a 2003-2007 tranche for the example CEO structure for the MMACC;

FIG. 20 shows a block diagram illustrating example tranche outcomes for a $300 M fund with 5% yield for the example CEO structure for the MMACC;

FIG. 21A-21B shows a graph illustrating dividends received by tranche vs. dividends received in a given year, as an option (income) for the example CEO structure for the MMACC;

FIG. 22A-22B shows a graph illustrating dividends received by tranche vs. dividends received in a given year, as an option (capital) for the example CEO structure for the MMACC;

FIG. 23 shows a block diagram illustrating embodiments of a MMACC controller;

FIG. 24 shows a block diagram illustrating example equity strips high-level schematic;

FIG. 25 shows a datagraph illustrating example embodiments of the MMACC;

FIG. 26 shows a calculation worksheet illustrating embodiments of a 2008 vintage equity strips CEO datastructure parameters for the MMACC;

FIG. 27 shows a datagraph companion to the worksheet illustrating embodiments of a 2008 vintage equity strips CEO datastructure parameters for the MMACC;

FIG. 28 shows a diagram illustrating example characteristics of D shares and P shares for the MMACC;

FIGS. 29-33 show diagrams illustrating example applications of D shares and P shares for the MMACC;

FIG. 34 shows a diagram illustrating example embodiment of relationship between D shares and P shares for the MMACC;

FIG. 35 shows a diagram illustrating example embodiment of relationship between prices of D shares and P shares for the MMACC;

FIGS. 36-38 show diagrams illustrating example embodiments of effects of dividend yield for the example equity strips CEO datastructure for the MMACC;

FIG. 39 shows a diagram illustrating historical performance of D shares, P shares, and S&P 500 TR Index for the example equity strips CEO datastructure for the MMACC;

FIGS. 40-41 show diagrams illustrating example embodiments of effects of dividend yield assumptions on D share price for the example equity strips CEO datastructure for the MMACC;

FIGS. 42-46 show diagrams illustrating example embodiments of results using rolling 5 year dividend yields for the example equity strips CEO datastructure for the MMACC;

FIGS. 47-51 show diagrams illustrating example embodiments of results using current year dividend yields for the example equity strips CEO datastructure for the MMACC;

FIGS. 52-53 show diagrams illustrating example embodiments of D shares and sequence of return risk for the example equity strips CEO datastructure for the MMACC;

FIG. 54 shows a diagram illustrating example embodiments of D shares and historical performance for the example equity strips CEO datastructure for the MMACC;

FIGS. 55-58 show diagrams illustrating example embodiments of P shares and convexity for the example equity strips CEO datastructure for the MMACC;

FIGS. 59-60 show screenshots illustrating an example embodiment of a calculation engine and its user interface for the MMACC;

FIGS. 61-63D show screenshots illustrating another example embodiment of a calculation engine and its user interface for the MMACC;

FIG. 64 shows a datagraph illustrating example embodiments of assured income data flow for the MMACC;

FIG. 65 shows a logic flow diagram illustrating embodiments of an assured income solution configuring component for the MMACC;

FIG. 66 shows a logic flow diagram illustrating embodiments of an assured income distribution component for the MMACC;

FIG. 67 shows a diagram illustrating example embodiments of assured income value proposition for the MMACC;

FIG. 68 shows a diagram illustrating example embodiments of assured income structure for the MMACC;

FIG. 69 shows a diagram illustrating example embodiments of assured income period-certain solution for the MMACC;

FIG. 70 shows a diagram illustrating example embodiments of assured income 20-year payout estimates for the MMACC;

FIG. 71 shows a diagram illustrating example embodiments of assured income lifetime solution for the MMACC;

FIG. 72 shows a diagram illustrating example embodiments of assured income adaptive payout structure for the MMACC;

FIG. 73 shows a diagram illustrating example embodiments of assured income shortfall risk for the MMACC;

FIG. 74 shows a diagram illustrating example embodiments of assured income and deferred income annuity for the MMACC;

FIG. 75 shows a diagram illustrating example embodiments of assured income payout estimates—nominal for the MMACC;

FIG. 76 shows a diagram illustrating example embodiments of assured income payout estimates—real for the MMACC; and FIG. 77 shows a diagram illustrating example embodiments of assured income historical performance for the MMACC.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Multiple Modular Asset Class Constructor Apparatuses, Methods and Systems (hereinafter "MMACC") transforms collateralized equity obligation structure parameters, asset search, tranche selections inputs, via MMACC components (e.g., pool tranche instantiation 2341, tranche asset transact 2342, distribute income tranche 2343, distribute principal tranche 2344 of FIG. 23, etc.), into asset income distribution message, principal distribution message outputs. In another embodiment, the MMACC transforms a Capital Structure Component inputs via Preferred Share Class and Common Share Class components into a series of multi-share class product offerings. The Capital Structure Component may include one or more of a UIT (Unit Investment Trust) sub-component, a CLO (Collateralized Loan Obligation) & CEO (Collateralized Equity Obligation) sub-component and/or an ETF (Exchange Traded Fund) sub-component. The Preferred Share Class component may include one or more of an Income Share Class sub-component, and a Growth & Income Share Class sub-component. The Common Share Class component may include a Capital Appreciation sub-component. As such, the MMACC may transform straight equity products into more attractive instruments by dividing and allocating the return and risk streams. The MMACC, rather than allocate stocks to types of funds, allocates a portion of each stock's return to different possible funds: (1) Income, (2) Growth & Income and/or (3) Capital Appreciation via a plurality of share classes. As such, the MMACC components, in various embodiments, implement advantageous features as set forth below.

Introduction

The MMACC provides a new datastructure and data stream allowing asset owners to receive benefits and features that were never before available from a single asset type. The MMACC can create slices of value from pools of assets that were never before separable. In this way, an asset buyer may enjoy just the dividend income (usually paying higher rates than bonds for example) in one slice of an asset pool, while a different asset buyer may enjoy just the asset appreciate component of that same asset pool without any dividend income. The MMACC provides asset buyers (e.g., investors) with a number of benefits including, but not limited to, providing them with what they want: income with stable principal, income with high yield but no residual value, growth & income with some capital risk or capital appreciation; specific term/duration; no broker/underwriter credit risk—not a derivative; no reinvestment or roll risk; no sequence of return risk; low cost. MMACC can employ a datastructure(s) representing: accounts receivable/payable (e.g., income), debts/loans, derivatives, dividends, equity, ETF, hybrid (e.g., permutations herein), indexes, mutual fund, notes, physical goods/inventory/products/services/ etc., trust, etc. (hereinafter "asset" or "assets"), and/or a plurality of assets via an asset (e.g., equity) portfolio. In one embodiment, the MMACC helps solve the problem that owners of assets (e.g., equity income products) may experience, i.e., where the market for the equity may move up and down while providing a dividend yield, and that fluctuation is unpalatable to the owner where the value change might be greater than a more moderate asset such as a bond. The MMACC can take datastructures representing assets, e.g., an equity portfolio, and rather than take assets (e.g., stocks) and split them up by risk (e.g., low risk stocks going into an equity income portfolio and high risk stocks going into capital appreciation portfolios), instead, the MMACC puts a pool of assets (e.g., stocks) and slices the components of the return of each stock into different stake holders of the pool (e.g., rather than take a stock A and say it is a low risk stock and put it into an equity income portfolio and then provide the return to an equity income investor receiving the total return of stock A, instead MMACC takes datastructures representing a portfolio of stocks and takes provided dividend income for each one of those stocks and allocates it to an equity income investor and then at the end of a specified holding period (e.g., 5 year maturity, 20 year maturity), depending on the configuration of a slice, the equity income holder may have first claim of getting the principal value they invested out of the portfolio or the equity income holder may have no residual principal value). In other words, the MMACC slices the component return of each stock and allocates it rather than vertically putting each stock into a different portfolio. As such, MMACC allows the equity component to be sliced off for one group of investors (e.g., an equity growth investor may get, depending on the configuration of a slice, the entire principal value or the principal value minus the principal value invested by the equity income investor) and an income component to be sliced off for another group. In one embodiment, MMACC could allow trades (e.g., trades of shares associated with different slices, trades of a combination of shares from different slices for the underlying security) during the maturity period. It may be sliced in numerous tranches to distribute and allocate portions of the income and capital at the end of the maturity period based on different rules (e.g., taking an equity product and creating a piece out of it so it's like a bond but with a higher income component where the MMACC would take a tranche out of the equity portfolio that provides to a stake holder holding until maturity, and when sold, depending on the configuration of a slice, the stake holder may get their principal back or the stake holder may have no residual principal value, and whatever income made during that period). In addition MMACC facilitates stake holders owning an income component, equity component and also hybrid components. In one embodiment, MMACC provides a coverage ratio feature where, for example, MMACC buys $100 of stock and sells only $50 via an income component, then the MMACC has income from a $100 portfolio covering the income promised to the $50 income component (i.e., protecting the income portfolio). In one embodiment, the MMACC employs a collateralized loan obligation (CLO) structure to transact, but instead as a collateralized equity obligation datastructure (CEO). Although at one time primes and scores could take a stock and split the return of a stock into individual pieces, it was limited to a single stock and would work in perpetuity without maturity and set allowable trades of one or the other pieces; it did not allow for MMACC features such as, but not limited to: a portfolio context, multiple tranches, convergence ratios, fixed maturity periods, etc. In one embodiment, the MMACC allows users to set both (a) how much of each tranche is to be sold out of each aggregate pool and (b) set the income with an initial yield paid and is set at the beginning of the period and does not change (e.g., a portfolio that yields 2.5% and MMACC sells a 25% income tranche (e.g., sell maximum of 10%) and can move the income level up or down in the income tranche based on how much risk is to be taken across the other tranches). In another example, the MMACC allows adjustment of the tranche size (e.g., if you only sell $20 of income out of $100 pool, then there is $80 in the capital appreciation tranche, and the capital appreciation tranche provides a lot of support to cover the $20 of income over a given period). In one embodiment, the CEO may include a force majeure trigger option where unforeseen events may cause liquidation and variations on the obligation. As such, the CEO may establish a pool where a capital appreciation tranche covers the income tranche and appreciation and corpus of the capital appreciation tranche. The initial tranche allocation may vary infinitely, but for example, if there was an income component of guaranteed $80 income over a maturity period out of $100, and only $20 in the capital appreciation tranche, such a CEO would be very risky and leveraged as there is not a lot of capital in the capital tranche to cover short falls in the income tranche. In one embodiment, one income share and one growth share may be generated for each share of an underlying security (e.g., S&P 500). Products with different characteristics (e.g., yield, beta) may be generated by combining different numbers of income shares and growth shares into a product. In one embodiment, the MMACC charges an administrative fee for establishing products, pools and tranches within a electronic database/computer account and/or transactions in establishing such electronic records/accounts and requisite accounts.

It should be noted that a number of variations are offered by the MMACC. MMACC can vary: the Income/G&I/ capital appreciation income and capital allocations to optimize risk distribution; income allocation to optimize income attractiveness to investors. MMACC offers numerous style spaces: large, mid, small, growth, core, value, international, U.S., global, etc. In some embodiments, shares from different style spaces may be combined (e.g., U.S. growth shares and foreign income shares) in a product to provide diversification benefits. MMACC can vary allocations of income and capital appreciation for negative wealth impact or optimization and it can add an "alpha" layer for income or appreciation. In one embodiment, the MMACC may create products with a 5 or 20 (or longer) year period. This provides brokers with the advantage of making a market with intra-period as the underlying holdings are liquid and transparent.

Some example product structures offered by the MMACC include:

Closed End Mutual Fund or U.I.T. With, e.g., 3, share classes: A: Income; B: Growth & Income; C: Capital Appreciation. Alternatively, these may be collapsed into, e.g., 2:

preferred (dividend income or D shares) and common (capital appreciation or growth or P shares).

As such, the MMACC may produce Collateralized Equity Obligation (CEO) products (e.g., equity strips) with the following slices: tranche A, Income; tranche B, Growth & Income; tranche C, Capital Appreciation. Alternatively, these may be collapsed into, e.g., 2: income tranche and growth tranche. Alternatively, the CEO may be formed as an ETF with publically disclosed holdings and AP's can create and redeem.

As such, the MMACC and its CEO datastructure products are revolutionary and transform normal asset/equities into more attractive instruments by slicing up and allocating the return and risk streams.

In some embodiments, the MMACC provides an assured income (AI) solution for managing investment portfolios, such as retirement portfolios. The AI may provide higher cash flow during retirement than existing solution and may be combined with a deferred income annuity (DIA) to provide protection against outliving income provided by the AI. In some implementations, AI solution constituent products may include CEO products, such as equity strips (e.g., D shares).

MMACC

FIG. 1 shows a datagraph illustrating example embodiments of the MMACC. The datagraph shows interactions between users 186a and their client devices 186b, a MMACC server(s) 199, market/3$^{rd}$ party server(s) 198, and asset buyers 187a and their client devices 187b. In one embodiment, the market server 198 may be incorporated into the MMACC itself. Users may be administrators, brokers, marketmakers, computerized systems, and/or the like 186a. Users can create MMACC datastructures and accompanying new asset products, e.g., users can provide specifications and parameters for such new products such as collateralized equity obligation datastructure (CEO) products.

As part of creation of new CEO products, the users may also specify the CEO's constituent slice types (or interchangeably slices and/or tranches). The CEOs may include a specification of constituent asset(s)/portfolio(s), slice types (e.g., income (e.g., current yield), income (e.g., dividend) growth, capital appreciation (e.g., corpus/position/principal/proceeds/etc.), hybrid (e.g., growth & income), total return, etc.), asset buyer share specification, asset buyer conditions, etc.

The asset buyers 187a may be looking to acquire slices of asset pools. The MMACC acts to create CEO products to the specifications of users 186a and makes otherwise unavailable asset slice types/tranches available to asset buyers where such products were simply never before available. The MMACC may interoperate with market servers and 3$^{rd}$ party servers 198 (e.g., obtaining funds and/or assets from asset buyers to be used to populate and/or instantiate CEOs made by the MMACC 199).

As such, users 186a may provide MMACC CEO structure parameters 101 via their client devices 186b (e.g., app/web based client with web forms for parameter specification). The client device 186b may then in turn provide a CEO datastructure parameter message 102 to the MMACC which will be used by the pool tranche instantiation component 141 (e.g., see FIG. 2A and 2341 of FIG. 23 for more detail) to create a new CEO product and associated tranches. In one embodiment, the client may provide the following example CEO datastructure parameter message 102, substantially in the form of a (Secure) Hypertext Transfer Protocol ("HTTP (S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<CEO_parameter_message>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MMACC.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
```

```xml
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <CEO_datastructure>
        <CEO_name>myCoolProductName</CEO_name>
        <CEO_tranche1> //product parameter dials
            <Name>myCoolSafeHighIncomeStreamTranche</Name>
            <priority>medium</priority>
            <fundsRaised>$123</fundsRaised>
            <FixedYield>.01</FixedYield>
            <YieldUpside>%ofTheResidualDividendsPaidAnnually</YieldUpside>
                <PrincipalUpside> % of Residual Market Value Of The
Portfolio At Maturity </PrincipalUpside>
        </CEO_tranche1>
        <CEO_tranche2>
            <Name>myCoolGrowth+IncomeTranche</Name>
...
        <CEO_tranche2>
...
        <asset1>
            <name>PG</name>
            <ID>123abc</ID>
            <QTY>100</QTY>
            <InitialCost>$23.45</InitialCost>
            <CurrentValue>$25.55</CurrentValue>
            <InitialQuarterlyDividend>$0.55</InitialQuarterlyDividend>
            <CurrentQuarterlyDividend>$0.65</CurrentQuarterlyDividend>
            <PurchaseTime>2020-12-31:12:59:59</PurchaseTime>
            <Alpha>0.5</Alpha>
            <Beta>0.6</Beta>
            <CurrentYield>0.03</CurrentYield>
            <TotalReturn>.072345</TotalReturn>
        <asset2>
            <name>GILD</name>
...
        </asset2>
...
        <asset3>
            <name>BAC</name>
        </asset3>
...
        <SliceType1>
```

```
            <Type>Income</Type>
            <asset1SliceReturn>.007</asset1SliceReturn>
            <asset2SliceReturn>.011</asset2SliceReturn>
            <asset3SliceReturn>.015</asset3SliceReturn>
        </SliceType1>
        <SliceType2>
            <Type>Growth+Income</Type>
            <asset1SliceReturn>.007</asset1SliceReturn>
            <asset2SliceReturn>.011</asset2SliceReturn>
            <asset3SliceReturn>.015</asset3SliceReturn>
        </SliceType2>
            <Type>Capital Appreciation</Type>
            <asset1SliceReturn>.007</asset1SliceReturn>
            <asset2SliceReturn>.011</asset2SliceReturn>
            <asset3SliceReturn>.015</asset3SliceReturn>
        </SliceType3>
        <CEO_maturity_date>2025-12-31-23:59:59</CEO_maturity_date>
        <CEO_income_interval>quarterly</CEO_income_interval>
    </CEO_datastructure>
</CEO_parameter_message>
```

Once the MMACC 199 generates the CEO product datastructure, the MMACC stores it in its database. Then, the MMACC may make the CEO and/or its tranches (or slices) available to the market via $3^{rd}$ party servers 198 by sending an asset tranche offer message 104 detailing the types of CEO tranche (or slice) products that are available. In one embodiment, the asset tranche offer message is the same as the CEO parameter message 102. In another embodiment, the asset tranche offer message may be an ISO 20022 securities message to a central securities depository (CSD). In one implementation, shares of the CEO and/or its tranches (or slices) may be housed in the CSD. In one embodiment, the MMACC may apportion a specified number of shares for issuance and may employ an investment bank issuer to instantiate and/or propagate the initial set of shares. In another embodiment, shares may take the form of a mutual fund whose shares may be instantiated and/or propagated by an investment advisor issuer. In one embodiment, the $3^{rd}$ party server and/or market servers 198 may be incorporated into the MMACC server 199; while in another embodiment, either the MMACC or the $3^{rd}$ party/market servers 198 may instantiate and execute the tranche asset transact component (e.g., see FIG. 2b and/or 2342 of FIG. 23 for more details). As such, the servers 198, 199 may store the asset tranche offer message 104 in their respective databases and make the new CEO product and tranches available for asset buyers 187a to search out such asset for procurement. In one embodiment, asset buyers 187a provide criteria via their clients 187b to search for desired assets employing the $3^{rd}$ party/market servers 198 (e.g., in one embodiment, the servers are financial institution equity brokerage systems allowing for asset searches of items in their database systems, which now includes the new CEO products and tranches). The asset buyer's 187a client devices 187b may further obtain asset search criteria 106 and send on the asset search request and criteria 107 to the tranche asset transact component running on the server(s) 198, 199. An example PHP/SQL listing for querying a database for a an asset search is below:

```
<?PHP
header('Content-Type: text/plain');
mysql_connect("254.93.179.112",$DBserver,$password); // access database server mysql_select_db("M-MACC.SQL"); // select database table to search
//create query for asset data
$query="SELECT assetName FROM AssetTable WHERE assetID LIKE '%' $123abc";
$result=mysql_query($query); // perform the search query
mysql_close("MMACC.SQL"); // close database access
?>
```

The server may run a database select command on the search criteria, and when CEO products and tranches are selected, the servers will generate an asset search response 108 providing a display of matching assets 109 to the asset buyers 187a. At this point, the asset buyers 187a may make selections of desired CEO products and/or tranches 110 and their client devices 187b will further send on an asset tranche purchase order 111 back to the tranche asset transact component 142 at the server(s) 198, 199. The asset tranche purchase order may include payment credentials (e.g., bank account, credit card, etc.) along with desired quantities of product, and the tranche asset transact component may use this data to obtain funds to secure the desired CEO product tranche for the asset buyer.

Once the asset buyers acquire the CEO product tranche, the MMACC may seek to make distributions according to asset buyers' secured right. The distribute income tranche component (e.g., see FIG. 2C and/or 2343 of FIG. 23 for more details) 143 seek to make payouts to all asset buyers having an income tranche CEO product (and/or hybrid/apportioned product). Upon determining distributions, the distribute income tranche component 143 will issue an income distribution message 113 to the tranche asset transact component 142 which may in turn move funds to/from the asset buyers based on the performance of the CEO product tranche owned (e.g. pro-rata share) by the asset buyers, and as such, the asset buyers 187a will obtain an income distribution message informing them of such distribution 114. The MMACC server 199 will also seek to distribute capital appreciation via the distribute principal tranche component 144 (e.g., see FIG. 2C and/or 2344 of FIG. 23 for more details), which also computes the appropriate distribution of asset appreciation and issue a principal distribution message 116 to the tranche asset transact component 142, similarly causing fund movement and a principal distribution message 117 to the asset buyers 187a.

FIG. 2A shows a logic flow diagram illustrating embodiments of a pool tranche instantiation component for the MMACC. The pool tranche instantiation component 241 initializes 202 and may provide a display login/create screen 204. In one embodiment, an existing asset/brokerage order and account system may be modified to allow users 286 to create new CEO datastructures and products. In one embodiment, the XML fields from the CEO parameter message 102 may be used to generate web form text fields, pop up lists, and/or other widgets for the specification of such parameters for transfer via HTTPS POST command Upon logging in 204 and supplying parameters for the new CEO product (e.g., via web form with corresponding fields for the parameters), the client 286 may send the CEO parameter message 102 to the MMACC server 299, and it may determine if such a CEO product already exists and if there is enough capacity for additional asset buyers for the product 212. If the product does exist and has enough capacity, the user may be presented with a massage for them to confirm 210 that they want to make another CEO product with similar features and give it a new and unique name. Then the MMACC server 299 may select asset(s) to be employed for the new CEO product 214. Then, for each asset 216, the MMACC will create a new current yield slice data structure (e.g., as specified in the CEO parameter message 102) 218. In one implementation, after receiving the new CEO parameter message 102, the MMACC server may parse the message and create/update CEO product record tables and associated slice record tables. An exemplary listing, written substantially in the form of PHP/SQL commands, to update the records in the MMACC database, is provided below:

```
<?PHP
header('Content-Type: text/plain');
// store input data in a database
mysql_connect("201.408.185.132",$DBserver,$password); // access database server mysql_select
    ("MMACC_DB.SQL"); // select database to append
mysql_query("UPDATE CEO
SET              CEO_name='myCoolProductName',
    CEO_trancheIName=
    'myCoolSafeHighIncomeStreamTranche',
    SliceType1='Income',
    asset1SliceType1Return='0.007',
    asset2SliceType1Return='0.011',
    asset3SliceType1Return='0.015', timestamp='2020-02-22 15:22:43'
    WHERE username='JDoe@gmail.com'");
mysql_close("MMACC_DB.SQL"); // close connection
    to database
?>
```

Another exemplary listing, written substantially in the form of PHP/SQL commands, to update the records in the MMACC database, is provided below:

```
<?PHP
header('Content-Type: text/plain');
// store input data in a database
mysql_connect("201.408.185.132",$DBserver,$password); // access database server mysql_select
    ("MMACC_DB.SQL"); // select database to append
mysql_query("UPDATE CEO
SET CEO_name='myCoolProductName2',
CEO_trancheIName='myCoolSafeHighIncomeStreamTranche2',
    sliceType1='Income/D            shares',
    sliceType1YieldUpside="100%",
    sliceType1PrincipalUpside="0%", timestamp='2020-02-22 15:22:43'
    WHERE username='JDoe@gmail.com'");
mysql_close("MMACC_DB.SQL"); // close connection
    to database
?>
```

Similarly, the MMACC then creates a new dividend growth slide data structure 220 and then it creates a principal appreciation slice data structure 222. It should be noted, that various apportionments may be specified via the CEO parameter datastructure 102 where the current yield, dividend growth and/or principal appreciation slices have no value, all the value, and/or any number of permutation/hybrid values between the slices. It should also be noted that in another embodiment, the hybrids may employ plurality of slices (e.g., more than 3). The MMACC then determines if there are more assets and if so 224, execution will iterate 216 until all assets have been examined 224. Upon examining all the assets specified for the new CEO product 224, the MMACC server 299 will then examine and iterate for each slice type specified by the CEO parameter datastructure 102. For each slice type the MMACC will select all the assets for that slice type. An example PHP/SQL listing for querying a database for a assets for the slice type is below:

```
<?PHP
header('Content-Type: text/plain');
mysql_connect("254.93.179.112",$DBserver,$password); // access database server mysql_select_db("Asset.SQL"); // select database table to search
//create query for asset data
$query="SELECT sliceID FROM AssetTable WHERE
    assetID LIKE '%' $123abc";
$result=mysql_query($query);  // perform the search
    query
mysql_close("MMACC.SQL"); // close database access
?>
```

By selecting all the assets associated with a slice type (e.g., sliceID), the MMACC may create tranche of that slice type (e.g., see FIG. 10 for more details). The slice datastructure may then be updated to be associated with all the identified and related assets (e.g., assetID) and adding slice type values to the asset records (e.g., sliceIDs). An exemplary listing, written substantially in the form of PHP/SQL commands, to update the records in the MMACC database, is provided below:

```
<?PHP
header('Content-Type: text/plain');
// Update Assets with related slice IDs
mysql_connect("201.408.185.132",$DBserver,$password); // access database server mysql_select
    ("MMACC_DB.SQL"); // select database to append
mysql_query("UPDATE Asset
SET  sliceID='myCoolSafeHighIncomeStreamTranche',
    timestamp='2020-02-22 15:22:43'
    WHERE username='JDoe@gmail.com'");
mysql_close("MMACC_DB.SQL"); // close connection
    to database
?>
<?PHP
header('Content-Type: text/plain');
// Update Slices with related Asset IDs
mysql_connect("201.408.185.132",$DBserver,$password); // access database server
mysql_select("MMACC_DB.SQL"); // select database to
    append
mysql_query("UPDATE Slice
SET    assetName='PG',    assetID='123abc',    timestamp='2020-02-22 15:22:43'
    WHERE username='JDoe@gmail.com'");
mysql_close("MMACC_DB.SQL"); // close connection
    to database
?>
```

The MMACC determine if there are more slice types 232 and if so it continues to iterate through the slice types 226, otherwise the CEO datastructure is instantiated 234. An exemplary listing, written substantially in the form of PHP/SQL commands, to create/update the records in the MMACC database, is provided below:

<?PHP
header('Content-Type: text/plain');
// Create/Update CEO datastructure product with related asset slice IDs
mysql_connect("201.408.185.132",$DBserver,$password); // access database server mysql_select ("MMACC_DB.SQL"); // select database to append
mysql_query("UPDATE CEO
SET CEO_name='myCoolProductName', CEO_tranchelName=
'myCoolSafeHighIncomeStreamTranche',
SliceType1='Income', sliceID1=
'123abc', asset1='PG', asset1ID='abc123'
SliceType2 . . . asset2 . . . , timestamp='2020-02-22 15:22:43'
WHERE username='JDoe@gmail.com'");
mysql_close("MMACC_DB.SQL"); // close connection to database
?>

Another exemplary listing, written substantially in the form of PHP/SQL commands, to create/update the records in the MMACC database, is provided below:

<?PHP
header('Content-Type: text/plain');
// Create/Update CEO datastructure product with related asset slice IDs
mysql_connect("201.408.185.132",$DBserver,$password); // access database server mysql_select ("MMACC_DB.SQL"); // select database to append
mysql_query("UPDATE CEO
SET CEO_name='myCoolProductName2', CEO_tranchelName=
'myCoolSafeHighIncomeStreamTranche2',
sliceType1='Income/D shares',
sliceID1='123abc', asset1='S&P 500', asset1ID='abc123'
SliceType2 . . . asset2 . . . , timestamp='2020-02-22 15:22:43'
WHERE username='JDoe@gmail.com'");
mysql_close("MMACC_DB.SQL"); // close connection to database
?>

FIG. 2B shows a logic flow diagram illustrating embodiments of a tranche asset transact component for the MMACC. The tranche asset transact component 242 initializes and may provide a display login/create screen 240. As has already been discussed 106 of FIG. 1, asset buyers 287 may provide asset search criteria 245 to search the server(s) 298, 299 (and as has already been noted, the tranche asset transact component may run on either and/or both the MMACC 299 and/or market/3$^{rd}$ party server(s) 298). The search results may be presented to the asset buyers 247 (e.g., CEO product, tranche options, exchange options, etc.) for purchase or exchange. The asset buyer 287 may then select a desired product/tranche (e.g., along with a funding source, constraints and/or conditions, etc.) 248 and the MMACC server will determine if the quantities are within the limits/availability of current CEO product offerings 250. If not 250, the server(s) may need to purchase additional assets 252 so that the CEO product constraints are maintained. A determination may be made at 253 whether the transaction is a purchase (or similarly a sale) of the CEO product or an exchange of the CEO product (e.g., exchange a D share and a P share for a share of S&P 500). If the transaction is a purchase, then a purchase of the CEO product (e.g., tranche) 254 will commence (e.g., the server(s) may request funds to cover the collateralized purchase of the tranche 256). If the transaction is an exchange, then an exchange of the CEO product 255 will commence (e.g., the server(s) may request funds to cover transaction fees associated with the exchange 256). If funds are not sufficient 258, an error message and retry option may be presented to the asset buyer 260 and the process may iterate 247. Once sufficient funds are obtained 258, the server(s) will adjust the collateral CEO tranche record for the asset buyer (e.g., allocate CEO product to asset buyer, deallocate CEO product from asset buyer) by updating the slice record (e.g., with the asset buyer's identifier). An exemplary listing, written substantially in the form of PHP/SQL commands, to create/update the records in the MMACC database, is provided below:

<?PHP
header('Content-Type: text/plain');
// Create/Update CEO datastructure product with asset buyer's ID
mysql_connect("201.408.185.132",$DBserver,$password); // access database server mysql_select ("MMACC_DB.SQL"); // select database to append
mysql_query("UPDATE CEO
SET userID='123-45-6789', timestamp='2020-02-22 15:22:43'
WHERE sliceID='abc123'");
mysql_close("MMACC_DB.SQL"); // close connection to database
?>

FIG. 2C shows a logic flow diagram illustrating embodiments of a distribute income tranche and distribute principal tranche components for the MMACC. The tranche asset transact component 242 initializes 202 and may iterate for each CEO datastructure record (e.g., product) 266. For each CEO, the MMACC will determine if a threshold time interval (e.g., dynamically, on-demand, periodic (e.g., second, minute, hour, day, week, month, quarterly, semi/bi annual, etc.), realtime, end of term (e.g., 20 years), etc.) has elapsed 268 and if not, the MMACC will continue to iterate 266. If a threshold interval has elapsed for a specific CEO product 266, 268, then the MMACC will iterate for each CEO product slice and asset buyer 270. As such, for each asset buyer's tranche 270, the MMACC 299 will then determine the tranche value over time (e.g., see FIG. 3 and FIG. 25 for more calculation details) and update the MMACC database 219 accordingly 272. Thereafter if there is no maturity due on the asset buyer's tranche 274, the distribute income tranche component 243 will provide (or request) funds to cover collateralized performance of the tranche (e.g., pay out income) 275 and provide notification of the update 278 (and tranche iteration will continue if there are more asset buyer slices 282, 270, or continue to the next CEO product if there are no more slices 282. However, if the MMACC server 299 determines there is a maturity due 274, then the distribute principal tranche component 244 will similarly provide (or request) funds to cover collateralized performance of the tranche (e.g., pay out income and return capital) 276 and provide notification of the update 278 (and tranche iteration will continue if there are more asset buyer slices 282, 270, or continue to the next CEO product 266 if there are no more slices 282.

FIG. 3 shows a datagraph illustrating example embodiments of the MMACC. It is an alternative embodiment to FIG. 1 and shows multiple asset (e.g., tranche) buyers 1 thru N 387 may have their funds pooled to buy an initial portfolio 302. For some term of years 1 thru T, the MMACC will distribute (e.g., dividend) income to tranches 1 thru N 308, and then at maturity, the positions will be sold and proceeds will be distributed to the tranches 310. One can create many CEO datastructure product permutations by manipulating the product parameter 'dials' as specified in the CEO parameter message 102. The dials vary the structure of the tranches, and the distribute income tranche component and distribute principal tranche component 244 of FIG. 2C may use the following calculations for determining tranche structure over time:

$$\text{Income}_{n,t} = \text{Minimum}\left(MV_{n,0} \times Y_n, \sum_{m=1}^{M} S_m \times D_{m,t} - \sum_{nn=1}^{n-1} \text{Income}_{nn,t}\right) +$$

$$\left(\sum_{m=1}^{M} S_m \times D_{m,t} - \sum_{nn=1}^{N} \text{Income}_{nn,t}\right) \times YU_n$$

$$MV_{n,t} = \text{Minimum}\left(MV_{n,0}, \sum_{m=1}^{M} S_m \times P_{m,t} - \sum_{nn=1}^{n-1} MV_{nn,t}\right) +$$

$$\left(\sum_{m=1}^{M} S_m \times P_{m,t} - \sum_{nn=1}^{N} MV_{nn,t}\right) \times CU_n$$

$$\text{Subject to}: \sum_{n=1}^{N} YU_n = 1; \sum_{n=1}^{N} CU_n = 1; \text{tranches are in order of claim}$$

where the above has the following values:
N=number of tranches; n=1 to N
T=number of time periods; t=1 to T; t=0=initial investment
M=number of securities in the portfolio; m=1 to M
D=dividends per share, $D_{m,t}$=security m's dividend at time t
S=shares held; $S_m$=shares held in security m
P=price; $P_{m,t}$=security m's price at time t
Y=yield; % yield tranche was sold with
YU=yield upside; % of excess portfolio income any tranche is entitled to
CU=capital upside; % of excess portfolio capital any tranche is entitled to
MV=market value of a tranche; $MV_{n,t}$
Income=income paid to each tranche; $\text{Income}_{n,t}$ We can use the above to drive a 'Vintage 2008' product parameter example to see the resulting products. With the CEO datastructure having the following values:

| Example product parameters for '2008 Vintage' example | |
| --- | --- |
| Underlying Portfolio | Large Cap U.S. Stocks |
| Number of Tranches | 3: Income, Growth & Income, Capital Appreciation |
| Maturity date or length For Each Tranche | 5 Years (Dec. 31, 2008-Dec. 31, 2013) |
| Funds Raised | $100,000,000 × 3 |
| Fixed Yield | 3.1%/3.1%/3.1% |
| Yield upside | 0%/100%/0% |
| Priority | $1^{st}/2^{nd}/3rd$ |
| Principal Upside | 0%/0%/100% |

FIG. 4 shows a calculation worksheet illustrating embodiments of a 2008 vintage CEO datastructure parameters for the MMACC. It uses the above parameters showing tranche levels, income, market value allocation, portfolio market value, 5 year returns and annual IRR.

FIG. 5 shows a datagraph companion to the worksheet illustrating embodiments of a 2008 vintage CEO datastructure parameters for the MMACC. Three tranches 501 of $100,000,000 each are pooled into a portfolio on Dec. 31, 2008 502. Each year's distribution per tranche 504 is broken down per FIG. 4's worksheet and with totals per year 503. The aggregated total 505 at maturity Dec. 31, 2013 is further broken out to show the income and growth and income tranches returned the principal $100,000,000 each 506, and the capital appreciation tranche benefited from growth 507.

FIG. 6 shows a graph illustrating embodiments an equity product line relationship between returns and risk for the MMACC. FIG. 7 shows a datagraph illustrating funds' relationship between returns and risk for the MMACC. FIG. 8 shows graphs illustrating funds' performances for the MMACC. FIG. 9A-B shows graphs illustrating funds' correlated performances for the MMACC. One may conclude that such equity funds have high/similar absolute risk and are highly correlated with the S&P and will lose money if the S&P is down significantly. As such, current equity income funds do not provide principal protection and are too risky to be used as a bond substitute.

In contrast, rather than allocate stocks to types of funds, the MMACC may allocate a portion of each stock's return to different funds. As such, dividend income and the most principal protection=Income Dividend income and dividend growth and some principal protection=Growth and Income. Also, the MMACC provides possible dividend income and all the capital appreciation with the least principal protection=Capital Appreciation. An example CEO product from the MMACC may illustrate this contrast more effectively. FIGS. 10-22A and 22B will provide example CEO structures and show relative performances to such funds.

FIG. 10 show a datagraphs illustrating a CEO structure for the MMACC. The CEO includes 3 slices: an income fund slice 1001, growth and income slice 1002, and a capital appreciation slice 1003. Constituent assets 1004 are compared across a risk spectrum 1005 and returns rates 1006. FIG. 11 show a datagraphs illustrating a CEO structure values for the MMACC. FIG. 12 show a calculation worksheet actual 1970 CEO structure values for the MMACC. FIGS. 13-14 show graphs of a range of outcomes from 1961-2008 of average annual returns and volatility for the example CEO structure for the MMACC. FIG. 15 shows a graph of a range of outcomes from 1961-2008 of average annual returns and volatility with risk shifted by changing tranche allocations for the example CEO structure for the MMACC. FIG. 16 shows a graph of a range of outcomes from 1961-2008 of average 5 year cumulative returns and volatility for the example CEO structure for the MMACC. FIG. 17 shows a graph of a trailing 5 year MMACC tranche correlations with the S&P 500 for the example CEO structure for the MMACC. FIGS. 18, 19A-19D show graphs of a annual return and cumulative value of a 2003-2007 tranche for the example CEO structure for the MMACC. FIG. 20 shows a block diagram illustrating example tranche outcomes for a $300 M fund with 5% yield for the example CEO structure for the MMACC. FIG. 21A-B shows a graph illustrating dividends received by tranche vs. dividends received in a given year, as an option (income) for the example CEO structure for the MMACC. FIG. 22A-22B shows a graph illustrating dividends received by tranche vs. dividends received in a given year, as an option (capital) for the example CEO structure for the MMACC.

FIG. 24 shows a block diagram illustrating example equity strips high-level schematic. In this example, a master trust with $100 million of S&P 500 Index Fund may be utilized for creation and/or redemption of D shares and P shares. In one embodiment, one D share and one P share may be created for each S&P 500 Index Fund share, and/or one D share and one P share may be redeemed for a share of S&P 500 Index Fund. D shares receive dividends from the master trust during the 20 year term and may be priced at approximately $33 per share. In one embodiment, D shares have no residual value (no principal is returned at maturity), and over the 20 year term their value declines on average 5% per year until they are worth nothing. P shares receive proceeds (principal) of the master trust after the 20 year term and may be priced at approximately $67 per share. In one embodiment, P shares are designed to have a value at the end of the 20 year term that is more than what was put in ($100 million), but there is no guarantee of return of principal.

FIG. 25 shows a datagraph illustrating example embodiments of the MMACC. It is an alternative embodiment that shows asset buyers 1 and 2 2587 may have their funds pooled to buy an initial portfolio 2502. For some term of years 1 thru T 2504, the MMACC will distribute (e.g., dividend) income to tranche 1 2508, and then at maturity 2506, the positions will be sold and proceeds will be distributed to tranche 2 2510. One can create many CEO datastructure product permutations by manipulating the product parameter 'dials' to vary the structure of the tranches as specified in the CEO parameter message 102.

We can use a 'Vintage 2008' product parameter example to see the resulting products. With the equity strips CEO datastructure having the following values:

| Example product parameters for '2008 Vintage' example | |
|---|---|
| Underlying Portfolio | Large Cap U.S. Stocks |
| Number of Tranches | 2: Income, Capital Appreciation |
| Maturity date or length | 5 Years (12/31/2008-12/31/2013) |
| Tranche | Tranche 1 (Income)/Tranche 2 (Capital Appreciation) |
| Funds Raised | $50,000,000/$250,000,000 |
| Dividend Upside | 100%/0% |
| Principal Upside | 0%/100% |

FIG. 26 shows a calculation worksheet illustrating embodiments of a 2008 vintage equity strips CEO datastructure parameters for the MMACC. It uses the above parameters showing tranche levels, income allocation, market value allocation, and portfolio market value.

FIG. 27 shows a datagraph companion to the worksheet illustrating embodiments of a 2008 vintage equity strips CEO datastructure parameters for the MMACC. Two tranches 2701 of $50,000,000 and $250,000,000 are pooled into a portfolio on Dec. 31, 2008 2702. Each year's distribution per tranche 2704 is broken down per FIG. 26's worksheet and with totals per year 2703. The aggregated total 2705 at maturity Dec. 31, 2013 is further broken out to show the income tranche returned no principal 2706, and the capital appreciation tranche benefited from growth 2707.

FIG. 28 shows a diagram illustrating example characteristics of D shares and P shares for the MMACC. FIGS. 29-33 show diagrams illustrating example applications of D shares and P shares for the MMACC. FIG. 30 shows that CEO product parameter 'dials' may be varied to create different types of products from D shares and/or P shares. In one embodiment, these products may facilitate trading growth for yield without borrowing money, credit risk, or duration risk. Thus, while a conventional index may be made up of a D share and a P share, an enhanced yield equity product may be made up of two D shares and one P share. As shown in this example, the enhanced yield product would have a higher yield but lower growth. It should be noted that D shares and/or P shares may be combined into derivatives and synthetics to track various asset types (e.g., stocks/equities, bonds/income streams, indexes (e.g., S&P 500), funds, commodities (e.g., gold), real assets (e.g., goods, real property), etc.). FIG. 32 shows how CEO product parameter 'dials' may be varied to obtain diversification benefits. The correlation charts illustrate that while there is strong correlation between US and foreign prices, there is a weak or negative correlation between US and foreign dividend payouts. D shares and P shares may be created on a wide variety of US and foreign indices, and may be combined (e.g., US P shares and foreign D shares) to create a product that provides strong diversification benefits. It is to be understood that D shares and P shares may be combined in a variety of ways to obtain higher yields, higher growth, diversification benefits, and/or the like based on investment objectives of assets buyers.

FIG. 34 shows a diagram illustrating example embodiment of relationship between D shares and P shares for the MMACC. FIG. 35 shows a diagram illustrating example embodiment of relationship between prices of D shares and P shares for the MMACC. FIGS. 36-38 show diagrams illustrating example embodiments of effects of dividend yield for the example equity strips CEO datastructure for the MMACC. FIG. 39 shows a diagram illustrating historical performance of D shares, P shares, and S&P 500 TR Index for the example equity strips CEO datastructure for the MMACC. FIGS. 40-41 show diagrams illustrating example embodiments of effects of dividend yield assumptions on D share price for the example equity strips CEO datastructure for the MMACC. FIGS. 42-46 show diagrams illustrating example embodiments of results using rolling 5 year dividend yields for the example equity strips CEO datastructure for the MMACC. FIGS. 47-51 show diagrams illustrating example embodiments of results using current year dividend yields for the example equity strips CEO datastructure for the MMACC.

FIGS. 52-53 show diagrams illustrating example embodiments of D shares and sequence of return risk for the example equity strips CEO datastructure for the MMACC. FIG. 52 shows that sequence of returns is a big risk for retirees that can result in a retiree's portfolio running out of money prematurely. For example, a person who retired in 1972 with a balanced portfolio would have run out of money by the $16^{th}$ year or with an all stock portfolio by the $12^{th}$ year. FIG. 53 shows that D shares are immune to sequence of return risk and that the retiree would achieve much better results using a portfolio of D shares. FIG. 54 shows a diagram illustrating example embodiments of D shares and historical performance for the example equity strips CEO datastructure for the MMACC.

FIGS. 55-58 show diagrams illustrating example embodiments of P shares and convexity for the example equity strips CEO datastructure for the MMACC. The FIG. illustrate that convexity provides P shares with more upside than downside.

Figure 60:
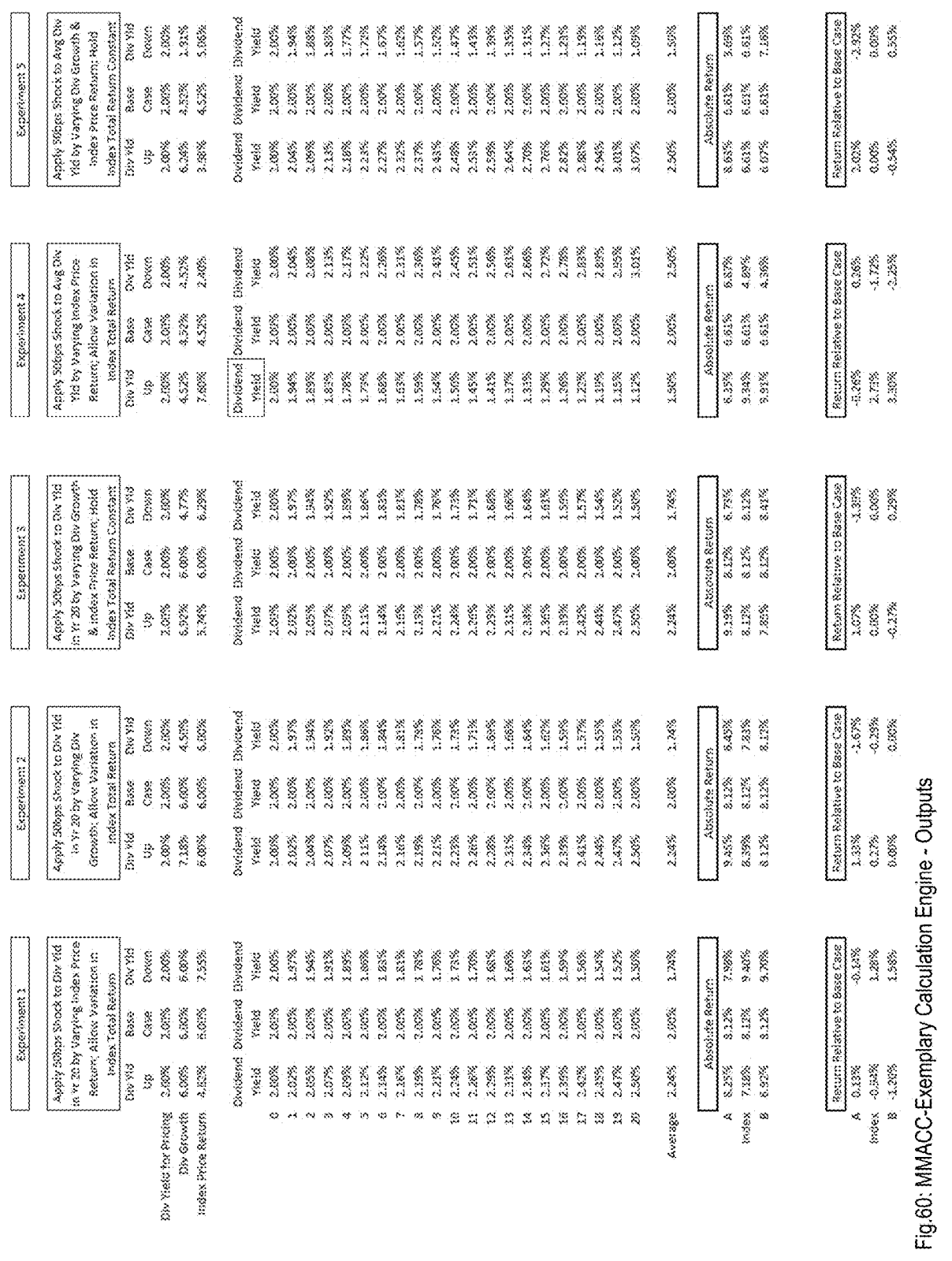

FIGS. 59-60 show screenshots illustrating an example embodiment of a calculation engine and its user interface for the MMACC. In one embodiment, this calculation engine may be utilized to analyze prospective returns. FIGS. 61-63D show screenshots illustrating another example embodiment of a calculation engine and its user interface for the MMACC. In one embodiment, this calculation engine may be utilized to analyze prospective returns and/or to reconstruct historical returns.

FIG. 64 shows a datagraph illustrating example embodiments of assured income data flow for the MMACC. The datagraph shows interactions between users 6486a and their client devices 6486b, a MMACC server(s) 6499, market/3$^{rd}$ party server(s) 6498, and assured income (AI) solution buyers (e.g., retirees) 6487a and their client devices 6487b. In one embodiment, the market server 6498 may be incorporated into the MMACC itself. Users may be administrators, brokers, marketmakers, computerized systems, and/or the like 6486a. Users can create MMACC datastructures and accompanying new AI solutions, e.g., users can provide specifications and parameters for new AI solutions.

As part of creation of new AI solutions, the users may specify MMACC AI parameters such as available capital, term length, desired base cash flow payments, bonus cap, risk preferences, capital markets assumptions, deferred income annuity (DIA) preferences, AI solution constituent products preferences, and/or the like. Users 6486a may provide MMACC AI parameters 6401 via their client devices 6486b (e.g., app/web based client with web forms for parameter specification). The client device 6486b may then in turn provide an AI datastructure parameters message 6405 to the MMACC which may be used by the AI solution configuring component 6409 (e.g., see FIG. 65 for more details) to create a new AI solution. In one embodiment, the client may provide the following example AI datastructure parameters message 6405, substantially in the form of a HTTP(S) POST message including XML-formatted data, as provided below:

```
POST /authrequest.php HTTP/1.1
Host: www.server.com
Content-Type: Application/XML
Content-Length: 667
<?XML version = "1.0" encoding = "UTF-8"?>
<CEO_parameter_message>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MMACC.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
```

```
            <client_version>534.30</client_version>
        </client_details>
        <client_details> //Mac Desktop with Webbrowser
            <client_IP>10.0.0.123</client_IP>
            <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
            <client_product_type>MacPro5,1</client_product_type>
            <client_serial_number>YXXXXXXXXXZ</client_serial_number>
            <client_UDID>FXXXXXXXXXX-XXXX-XXXX-XXXX-XXXXXXXXXXXXX</client_UDID>
            <client_OS>Mac OS X</client_OS>
            <client_OS_version>10.9.3</client_OS_version>
            <client_app_type>web browser</client_app_type>
            <client_name>Mobile Safari</client_name>
            <client_version>537.75.14</client_version>
        </client_details>
        <AI_datastructure>
            <AI_Parameters>
                <AI_Name>myCoolAISolutionName</AI_Name>
                <AvailableCapital>$1M</AvailableCapital>
                <TermLength>20 Years</TermLength>
                <BonusCap>50% of base cash flows</BonusCap>
            </AI_Parameters>
            <RiskPreferences>
                <FailureProbability>10%</FailureProbability>
                <CriticalFailureProbability>1%</CriticalFailureProbability>
            </RiskPreferences>
            <CapitalMarketsAssumptions>
                <HistoricalData>historical_data. CMA</HistoricalData>
                <Inflation>2%</Inflation>
                <NomOrReal>Nominal</NomOrReal>
            </CapitalMarketsAssumptions>
            <DIA Preferences>
                <UseDIA>TRUE</UseDIA>
                <DIA_Amount>$50K per year</DIA_Amount>
                <DIA_StartDate>In 20 years</DIA_StartDate>
                <AllowDIA_Acceleration>TRUE</AllowDIA_Acceleration>
            </DIA_Preferences>
            <ConstituentProductsPreferences>
                <Product>
                    <Name>D shares of S&P 500</Name>
                    <Percentage>Up to 10% of AI solution</Percentage>
                </Product>
...
            </ConstituentProductsPreferences>
...
        </AI_datastructure>
...
</AI_parameters_message>
```

An asset purchase order 6413 may be sent to the $3^{rd}$ party server and/or market servers 6498 to facilitate purchase of AI constituent product(s) and/or DIA product(s). In one implementation, the asset purchase order may include data such as a purchase identifier, a security identifier, an order type, a quantity, a price, and/or the like. For example, the MMACC application server may provide the following example order request, substantially in the form of a HTTP(S) POST message including XML-formatted data, as provided below:

POST/asset_purchase_order.php HTTP/1.1
Host: www.server.com
Content-Type: Application/XML
Content-Length: 667
<?XML version="1.0" encoding="UTF-8"?>
<asset_purchase_order>
    <order_identifier>ID_Order1</order_identifier>
    <security>D shares of S&P 500</security>
    <order_type>limit order</order_type>
    <quantity>1000 shares</quantity>
    <price>$33</price>
</asset_purchase_order>

The $3^{rd}$ party server and/or market servers 6498 may send an order response 6417 to the MMACC server. The order response may be used to inform the MMACC server that the order has been processed. For example, the order response may be formatted according to the XML. An example order response, substantially in the form of a HTTP(S) POST message including XML-formatted data, is provided below:

POST/order_response.php HTTP/1.1
Host: www.server.com
Content-Type: Application/XML
Content-Length: 667
<?XML version="1.0" encoding="UTF-8"?>
<order_response>
    <response_identifier>ID_Response1</response_identifier>
    <status>0K</status>
</order_response>

The MMACC may seek to make distributions according to AI solution buyers' secured rights. The assured income distribution component 6421 (e.g., see FIG. 66 for more details) may be utilized to make distributions. Upon determining distributions, the assured income distribution component 6421 may issue an income distribution message 6425 and/or facilitate distribution of funds to the AI solution buyers based on the performance of the AI solution, and as such, the AI solution buyers 6487*a* may obtain an income distribution message output 6429 informing them of such distribution.

FIG. 65 shows a logic flow diagram illustrating embodiments of an assured income solution configuring component for the MMACC. In FIG. 65, an AI solution configuration request may be obtained at 6501. For example, a user may wish to configure a new AI solution for an AI solution buyer (e.g., a retiree). Accordingly, the AI solution configuration request may be obtained as a result of receiving an AI datastructure/parameters message from the user.

AI parameters may be determined at 6505. In one implementation, the AI datastructure/parameters message may be parsed (e.g., using PHP commands) to determine AI parameters. For example, AI parameters may include available capital (e.g., amount of capital the retiree wishes to invest into the AI solution), term length (e.g., the number of years, such as 20, during which the AI solution should provide payments), desired base cash flow payments (e.g., the dollar amount or percentage of the available capital to pay out annually), bonus cap (e.g., to limit maximum bonus payment amount to a percentage of the base cash flow payment—additional gains above the bonus cap may be reinvested to increase the chances that the retiree will get base cash flow payments and/or bonus payments in future years), and/or the like.

Applicable AI constituent products may be identified at 6509. In one implementation, the AI parameters may be used to identify applicable AI constituent products (e.g., products from which AI constituent products may be selected). For example, term length may be used to identify products that have similar duration (e.g., D shares of S&P 500 with a 20 year maturity period). In another implementation, other parameters, such as risk preferences and constituent product preferences, may be used to identify applicable AI constituent products. For example, risk preferences (e.g., volatility preferences, sector preferences, geographic preferences, glide path preferences) may be used to determine which products would be too risky (e.g., products having high volatility) and which products would be OK to use for the AI solution. In another example, constituent product preferences may specify which products to use and/or the extent (e.g., minimum and/or maximum percentage of the AI solution) to which a product may be used in the AI solution.

Capital markets assumptions may be determined at 6513. In one implementation, capital markets assumptions may include preferences regarding data to use when estimating market performance. In another implementation, capital markets assumptions may include preferences regarding whether to calculate nominal or real values, and/or which rate of inflation to use in calculations of real values.

Risk framework to utilize may be determined at 6517. In one implementation, risk framework preferences may include failure probability (e.g., probability, such as 10%, that the AI solution runs out of money before the end of the term length) to use in calculations. In another implementation, risk framework preferences may include critical failure probability (e.g., probability, such as 1%, that the AI solution runs out of money 5 or more years before the end of the term length) to use in calculations. It is to be understood that the critical failure probability may be defined with regard to any other length of time and is not limited to 5 or more years.

Supported AI cash flows may be calculated at 6521. In one embodiment, determined parameters, assumptions, frameworks, and/or the like inputs may be used to calculate supported AI cash flows. In one implementation, a calculation engine written in MATLAB programming language may be used to perform calculations utilized to determine supported AI cash flows. For example, the following inputs may be used:
    Using Available Capital of: 1%% In Millions
    Using Base Cash Flow Payment of: 0.055%% In Millions
    Using Returns from:DATA_2015.CMA
    Using Bonus Cap of: 0.2%% 20%
    Using Term Length of: 30%% In Years
    Using Nominal//Real:R %% Real
    Using Simulation Size of: 10000

Using the above inputs, the calculation engine may perform the requested 10,000 simulations and provide the following output:
    Number of Simulations:10000
    Number of Successes: 7881%% 78.81%
    Number of Failures: 2119%% 21.19%
    Number of Critical Failures: 1213%% 12.13%

If, as shown for the example above, it is determined at 6525 that the AI cash flows are not acceptable, updated AI parameters may be obtained at 6529. In one embodiment, AI cash flows may be unacceptable because the failure probability (e.g., 21.19% vs. specified maximum of 10%) and/or critical failure probability (e.g., 12.13% vs. specified maximum of 1%) are too high (e.g., the risk of running out of money is too high) or too low (e.g., higher cash flows may be realized without exceeding acceptable risk). In another embodiment, in which the calculation engine calculates a supported base cash flow payment based on other inputs, AI cash flows may be unacceptable because the calculated supported base cash flow payment fails to exceed a threshold amount (e.g., too low). If the AI cash flows are not acceptable, updated AI parameters and/or assumptions, frameworks, and/or the like inputs may be obtained and used to recalculate supported AI cash flows. For example, updated available capital (e.g., $1.2 M instead of $1 M), term length (e.g., 25 years instead of 30 years), desired base cash flow payments (e.g., $50K instead of $55K), and/or the like inputs may be obtained. In another example, updated failure probability preferences (e.g., 12% instead of 10%), critical failure probability preferences (e.g., 1.5% that the AI solution runs out of money 6 or more years before the end of the term length instead of 1% that the AI solution runs out of money 5 or more years before the end of the term length), and/or the like inputs may be obtained.

If it is determined at 6525 that the AI cash flows are acceptable, a determination may be made at 6531 (e.g., by parsing the AI datastructure/parameters message) whether a longevity hedge is desired. For example, the retiree may desire a longevity hedge to provide protection against outliving income provided by the AI. In one embodiment, a longevity hedge may be provided using a deferred income annuity (DIA). In some implementations, a DIA's payments may be accelerated (e.g., payments may begin earlier, but they will be reduced).

If it is determined that a longevity hedge is desired, an applicable DIA solution may be identified at 6533. In one implementation, the AI datastructure/parameters message may be parsed to determine the size of a DIA solution desired by the retiree. Accordingly, an applicable DIA solution may be identified that corresponds to the desired DIA size (e.g., $55K per year). In another implementation, a DIA solution that substantially corresponds (e.g., based on rounding) to the size of the calculated supported base cash flow payments may be identified. For example, if DIA solutions are available providing $50K per year and $55 per year, and the calculated supported base cash flow payments are $52K per year, the DIA solution providing $50K per year may be selected.

A determination may be made at 6537 (e.g., by parsing the AI datastructure/parameters message) whether to optimize the determined AI and DIA solutions. As the term of an AI solution increases its cost (e.g., available capital to support AI cash flows) increases, and as the deferment period of a DIA solution increases its cost decreases. Thus, there is an optimal point at which the cost vs. term length curve of an AI solution and the cost vs. deferment period curve of a DIA solution intersect, and at which the cost of the combined AI and DIA solutions is minimized. If it is determined that the determined AI and DIA solutions should be optimized, the optimized term length for the AI solution may be determined at 6541 and the optimized deferment period for the DIA solution may be determined at 6545 based on the optimal point, and the determined AI and DIA solutions may be adjusted (e.g., applicable AI constituent products may be adjusted based on the optimized term length) based on the optimization at 6549.

Purchase of the DIA solution may be facilitated at 6553. Purchase of the AI solution may be facilitated at 6557. In one implementation, AI constituent products may be selected (e.g., based on glide path preferences) and purchased as part of purchasing the AI solution. One or more asset purchase orders may be sent to facilitate purchase of AI and/or DIA solutions.

FIG. 66 shows a logic flow diagram illustrating embodiments of an assured income distribution component for the MMACC. The assured income distribution component initializes at 6601. A determination may be made at 6605 whether more payment periods are remaining for AI and/or DIA solutions. In one implementation, if an AI solution buyer (e.g., a retiree) purchased an AI solution and/or a DIA solution, this determination may be made based on whether there remain more AI solution payments to make (e.g., monthly for 20 years) and/or a whether there remain more DIA solution payments to make (e.g., monthly until death after a 20-year deferment period).

If it is determined that there are more payment periods remaining, a determination may be made at 6609 whether the retiree or the retiree's beneficiary wishes to withdraw principal. For example, the retiree may wish to terminate the AI solution early and withdraw the remaining capital. In another example, the beneficiary may wish to withdraw the remaining capital if the retiree dies before the expiration of the AI solution's term. If it is determined that the retiree or the retiree's beneficiary wishes to withdraw principal, remaining principal balance may be determined at 6613 and principal distribution may be facilitated at 6617. For example, AI constituent products may be sold and the resulting funds may be distributed to the retiree or the retiree's beneficiary (e.g., an income distribution message may be sent).

If it is determined that the retiree or the retiree's beneficiary does not wish to withdraw principal, a determination may be made at 6621 whether it is time to make an AI payment. In various implementations, AI payments may be made biweekly, monthly, annually, and/or the like. If it is determined that it is time to make an AI payment to the retiree, the base cash flow payment (salary payment) may be determined at 6625. For example, the base cash flow payment may be obtained via a MySQL database command similar to the following:

SELECT AI_BaseCashFlowPayment
FROM AI
WHERE AI_ID="ID_AI_1";

A determination may be made at 6629 whether there are sufficient AI funds to make the salary payment. For example, the AI solution's remaining principal balance may be ascertained to determine whether sufficient AI funds exist. If it is determined that sufficient AI funds exist, a determination may be made at 6633 whether a minimum required distribution (MRD) adjustment should be made. In one implementation, if the AI solution is treated as a retirement account that has MRD requirements (e.g., specified by the IRS) and the salary payment is insufficient to satisfy MRD requirements (e.g., because the AI solution performed better than expected), the salary payment may be recalculated at 6637 to satisfy MRD requirements.

AI bonus payment may be calculated at 6641. In one implementation, the AI solution's actual performance (e.g., remaining principal balance) may be compared with the AI solution's expected performance (e.g., expected principal balance at the time of the AI payment), and, if the actual performance is better than the expected performance (e.g., more principal remains than expected), the overage may be treated as a bonus payment. If there is no overage, no bonus payment may be made. It is to be understood that bonus payments may be made using the same schedule or different schedule from the salary payments. For example, both salary and bonus payments may be calculated and made monthly. In another example, salary payments may be made biweekly, while bonus payments may be made annually. A determination may be made at 6645 whether a cap on the bonus payment has been specified (e.g., by checking the AI_BonusCap field of the AI table using a SQL statement). If a cap has been specified, the allowed (e.g., annual) bonus payment (e.g., up to 50% of the annual amount of salary payments) may be calculated. For example, the following pseudo code may be used:

bonus cap amount=bi-weekly salary×26 annual payments×0.5 bonus cap
if (calculated bonus payment<bonus cap amount)
  allowed bonus payment=calculated bonus payment
else
  allowed bonus payment=bonus cap amount Any undistributed bonus amount above the bonus cap may be reinvested at 6653. For example, fewer AI constituent products may be sold than would have been sold without the cap. In another example, some of the AI principal held in lower risk/reward constituent products may be reinvested into higher risk/reward constituent products. Salary payment and/or bonus payment distribution may be facilitated at 6657. For example, some of the AI constituent products may be sold and the resulting funds may be distributed to the retiree (e.g., an income distribution message may be sent).

If it is determined that sufficient AI funds to make the salary payment do not exist, DIA payment time may be accelerated at 6661. Accordingly, the retiree will not run out of money because DIA payments will begin earlier to make up for AI solution's failure, though the DIA payments will be smaller than if the full deferment period had elapsed.

If it is determined that it is not time to make an AI payment or if DIA payment time is accelerated, a determination may be made at 6665 whether it is time to make a DIA payment (e.g., by checking the DIA_StartDate field of the AI table using a SQL statement). If it is determined that it is time to make a DIA payment to the retiree, the DIA payment may be calculated at 6669 (e.g., based on whether or not the DIA payment time was accelerated, by checking the DIA_Amount field of the AI table using a SQL statement). DIA payment distribution may be facilitated at 6673. For example, funds from the DIA solution may be distributed to the retiree (e.g., an income distribution message may be sent).

FIG. 67 shows a diagram illustrating example embodiments of assured income value proposition for the MMACC. The figure shows that AI solutions offer a unique combination of benefits include higher cash flow, flexibility and control over the principal, and an optional longevity hedge.

FIG. 68 shows a diagram illustrating example embodiments of assured income structure for the MMACC. The figure shows that an AI solution buyer is provided with a base payment and a bonus that replicate the AI solution buyer's experience of receiving a salary and a bonus during the working years.

FIG. 69 shows a diagram illustrating example embodiments of assured income period-certain solution for the MMACC. The figure shows how base cash flow payments, bonus payments, and asset principal balance may work for a period-certain 20-year AI solution.

FIG. 70 shows a diagram illustrating example embodiments of assured income 20-year payout estimates for the MMACC.

FIG. 71 shows a diagram illustrating example embodiments of assured income lifetime solution for the MMACC. The figure shows how base cash flow payments, bonus payments, asset principal balance, and longevity hedge payments may work for a lifetime solution that includes a period-certain 20-year AI solution and a DIA solution.

FIG. 72 shows a diagram illustrating example embodiments of assured income adaptive payout structure for the MMACC. The figure shows when bonus payments are paid and when bonus payments are not paid.

FIG. 73 shows a diagram illustrating example embodiments of assured income shortfall risk for the MMACC. The figure shows that AI solutions have a shorter failure tail (less likely to fail a long time before the end of their term) than other solutions.

FIG. 74 shows a diagram illustrating example embodiments of assured income and deferred income annuity for the MMACC. The figure shows various configuration options available for DIA solutions.

FIG. 75 shows a diagram illustrating example embodiments of assured income payout estimates—nominal for the MMACC.

FIG. 76 shows a diagram illustrating example embodiments of assured income payout estimates—real for the MMACC.

FIG. 77 shows a diagram illustrating example embodiments of assured income historical performance for the MMACC. The figure shows a realized payouts for the first 13 out of 20 years for an AI solution.

MMACC Controller

FIG. 23 shows a block diagram illustrating embodiments of a MMACC controller. In this embodiment, the MMACC controller 2301 may serve to aggregate, process, store, search, serve, identify, instruct, generate, match, and/or facilitate interactions with a computer through information technology technologies, and/or other related data.

Typically, users, which may be people and/or other systems, may engage information technology systems (e.g., computers) to facilitate information processing. In turn, computers employ processors to process information; such processors 2303 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2329 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the MMACC controller 2301 may be connected to and/or communicate with entities such as, but not limited to: one or more users from peripheral devices 2312 (e.g., user input devices 2311); an optional cryptographic processor device 2328; and/or a communications network 2313.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The MMACC controller 2301 may be based on computer systems that may comprise, but are not limited to, components such as: a computer systemization 2302 connected to memory 2329.

Computer Systemization

A computer systemization 2302 may comprise a clock 2330, central processing unit ("CPU(s)" and/or "processor(s)" (these terms are used interchangeable throughout the disclosure unless noted to the contrary)) 2303, a memory 2329 (e.g., a read only memory (ROM) 2306, a random access memory (RAM) 2305, etc.), and/or an interface bus 2307, and most frequently, although not necessarily, are all interconnected and/or communicating through a system bus 2304 on one or more (mother)board(s) 2302 having conductive and/or otherwise transportive circuit pathways through which instructions (e.g., binary encoded signals) may travel to effectuate communications, operations, storage, etc. The computer systemization may be connected to a power source 2386; e.g., optionally the power source may be internal. Optionally, a cryptographic processor 2326 may be connected to the system bus. In another embodiment, the cryptographic processor, transceivers (e.g., ICs) 2374, and/or sensor array (e.g., accelerometer, altimeter, ambient light, barometer, global positioning system (GPS) (thereby allowing MMACC controller to determine its location), gyroscope, magnetometer, pedometer, proximity, ultra-violet sensor, etc.) 2373 may be connected as either internal and/or external peripheral devices 2312 via the interface bus I/O 2308 (not pictured) and/or directly via the interface bus 2307. In turn, the transceivers may be connected to antenna(s) 2375, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom BCM43341 transceiver chip (e.g., providing 2G, 3G and 4G LTE cellular communications; 802.11 g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large super-computer(s) and mainframe(s) computers, down to mini computers, servers, desktop computers, laptops, thin clients (e.g., Chromebooks), netbooks, tablets (e.g., iPads, Android and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2329 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the MMACC controller and beyond through various interfaces. Should processing requirements dictate a greater amount speed and/or capacity, distributed processors (e.g., Distributed MMACC), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the MMACC may be achieved by implementing a microcontroller such as CAST's R8051XC2 microcontroller; Intel's MCS 51 (i.e., 8051 microcontroller); and/or the like. Also, to implement certain features of the MMACC, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the MMACC component collection (distributed or otherwise) and/or features may be implemented via the microprocessor and/or via embedded components; e.g., via ASIC, coprocessor, DSP, FPGA, and/or the like. Alternately, some implementations of the MMACC may be implemented with embedded components that are configured and used to achieve a variety of features or signal processing.

Depending on the particular implementation, the embedded components may include software solutions, hardware solutions, and/or some combination of both hardware/software solutions. For example, MMACC features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the MMACC features. A hierarchy of programmable interconnects allow logic blocks to be interconnected as needed by the MMACC system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the MMACC may be developed on regular FPGAs and then migrated into a fixed version that more resembles ASIC implementations. Alternate or coordinating implementations may migrate MMACC controller features to a final ASIC instead of or in addition to FPGAs. Depending on the implementation all of the aforementioned embedded components and microprocessors may be considered the "CPU" and/or "processor" for the MMACC.

Power Source

The power source 2386 may be of any standard form for powering small electronic circuit board devices such as the following power cells alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2386 is connected to at least one of the interconnected subsequent components of the MMACC thereby providing an electric current to all subsequent components. In one example, the power source 2386 is connected to the system bus component 2304. In an alternative embodiment, an outside power source 2386 is provided through a connection across the I/O 2308 interface. For example, a USB and/or IEEE 1394 connection carries both data and power across the connection and is therefore a suitable source of power.

Interface Adapters

Interface bus(ses) 2307 may accept, connect, and/or communicate to a number of interface adapters, conventionally although not necessarily in the form of adapter cards, such as but not limited to: input output interfaces (I/O) 2308, storage interfaces 2309, network interfaces 2310, and/or the like. Optionally, cryptographic processor interfaces 2327 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X), PCI Express, Personal Computer Memory Card International Association (PCMCIA), and/or the like.

Storage interfaces 2309 may accept, communicate, and/or connect to a number of storage devices such as, but not limited to: storage devices 2314, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2310 may accept, communicate, and/or connect to a communications network 2313. Through a communications network 2313, the MMACC controller is accessible through remote clients 2333b (e.g., computers with web browsers) by users 2333a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., Distributed MMACC), architectures may similarly be employed to pool, load balance, and/or otherwise decrease/increase the communicative bandwidth required by the MMACC controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 2310 may be used to engage with various communications network types 2313. For example, multiple network interfaces may be employed to allow for the communication over broadcast, multicast, and/or unicast networks.

Input Output interfaces (I/O) 2308 may accept, communicate, and/or connect to user, peripheral devices 2312 (e.g., input devices 2311), cryptographic processor devices 2328, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 2312 may be connected and/or communicate to I/O and/or other facilities of the like such as network interfaces, storage interfaces, directly to the interface bus, system bus, the CPU, and/or the like. Peripheral devices may be external, internal and/or part of the MMACC controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 2311 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the MMACC controller may be embodied as an embedded, dedicated, and/or monitor-less (i.e., headless) device, wherein access would be provided over a network interface connection.

Cryptographic units such as, but not limited to, microcontrollers, processors 2326, interfaces 2327, and/or devices 2328 may be attached, and/or communicate with the MMACC controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other i8 Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 2329. However, memory is a fungible technology and resource, thus, any number of memory embodiments may be employed in lieu of or in concert with one another. It is to be understood that the MMACC controller and/or a computer systemization may employ various forms of memory 2329. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 2329 will include ROM 2306, RAM 2305, and a storage device 2314. A storage device 2314 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 2329 may contain a collection of program and/or database components and/or data such as, but not limited to: operating system component(s) 2315 (operating system); information server component(s) 2316 (information server); user interface component(s) 2317 (user interface); Web browser component(s) 2318 (Web browser); database(s) 2319; mail server component(s) 2321; mail client component(s) 2322; cryptographic server component(s) 2320 (cryptographic server); the MMACC component(s) 2335; and/or the like (i.e., collectively a component collection). These components may be stored and accessed from the storage devices and/or from storage devices accessible through an interface bus. Although non-conventional program components such as those in the component collection, typically, are stored in a local storage device 2314, they may also be loaded and/or stored in memory such as: peripheral devices, RAM, remote storage facilities through a communications network, ROM, various forms of memory, and/or the like.

Operating System

The operating system component 2315 is an executable program component facilitating the operation of the MMACC controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the MMACC controller to communicate with other entities through a communications network 2313. Various communication protocols may be used by the MMACC controller as a subcarrier transport mechanism for interaction, such as, but not limited to: multicast, TCP/IP, UDP, unicast, and/or the like.

Information Server

An information server component 2316 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the MMACC controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the MMACC database 2319, operating systems, other program components, user interfaces, Web browsers, and/or the like.

Access to the MMACC database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the MMACC. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the MMACC as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome; Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 2317 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2318 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the MMACC enabled nodes. The combined application may be nugatory on systems employing standard Web browsers.

Mail Server

A mail server component 2321 is a stored program component that is executed by a CPU 2303. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the MMACC. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the MMACC mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2322 is a stored program component that is executed by a CPU 2303. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2320 is a stored program component that is executed by a CPU 2303, cryptographic processor 2326, cryptographic processor interface 2327, cryptographic processor device 2328, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the MMACC may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the MMACC component to engage in secure transactions if so desired. The cryptographic component facilitates the secure accessing of resources on the MMACC and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The MMACC Database

The MMACC database component 2319 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, opensource Hadoop, opensource VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the MMACC database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the MMACC database is implemented as a data-structure, the use of the MMACC database 2319 may be integrated into another component such as the MMACC component 2335. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 2319 includes several tables 2319*a-z*:

An accounts table 2319*a* includes fields such as, but not limited to: an accountID, accountOwnerID, accountContactID, assetIDs, deviceIDs, paymentIDs, transactionIDs, userIDs, CEO_ID, SliceTypeID, accountType (e.g., agent, entity (e.g., corporate, non-profit, partnership, etc.), individual, etc.), accountCreationDate, accountUpdateDate, accountName, accoun tNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 2319*b* includes fields such as, but not limited to: a userID, userSSN, taxID, userContactID, accountID, assetIDs, deviceIDs, paymentIDs, transactionIDs, CEO_ID, SliceTypeID, userType (e.g., MMACC product user, asset buyer, agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a MMACC);

An devices table 2319*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppinstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 2319*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 2319e includes fields such as, but not limited to: assetID, accountID, userID, distributorAccountID, distributorPaymentID, distributorOnwerID, CEO_ID, SliceTypeID, assetType, assetName, assetCode, assetQuantity, assetCost, assetPrice, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetConditions, initialCost, currentValue, initialQuarterlyDividend, currentQuarterlyDividend, purchaseTime, alpha, beta, currentYield, totalReturn, assetDShareID, assetDSharePrice, assetDShareValue, assetDSharePriceHis tory, assetDShareBidAsk, assetPShareID, assetPSharePrice, assetPShareValue, assetPSharePriceHistory, assetPShareBidAsk, and/or the like;

A payments table 2319f includes fields such as, but not limited to: paymentID, accountID, userID, CEO_ID, SliceTypeID, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 2319g includes fields such as, but not limited to: transactionID, accountID, assetIDs, deviceIDs, paymentIDs, trans actionIDs, userID, merchantID, CEO_ID, SliceTypeID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 2319h includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An CEO table 2319i includes fields such as, but not limited to: CEO_ID, sliceID, CEO_Name, SliceType, SliceName, assetID, accountID, userID, distributorAccountID, distributorPaymentID, distributorOnwerID, priority, fundsRaised, FixedYield, YieldUpside, and/or the like;

An SliceType table 2319j includes fields such as, but not limited to: SliceTypeID, CEO_ID, sliceID, SliceType, SliceName, assetID, accountID, userID, distributorAccountID, distributorPaymentID, distributorOnwerID, priority, fundsRaised, FixedYield, YieldUpside, and/or the like;

An AI table 2319k includes fields such as, but not limited to: AI_ID, AI_Parameters, AI_Name, availableCapital, desiredBaseCashFlowPayment, AI_TermLength, AI_BonusCap, riskPreferences, AI_FailureProbability, AI_CriticalFailureProbability, capitalMarketAssumptions, historicalDataFile, inflationPercentage, NominalOrReal, DIA_Preferences, DIA_Amount, DIA_StartDate, allowDIA_Acceleration, AI_ConstituentProductsPreferences, AI_ConstituentProdutID, AI_ConstituentProductPercentage, AI_ExpectedPrincipalBalanceSpecification, AI_RemainingPrincipalBalance, AI_BaseCashFlowPayment, AI_PaymentTimePreferences, and/or the like;

A market_data table 2319z includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Dun & Bradstreet, Reuter's Tib, Triarch, etc.), for example, through Microsoft's Active Template Library and Dealing Object Technology's real-time toolkit Rtt.Multi.

In one embodiment, the MMACC database may interact with other database systems. For example, employing a distributed database system, queries and data access by search MMACC component may treat the combination of the MMACC database, an integrated data security layer database as a single database entity.

In one embodiment, user programs may contain various user interface primitives, which may serve to update the MMACC. Also, various accounts may require custom database tables depending upon the environments and the types of clients the MMACC may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2319a-z. The MMACC may be configured to keep track of various settings, inputs, and parameters via database controllers.

The MMACC database may communicate to and/or with other components in a component collection, including itself, and/or facilities of the like. Most frequently, the MMACC database communicates with the MMACC component, other program components, and/or the like. The database may contain, retain, and provide information regarding other nodes and data.

The MMACCs

The MMACC component 2335 is a stored program component that is executed by a CPU. In one embodiment, the MMACC component incorporates any and/or all combinations of the aspects of the MMACC that was discussed in the previous figures. As such, the MMACC affects accessing, obtaining and the provision of information, services, transactions, and/or the like across various communications networks. The features and embodiments of the MMACC discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the MMACC's features and facilities, and in many cases reduce the costs, energy consumption/requirements, and extend the life of MMACC's underlying infrastructure; this has the added benefit of making the MMACC more reliable. Similarly, many of the features and mechanisms are designed to be easier for users to use and access, thereby broadening the audience that may enjoy/employ and exploit the feature sets of the MMACC; such ease of use also helps to increase the reliability of the MMACC. In addition, the feature sets include heightened security as noted via the Cryptographic components 2320, 2326, 2328 and throughout, making access to the features and data more reliable and secure The MMACC transforms collateralized equity obligation structure parameters, asset search, tranche selections inputs, via MMACC components (e.g., pool tranche instantiation 2341, tranche asset transact 2342, distribute income tranche 2343, distribute principal tranche 2344 of FIG. 23), into asset income distribution message, principal distribution message outputs.

The MMACC component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the MMACC server employs a cryptographic server to encrypt and decrypt communications. The MMACC component may communicate to and/or with other components in a component collection, including itself, and/or facilities of the like. Most frequently, the MMACC component communicates with the MMACC database, operating systems, other program components, and/or the like. The MMACC may contain, communicate, generate, obtain, and/or provide program component, system, user, and/or data communications, requests, and/or responses.

Distributed MMACCs

The structure and/or operation of any of the MMACC node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the MMACC controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RAE), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the MMACC controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address='192.168.0.100';
$port=255;
// create a server-side SSL socket, listen for/accept incoming communication $sock=socket_create(AF_INET, SOCK_STREAM, 0);
socket_bind($sock, $address, $port) or die('Could not bind to address');
socket_listen($sock);
$client=socket_accept($sock);
// read input data from client device in 1024 byte blocks until end of message
do {
  $input=" ";
  $input=socket_read($client, 1024);
  $data.=$input;
} while($input !="");
// parse data to extract variables
$obj=json_decode($data, true);
// store input data in a database
mysql_connect("201.408.185.132", $DBserver, $password); // access database server mysql_select("CLIENT_DB. SQL"); // select database to append
mysql_query("INSERT INTO UserTable (transmission) VALUES ($data)"); // add data to UserTable table in a CLIENT database
mysql_close("CLIENT_DB. SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm
IBMDI.doc/referenceguide295.htm
and other parser implementations:
http://publib.boulder.ibm.com/infocenter/tivihelp/v2r1/index.jsp?topic=/com.ibm .IBMDI.doc/referenceguide259.htm all of which are hereby expressly incorporated by reference.

Additional embodiments may include:

1. An MMACC matching apparatus, comprising:
a memory;
a component collection in the memory, including:
a pool tranche instantiation component, and
a tranche asset transact component;
a processor disposed in communication with the memory, and configured to issue a plurality of processing instructions from the component collection stored in the memory,
wherein the processor issues instructions from the pool tranche instantiation component, stored in the memory, to:
obtain, via at least one processor, a capital structure input from a system user, wherein the capital structure input is obtained via a first data structure that specifies dividend allocation and capital allocation for a first equity tranche, and dividend allocation and capital allocation for a second equity tranche;
determine, via at least one processor, dividend allocation and capital allocation for the first equity tranche, and dividend allocation and capital allocation for the second equity tranche;
generate, via at least one processor, a second data structure that maps dividend allocation and capital allocation of an index to the first equity tranche and to the second equity tranche based on the determined dividend allocation and capital allocation for the first equity tranche and the determined dividend allocation and capital allocation for the second equity tranche; and
facilitate, via at least one processor, generating an actionable data structure configured to be actionable to generate shares of the first equity tranche and shares of the second equity tranche using the generated second data structure.

2. The apparatus of embodiment 1, wherein the first data structure further specifies an identifier of the index.

3. The apparatus of embodiment 1, wherein the first data structure further specifies a size of investment into the index.

4. The apparatus of embodiment 3, wherein instructions to facilitate generating shares of the first equity tranche and shares of the second equity tranche further comprise instructions to:
purchase shares of the index based on the size of investment into the index; and
create a share of the first tranche and a share of the second tranche for each purchased share of the index.

5. The apparatus of embodiment 4, further, comprising:
the processor issues instructions from the tranche asset transact component, stored in the memory, to:
exchange a share of the index for a share of the first equity tranche and a share of the second equity tranche.

6. The apparatus of embodiment 4, further, comprising:
the processor issues instructions from the tranche asset transact component, stored in the memory, to:
exchange a share of the first equity tranche and a share of the second equity tranche for a share of the index.

7. The apparatus of embodiment 1, wherein the first equity tranche is configured to receive substantially all dividends associated with the index and the second equity tranche is configured to receive substantially all capital associated with the index.

8. The apparatus of embodiment 7, further, comprising:
the processor issues instructions from the pool tranche instantiation component, stored in the memory, to:
generate a third data structure, for a product, that maps at least one share of the first equity tranche and at least one share of the second equity tranche to a share of the product.

9. The apparatus of embodiment 8, wherein the product is an enhanced yield product that maps more shares of the first equity tranche than shares of the second equity tranche for each share of the product.

10. The apparatus of embodiment 8, wherein the product is an enhanced growth product that maps fewer shares of the first equity tranche than shares of the second equity tranche for each share of the product.

11. The apparatus of embodiment 7, further, comprising:
the processor issues instructions from the pool tranche instantiation component, stored in the memory, to:
generate a third data structure, for a product, that maps at least one share of the first equity tranche or at least one share of the second equity tranche, and at least one similarly configured share for a second index to a share of the product.

12. The apparatus of embodiment 11, wherein the index is a domestic index and the second index is a foreign index.

13. The apparatus of embodiment 7, further, comprising:
the processor issues instructions from the pool tranche instantiation component, stored in the memory, to:
generate a third data structure, for a product, that maps at least one share of the first equity tranche and at least one share configured as the second equity tranche for a second index to a share of the product.

14. The apparatus of embodiment 13, wherein the index is a domestic index and the second index is a foreign index.

15. The apparatus of embodiment 13, wherein the index is a foreign index and the second index is a domestic index.

16. A processor-readable MMACC matching non-transient physical medium storing processor-executable components, the components, comprising:
a component collection stored in the medium, including:
a pool tranche instantiation component, and
a tranche asset transact component;
wherein the pool tranche instantiation component, stored in the medium, includes processor-issuable instructions to:
obtain, via at least one processor, a capital structure input from a system user, wherein the capital structure input is obtained via a first data structure that specifies dividend allocation and capital allocation for a first equity tranche, and dividend allocation and capital allocation for a second equity tranche;
determine, via at least one processor, dividend allocation and capital allocation for the first equity tranche, and dividend allocation and capital allocation for the second equity tranche;
generate, via at least one processor, a second data structure that maps dividend allocation and capital allocation of an index to the first equity tranche and to the second equity tranche based on the determined dividend allocation and capital allocation for the first equity tranche and the determined dividend allocation and capital allocation for the second equity tranche; and
facilitate, via at least one processor, generating an actionable data structure configured to be actionable to generate shares of the first equity tranche and shares of the second equity tranche using the generated second data structure.

17. The medium of embodiment 16, wherein the first data structure further specifies an identifier of the index.

18. The medium of embodiment 16, wherein the first data structure further specifies a size of investment into the index.

19. The medium of embodiment 18, wherein instructions to facilitate generating shares of the first equity tranche and shares of the second equity tranche further comprise instructions to:
purchase shares of the index based on the size of investment into the index; and
create a share of the first tranche and a share of the second tranche for each purchased share of the index.

20. The medium of embodiment 19, further, comprising:
the tranche asset transact component, stored in the medium, includes processor-issuable instructions to:
exchange a share of the index for a share of the first equity tranche and a share of the second equity tranche.

21. The medium of embodiment 19, further, comprising:
the tranche asset transact component, stored in the medium, includes processor-issuable instructions to:
exchange a share of the first equity tranche and a share of the second equity tranche for a share of the index.

22. The medium of embodiment 16, wherein the first equity tranche is configured to receive substantially all dividends associated with the index and the second equity tranche is configured to receive substantially all capital associated with the index.

23. The medium of embodiment 22, further, comprising:
the pool tranche instantiation component, stored in the medium, includes processor-issuable instructions to:
generate a third data structure, for a product, that maps at least one share of the first equity tranche and at least one share of the second equity tranche to a share of the product.

24. The medium of embodiment 23, wherein the product is an enhanced yield product that maps more shares of the first equity tranche than shares of the second equity tranche for each share of the product.

25. The medium of embodiment 23, wherein the product is an enhanced growth product that maps fewer shares of the first equity tranche than shares of the second equity tranche for each share of the product.

26. The medium of embodiment 22, further, comprising:
the pool tranche instantiation component, stored in the medium, includes processor-issuable instructions to:
generate a third data structure, for a product, that maps at least one share of the first equity tranche or at least one share of the second equity tranche, and at least one similarly configured share for a second index to a share of the product.

27. The medium of embodiment 26, wherein the index is a domestic index and the second index is a foreign index.

28. The medium of embodiment 22, further, comprising:
the pool tranche instantiation component, stored in the medium, includes processor-issuable instructions to:
generate a third data structure, for a product, that maps at least one share of the first equity tranche and at least one share configured as the second equity tranche for a second index to a share of the product.

29. The medium of embodiment 28, wherein the index is a domestic index and the second index is a foreign index.
30. The medium of embodiment 28, wherein the index is a foreign index and the second index is a domestic index.
31. A processor-implemented MMACC matching system, comprising:
  a pool tranche instantiation component means, to:
    obtain, via at least one processor, a capital structure input from a system user, wherein the capital structure input is obtained via a first data structure that specifies dividend allocation and capital allocation for a first equity tranche, and dividend allocation and capital allocation for a second equity tranche;
    determine, via at least one processor, dividend allocation and capital allocation for the first equity tranche, and dividend allocation and capital allocation for the second equity tranche;
    generate, via at least one processor, a second data structure that maps dividend allocation and capital allocation of an index to the first equity tranche and to the second equity tranche based on the determined dividend allocation and capital allocation for the first equity tranche and the determined dividend allocation and capital allocation for the second equity tranche; and
    facilitate, via at least one processor, generating an actionable data structure configured to be actionable to generate shares of the first equity tranche and shares of the second equity tranche using the generated second data structure.
32. The system of embodiment 31, wherein the first data structure further specifies an identifier of the index.
33. The system of embodiment 31, wherein the first data structure further specifies a size of investment into the index.
34. The system of embodiment 33, wherein means to facilitate generating shares of the first equity tranche and shares of the second equity tranche further comprise means to:
  purchase shares of the index based on the size of investment into the index; and
  create a share of the first tranche and a share of the second tranche for each purchased share of the index.
35. The system of embodiment 34, further, comprising:
  a tranche asset transact component means, to:
    exchange a share of the index for a share of the first equity tranche and a share of the second equity tranche.
36. The system of embodiment 34, further, comprising:
  a tranche asset transact component means, to:
    exchange a share of the first equity tranche and a share of the second equity tranche for a share of the index.
37. The system of embodiment 31, wherein the first equity tranche is configured to receive substantially all dividends associated with the index and the second equity tranche is configured to receive substantially all capital associated with the index.
38. The system of embodiment 37, further, comprising:
  the pool tranche instantiation component means, to:
    generate a third data structure, for a product, that maps at least one share of the first equity tranche and at least one share of the second equity tranche to a share of the product.
39. The system of embodiment 38, wherein the product is an enhanced yield product that maps more shares of the first equity tranche than shares of the second equity tranche for each share of the product.
40. The system of embodiment 38, wherein the product is an enhanced growth product that maps fewer shares of the first equity tranche than shares of the second equity tranche for each share of the product.
41. The system of embodiment 37, further, comprising:
  the pool tranche instantiation component means, to:
    generate a third data structure, for a product, that maps at least one share of the first equity tranche or at least one share of the second equity tranche, and at least one similarly configured share for a second index to a share of the product.
42. The system of embodiment 41, wherein the index is a domestic index and the second index is a foreign index.
43. The system of embodiment 37, further, comprising:
  the pool tranche instantiation component means, to:
    generate a third data structure, for a product, that maps at least one share of the first equity tranche and at least one share configured as the second equity tranche for a second index to a share of the product.
44. The system of embodiment 43, wherein the index is a domestic index and the second index is a foreign index.
45. The system of embodiment 43, wherein the index is a foreign index and the second index is a domestic index.
46. A processor-implemented MMACC matching method, comprising:
  executing processor-implemented pool tranche instantiation component instructions to:
    obtain, via at least one processor, a capital structure input from a system user, wherein the capital structure input is obtained via a first data structure that specifies dividend allocation and capital allocation for a first equity tranche, and dividend allocation and capital allocation for a second equity tranche;
    determine, via at least one processor, dividend allocation and capital allocation for the first equity tranche, and dividend allocation and capital allocation for the second equity tranche;
    generate, via at least one processor, a second data structure that maps dividend allocation and capital allocation of an index to the first equity tranche and to the second equity tranche based on the determined dividend allocation and capital allocation for the first equity tranche and the determined dividend allocation and capital allocation for the second equity tranche; and
    facilitate, via at least one processor, generating an actionable data structure configured to be actionable to generate shares of the first equity tranche and shares of the second equity tranche using the generated second data structure.
47. The method of embodiment 46, wherein the first data structure further specifies an identifier of the index.
48. The method of embodiment 46, wherein the first data structure further specifies a size of investment into the index.
49. The method of embodiment 48, wherein instructions to facilitate generating shares of the first equity tranche and shares of the second equity tranche further comprise instructions to:

purchase shares of the index based on the size of investment into the index; and create a share of the first tranche and a share of the second tranche for each purchased share of the index.

50. The method of embodiment 49, further, comprising:
    executing processor-implemented tranche asset transact component instructions to:
      exchange a share of the index for a share of the first equity tranche and a share of the second equity tranche.

51. The method of embodiment 49, further, comprising:
    executing processor-implemented tranche asset transact component instructions to:
      exchange a share of the first equity tranche and a share of the second equity tranche for a share of the index.

52. The method of embodiment 46, wherein the first equity tranche is configured to receive substantially all dividends associated with the index and the second equity tranche is configured to receive substantially all capital associated with the index.

53. The method of embodiment 52, further, comprising:
    executing processor-implemented pool tranche instantiation component instructions to:
      generate a third data structure, for a product, that maps at least one share of the first equity tranche and at least one share of the second equity tranche to a share of the product.

54. The method of embodiment 53, wherein the product is an enhanced yield product that maps more shares of the first equity tranche than shares of the second equity tranche for each share of the product.

55. The method of embodiment 53, wherein the product is an enhanced growth product that maps fewer shares of the first equity tranche than shares of the second equity tranche for each share of the product.

56. The method of embodiment 52, further, comprising:
    executing processor-implemented pool tranche instantiation component instructions to:
      generate a third data structure, for a product, that maps at least one share of the first equity tranche or at least one share of the second equity tranche, and at least one similarly configured share for a second index to a share of the product.

57. The method of embodiment 56, wherein the index is a domestic index and the second index is a foreign index.

58. The method of embodiment 52, further, comprising:
    executing processor-implemented pool tranche instantiation component instructions to:
      generate a third data structure, for a product, that maps at least one share of the first equity tranche and at least one share configured as the second equity tranche for a second index to a share of the product.

59. The method of embodiment 58, wherein the index is a domestic index and the second index is a foreign index.

60. The method of embodiment 58, wherein the index is a foreign index and the second index is a domestic index.

61. An assured income solution configuring apparatus, comprising:
    a memory;
    a component collection in the memory, including:
      an assured income solution configuring component, and
      an assured income distribution component;
    a processor disposed in communication with the memory, and configured to issue a plurality of processing instructions from the component collection stored in the memory,
      wherein the processor issues instructions from the assured income solution configuring component, stored in the memory, to:
        obtain, via at least one processor, an assured income solution configuring request, wherein the assured income solution configuring request includes a first data structure that specifies assured income solution parameters including available capital and term length, and deferred income annuity parameters including payment amount;
        calculate, via at least one processor, a supported assured income base cash flow payment based on the assured income solution parameters;
        generate, via at least one processor, an assured income cost curve for the calculated supported assured income base cash flow payment with regard to various term lengths;
        generate, via at least one processor, a deferred income annuity cost curve for the payment amount with regard to various deferment periods;
        determine, via at least one processor, an optimal point for the assured income cost curve and the deferred income annuity cost curve, wherein the optimal point identifies an optimal term length and an optimal deferment period; and
        facilitate, via at least one processor, purchase of an assured income solution that provides the calculated supported assured income base cash flow payment for the duration of the optimal term length, and of a deferred income annuity solution that provides the payment amount after the optimal deferment period.

62. The apparatus of embodiment 61,
    wherein the assured income solution parameters specified by the first data structure further include a desired assured income base cash flow payment, and
    wherein instructions to calculate the supported assured income base cash flow payment further comprise instructions to:
      calculate a failure probability and a critical failure probability based on the specified assured income solution parameters; and
      request updated assured income solution parameters upon determining that the failure probability or the critical failure probability is too high or too low.

63. The apparatus of embodiment 61,
    wherein the first data structure further specifies risk framework preferences including a failure probability and a critical failure probability, and
    wherein instructions to calculate the supported assured income base cash flow payment further comprise instructions to:
      calculate the supported assured income base cash flow payment in accordance with the specified risk framework preferences.

64. The apparatus of embodiment 63, further, comprising:
the processor issues instructions from the assured income solution configuring component, stored in the memory, to:
request updated assured income solution parameters or risk framework preferences upon determining that the calculated supported assured income base cash flow payment fails to exceed a threshold amount.

65. The apparatus of embodiment 61,
wherein the first data structure further specifies capital market preferences including a calculation mode that specifies whether to calculate the supported assured income base cash flow payment using nominal or real values and an inflation rate, and
wherein instructions to calculate the supported assured income base cash flow payment further comprise instructions to:
calculate the supported assured income base cash flow payment in accordance with the specified calculation mode and inflation rate.

66. The apparatus of embodiment 61, further, comprising:
the processor issues instructions from the assured income solution configuring component, stored in the memory, to:
identify applicable assured income constituent products in accordance with parameters specified in the first data structure.

67. The apparatus of embodiment 66, wherein the applicable assured income constituent products are identified based on the term length.

68. The apparatus of embodiment 66, wherein the applicable assured income constituent products are identified based on risk preferences.

69. The apparatus of embodiment 66, wherein the applicable assured income constituent products are identified based on being explicitly specified in the first data structure.

70. The apparatus of embodiment 69, wherein a minimum or a maximum extent of use is specified in the first data structure for a specified applicable assured income constituent product.

71. The apparatus of embodiment 66, wherein at least one of the applicable assured income constituent products is a CEO product.

72. The apparatus of embodiment 71, wherein the CEO product is configured to receive substantially all dividends associated with an index.

73. The apparatus of embodiment 61, further, comprising:
the processor issues instructions from the assured income distribution component, stored in the memory, to:
determine that it is time to make a payment associated with the assured income solution;
determine that sufficient funds are not available to make the payment; and
accelerate payment time associated with the deferred income annuity solution.

74. The apparatus of embodiment 61, further, comprising:
the processor issues instructions from the assured income distribution component, stored in the memory, to:
determine that it is time to make a payment associated with the assured income solution; determine that the payment should be adjusted due to minimum required distribution requirements;
recalculate the payment to satisfy minimum required distribution requirements; and
facilitate distribution of the recalculated payment.

75. The apparatus of embodiment 61, further, comprising:
the processor issues instructions from the assured income distribution component, stored in the memory, to:
determine that it is time to make a payment associated with the assured income solution;
calculate a bonus payment associated with the payment;
determine that the calculated bonus payment exceeds a bonus payment cap;
recalculate the bonus payment to satisfy the bonus payment cap; and
facilitate distribution of the recalculated bonus payment.

76. A processor-readable assured income solution configuring non-transient physical medium storing processor-executable components, the components, comprising:
a component collection stored in the medium, including:
an assured income solution configuring component, and
an assured income distribution component;
wherein the assured income solution configuring component, stored in the medium, includes processor-issuable instructions to:
obtain, via at least one processor, an assured income solution configuring request, wherein the assured income solution configuring request includes a first data structure that specifies assured income solution parameters including available capital and term length, and deferred income annuity parameters including payment amount;
calculate, via at least one processor, a supported assured income base cash flow payment based on the assured income solution parameters;
generate, via at least one processor, an assured income cost curve for the calculated supported assured income base cash flow payment with regard to various term lengths;
generate, via at least one processor, a deferred income annuity cost curve for the payment amount with regard to various deferment periods;
determine, via at least one processor, an optimal point for the assured income cost curve and the deferred income annuity cost curve, wherein the optimal point identifies an optimal term length and an optimal deferment period; and
facilitate, via at least one processor, purchase of an assured income solution that provides the calculated supported assured income base cash flow payment for the duration of the optimal term length, and of a deferred income annuity solution that provides the payment amount after the optimal deferment period.

77. The medium of embodiment 76,
wherein the assured income solution parameters specified by the first data structure further include a desired assured income base cash flow payment, and
wherein instructions to calculate the supported assured income base cash flow payment further comprise instructions to:
calculate a failure probability and a critical failure probability based on the specified assured income solution parameters; and request updated assured income solution parameters upon determining that the failure probability or the critical failure probability is too high or too low.

78. The medium of embodiment 76,
wherein the first data structure further specifies risk framework preferences including a failure probability and a critical failure probability, and
wherein instructions to calculate the supported assured income base cash flow payment further comprise instructions to:
calculate the supported assured income base cash flow payment in accordance with the specified risk framework preferences.

79. The medium of embodiment 78, further, comprising:
the assured income solution configuring component, stored in the medium, includes processor-issuable instructions to:
request updated assured income solution parameters or risk framework preferences upon determining that the calculated supported assured income base cash flow payment fails to exceed a threshold amount.

80. The medium of embodiment 76,
wherein the first data structure further specifies capital market preferences including a calculation mode that specifies whether to calculate the supported assured income base cash flow payment using nominal or real values and an inflation rate, and
wherein instructions to calculate the supported assured income base cash flow payment further comprise instructions to:
calculate the supported assured income base cash flow payment in accordance with the specified calculation mode and inflation rate.

81. The medium of embodiment 76, further, comprising:
the assured income solution configuring component, stored in the medium, includes processor-issuable instructions to:
identify applicable assured income constituent products in accordance with parameters specified in the first data structure.

82. The medium of embodiment 81, wherein the applicable assured income constituent products are identified based on the term length.

83. The medium of embodiment 81, wherein the applicable assured income constituent products are identified based on risk preferences.

84. The medium of embodiment 81, wherein the applicable assured income constituent products are identified based on being explicitly specified in the first data structure.

85. The medium of embodiment 84, wherein a minimum or a maximum extent of use is specified in the first data structure for a specified applicable assured income constituent product.

86. The medium of embodiment 81, wherein at least one of the applicable assured income constituent products is a CEO product.

87. The medium of embodiment 86, wherein the CEO product is configured to receive substantially all dividends associated with an index.

88. The medium of embodiment 76, further, comprising:
the assured income distribution component, stored in the medium, includes processor-issuable instructions to:
determine that it is time to make a payment associated with the assured income solution;
determine that sufficient funds are not available to make the payment; and
accelerate payment time associated with the deferred income annuity solution.

89. The medium of embodiment 76, further, comprising:
the assured income distribution component, stored in the medium, includes processor-issuable instructions to:
determine that it is time to make a payment associated with the assured income solution;
determine that the payment should be adjusted due to minimum required distribution requirements;
recalculate the payment to satisfy minimum required distribution requirements; and
facilitate distribution of the recalculated payment.

90. The medium of embodiment 76, further, comprising:
the assured income distribution component, stored in the medium, includes processor-issuable instructions to:
determine that it is time to make a payment associated with the assured income solution;
calculate a bonus payment associated with the payment;
determine that the calculated bonus payment exceeds a bonus payment cap;
recalculate the bonus payment to satisfy the bonus payment cap; and
facilitate distribution of the recalculated bonus payment.

91. A processor-implemented assured income solution configuring system, comprising:
an assured income solution configuring component means, to:
obtain, via at least one processor, an assured income solution configuring request, wherein the assured income solution configuring request includes a first data structure that specifies assured income solution parameters including available capital and term length, and deferred income annuity parameters including payment amount;
calculate, via at least one processor, a supported assured income base cash flow payment based on the assured income solution parameters;
generate, via at least one processor, an assured income cost curve for the calculated supported assured income base cash flow payment with regard to various term lengths;
generate, via at least one processor, a deferred income annuity cost curve for the payment amount with regard to various deferment periods;
determine, via at least one processor, an optimal point for the assured income cost curve and the deferred income annuity cost curve, wherein the optimal point identifies an optimal term length and an optimal deferment period; and
facilitate, via at least one processor, purchase of an assured income solution that provides the calculated supported assured income base cash flow payment for the duration of the optimal term length, and of a deferred income annuity solution that provides the payment amount after the optimal deferment period.

92. The system of embodiment 91,
wherein the assured income solution parameters specified by the first data structure further include a desired assured income base cash flow payment, and wherein means to calculate the supported assured income base cash flow payment further comprise means to:
calculate a failure probability and a critical failure probability based on the specified assured income solution parameters; and
request updated assured income solution parameters upon determining that the failure probability or the critical failure probability is too high or too low.

93. The system of embodiment 91,
wherein the first data structure further specifies risk framework preferences including a failure probability and a critical failure probability, and
wherein means to calculate the supported assured income base cash flow payment further comprise means to:
calculate the supported assured income base cash flow payment in accordance with the specified risk framework preferences.

94. The system of embodiment 93, further, comprising:
the assured income solution configuring component means, to:
request updated assured income solution parameters or risk framework preferences upon determining that the calculated supported assured income base cash flow payment fails to exceed a threshold amount.

95. The system of embodiment 91,
wherein the first data structure further specifies capital market preferences including a calculation mode that specifies whether to calculate the supported assured income base cash flow payment using nominal or real values and an inflation rate, and
wherein means to calculate the supported assured income base cash flow payment further comprise means to:
calculate the supported assured income base cash flow payment in accordance with the specified calculation mode and inflation rate.

96. The system of embodiment 91, further, comprising:
the assured income solution configuring component means, to:
identify applicable assured income constituent products in accordance with parameters specified in the first data structure.

97. The system of embodiment 96, wherein the applicable assured income constituent products are identified based on the term length.

98. The system of embodiment 96, wherein the applicable assured income constituent products are identified based on risk preferences.

99. The system of embodiment 96, wherein the applicable assured income constituent products are identified based on being explicitly specified in the first data structure.

100. The system of embodiment 99, wherein a minimum or a maximum extent of use is specified in the first data structure for a specified applicable assured income constituent product.

101. The system of embodiment 96, wherein at least one of the applicable assured income constituent products is a CEO product.

102. The system of embodiment 101, wherein the CEO product is configured to receive substantially all dividends associated with an index.

103. The system of embodiment 91, further, comprising:
an assured income distribution component means, to:
determine that it is time to make a payment associated with the assured income solution;
determine that sufficient funds are not available to make the payment; and
accelerate payment time associated with the deferred income annuity solution.

104. The system of embodiment 91, further, comprising:
an assured income distribution component means, to:
determine that it is time to make a payment associated with the assured income solution;
determine that the payment should be adjusted due to minimum required distribution requirements;
recalculate the payment to satisfy minimum required distribution requirements; and
facilitate distribution of the recalculated payment.

105. The system of embodiment 91, further, comprising:
an assured income distribution component means, to:
determine that it is time to make a payment associated with the assured income solution;
calculate a bonus payment associated with the payment;
determine that the calculated bonus payment exceeds a bonus payment cap;
recalculate the bonus payment to satisfy the bonus payment cap; and
facilitate distribution of the recalculated bonus payment.

106. A processor-implemented assured income solution configuring method, comprising:
executing processor-implemented assured income solution configuring component instructions to:
obtain, via at least one processor, an assured income solution configuring request, wherein the assured income solution configuring request includes a first data structure that specifies assured income solution parameters including available capital and term length, and deferred income annuity parameters including payment amount;
calculate, via at least one processor, a supported assured income base cash flow payment based on the assured income solution parameters;
generate, via at least one processor, an assured income cost curve for the calculated supported assured income base cash flow payment with regard to various term lengths;
generate, via at least one processor, a deferred income annuity cost curve for the payment amount with regard to various deferment periods;
determine, via at least one processor, an optimal point for the assured income cost curve and the deferred income annuity cost curve, wherein the optimal point identifies an optimal term length and an optimal deferment period; and
facilitate, via at least one processor, purchase of an assured income solution that provides the calculated supported assured income base cash flow payment for the duration of the optimal term length, and of a deferred income annuity solution that provides the payment amount after the optimal deferment period.

107. The method of embodiment 106,
wherein the assured income solution parameters specified by the first data structure further include a desired assured income base cash flow payment, and
wherein instructions to calculate the supported assured income base cash flow payment further comprise instructions to:

calculate a failure probability and a critical failure probability based on the specified assured income solution parameters; and request updated assured income solution parameters upon determining that the failure probability or the critical failure probability is too high or too low.

108. The method of embodiment 106,
wherein the first data structure further specifies risk framework preferences including a failure probability and a critical failure probability, and
wherein instructions to calculate the supported assured income base cash flow payment further comprise instructions to:
calculate the supported assured income base cash flow payment in accordance with the specified risk framework preferences.

109. The method of embodiment 108, further, comprising:
executing processor-implemented assured income solution configuring component instructions to:
request updated assured income solution parameters or risk framework preferences upon determining that the calculated supported assured income base cash flow payment fails to exceed a threshold amount.

110. The method of embodiment 106,
wherein the first data structure further specifies capital market preferences including a calculation mode that specifies whether to calculate the supported assured income base cash flow payment using nominal or real values and an inflation rate, and
wherein instructions to calculate the supported assured income base cash flow payment further comprise instructions to:
calculate the supported assured income base cash flow payment in accordance with the specified calculation mode and inflation rate.

111. The method of embodiment 106, further, comprising:
executing processor-implemented assured income solution configuring component instructions to:
identify applicable assured income constituent products in accordance with parameters specified in the first data structure.

112. The method of embodiment 111, wherein the applicable assured income constituent products are identified based on the term length.

113. The method of embodiment 111, wherein the applicable assured income constituent products are identified based on risk preferences.

114. The method of embodiment 111, wherein the applicable assured income constituent products are identified based on being explicitly specified in the first data structure.

115. The method of embodiment 114, wherein a minimum or a maximum extent of use is specified in the first data structure for a specified applicable assured income constituent product.

116. The method of embodiment 111, wherein at least one of the applicable assured income constituent products is a CEO product.

117. The method of embodiment 116, wherein the CEO product is configured to receive substantially all dividends associated with an index.

118. The method of embodiment 106, further, comprising:
executing processor-implemented assured income distribution component instructions to:
determine that it is time to make a payment associated with the assured income solution;
determine that sufficient funds are not available to make the payment; and
accelerate payment time associated with the deferred income annuity solution.

119. The method of embodiment 106, further, comprising:
executing processor-implemented assured income distribution component instructions to:
determine that it is time to make a payment associated with the assured income solution;
determine that the payment should be adjusted due to minimum required distribution requirements;
recalculate the payment to satisfy minimum required distribution requirements; and
facilitate distribution of the recalculated payment.

120. The method of embodiment 106, further, comprising:
executing processor-implemented assured income distribution component instructions to:
determine that it is time to make a payment associated with the assured income solution;
calculate a bonus payment associated with the payment;
determine that the calculated bonus payment exceeds a bonus payment cap;
recalculate the bonus payment to satisfy the bonus payment cap; and
facilitate distribution of the recalculated bonus payment.

In order to address various issues and advance the art, the entirety of this application for Multiple Modular Asset Class Constructor Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the FIGS. and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a MMACC individual and/or enterprise user, database configuration and/or relational model, data type, data transmission and/or network framework, syntax structure, and/or the like, various embodiments of the MMACC, may be implemented that enable a great deal of flexibility and customization. For example, aspects of the MMACC may be adapted for separating, e.g., physical, asset benefits and liabilities across slices of an asset collection. While various embodiments and discussions of the MMACC have included information technology, however, it is to be understood that the embodiments described herein may be readily configured and/or customized for a wide variety of other applications and/or implementations.

What is claimed is:

1. An actionable asset data structure creator apparatus, comprising:
at least one memory;
a component collection in the at least one memory;
at least one processor disposed in communication with the at least one memory, the at least one processor executing processor-executable instructions comprising:
obtain, via at least one processor, a composite capital structure input data structure,
in which capital structure input is obtained via a first actionable data structure that specifies dividend allocation and capital allocation for a first equity tranche data structure element, and dividend allocation and capital allocation for a second equity tranche data structure element;

determine, via at least one processor, dividend allocation and capital allocation for the first equity tranche data structure element, and dividend allocation and capital allocation for the second equity tranche data structure element,
in which determination includes examining all assets specified in the composite capital structure input data structure and iterate for each actionable data structure slice type specified in the composite capital structure input data structure;
generate, via at least one processor, a second actionable data structure that maps dividend allocation and capital allocation of an index to the first equity tranche data structure element and to the second equity tranche data structure element based on the determined dividend allocation and capital allocation for the first equity tranche data structure element and the determined dividend allocation and capital allocation for the second equity tranche data structure element; and
generate, via at least one processor, an actionable data structure structured as actionable to generate share data structures of the first equity tranche data structure element and share data structures of the second equity tranche data structure element using the generated second actionable data structure.

2. The apparatus of claim 1, in which the actionable data structure is at least one database record.

3. The apparatus of claim 1, in which the first actionable data structure further specifies an identifier of the index.

4. The apparatus of claim 1, in which the first actionable data structure further specifies a size of investment into the index.

5. The apparatus of claim 4, in which instructions to facilitate generating shares of the first equity tranche data structure element and shares of the second equity tranche data structure element further comprise instructions to:
purchase shares of the index based on the size of investment into the index; and
create a share of the first tranche data structure element and a share of the second tranche data structure element for each purchased share of the index.

6. The apparatus of claim 5, further, comprising:
exchange a share of the index for a share of the first equity tranche data structure element and a share of the second equity tranche data structure element.

7. The apparatus of claim 5, further, comprising:
exchange a share of the first equity tranche data structure element and a share of the second equity tranche data structure element for a share of the index.

8. The apparatus of claim 1, in which the first equity tranche data structure element is structured as to receive substantially all dividends associated with the index and the second equity tranche data structure element is structured as to receive substantially all capital associated with the index.

9. The apparatus of claim 8, further, comprising:
generate a third actionable data structure, for a product, that maps at least one share of the first equity tranche data structure element and at least one share of the second equity tranche data structure element to a share of the product.

10. The apparatus of claim 9, in which the product is an enhanced yield product that maps more shares of the first equity tranche data structure element than shares of the second equity tranche data structure element for each share of the product.

11. The apparatus of claim 9, in which the product is an enhanced growth product that maps fewer shares of the first equity tranche data structure element than shares of the second equity tranche data structure element for each share of the product.

12. The apparatus of claim 8, further, comprising:
the processor issues instructions from the pool tranche instantiation component, stored in the memory, to:
generate a third actionable data structure, for a product, that maps at least one share of the first equity tranche data structure element or at least one share of the second equity tranche data structure element, and at least one similarly structured share for a second index to a share of the product.

13. The apparatus of claim 12, in which the index is a domestic index and the second index is a foreign index.

14. The apparatus of claim 8, further, comprising:
the processor issues instructions from the pool tranche instantiation component, stored in the memory, to:
generate a third actionable data structure, for a product, that maps at least one share of the first equity tranche data structure element and at least one share structured as the second equity tranche data structure element for a second index to a share of the product.

15. The apparatus of claim 14, in which the index is a domestic index and the second index is a foreign index.

16. The apparatus of claim 14, in which the index is a foreign index and the second index is a domestic index.

17. An actionable asset data structure creator processor-readable, non-transient medium storing a component collection, the component collection storage structured with processor-executable instructions comprising:
obtain, via at least one processor, a composite capital structure input data structure,
in which capital structure input is obtained via a first actionable data structure that specifies dividend allocation and capital allocation for a first equity tranche data structure element, and dividend allocation and capital allocation for a second equity tranche data structure element;
determine, via at least one processor, dividend allocation and capital allocation for the first equity tranche data structure element, and dividend allocation and capital allocation for the second equity tranche data structure element,
in which determination includes examining all assets specified in the composite capital structure input data structure and iterate for each actionable data structure slice type specified in the composite capital structure input data structure;
generate, via at least one processor, a second actionable data structure that maps dividend allocation and capital allocation of an index to the first equity tranche data structure element and to the second equity tranche data structure element based on the determined dividend allocation and capital allocation for the first equity tranche data structure element and the determined dividend allocation and capital allocation for the second equity tranche data structure element; and
generate, via at least one processor, an actionable data structure structured as actionable to generate share data structures of the first equity tranche data structure element and share data structures of the second equity tranche data structure element using the generated second actionable data structure.

18. A actionable asset data structure creator processor-implemented system, comprising:
means to store a component collection;
means to process processor-executable instructions from the component collection, the component collection storage structured with processor-executable instructions including:
obtain, via at least one processor, a composite capital structure input data structure,
in which capital structure input is obtained via a first actionable data structure that specifies dividend allocation and capital allocation for a first equity tranche data structure element, and dividend allocation and capital allocation for a second equity tranche data structure element;
determine, via at least one processor, dividend allocation and capital allocation for the first equity tranche data structure element, and dividend allocation and capital allocation for the second equity tranche data structure element,
in which determination includes examining all assets specified in the composite capital structure input data structure and iterate for each actionable data structure slice type specified in the composite capital structure input data structure;
generate, via at least one processor, a second actionable data structure that maps dividend allocation and capital allocation of an index to the first equity tranche data structure element and to the second equity tranche data structure element based on the determined dividend allocation and capital allocation for the first equity tranche data structure element and the determined dividend allocation and capital allocation for the second equity tranche data structure element; and
generate, via at least one processor, an actionable data structure structured as actionable to generate share data structures of the first equity tranche data structure element and share data structures of the second equity tranche data structure element using the generated second actionable data structure.

19. A actionable asset data structure creator process, including processing processor-executable instructions via at least one processor from a component collection stored in at least one memory, the component collection storage structured with processor-executable instructions comprising:
obtain, via at least one processor, a composite capital structure input data structure,
in which capital structure input is obtained via a first actionable data structure that specifies dividend allocation and capital allocation for a first equity tranche data structure element, and dividend allocation and capital allocation for a second equity tranche data structure element;
determine, via at least one processor, dividend allocation and capital allocation for the first equity tranche data structure element, and dividend allocation and capital allocation for the second equity tranche data structure element,
in which determination includes examining all assets specified in the composite capital structure input data structure and iterate for each actionable data structure slice type specified in the composite capital structure input data structure;
generate, via at least one processor, a second actionable data structure that maps dividend allocation and capital allocation of an index to the first equity tranche data structure element and to the second equity tranche data structure element based on the determined dividend allocation and capital allocation for the first equity tranche data structure element and the determined dividend allocation and capital allocation for the second equity tranche data structure element; and generate, via at least one processor, an actionable data structure structured as actionable to generate share data structures of the first equity tranche data structure element and shares of the second equity tranche data structure element using the generated second actionable data structure.

\* \* \* \* \*